ELECTRONIC DATA PROCESSING MACHINE

Filed March 30, 1954 70 Sheets-Sheet 1

INVENTORS
J. A. HADDAD
R. K. RICHARDS
N. ROCHESTER
H. D. ROSS JR
BY John F. Hanifin
ATTORNEY

ELECTRONIC DATA PROCESSING MACHINE

Filed March 30, 1954 70 Sheets-Sheet 2

INVENTORS
J. A. HADDAD
R. K. RICHARDS
N. ROCHESTER
H. D. ROSS JR.

BY John F. Hanifin
ATTORNEY

March 14, 1961 J. A. HADDAD ET AL 2,974,866

ELECTRONIC DATA PROCESSING MACHINE

Filed March 30, 1954 70 Sheets-Sheet 3

INVENTORS
J.A. HADDAD
R.K. RICHARDS
N. ROCHESTER
H. D. ROSS JR

BY John F. Hanifin
ATTORNEY

March 14, 1961 J. A. HADDAD ET AL 2,974,866

ELECTRONIC DATA PROCESSING MACHINE

Filed March 30, 1954 70 Sheets-Sheet 4

INVENTORS
J.A. HADDAD
R.K. RICHARDS
N. ROCHESTER
H.D. ROSS, JR.

BY John F. Hanifin
ATTORNEY

ELECTRONIC DATA PROCESSING MACHINE

Filed March 30, 1954

70 Sheets-Sheet 5

INVENTORS
J. A. HADDAD
R. K. RICHARDS
N. ROCHESTER
H. D. ROSS JR.

BY

John F. Hanifin
ATTORNEY

March 14, 1961 J. A. HADDAD ET AL 2,974,866

ELECTRONIC DATA PROCESSING MACHINE

Filed March 30, 1954 70 Sheets-Sheet 6

INVENTORS
J.A. HADDAD
R.K. RICHARDS
N. ROCHESTER
H.D. ROSS JR.

BY John F. Hanifin
ATTORNEY

INVENTORS
J. A. HADDAD
R. K. RICHARDS
N. ROCHESTER
H. D. ROSS, JR.

BY John T. Hanifin

ATTORNEY

INVENTORS
J. A. HADDAD
R. K. RICHARDS
N. ROCHESTER
H. D. ROSS, JR.
BY John F. Hanifin
ATTORNEY INVENTORS
J. A. HADDAD
R. K. RICHARDS
N. ROCHESTER
H. D. ROSS, JR.
BY
John F. Hanifin
ATTORNEY

INVENTORS
J. A. HADDAD
R. K. RICHARDS
N. ROCHESTER
H. D. ROSS, JR.

BY John F. Hanifin
ATTORNEY

INVENTORS
J. A. HADDAD
R. K. RICHARDS
N. ROCHESTER
H. D. ROSS, JR.
BY
John F. Hanifin
ATTORNEY INVENTORS
J. A. HADDAD
R.K. RICHARDS
N. ROCHESTER
H. D. ROSS JR.
BY John F. Hanifen
ATTORNEY INVENTORS
J. A. HADDAD
R. K. RICHARDS
N. ROCHESTER
H. D. ROSS JR.
BY
John F. Hanifin
ATTORNEY INVENTORS
J. A. HADDAD
R. K. RICHARDS
N. ROCHESTER
H. D. ROSS JR.
BY
John F. Hanifin
ATTORNEY INVENTORS
J. A. HADDAD
R. K. RICHARDS
N. ROCHESTER
H. D. ROSS JR.
BY
John F. Hanifin
ATTORNEY INVENTORS
J. A. HADDAD
R. K. RICHARDS
N. ROCHESTER
H. D. ROSS JR.
BY
John F. Hanifin
ATTORNEY INVENTORS
J. A HADDAD
R. K. RICHARDS
N. ROCHESTER
H. D ROSS JR.
BY John F. Hanifin
ATTORNEY

INVENTORS
J. A. HADDAD
R. K. RICHARDS
N. ROCHESTER
H. D. ROSS JR.

BY John F. Hanifin

ATTORNEY

March 14, 1961 J. A. HADDAD ET AL 2,974,866

ELECTRONIC DATA PROCESSING MACHINE

Filed March 30, 1954

70 Sheets-Sheet 19

INVENTORS
J. A. HADDAD
R. K. RICHARDS
N. ROCHESTER
H. D. ROSS JR.

BY John F. Hanifin
ATTORNEY

March 14, 1961 J. A. HADDAD ET AL 2,974,866

ELECTRONIC DATA PROCESSING MACHINE

Filed March 30, 1954

70 Sheets-Sheet 20

INVENTORS
J. A. HADDAD
R. K. RICHARDS
N. ROCHESTER
H. D. ROSS, JR.

BY John F. Hanifin

ATTORNEY

REGENERATION COUNTER

INVENTORS
J. A. HADDAD
R. K. RICHARDS
N. ROCHESTER
H. D. ROSS JR.

BY John T. Hanifin
ATTORNEY

INVENTORS
J. A. HADDAD
R. K. RICHARDS
N. ROCHESTER
H. D. ROSS, JR.
BY
John F. Hanifin
ATTORNEY INVENTORS
J.A. HADDAD
R.K. RICHARDS
N. ROCHESTER
H.D. ROSS, JR.
BY John F. Hanifin
ATTORNEY March 14, 1961 J. A. HADDAD ET AL 2,974,866

ELECTRONIC DATA PROCESSING MACHINE

Filed March 30, 1954

70 Sheets-Sheet 24

INVENTORS
J. A. HADDAD
R. K. RICHARDS
N. ROCHESTER
H. D. ROSS, JR.

BY John F. Hanifin
ATTORNEY

March 14, 1961 J. A. HADDAD ET AL 2,974,866

ELECTRONIC DATA PROCESSING MACHINE

Filed March 30, 1954 70 Sheets-Sheet 25

OPERATION DECODER

INVENTORS
J. A. HADDAD
R. K. RICHARDS
N. ROCHESTER
H. D. ROSS JR.

BY John F. Hanifin
ATTORNEY

March 14, 1961 J. A. HADDAD ET AL 2,974,866

ELECTRONIC DATA PROCESSING MACHINE

Filed March 30, 1954 70 Sheets-Sheet 26

OPERATION DECODER

INVENTORS
J. A. HADDAD
R. K. RICHARDS
N. ROCHESTER
H. D. ROSS JR.

BY John T. Hanifin
ATTORNEY

CARRY AND OVERFLOW TRIGGERS

MULT DIV TALLY COUNTER

INVENTORS
J. A. HADDAD
R. K. RICHARDS
N. ROCHESTER
H. D. ROSS JR.
BY John F. Hanifin
ATTORNEY

ADDRESS, SIGN, ADDRESS COUNTER MIXER

BY
INVENTORS
J. A. HADDAD
R. K. RICHARDS
N. ROCHESTER
H. D. ROSS JR.
John F. Hanifin
ATTORNEY

TRANSFER ON OVERFLOW

TRANSFER ON PLUS

TRANSFER ON ZERO

ROUND

SUBTRACT

RESET SUBTRACT

SUBTRACT ABSOLUTE

ADD

INVENTORS
J. A. HADDAD
R. K. RICHARDS
N. ROCHESTER
H. D. ROSS, JR.
BY John F. Hanifin
ATTORNEY

RESET ADD

ADD ABSOLUTE

MPY; MPY & ROUND

STORE

STORE MQ

STORE ADDRESS

INVENTORS
J. A. HADDAD
R. K. RICHARDS
N. ROCHESTER
H. D. ROSS, JR.
BY
John F. Hanifin
ATTORNEY INVENTORS
J. A. HADDAD
R. K. RICHARDS
N. ROCHESTER
H. D. ROSS, JR.
BY
John T. Hanifin
ATTORNEY INVENTORS
J. A. HADDAD
R. K. RICHARDS
N. ROCHESTER
H. D. ROSS JR
BY John T. Hanifin
ATTORNEY INVENTORS
J. A. HADDAD
R. K. RICHARDS
N. ROCHESTER
H. D. ROSS JR.
BY John T. Hanifin
ATTORNEY INVENTORS
J. A. HADDAD
R. K. RICHARDS
N. ROCHESTER
H. D. ROSS JR.
BY
John F. Hanifin
ATTORNEY March 14, 1961 J. A. HADDAD ET AL 2,974,866

ELECTRONIC DATA PROCESSING MACHINE

Filed March 30, 1954

70 Sheets-Sheet 35

INVENTORS
J. A. HADDAD
R.K. RICHARDS
N. ROCHESTER
H.D. ROSS JR.

BY John T. Hanifin
ATTORNEY

INVENTORS
J. A. HADDAD
R. K. RICHARDS
N. ROCHESTER
H. D. ROSS JR.
BY John R. Hanifin
ATTORNEY INVENTORS
J.A. HADDAD
R.K. RICHARDS
N. ROCHESTER
H.D. ROSS, JR
BY John F. Hanifin
ATTORNEY INVENTORS
J. A. HADDAD
R. K. RICHARDS
N. ROCHESTER
H. D. ROSS JR.
BY John F. Hanifin
ATTORNEY INVENTOR.
J. A. HADDAD
R. K. RICHARDS
N. ROCHESTER
H. D. ROSS JR
BY
John T. Hanifin
ATTORNEY INVENTORS
J. A. HADDAD
R. K. RICHARDS
N. ROCHESTER
H. D. ROSS JR.
BY
John F. Hanifin
ATTORNEY INVENTORS
J. A. HADDAD
R. K. RICHARDS
N. ROCHESTER
H. D. ROSS JR.
BY
John F. Hanifin
ATTORNEY INVENTORS
J. A. HADDAD
R. K. RICHARDS
N. ROCHESTER
H. D. ROSS JR.
BY John F. Hanifin
ATTORNEY INVENTORS
J. A. HADDAD
R. K. RICHARDS
N. ROCHESTER
H. D. ROSS JR.
BY John F. Hanifin
ATTORNEY

ELECTRONIC DATA PROCESSING MACHINE

Filed March 30, 1954

INVENTORS
J. A. HADDAD
R. K. RICHARDS
N. ROCHESTER
H. D. ROSS JR.

BY John F. Hanifin

ATTORNEY

INVENTORS
J. A. HADDAD
R. K. RICHARDS
N. ROCHESTER
H. D. ROSS JR.
BY John F. Hanifin
ATTORNEY INVENTORS
J. A. HADDAD
R. K. RICHARDS
N. ROCHESTER
H. D. ROSS JR.
BY John F. Hanifin
ATTORNEY INVENTORS
J. A. HADDAD
R. K. RICHARDS
N. ROCHESTER
H. D. ROSS JR.
BY John F. Hanifin
ATTORNEY INVENTORS
J. A. HADDAD
R. K. RICHARDS
N. ROCHESTER
H. D. ROSS JR.
BY John F. Hanifin
ATTORNEY INVENTORS
J. A. HADDAD
R. K. RICHARDS
N. ROCHESTER
H. D. ROSS JR.
BY John F. Hanifin
ATTORNEY March 14, 1961 J. A. HADDAD ET AL 2,974,866

ELECTRONIC DATA PROCESSING MACHINE

Filed March 30, 1954 70 Sheets-Sheet 50

INVENTORS
J. A. HADDAD
R. K. RICHARDS
N. ROCHESTER
H. D. ROSS JR.
BY John T. Hanifin
ATTORNEY INVENTORS
J. A. HADDAD
R. K. RICHARDS
N. ROCHESTER
H. D. ROSS JR.
BY John F. Hanifin
ATTORNEY INVENTORS
J. A. HADDAD
R.K. RICHARDS
N. ROCHESTER
H.D. ROSS JR.
BY
John R. Hanifin
ATTORNEY INVENTORS
J. A. HADDAD
R. K. RICHARD
N. ROCHESTER
H. D. ROSS JR.
BY John F. Hanifin
ATTORNEY

* LINE GOES NEGATIVE WHEN NEW INSTRUCTION IS READ INTO OPERATION DECODER

* LINE GOES NEGATIVE WHEN NEW INSTRUCTION IS READ INTO OPERATION DECODER

INVENTORS
J. A. HADDAD
R. K. RICHARDS
N. ROCHESTER
H. D. ROSS JR.
BY John F. Hanifin
ATTORNEY INVENTORS
J. A. HADDAD
R. K. RICHARDS
N. ROCHESTER
H. D. ROSS JR.
BY John F. Hanifin
ATTORNEY

BY

INVENTORS
J. A. HADDAD
R. K. RICHARDS
N. ROCHESTER
H. D. ROSS JR.

John F. Hanifin
ATTORNEY

INVENTORS
J. A. HADDAD
R. K. RICHARDS
N. ROCHESTER
H. D. ROSS JR.
BY John T. Hanifin
ATTORNEY INVENTORS
J. A. HADDAD
R. K. RICHARDS
N. ROCHESTER
H. D. ROSS JR.
BY John T. Hanifin
ATTORNEY INVENTORS
J. A. HADDAD
R. K. RICHARDS
N. ROCHESTER
H. D. ROSS JR.
BY John F. Hanifin
ATTORNEY

INVENTORS
J. A. HADDAD
R. K. RICHARDS
N. ROCHESTER
H. D. ROSS JR

BY John F. Hanifin
ATTORNEY

March 14, 1961 J. A. HADDAD ET AL 2,974,866

ELECTRONIC DATA PROCESSING MACHINE

Filed March 30, 1954 70 Sheets-Sheet 61

INVENTORS
J. A. HADDAD
R. K. RICHARDS
N. ROCHESTER
H. D. ROSS JR.

BY John F. Hanifin
ATTORNEY

INVENTORS
J. A. HADDAD
R. K. RICHARDS
N. ROCHESTER
H. D. ROSS JR.
BY
John F. Hanifin
ATTORNEY INVENTORS
J. A. HADDAD
R. K. RICHARDS
N. ROCHESTER
H. D. ROSS JR.
BY John F. Hanifin
ATTORNEY INVENTORS
J. A. HADDAD
R. K. RICHARDS
N. ROCHESTER
H. D. ROSS JR.
BY
John F. Hanifin
ATTORNEY INVENTORS
J. A. HADDAD
R. K. RICHARDS
N. ROCHESTER
H. D. ROSS JR.
BY John F. Hanifin
ATTORNEY

ACCUMULATOR REGISTER
S ORDER

ACCUMULATOR REGISTER
ORDERS Q, P, AND 1 through 35

MQ REGISTER
ORDERS S, AND 1 through 35

INVENTORS
J. A. HADDAD
R. K. RICHARDS
N. ROCHESTER
H. D. ROSS JR.
BY
John F. Hanifin
ATTORNEY INVENTORS
J. A. HADDAD
R. K. RICHARDS
N. ROCHESTER
H. D. ROSS JR.
BY John F. Hanifin
ATTORNEY

FIG. 8a

MEMORY REGISTER
.10110

| | | ACCUMULATOR REGISTER | MQ REGISTER |
|---|---|---|---|
| | | 00.00000 | 01101 |
| E/R1 | ADD MR TO ACC | .10110 | |
| | ADDER SUM TO ACC | 00.10110 | |
| | SHIFT ACC AND MQ | 00.01011 | 00110 |
| E/R2 | ADD MR TO ACC | .10110 | |
| | NO ADDER SUM TO ACC | 00.01011 | |
| | SHIFT ACC AND MQ | 00.00101 | 10011 |
| E/R3 | ADD MR TO ACC | .10110 | |
| | ADDER SUM TO ACC | 00.11011 | |
| | SHIFT ACC AND MQ | 00.01101 | 11001 |
| E/R4 | ADD MR TO ACC | .10110 | |
| | ADDER SUM TO ACC | 01.00011 | |
| | SHIFT ACC AND MQ | 00.10001 | 11100 |
| E/R5 | ADD MR TO ACC | .10110 | |
| | NO ADDER SUM TO ACC | 00.10001 | |
| | SHIFT ACC AND MQ | 00.01000 | 11110 |

INVENTORS
J. A. HADDAD
R. K. RICHARDS
N. ROCHESTER
H. D. ROSS JR.
BY John F. Hanifin
ATTORNEY

FIG. 8b

MEMORY REGISTER .10110

| | | ACCUMULATOR REGISTER | MQ REGISTER |
|---|---|---|---|
| | | 00.01000 | 1111 1 |
| E/R1 | COMPLEMENT ACC | 11.10111 | |
| | ADD MR TO COMP ACC | .10110 | |
| | ADDER OUTPUT (CARRY) | C 00.01101 | |
| | ACCUMULATOR REGISTER | 00.01000 | |
| | SHIFT ACC AND MQ | 00.10001 | 1111 0 |
| E/R2 | COMPLEMENT ACC | 11.01110 | |
| | ADD MR TO COMP ACC | .10110 | |
| | ADDER OUTPUT (CARRY) | C 00.00100 | |
| | ACCUMULATOR REGISTER | 00.10001 | |
| | SHIFT ACC AND MQ | 01.00011 | 1110 0 |
| E/R3 | COMPLEMENT ACC | 10.11100 | |
| | ADD MR TO COMP ACC | .10110 | |
| | ADDER OUTPUT (NO CARRY) | NC 11.10010 | 1 |
| | ADDER TO ACCUMULATOR REGISTER | 11.10010 | |
| | RECOMPLEMENT ACC | 00.01101 | |
| | SHIFT ACC AND MQ | 00.11011 | 1101 0 |
| E/R4 | COMPLEMENT ACC | 11.00100 | |
| | ADD MR TO COMP ACC | .10110 | |
| | ADDER OUTPUT (NO CARRY) | NC 11.11010 | 1 |
| | ADDER TO ACC REG | 11.11010 | |
| | RECOMPLEMENT ACC | 00.00101 | |
| | SHIFT ACC AND MQ | 00.01011 | 1011 0 |
| E/R5 | COMPLEMENT ACC | 11.10100 | |
| | ADD MR TO COMP ACC | .10110 | |
| | ADDER OUTPUT (CARRY) | C 00.01010 | |
| | ACCUMULATOR REGISTER | 00.01011 | |
| | SHIFT ACC AND MR | 00.10111 | 0110 0 |
| E/R6 | COMPLEMENT ACC | 11.01000 | |
| | ADD MR TO COMP ACC | .10110 | |
| | ADDER OUTPUT (NO CARRY) | NC 11.11110 | 1 |
| | ADDER TO ACC REG | 11.11110 | |
| | RECOMPLEMENT ACC | 00.00001 | |
| | RESULT | 00.00001 | 0110 1 |

INVENTORS
J. A. HADDAD
R. K. RICHARDS
N. ROCHESTER
H. D. ROSS JR.
BY John F. Hanifin
ATTORNEY

INVENTORS
J. A. HADDAD
R. K. RICHARDS
N. ROCHESTER
H. D. ROSS JR.

BY John F. Hanifin
ATTORNEY

United States Patent Office 2,974,866

Patented Mar. 14, 1961

2,974,866

ELECTRONIC DATA PROCESSING MACHINE

Jerrier A. Haddad, Binghamton, Richard K. Richards, Poughkeepsie, Nathaniel Rochester, Wappinger Falls, and Harold D. Ross, Jr., Poughkeepsie, N.Y., assignors to International Business Machines Corporation, New York, N.Y., a corporation of New York Filed Mar. 30, 1954, Ser. No. 419,642

12 Claims. (Cl. 235—157)

Figure 1A:
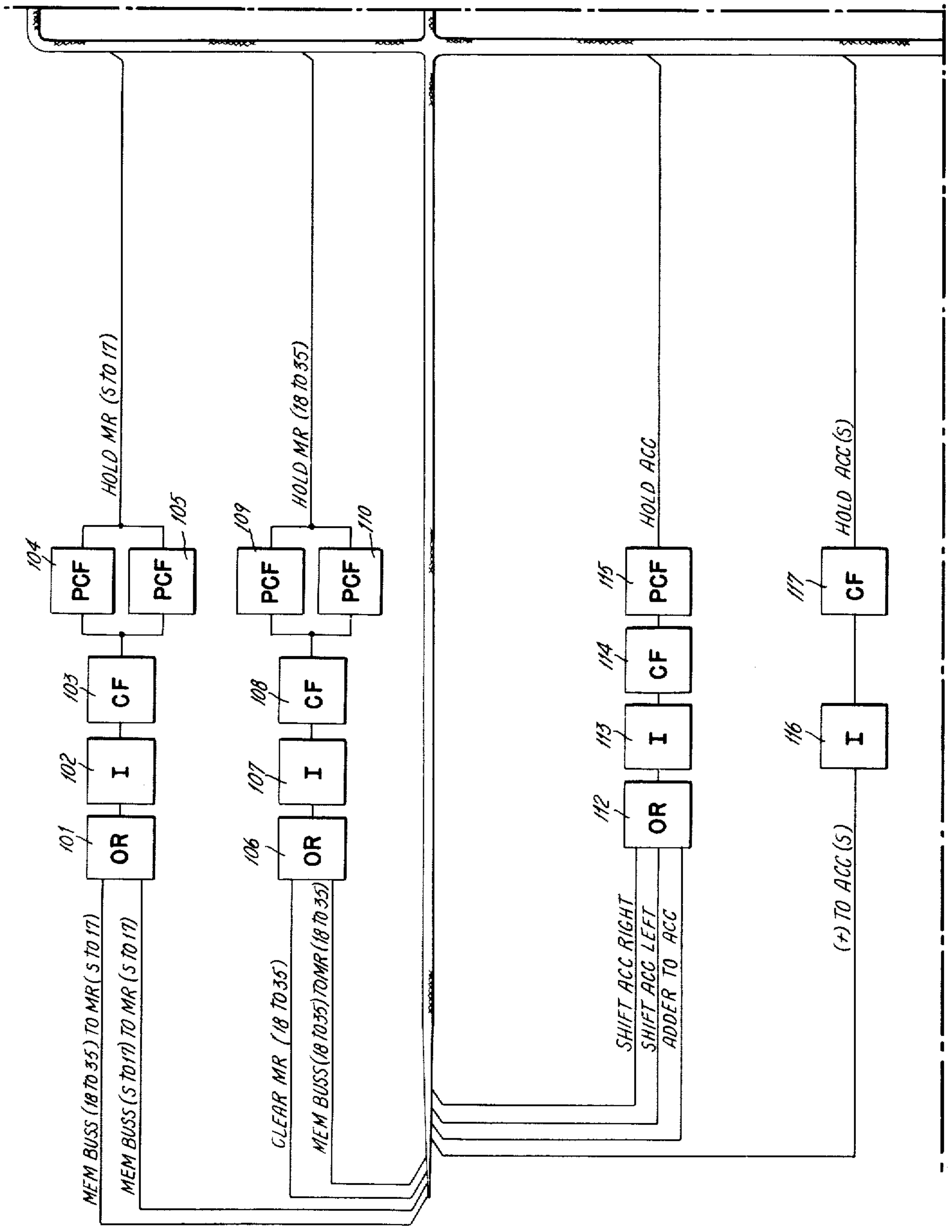

The present invention relates to a Calculator for performing binary calculations on data; derived from the cathode ray tube storage elements comprising the Memory of an Electronic Data Processing Machine.

As set forth below, in A BRIEF OUTLINE OF THE CALCULATOR, the Calculator, per se, is operated by a Program, stored in Memory, said Program including Instructions for initiating certain Arithmetical processes upon data, also stored in said Memory. The Calculator is of the parallel type comprising 35 orders and a Sign order and all 35 orders are handled, in parallel.

The Calculator, per se, comprises a 36 order Memory Register, comprising 35 orders and a Sign order; a 35 order Adder, each comprising a full binary adder, of logical AND and OR circuits and additional circuitry and two overflow orders, each comprising half binary adders of logical AND and OR circuits and additional circuitry; an Accumulator Register, of 35 orders, for storing data, two overflow orders and a Sign order, each comprising a Delay Unit, as the storing element, per se, of each order, which Unit, as described below, has the inherent faculty of emitting an output indication, of a previously stored bit, as a new bit is simultaneously applied to the input of said Unit. Another register called the Multiplier Quotient Register (MQ) comprising 35 orders and a Sign order also utilizes a Delay Unit, as the storage element, per se. The 35th order of the Accumulator Register is connective to the Multiplier Quotient 1 order and vice versa, whereby the MQ and the Accumulator Register are shiftable, as a unit, any desired number of steps, either to the right or to the left. As pointed out below, the logical nature of the Adder and the unique characteristic of simultaneous input and output of the Delay Units, along with the fact that the outputs of the Accumulator Register Delay Units are respectively connected to inputs of the Adder orders, and operable to deliver True or Complement representations of the respective values, stored in said Accumulator Register, while outputs of the respective Adder orders are respectively connected to the inputs of the Delay Units of the Accumulator Register, provide a Calculator wherein carries ripple through almost instantaneously and due to the simultaneous input/output feature of the Delay Units, "tentative" arithmetical operations can be performed and can also be completed or not completed, selectively, in accordance with operating conditions, whereby extremely rapid calculations are produced, at speeds heretofore unheard of, and limited only by the operating speeds of the circuit components, per se.

Further, Sign indicating and checking devices are provided whereby the Calculations may be performed in accordance with the Signs and including special operations particularly involving Signs, and the results of said Calculations are stored, with the proper Sign indications.

Means are provided, as stated above, to read Instructions from Memory and control data handling in accordance with these Instructions, both data and the Instructions being stored in Memory, at selectable Addresses. As described below, Instructions comprise half words of 18 bits, including Sign, read from Memory to the Memory Busses and via the Memory Busses to a Memory Register, hereinafter referred to as the MR and from the MR to an Instruction Register having a Sign storage portion, an Operation storage portion and an Address storage portion, which latter is also operative, as a Count Down Counter, to count the number of certain steps, during for example, MULTIPLY, DIVIDE or SHIFT operations. The Instruction Register stores binary 1 and binary zero manifestations, the permutations thereof stored in said Operation portions being decoded by an Operation Decoder which, in turn, controls various Control Circuits including Execution Timers and Mixing Circuits, all as described below, whereby each of the Instructions, so decoded, is respectively carried out.

When data comprising full or half words are read from Memory to the MR, it may be read to the Adder and thus to the Accumulator Register.

Said Memory Register is also connective to said Multiplier Quotient Register, referred to hereinafter as the MQ to thus transfer data from Memory via the MR to said MQ. Such data, delivered to the MQ or to the Adder, as mentioned above, may comprise full or half words, a full word comprising two half words and consisting of 35 bits and the Sign bit, all as described below.

Overflow and Carry triggers are provided to indicate when an overflow occurs from the regular orders to the overflow orders of said Accumulator Register and to indicate carries, from the highest order of said Adder and also from the highest overflow order thereof. Various other circuits are provided, as described in detail below, to provide means whereby a large number of arithmetical and data handling operations can be performed under control of Instructions stored in said Memory, and Read out, therefrom, to said various circuits, including said Operation Decoder.

Among the Operations which are performed are STOP AND TRANSFER, TRANSFER, TRANSFER ON AND RESET OVERFLOW, TRANSFER ON ZERO, ADD, RESET AND ADD, ADD ABSOLUTE VALUE, SUBTRACT, RESET AND SUBTRACT, SUBTRACT ABSOLUTE VALUE, NO OPERATION, STORE, STORE ADDRESS, STORE NUMBER FROM MQ, LOAD MQ, MULTIPLY, ROUND, MULTIPLY AND ROUND, DIVIDE, LONG SHIFT LEFT, LONG SHIFT RIGHT, SHIFT ACCUMULATOR LEFT, and SHIFT ACCUMULATOR RIGHT.

Various other Operations are performed by said Electronic Data Processing Machine, as set forth in the co-pending application of Philip E. Fox, et al., Serial No. 417,702, filed March 22, 1954, now Patent No. 2,950,465, issued August 23, 1960. Still other operations, particularly those utilizing Input/Output units, such as magnetic tapes, are disclosed in the co-pending application of Bartelt, et al., Serial No. 401,648, filed December 31, 1953, now Patent No. 2,850,234, issued September 2, 1958, and in the co-pending application of Bartelt et al., Serial No. 401,502, filed December 31, 1953, now Patent No. 2,921,293, issued Januaary 12, 1960, and still other operations, particularly those utilizing Magnetic Drums, are disclosed in the co-pending application of Werner Buchholz et al., Serial No. 316,914, filed October 25, 1952, now Patent No. 2,863,134, issued December 2, 1958.

One of the objects of the present invention, therefore, is to provide, means for carrying out, efficiently and at high speed, certain of these operations and particularly those pertaining to Arithmetical operations.

Another object of the present invention is to provide a full binary adder comprising, in combination, a first diode OR circuit having three inputs, its output feeding to a first diode AND circuit, a second AND circuit having three inputs, its output feeding to a second diode OR circuit, said second OR circuit having an output feeding to said first AND circuit, a third diode AND circuit having two inputs and its output feeding via a third diode OR circuit, to an inverter, said inverter output feeding to said second OR circuit, a fourth AND circuit having two inputs, its output feeding to said third OR circuit and a fifth AND circuit having two inputs, its output feeding to said third OR circuit, said first AND circuit providing a sum output of binary 1 or binary 0, when binary 1 and binary 0 inputs are applied to the respective inputs of said other AND circuits or the respective inputs of said first OR circuit, and said third OR circuit providing a carry output, of binary 1 or binary 0.

Still another object is to provide a device having an object, as above, and including means selectively feeding True or Complement representations, of binary 1's and binary 0's, of a first factor, to said first OR circuit, and comprising one input to each of said second, third and fourth AND circuits, respectively.

A further object is to provide a device having an object, as above, and including means for producing a carry input, to said first OR circuit and comprising one input to each of said second, fourth and fifth AND circuits, respectively.

Another object is to provide a device having an object, as above, and including means providing binary 1 or binary 0 inputs, representative of a second factor, to said first OR circuit, and to said second, third and fifth AND circuits, respectively.

A further object is to provide a device having an object, as above, said True Complement input circuits comprising a first AND circuit having a True input thereto and a second AND circuit, means producing a conditioning potential for said first AND circuit, for passing said True value input therethrough to said full binary adder, means including an inverter connected to said True input and applying its output to said second AND circuit to thus apply a Complement value input, and means producing a conditioning potential for said second AND circuit, for passing said Complement value input therethrough, to said full binary adder.

Another object is to provide novel means for injecting a binary 1 or a binary 0 selectively, into a Delay Unit, used as a storage element.

A further object is to provide, in a Delay Unit, a diode AND circuit, for recirculating a binary 1 manifestation stored therein, and means for deconditioning one input to said AND circuit, whereby the manifestation, stored in said Delay Unit, becomes a binary 0 manifestation.

Another object is to provide in a Delay Unit combination having an object, as above, means including a diode OR circuit, for recirculating a binary 1 manifestation passed by said AND circuit during recirculation of a binary 1, and means for directly applying a binary 1 manifestation, to said OR circuit, regardless of the binary 1 or binary 0 character of the manifestation stored in said Delay Unit, whereby a binary 1, is directly injected into said Delay Unit, for manifestation therein, without altering the inputs to said AND circuit.

A further main object is to provide, in combination, a plurality of storage elements comprising plural order storage means, respectively, storing a plurality of binary 1 or binary 0 bit representations, selectively, a storage element for storing a manifestation of a Sign, means for shifting the respective representations in said plurality of storage elements, a desired number of steps, in either one of two desired directions, and means, excluding said Sign order, from said shifting operation, whereby the contents of said respective storage elements may be altered but the Sign manifestation remains unaltered.

Another object is to provide a device having an object, as above, and including an Overflow trigger, and means for flipping said Overflow trigger, when a binary bit representation is shifted, in one chosen direction, out of the highest order of said plural order storage means.

Still another object is to provide a device having an object, as above, and including a plurality of Overflow orders, and said trigger being flipped, when a bit representation is shifted to said Overflow orders, in said one direction, but is not flipped, when a bit representation is shifted out of said Overflow orders to said highest order of said plural order storage means.

Another object is to provide a device having a main object, as above, and including a second plural order storage means, including a Sign order and a plurality of value orders, means connecting the lowest value order, of said first plural order storage device, to the highest value order of said second storage device, and means effective to shift the contents of said lowest order to said highest order, in one direction of shift, and the contents of said highest order, to said lowest order, in the other direction of shift, whereby both said storage devices operate as a single device during said shifting.

A further object is to provide a device having an object, as above, and means, excluding, both said Sign orders from said shifting process, in either direction.

Another object is to provide a device having an object, as next above, and including, means setting the Sign order of said first storage means to the Sign of said second storage means, upon shifting from the second to the first, and means, setting the Sign of said second storage means to the Sign of said first storage means, upon shifting from the first storage means to said second storage means.

Still another object is to provide means for producing in a novel manner, a TRANSFER operation.

A further object is to provide means for producing in a novel manner, a STOP AND TRANSFER operation.

Another object is to provide a Machine having as a main object to provide means for producing a STOP AND TRANSFER operation and including a Memory device, a Memory Register, an Instruction Register and an Instruction Counter, means for storing a Program of Instructions in said Memory device at Addresses selectable by said Counter, and for reading out said stored Instructions, means reading out and transferring a STOP AND TRANSFER Instruction manifestation from said Memory device to said Memory Register, means transferring said manifestation from said Memory Register to said Instruction Register, including an Address portion, means including an Operation Decoder, controlled by said Instruction manifestation in said Instruction Register, to stop said Machine, means operative during said stoppage to place said Machine in a Regenerate condition, means rendered operative, upon restarting said Machine, to replace said Machine in an Execute/Regenerate condition, means controlled by an Execute/Regenerate timed pulse to reset said Instruction Counter and to set it to the holding of the Address portion of said Instruction Register manifestation, whereby the normal sequence of handling Instructions is broken and the Machine proceeds to the Instruction, in Memory, located at the present Address stored in the said Instruction Counter.

A further object is to provide a device for ascertaining a zero condition, in a novel manner, and effecting a TRANSFER ON ZERO operation.

Another object is to provide in a device having an object, as above, and including a Memory device, an Instruction Register, an Accumulator Register and an Instruction Counter, means for transferring a manifestation of a TRANSFER ON ZERO Instruction, from said Memory to said Instruction Register, means initiating a test of said Accumulator Register to ascertain if a zero stands therein, and means, effective upon such an ascertainment of zero, to reset said Instruction Counter and to transfer the Address portion, of said Instruction manifestation in said Instruction Register, to said Instruction Counter.

A further object is to provide, in an Electronic Data Processing Machine, means to produce a TRANSFER ON ZERO operation, and including, means comprising an Addressable Memory for said Machine, means storing a Program manifestation in said Memory, an Instruction Register, in Instruction Counter, means for stepping said Counter, means controlled by said Counter for normally selecting sequentially numbered Addresses in said Memory, an Accumulator Register, an Adder, means for transferring the manifestation of said TRANSFER ON ZERO Instruction, from said Memory to said Instruction Register, means effective, upon ascertainment that said Instruction is TRANSFER ON ZERO, for initiating a test of said Accumulator Register, for zero standing therein comprising means complementing the holding of said Accumulator Register and feeding it to said Adder and inserting a unit value, in the lowest order of said Adder, and means, effective upon carry, from the highest order of said Adder, indicative of a previous 0 standing in said Accumulator Register, to reset said Counter and to transfer the Address part of said Instruction, stored in said Instruction Register, to said Instruction Counter, whereby the normal sequence of Instruction selection, is altered accordingly.

Another object is to provide in an Electronic Data Processing Machine, novel means for producing a TRANSFER ON OVERFLOW operation.

Still another object is to provide, in an Electronic Data Processing Machine having an object, as above, and including an Addressable Memory for said Machine, means storing a Program of Instructions in said Memory, an Instruction Register, an Instruction Counter, means for stepping said Counter, one step at a time, means controlled by said Counter for selecting sequentially numbered Addresses in said Memory, to thus select the Instructions of said Program in normal sequence, an Accumulator Register comprising a regular section and an Overflow section, an Adder also comprising a regular section and an Overflow section, Overflow means for said Adder indicating when an overflow has occurred from its highest regular order to said Overflow section, means for transferring the contents of said entire Accumulator Register to said Adder, means transferring a manifestation of an Instruction TRANSFER ON OVERFLOW to said Instruction Register, and means, effective upon indication of an Overflow, to reset said Instruction Counter and to transfer the Address portion of said Instruction stored in said Instruction Register, to said Instruction Counter and inhibiting said normal stepping means, whereby the selection of Instructions, in normal sequence, is altered accordingly.

A further object is to provide a device for producing a TRANSFER ON PLUS operation in a novel manner.

Another object is to provide an Electronic Data Processing Machine for producing a LOAD MQ operation.

A further object is to provide, in an Electronic Data Processing Machine having an object, as above, and including an Addressable Memory for said Machine, means storing data in said Memory, a Memory Register, an Instruction Register, and a Multiplier Quotient Register, means for transferring a manifestation of a LOAD MQ Instruction, from said Memory Register to said Instruction Register, and means effective under control of said manifestation, to transfer a full word or a half word, from a chosen Address, in Memory, to said Memory Register, and from said Memory Register, to said Multiplier Quotient Register, in accordance with the Address portion of said LOAD MQ Instruction manifestation in said Instruction Register.

Still a further object is to provide a device for carrying out a NO OPERATION Instruction in a novel manner.

Another object is to provide, in combination, an Accumulator Register, a Multiplier Quotient Register, and means for producing a ROUND operation in said Accumulator Register, if the highest order of the Multiplier Quotient Register contains a binary 1.

A further object is to provide in a combination, as above, for producing a ROUND operation, an Adder connected to said Accumulator Register, output and said Adder being connected to said Accumulator Register input, means for transferring the True value of the manifestation stored in said Accumulator Register, to said Adder, means checking the highest order of said Multiplier Quotient Register for the presence of a binary 1 or a binary 0, and means, effective upon ascertainment of a binary 1, for adding a unit increment, to the lowest order of said Adder, and means thereafter effective, to transmit the new Adder sum to said Accumulator Register.

Another object is to provide a device having an object, as above, and including an Overflow Indicator connected to the highest order of said Adder, and effective, upon addition of said unit increment of value to the lowest order of said Adder and a consequent rippling of a carry, through said Adder and through its highest order, to operate said Overflow Indicator.

A further object is to provide a device including novel means for producing ADD in a binary parallel system.

Another object is to provide a plural order Adder having as a main object, means for algebraically adding a first Signed factor to a second Signed factor, means for checking the Signs of these factors to be added, and means operative if the Signs, are alike, to add the True value of the first factor to the True value of the second factor.

A further object is to provide a device having an object, as above, and including means operative, if the Signs are UNLIKE, to add the Complement, of the first factor, to the True value of the second factor.

Still another object is to provide a device having an object, as above, and including means checking for an End Carry from said Adder, when said factors are added, and means, effective upon ascertainment of such an End Carry, to add an "elusive 1" to the result.

Another object is to provide a device having an object, as above, and means effective, when no END Carry is ascertained, to Recomplement the first Sum.

A further object is to provide a device having a main object, as above, and including means for leaving the Sign of the sum, the same as that of the two factors.

Another object is to provide a novel binary parallel Adder of extremely high speed comprising, in combination, a plurality of orders, each consisting of a full binary adder comprising diode AND circuits and diode OR circuits, the carry outputs of each lower order feeding to the input of the next higher order, a plurality of Overflow orders, each comprising diode AND circuits and a diode OR circuit, forming a half binary adder only, an Overflow Indicator, connected to the highest full binary adder order, and Carry means, connected to the highest Overflow order and operative, upon an output from said order.

A further object is to provide a device having an object, as above, and means for feeding two factors into each of said full binary adder orders, and one factor only, into each of said Overflow orders.

Another object is to provide a device having an object, as above, and including means for selectively converting, one of said factors being fed to said full binary adder orders, to Complement form, and the single factor, fed to said Overflow orders, being selectively converted to Complement form.

Still another object is to provide in a device having an object, as above, and including an Accumulator Register, having an order for each order of the Adder including said Overflow orders, respectively, connected to the sum outputs of each of said orders.

Another object is to provide a device having an object, as above, each of said orders of said Accumulator Register comprising a Delay Unit, whereby an input, from the sum output of each of the Adder orders, can be applied to the inputs of the respective Accumulator Register orders, while an output, indicative of a previous value stored in said Accumulator Register is available at the Accumulator Register order outputs, respectively.

A further object is to provide a device having an object, as above, and means connecting the respective outputs of said Accumulator Register orders, to one input of each of said Adder orders, including said Overflow orders, whereby the respective sum outputs, of each order of the Adder, can be applied to the inputs of each order of the Accumulator Register, while each output of the Accumulator Register is being applied to said one input, of the respective orders of the Adder.

Another object is to provide a binary adding device comprising a plurality of orders, each order respectively comprising a full binary adder of diode AND circuits and diode OR circuits, the carry output of each order being connected to the input of the immediately higher order, means for supplying two factor inputs to each of said orders, and means for inverting, one of said factor inputs, selectively, to a Complement value, whereby said adding device may selectively ADD or SUBTRACT.

Still another object is to provide a device comprising an Accumulator Register having a plurality of orders, means providing an indication of the algebraic Sign of a first factor, stored in said Accumulator Register, means for adding a second factor to the first factor stored in said Accumulator Register, means ascertaining the Sign of said second factor, and means operative to ADD the True value of the factor in said Accumulator Register to the True value of said second factor, only when said Signs are alike.

Another object is to provide a device having an object, as above, and including means changing the factor, stored in said Accumulator Register, to its Complement value, when said Signs are unlike, before adding it to said second factor.

A further object is to provide a device having an object, as above, and means effective to maintain said Accumulator Register indication unchanged, if both said Signs are alike.

Another object is to provide a device having an object, as above, and including means rendered operative, if said Signs are unlike and no End Carry results from said addition, to Recomplement the factor in said Accumulator Register and render the Sign of said sum, the same as that of said first factor.

A further object is to provide a device having an object, as above, and means rendered operative, if said Signs are unlike and that there is an End Carry, to add an "elusive 1" in the lowest order and to change the Sign of said Accumulator Register factor.

Another object is to provide a device having an object, as above, and including means operative, when said second factor, added to the first factor in said Accumulator Register results in a sum of 0, to maintain said Accumulator Register Sign indication unchanged.

A further object is to provide a device having as an object, the performance of an ADD ABSOLUTE parallel operation, on binary values.

Another object is to provide a device for performing an ADD ABSOLUTE operation and including an Accumulator Register, means for indicating the Sign of a factor stored therein, an Adder having a plurality of regular orders and a plurality of Overflow orders, means storing an indication of a first factor, in said Accumulator Register, means for feeding said first factor to said Adder, selectively in True or in Complement form, means feeding a second factor to said Adder in True form only, said second factor being treated as a positive value regardless of its Sign, said first factor being transferred to said Adder in True form, if said Accumulator Register Sign is plus, and in Complement form, if said Accumulator Register Sign is minus, an Overflow Indicator, means for operating said Overflow Indicator provided a carry occurs from said highest regular Adder order and said Accumulator Register factor is plus, means inserting an increment of value in the lowest order of said Adder, if said Accumulator Register factor is minus and a carry occurs from the highest Overflow order, means transmitting said result to said Accumulator Register, means Recomplementing said value by passing it in Complement form to said Adder, if said Accumulator Register Sign, is minus and no End Carry occurs, and transferring said result to said Accumulator Register, and means setting said Accumulator Register Sign indication, to plus, if said Accumulator Register Sign is minus and an End Carry did occur.

Still another object is to provide novel adding means, to produce parallel SUBTRACT of binary values in a novel manner.

Another object is to provide novel means for producing a SUBTRACT operation between a first factor and a second factor, said factors comprising values, of either Sign, respectively, an Adder having a plurality of regular orders and a plurality of Overflow orders, an Accumulator Register, means indicating the Sign of a first factor stored in said Accumulator Register, means operative upon ascertaining that the Signs of said first factor and of said second factor, are unlike, to transfer the True value of the factor in said Accumulator Register, to said Adder, and the True value of said second factor, to said Adder, but operative if the Signs, are alike, to transfer the Complement value of said first factor, to said Adder, an Overflow Indicating device, means operative to set said device to indicate an overflow, if said Signs are unlike and there is a Carry from the highest regular order of said Adder, means effective if such Signs are alike and a Carry occurs from the highest Overflow order, to inject an "elusive 1" into the lowest regular order of said Adder, means transferring the result in said Adder to said Accumulator Register, means operative, if the Signs, are alike and there is no End Carry to transfer the Complement of said value in said Accumulator Register to said Adder and back to said Accumulator Register to thereby Recomplement said value, and means effective if said Signs are alike, there is an End Carry and said Accumulator Register Sign is minus, to set said Sign, to plus, but effective if said Signs are alike, there is an End Carry and the Accumulator Sign is plus, to set said Sign, to minus.

A further object is to provide novel means for producing a SUBTRACT ABSOLUTE operation, on binary values in parallel.

Another object is to provide in a device for producing a SUBTRACT ABSOLUTE operation on two factors having respectively, either one of two Signs, and including an Adder having a multiplicity of regular orders and a multiplicity of Overflow orders, an Accumulator Register, means for indicating the Sign of the factor in said Accumulator Register, means operative if said Accumulator Register Sign is minus, to transfer the True value of the factor in said Accumulator Register to said Adder and the True value of said second factor to said Adder, but operative if said Accumulator Register Sign is plus to transfer the Complement of said Accumulator Register factor to said Adder, an Overflow Indicating means, means operative if said Accumulator Register Sign is minus and a Carry occurs from the highest regular order of said Adder to set said Overflow Indicating means, means operative if said Accumulator Register Sign is plus and a Carry occurs from the highest Overflow order to enter an "elusive 1" in the lowest Adder order, means operative to transfer the resultant value, from said Adder to said Accumulator Register, means rendered operative if said Accumulator Register Sign is plus and there is no End Carry to transfer the Complement of said value in said Accumulator Register to said Adder and back to said Accumulator Register to thus Recomplement said value, and means operative if said Accumulator Register Sign is plus and there is an End Carry, to change the Accumulator Register Sign, to minus.

Another object is to provide novel means for producing a RESET ADD operation in a parallel binary device, and including, a Memory Register, an Adder, an Accumulator Register, means for indicating the Sign of the value stored in said Memory Register, means for indicating the Sign of the value in said Accumulator Register, means operative upon the receipt of a RESET ADD Instruction manifestation to transfer the value from said Memory Register only, to said Adder and from said Adder to said Accumulator Register, to thereby replace the value, if any, in said Accumulator Register, with the value from said Memory Register, means checking the Sign indication of the Memory Register for a plus or a minus Sign and means, including said checking means, for setting the Sign indicating means of said Accumulator Register to correspond with the Sign of said Memory Register.

A further object is to provide novel means for performing a RESET SUBTRACT operation, including a device, as above, said Sign checking means, however, setting said Accumulator Register Sign indicating means, to plus, if said Memory Register Sign is minus, and setting said Accumulator Register Sign indicating means, to minus, if said Memory Register Sign indication is plus.

Another main object is to provide a device to produce a STORE function, in a novel manner, and including an electrostatic storage means comprising Memory, Memory Busses connected to said Memory, an Accumulator Register, a Memory Register and an Instruction Register, means controlled by the manifestations of data stored in said Instruction Register for selecting the desired Address in Memory, means for reading out an Instruction from said Memory to said Memory Register and from said Memory Register to said Instruction Register, means controlled in accordance with the Address portion manifestation of said Instruction in said Instruction Register, for selecting an Address accordingly, in Memory, means preparing said Memory, for writing data therein, means transmitting the data manifestation in said Accumulator Register to said Memory Busses, and means including said writing means for writing said data in Memory.

Another object is to provide a device having an object, as above, but including a Multiplier Quotient Register, instead of said Accumulator Register, and means including said writing means for writing the contents of said Multiplier Quotient Register in said Memory.

A further object is to provide a device having a main object, as above, said means handling half words, comprising Instructions, only, and means, including said writing means, for storing, in Memory, the Address portion only of a half word, stored in said Accumulator Register.

Another object is to provide novel means for producing high speed parallel MULTIPLY of binary values including, a plurality of binary full adders comprising the regular orders of an adding device and a plurality of half binary adders comprising Overflow orders for said adding device, an Accumulator Register comprising a plurality of regular accumulator orders, one for each regular order of said adding device and a plurality of Overflow orders, one for each Overflow order of said adding device, each order of said Accumulator Register comprising a Delay Unit, operable with an input, simultaneously applied thereto while an output of a previously stored bit is available therefrom, a second Register connectable to said Accumulator Register and shiftable in either direction, jointly with said Accumulator Register, means storing a multiplier in said second Register, means storing a multiplicand, means testing the lowest order of said second Register for a binary 1 or a binary 0 therein, indicative of a binary 1 or binary 0 value in the lowest order of said multpler, means operatve, upon ascertaning that a binary 1 exists in said lowest order, to produce transfer of said multiplicand to said adding device and from said device to said Accumulator Register, to store a first partial product, but ineffective to transfer said multiplicand to said device if said lowest order contains a binary 0, means thereupon effective to shift said Accumulator Register and said second Register, jointly to the right, thereby discarding the lowest order binary bit of the multiplier and locating the next binary bit, of the multiplier, in said lowest order of said second Register and also shifting said first partial product, means transferring the contents of said Accumulator Register to said device, means again testing said lowest order, for a binary 1 or a binary 0, and accordingly transferring or not transferring said multiplicand to said device, whereby if a binary 1 is present, said multiplicand is added in said device to the shifted first partial product from said Accumulator Register to produce a second partial product, means transferring this second partial product from said device to said Accumulator Register and again shifting said Accumulator Register, and said second Register, bodily to the right, and repeating said testing and the selective transfer of the multiplicand to the adding device as the respective shifted partial products are applied to said adding device, whereby repeated partial products are built up in said Accumulator Register, so that, when all values of said multiplier have been tested and the last shift made, the full product appears in said second Register and in said Accumulator Register, jointly.

Still another object is to provide a device having an object, as above, and including a count down counter for counting said shifts, and means effective, when said counter, counts down to zero, to terminate said MULTIPLY operation.

A further object is to provide in an Electronic Data Processing Machine including Addressable electrostatic storage means comprising Memory, means storing a Program of Instruction in said Memory, a Count Down Counter, a Memory Register, an Instruction Register, an Adder, an Accumulator Register, and a Multiplier Quotient Register, means for storing a Sign indication for said Multiply Quotient Register, means for storing a Sign indication for said Accumulator Register, means controlled by said Program to transfer a multiplier, from said Memory to said Multiplier Quotient Register, means controlled by said Program to transfer a MULTIPLY Instruction, from said Memory to said Memory Register and from said Memory Register to said Instruction Register, means for settling said Count Down Counter, to a fixed setting, means controlled by the data manifestations in said Instruction Register to select a multiplicand, at the Address, in Memory, indicated by the Address portion of the Instruction stored in said Instruction Register, and to transfer said multiplicand to said Memory Register, means stepping said Count Down Counter, one step, means checking the lowest order of said Multiplier Quotient Register, for a binary 1 or a binary 0 therein, and effective, upon ascertaining the presence of a binary 1, to transfer said multiplicand from said Memory Register to said Adder, and from said Adder to said Accumulator Register, to thus store a first partial product, means shifting said Accumulator Register and said Multiplier Quotient Register, jointly, to the right, means transferring said shifted partial product in said Accumulator Register to said Adder, and said multiplicand to said Adder, means checking the binary 1 or binary 0 status, of the new lowest order value in said Multiplier Quotient Register, and effective, if a binary 1 is ascertained, to transfer said Adder sum to said Accumulator Register, to replace the first partial product by a second partial product, means again shifting said Multiplier Quotient Register and said Accumulator Register, one step to the right, and stepping down said Counter, one step, means transferring said multiplicand to said Adder, and said second shifted partial product to said Adder, means testing the new value, at the lowest Multiplier Quotient Register order, and transferring said Adder sum to said Accumulator Register, if a binary 1 exists, means repeating said operation until all digits of the multiplier have been tested and all transfers and shifts have been made, whereby the full product is produced, in said Multiplier Quotient Register and said Accumulator Register, at the time that said step down Counter counts down to zero.

Another object is to provide a device having an object as above, and including means for checking the Sign of the multiplier and the multiplicand, and means effective if said Signs are unlike, to store a negative Sign, in both the Multiplier Quotient Sign order and the Accumulator Register Sign order, but if said Signs are alike, the Signs, so stored, are positive.

A further object is to provide a device having an object, as above, except that the Instruction is MULTIPLY AND ROUND, means applying a unit increment to said Adder lowest order, means transferring the product to said Adder, means testing the highest order of said Multiplier Quotient Register for a binary 1, and means effective, upon ascertainment of a binary 1, to transfer said sum to the Accumulator Register.

Still another object is to provide in an Electronic Data Processing Machine including Addressable electrostatic storage means comprising Memory, means storing a Program of Instruction, in Memory, a Memory Register, an Instruction Register, a Count Down Counter, an Adder, an Accumulator Register, a Multiplier Quotient Register, means storing a Sign indication for said Multiplier Quotient Register, means controlled by said Program, for transferring a dividend to said Accumulator Register and to said Multiplier Quotient Register jointly, means controlled by said Program for transferring a DIVIDE Instruction, from said Memory to said Memory Register and from said Memory Register to said Instruction Register, means controlled by the manifestation of a DIVIDE Instruction in said Instruction Register, to transfer a divisor, from the Address, in Memory, indicated by the Address portion of the Instruction, in said Instruction Register, to said Memory Register, means resetting said Count Down Counter, means adding, a stipulated value, indicative of the number of steps of shift, to said Count Down Counter, means transferring the Memory Register contents to said Adder, and the Complement of the value in said Accumulator Register to said Adder, to test whether said divisor is greater than said dividend, means for stopping said machine, if said divisor is less than said dividend as indicated by no Carry from said Adder, means operative, if said divisor is greater than said dividend to continue said DIVIDE operation, means connecting the highest order of the Multiplier Quotient Register to the lowest order of the Accumulator Register and shifting both said Multiplier Quotient Register and Accumulator Register, one step to the left, means transferring said divisor in said Memory Register to said Adder, and the Complement of said Accumulator Register to said Adder, to thus subtract the divisor from the dividend, means effective, if no End Carry ensues, to transfer said result in said Adder to said Accumulator Register, and also effective to store a binary 1, in the lowest order, of the Multiplier Quotient Register, to thus provide a quotient bit, but effective, if an End Carry did ensue, to block transfer of said result to said Accumulator Register, and to insert a binary 0, in the lowest order of the Multiplier Quotient Register, means effective, when no Carry ensues, to transfer the Complement of the value in said Accumulator Register to said Adder and from said Adder back to said Accumulator Register to thereby Recomplement said value, means shifting said Multiplier Quotient Register and said Accumulator Register jointly, one step to the left, including shifting the Multiplier Quotient highest order contents, to the Accumulator Register lowest order, means stepping said Count Down Counter, one step, means repeating said Register, after said test, means transferring the contents of said Accumulator Register to said Adder, in Complement form, and the divisor to said Adder, in True form, to thus subtract said divisor from said dividend, means effective, upon no Carry from the highest Overflow order indicative of a "go" condition, to transfer said results to said Accumulator Register and to add a binary 1, to said Multiplier Quotient Register lowest order, to thus provide an increment of quotient, means effective upon no such Carry, to transfer the Complement of the value in the Accumulator Register into said Adder and from said Adder to said Accumulator Register to thus Recomplement said value, but effective, to block said transfer, if a carry does occur, and to insert a binary 0, into the lowest Multiplier Quotient order, means again shifting said Multiplier Quotient Register and said Accumulator Register and repeating said tentative subtractions and selectively inserting a binary 1 or binary 0 in said Multiplier Quotient Register lowest order, to thus build up said quotient, until a set number of shifts have occurred, whereupon said quotient appears in said Multiplier Quotient Register.

Another object is to provide a device having an object, as above, and including means testing the Signs of said divisor and said dividend, and setting said Multiplier Quotient Register Sign, to plus, if said Signs are alike, but to minus, if said Signs are unlike.

Other objects of the invention will be pointed out in the following description and claims and illustrated in the accompanying drawings, which disclose by way of example, the principle of the invention and the best mode which has been contemplated of applying that principle.

Figure 1B:
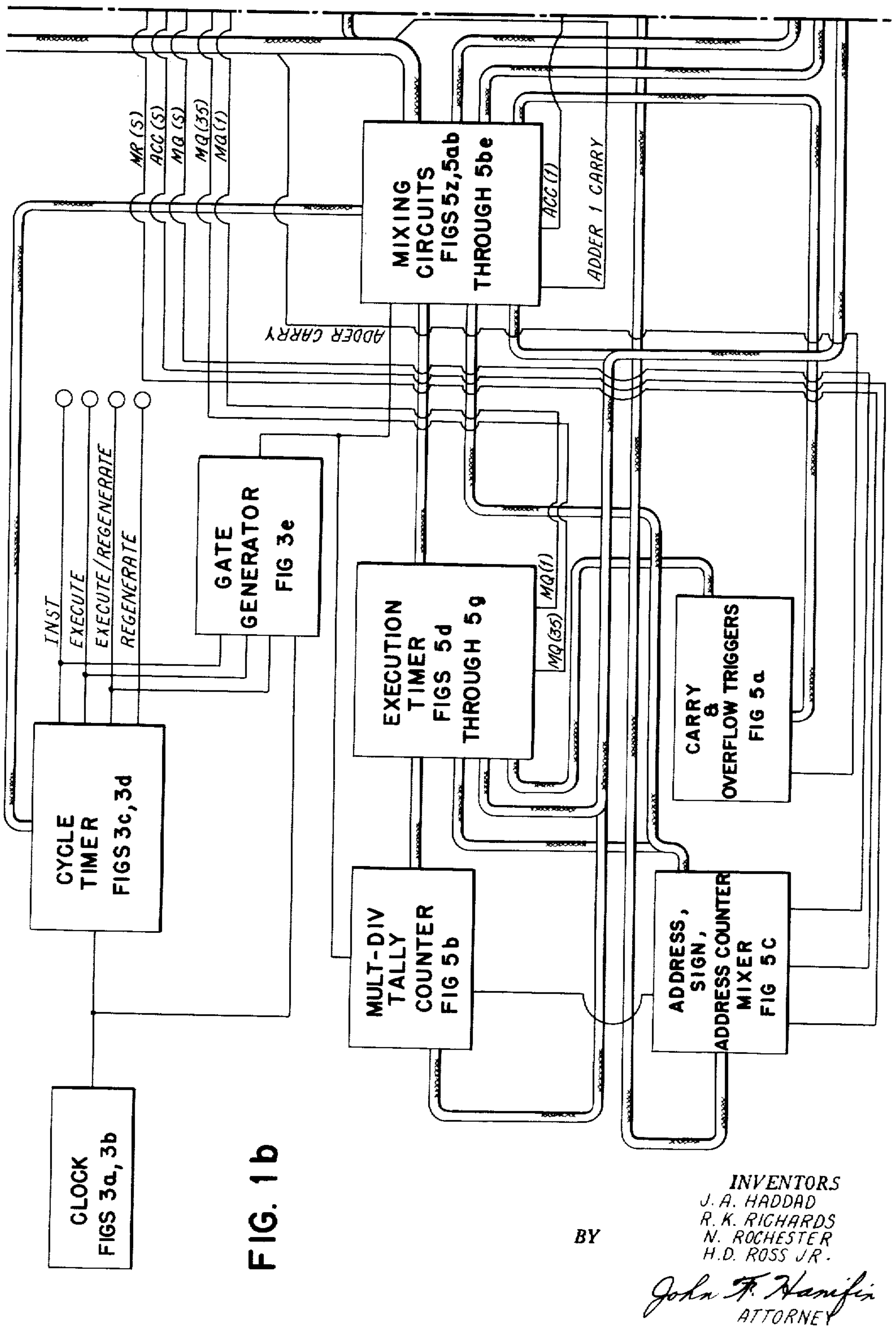
Figure 1C:
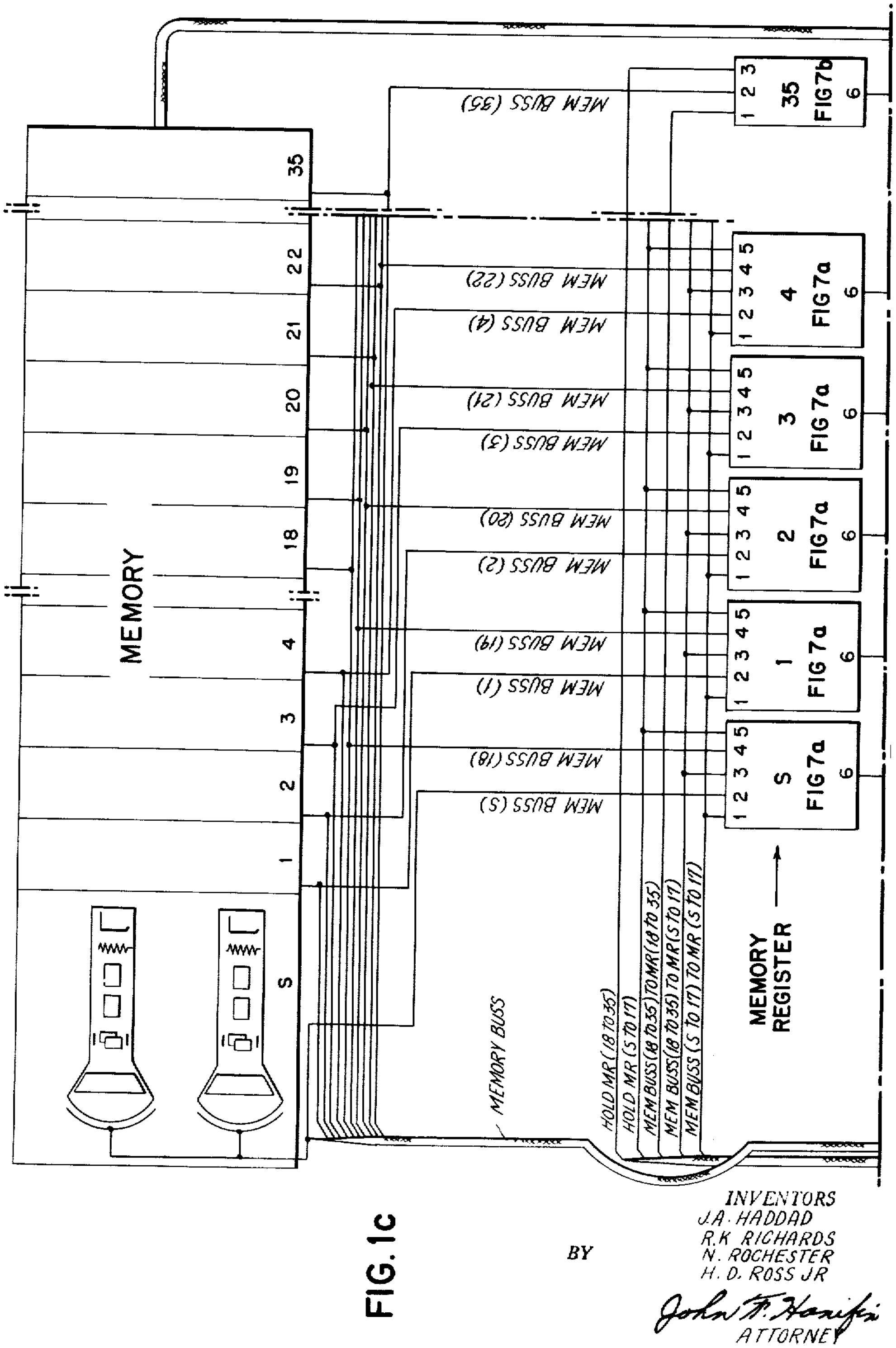
Figure 1D:
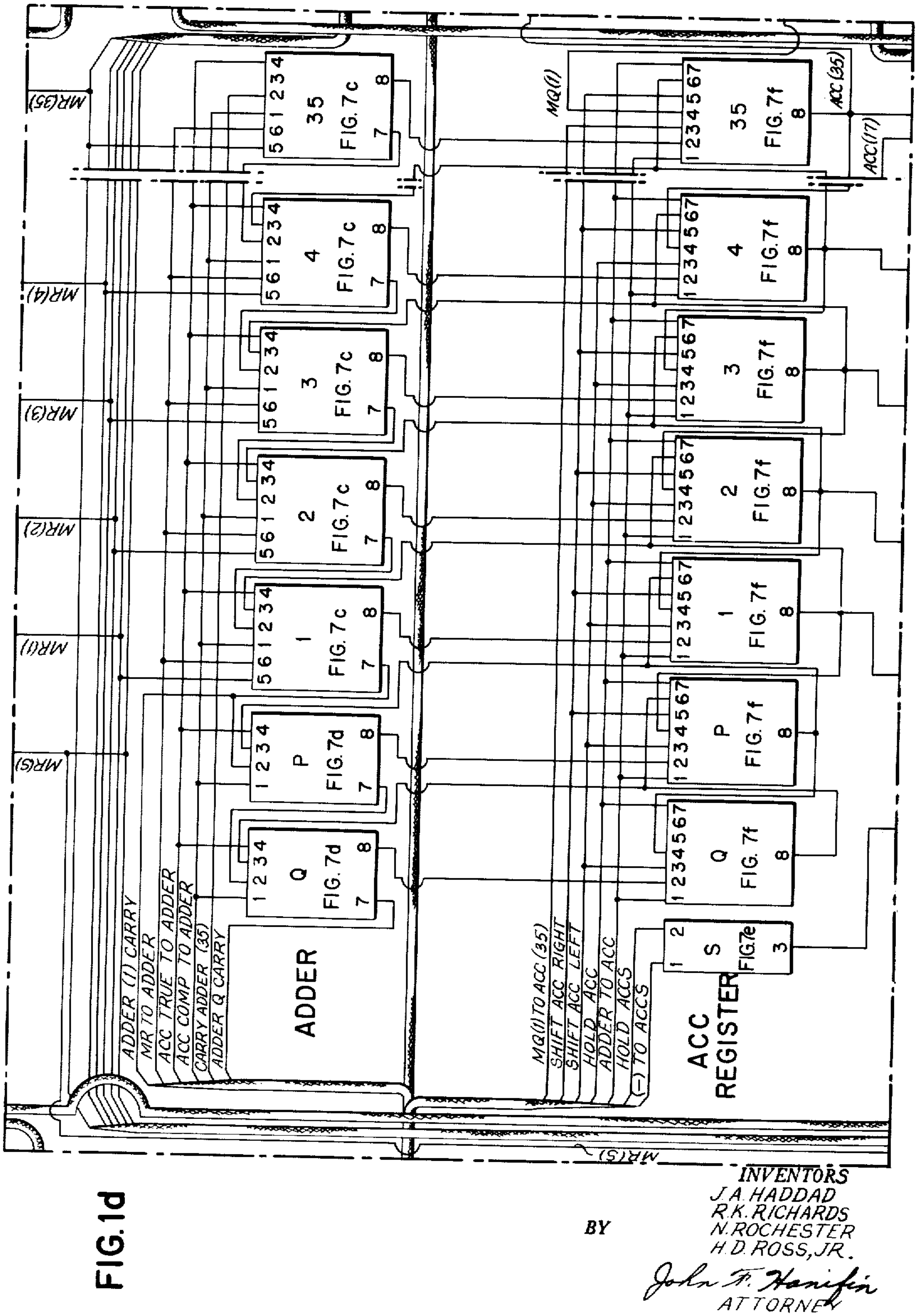
Figure 1E:
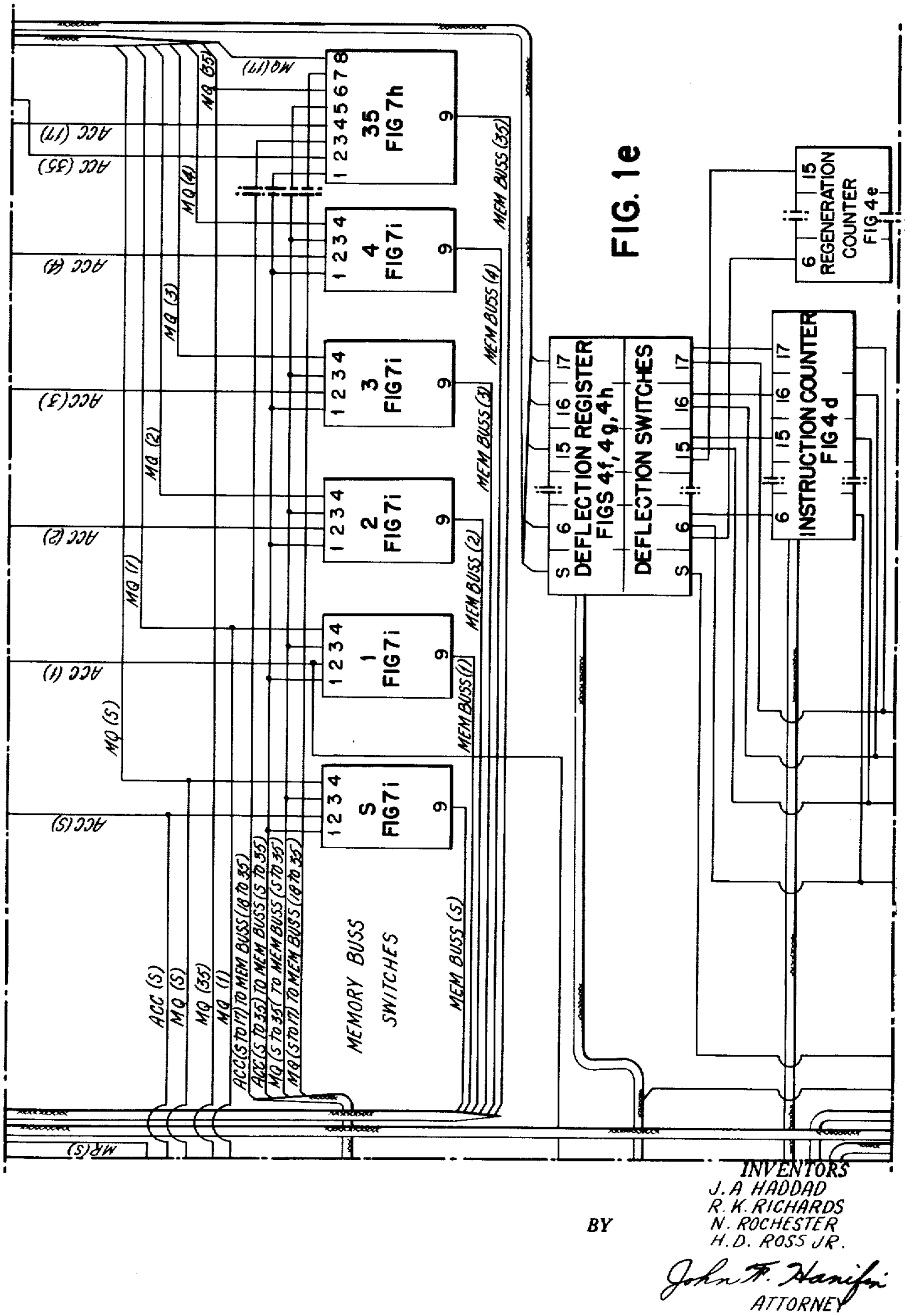
Figures 1F, 1H:
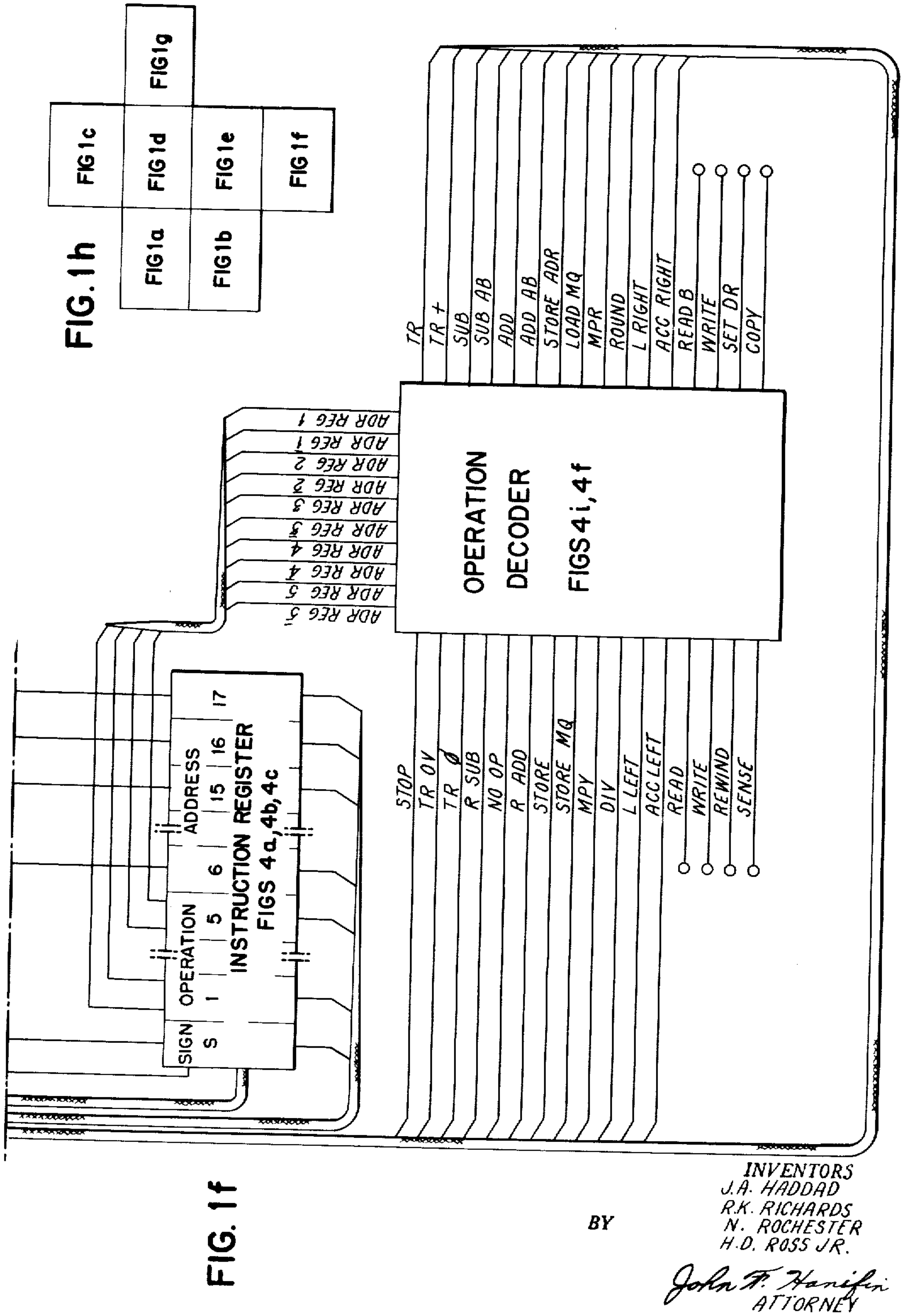

In the drawings:

Figs. 1*a*, 1*b*, 1*c*, 1*d*, 1*e*, 1*f* and 1*g* taken together, as shown in Fig. 1*h*, comprise an overall block diagram of the Calculator.

Figure 2A:
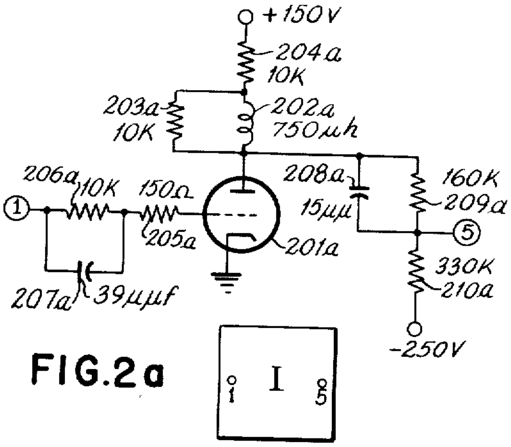

Fig. 2*a* is a detailed circuit diagram and corresponding block symbol of an inverter I, employed in the Calculator.

Figure 2D:
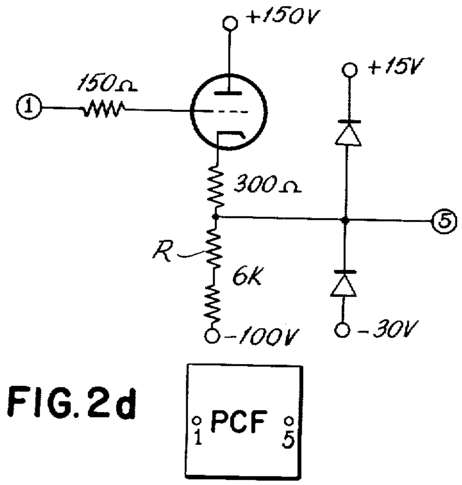
Figure 2B:
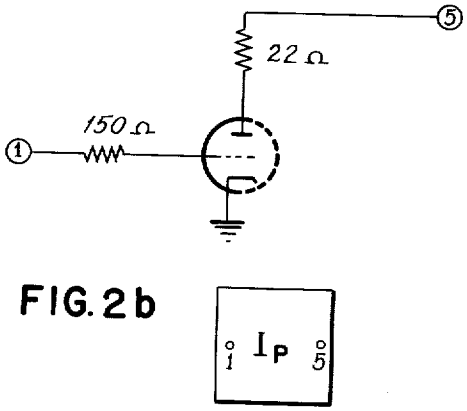

Fig. 2*b* is a detailed circuit diagram and corresponding block symbol of an inverter $I_P$.

Figure 2E:
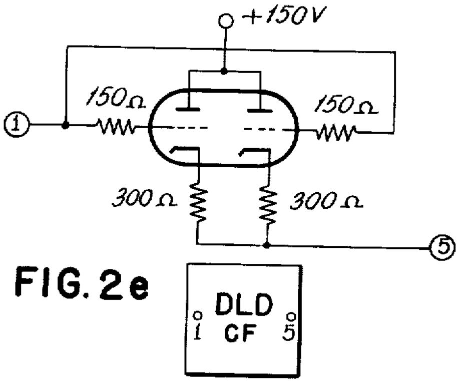
Figure 2C:
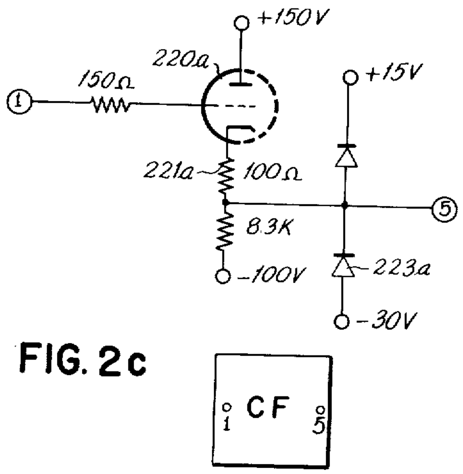

Fig. 2*c* is a detailed circuit diagram and corresponding block symbol of a cathode follower CF.

Fig. 2*d* is a detailed circuit diagram and corresponding block symbol of a power cathode follower PCF.

Fig. 2*e* is a detailed circuit diagram and corresponding block symbol of a delay line driver cathode follower DLD.

Figure 2F:
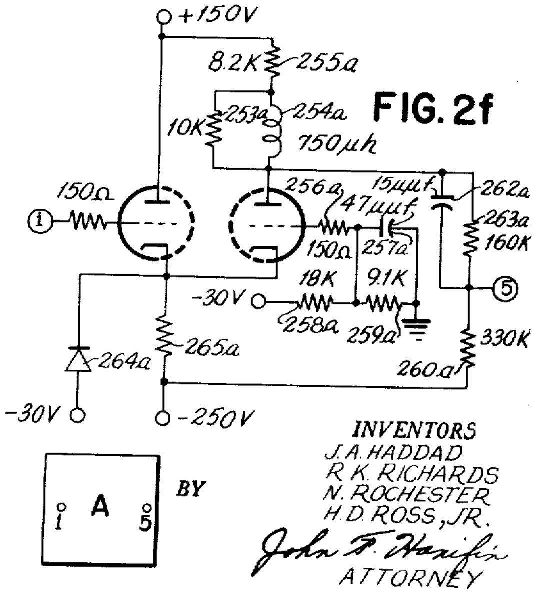

Fig. 2*f* is a detailed circuit diagram and corresponding block symbol of an amplifier A.

Figures 2G, 2H, 2I, 2J:
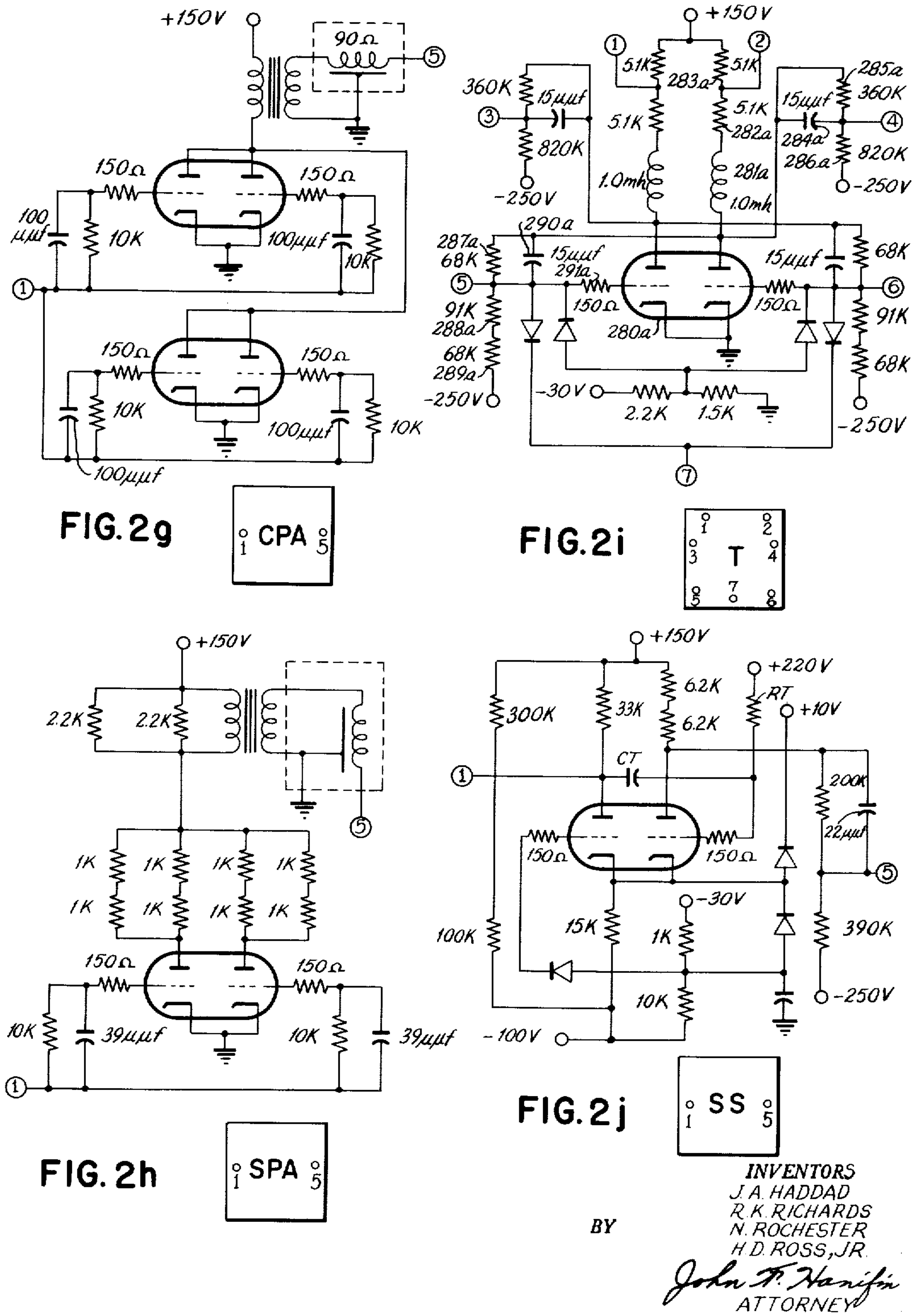

Fig. 2*g* is a detailed circuit diagram and corresponding block symbol of a clamp power amplifier CPA.

Fig. 2*h* is a detailed circuit diagram and corresponding block symbol of a sync power amplifier SPA.

Fig. 2*i* is a detailed circuit diagram and corresponding block symbol of a trigger T.

Fig. 2*j* is a detailed circuit diagram and corresponding block symbol of a single shot multivibrator SS.

Figure 2K:
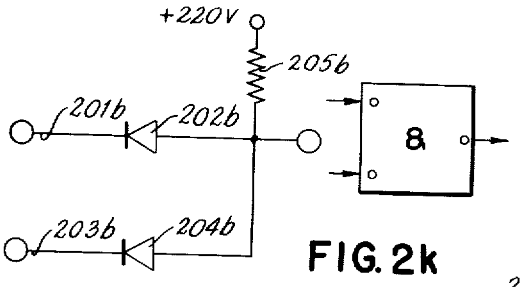

Fig. 2*k* is a detailed circuit diagram and corresponding block symbol of a "+" diode AND circuit.

Figure 2M:
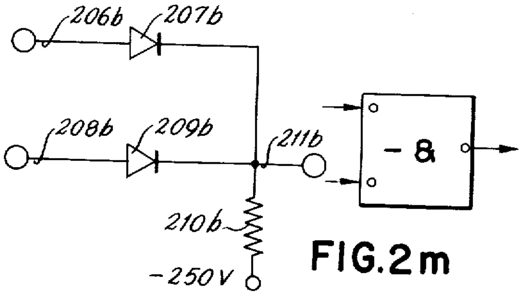

Fig. 2*m* is a detailed circuit diagram and corresponding block symbol of a "−" diode AND circuit.

Figure 2N:
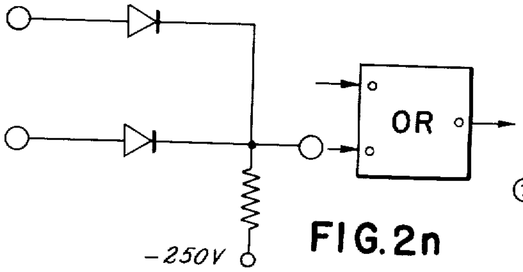

Fig. 2*n* is a detailed circuit diagram and corresponding block symbol of a "+" diode OR circuit.

Figure 2P:
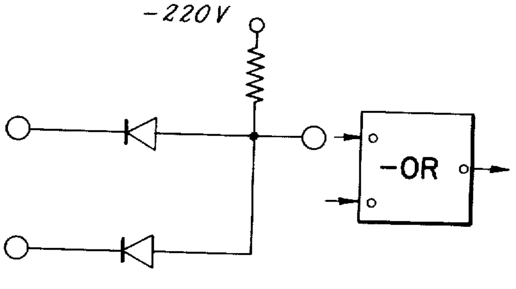

Fig. 2*p* is a detailed circuit diagram and corresponding block symbol of a "−" diode OR circuit.

Figure 2Q:
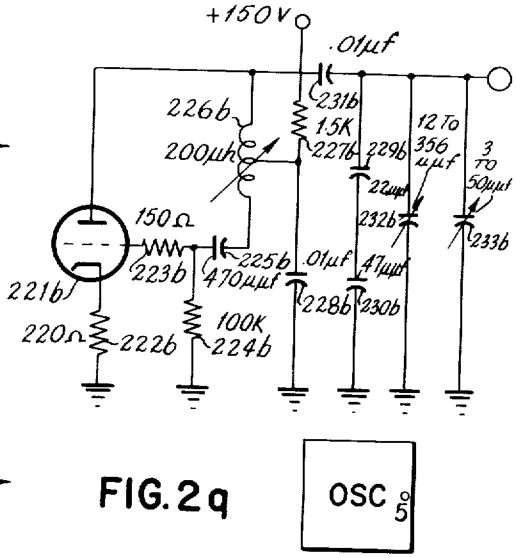

Fig. 2*q* is a detailed circuit diagram and corresponding block symbol of an oscillator OSC.

Figure 2R:
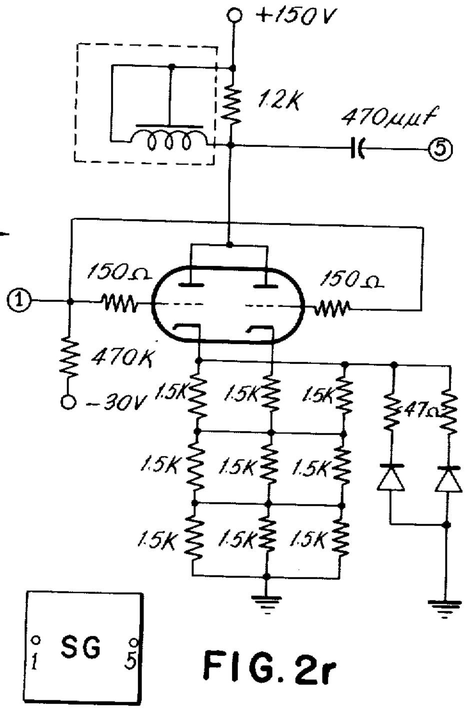

Fig. 2*r* is a detailed circuit diagram and corresponding block symbol of a sync generator SG.

Figures 2S, 2T, 2V:
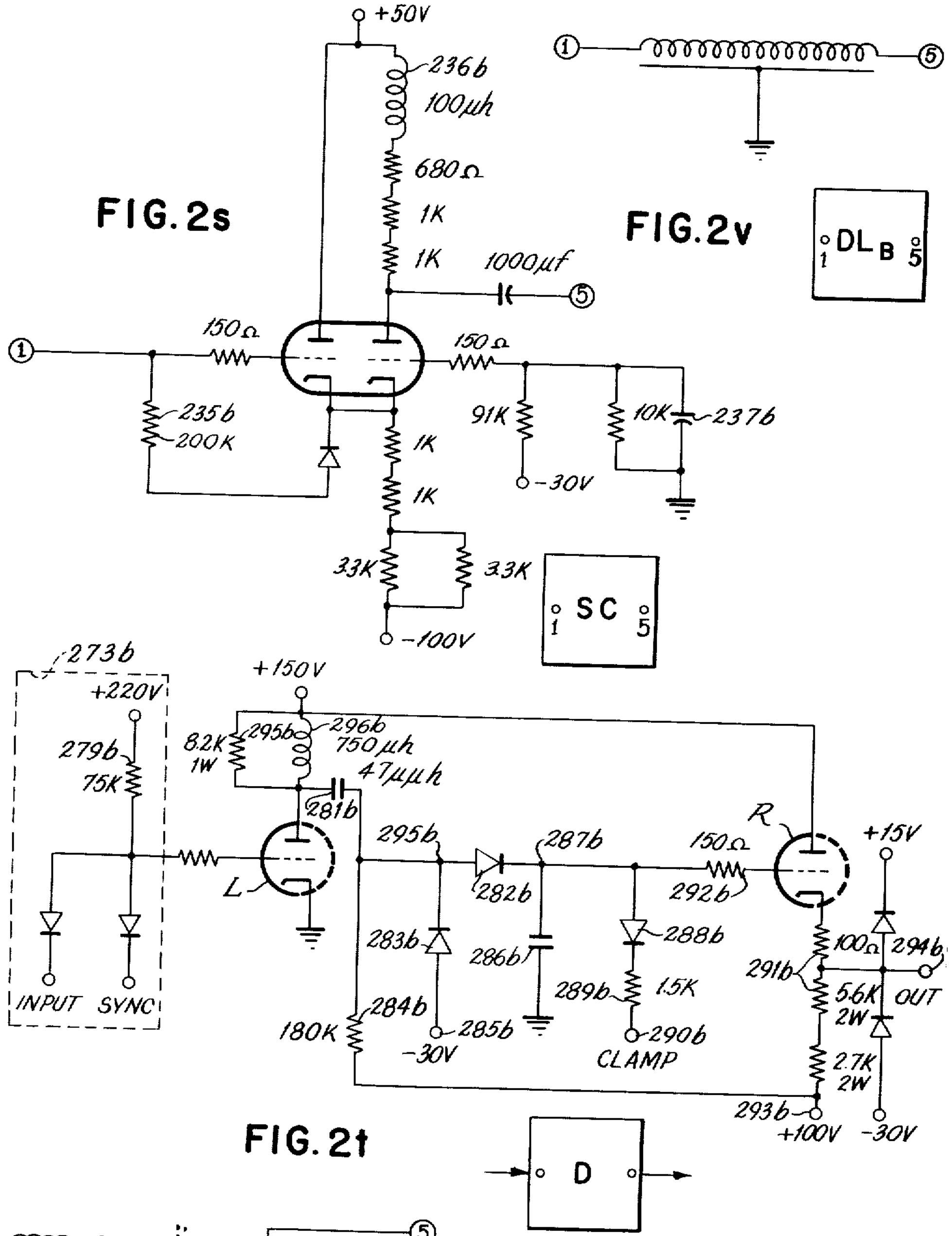

Fig. 2*s* is a detailed circuit diagram and corresponding block symbol of a sync clipper circuit SC.

Fig. 2*t* is a detailed circuit diagram and corresponding block symbol of a microsecond delay unit D, used as a storage element.

Figure 2U:
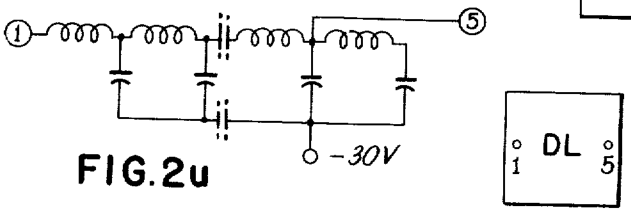

Fig. 2*u* is a detailed circuit diagram and corresponding block symbol of a lumped constant delay line DL.

Fig. 2*v* is a detailed circuit diagram in corresponding block symbol of a distributed constant delay line $DL_B$.

Figure 3A:
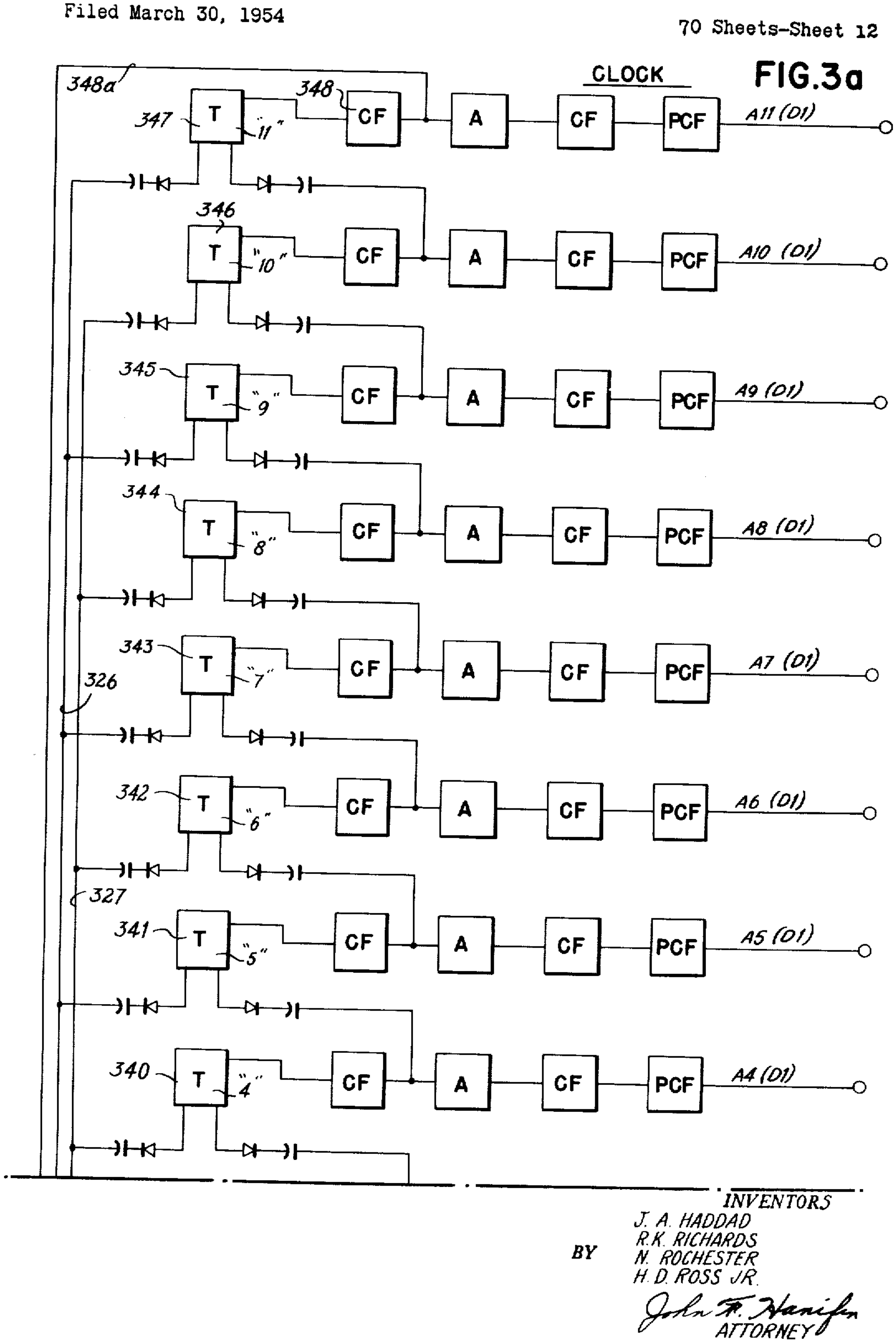
Figure 3B:
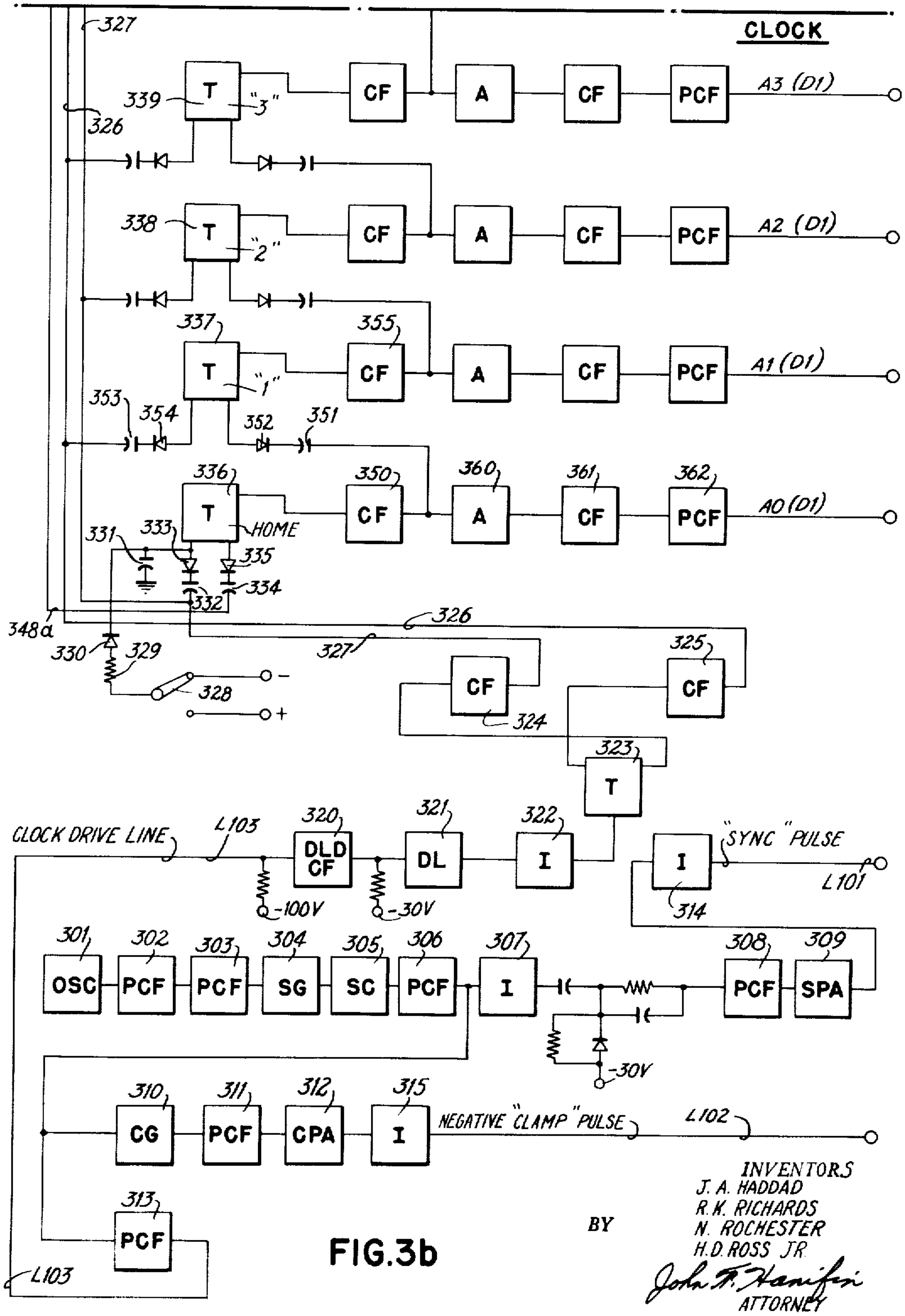

Figs 3*a* and 3*b*, taken together, with Fig. 3*a* located above Fig. 3*b*, comprise a block diagram of the Clock.

Figure 3C:
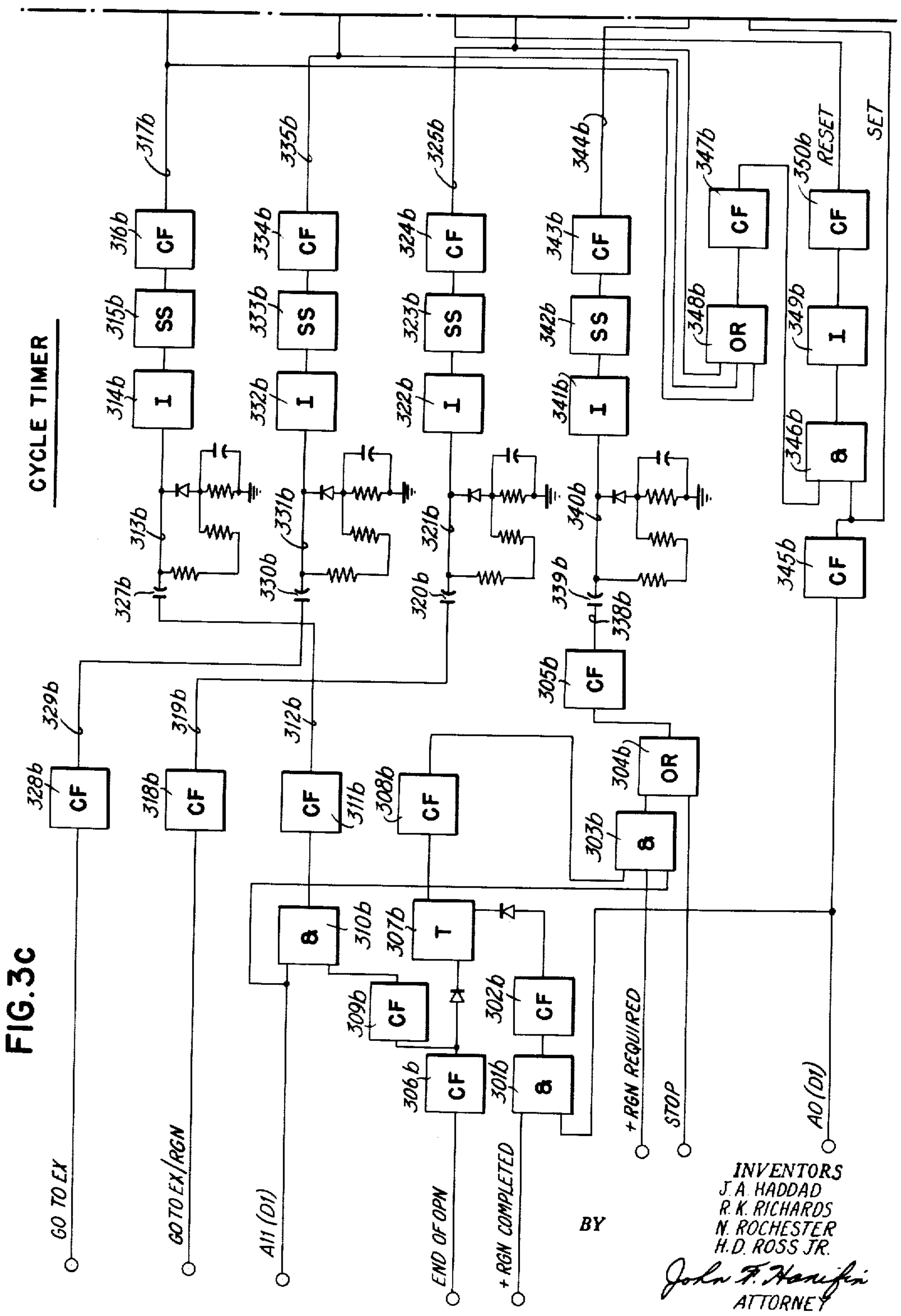
Figure 3D:
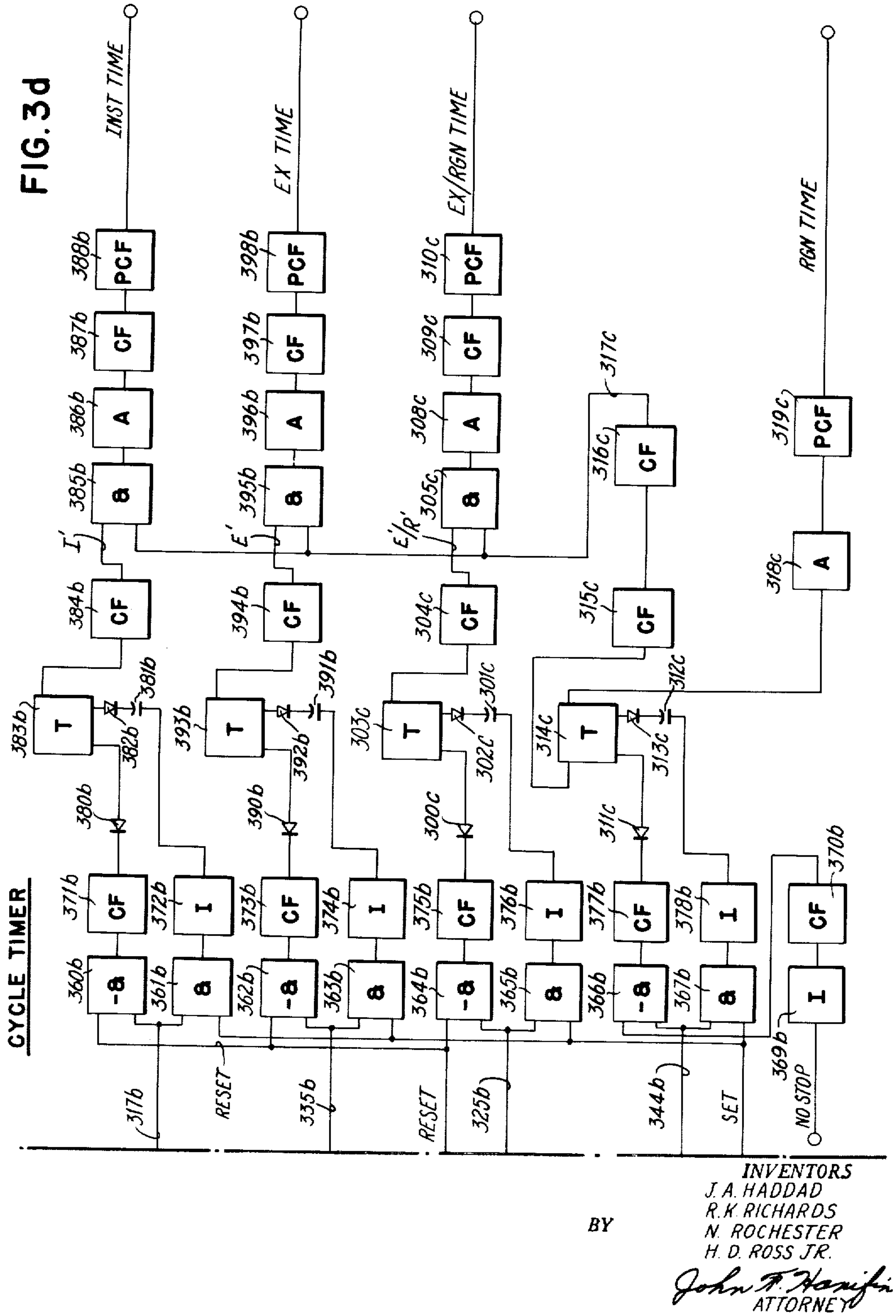

Figs. 3*c* and 3*d*, taken together with Fig. 3*d* located to the right of Fig. 3*c*, comprise a block diagram of the Cycle Timer.

Figure 3E:
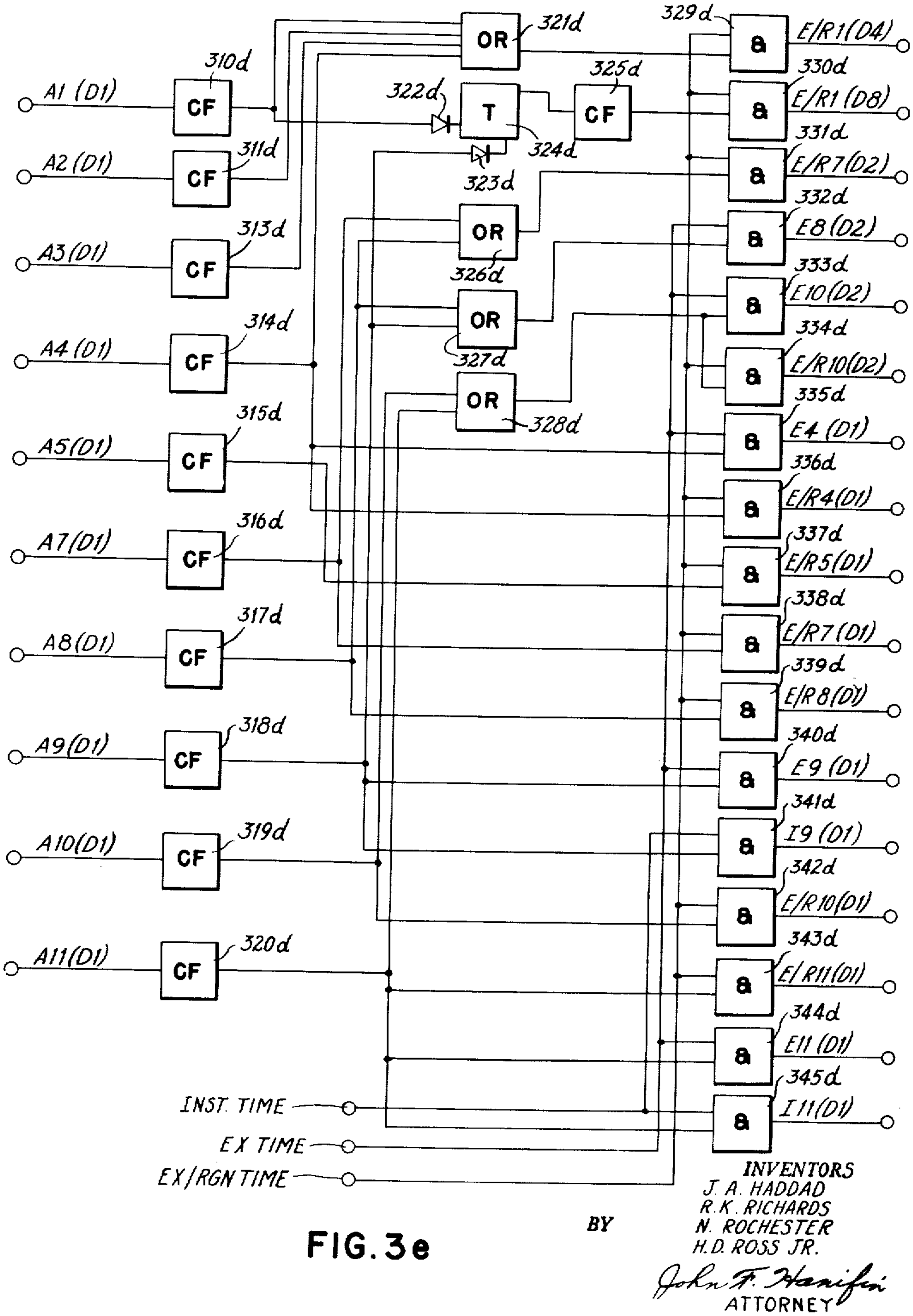

Fig. 3*e* is a block diagram of Gate Generator circuits.

Figure 4A:
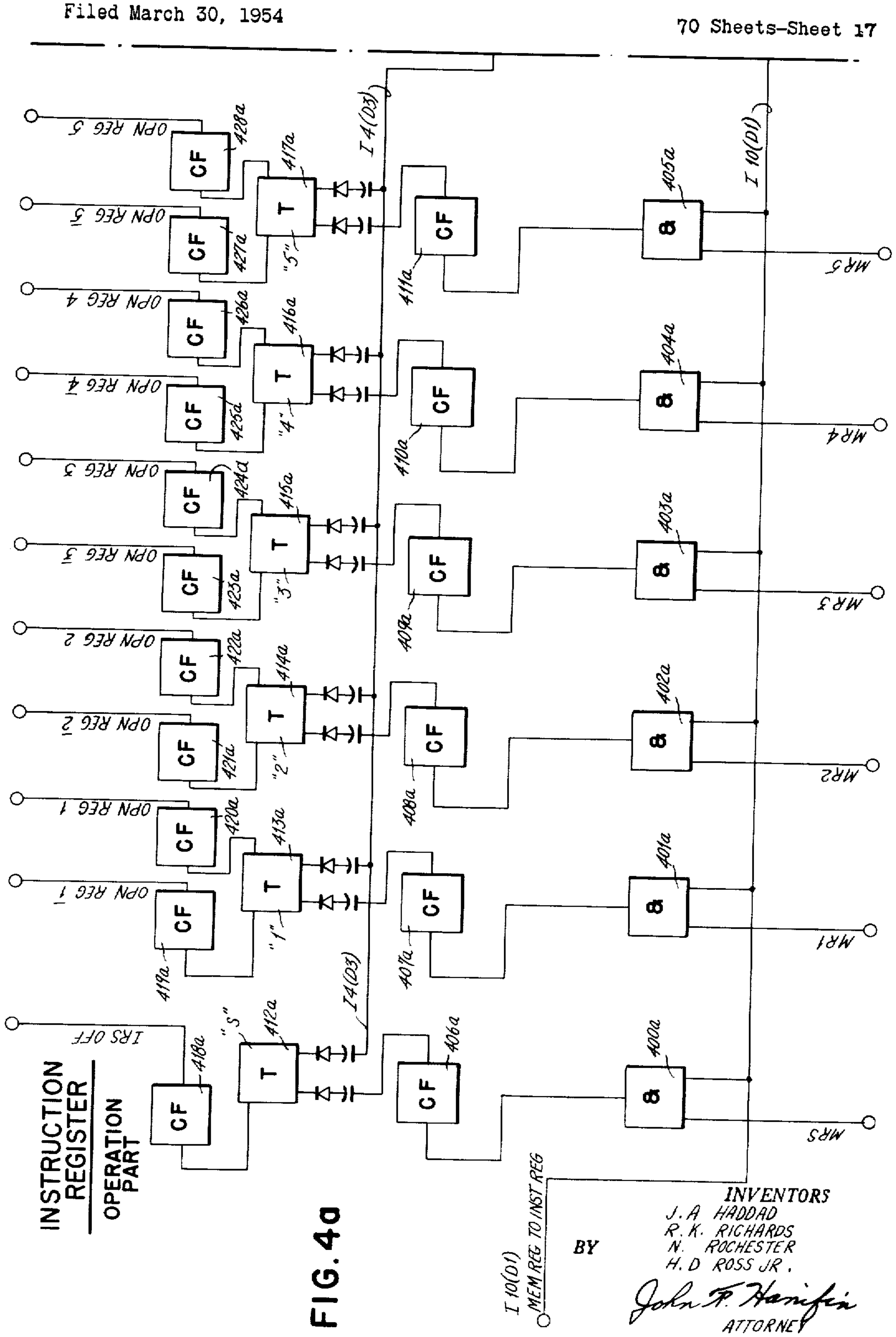
Figure 4B:
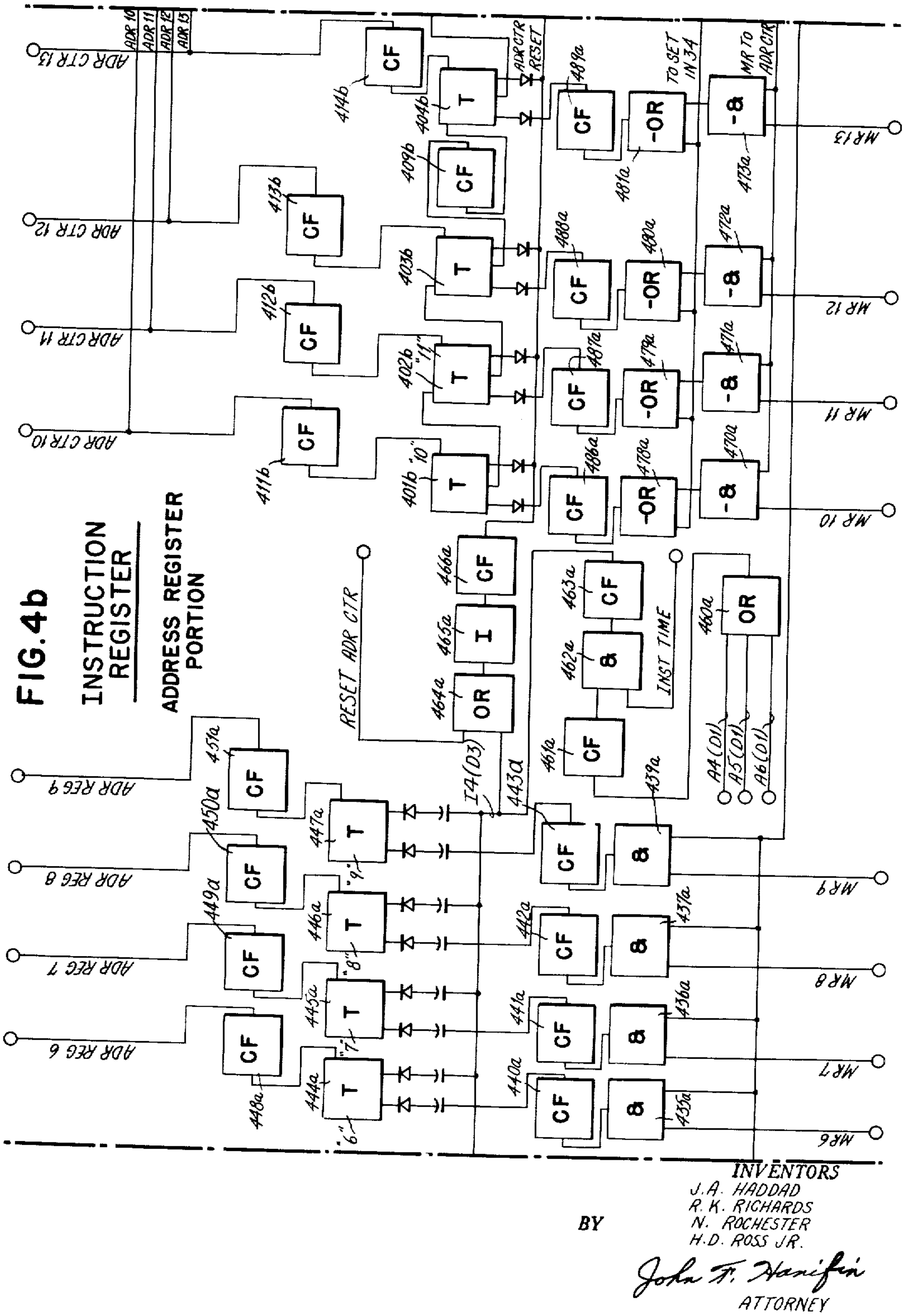
Figure 4C:
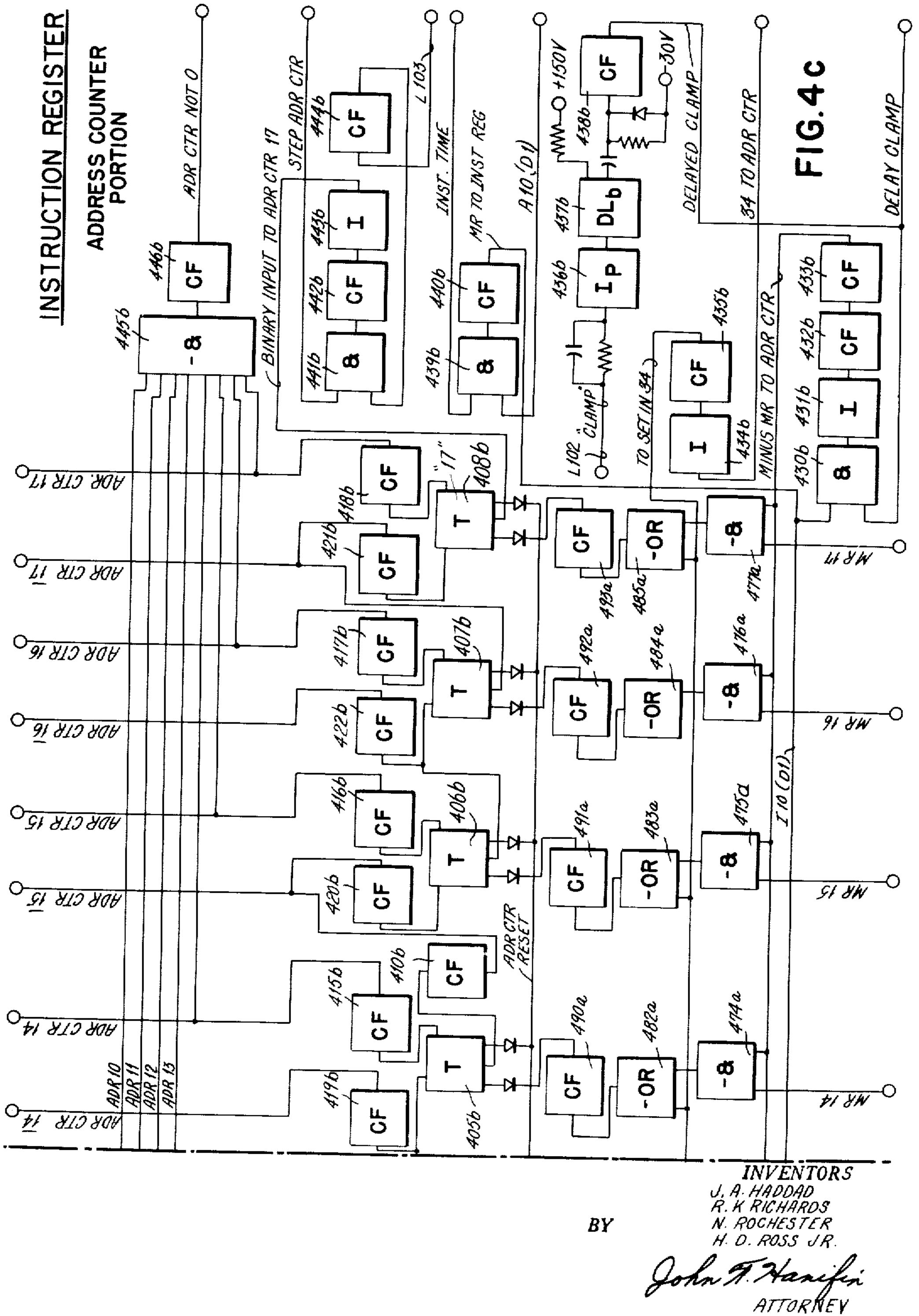

Figs. 4*a*, 4*b* and 4*c*, taken together, with Fig. 4*b* located to the right of Fig. 4*a*, and Fig. 4*c*, at the right of Fig. 4*b*, comprise a block diagram of the Instruction Register.

Figure 4D:
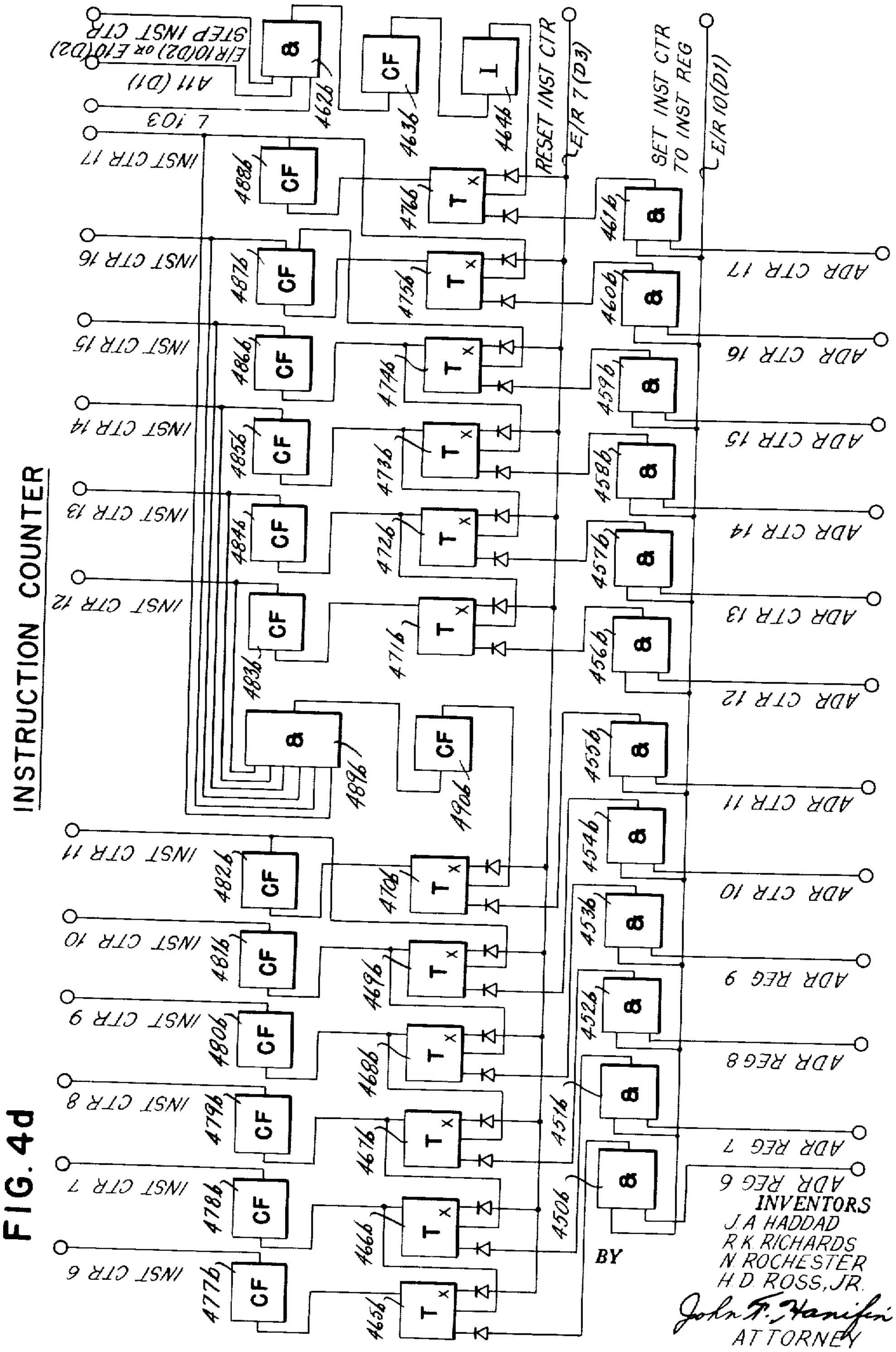

Fig. 4*d* is a block diagram of the Instruction Counter.

Figure 4E:
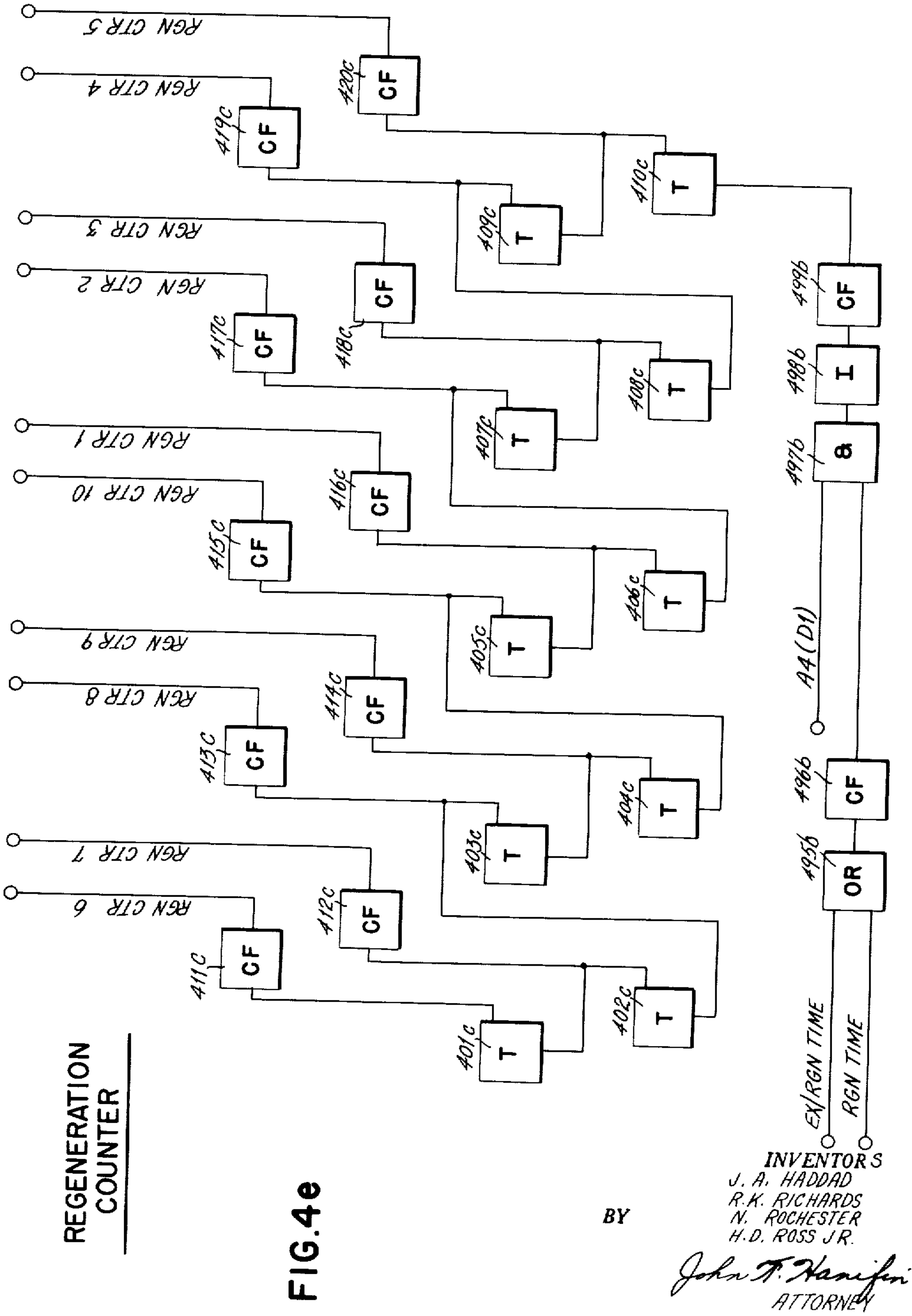

Fig. 4*e* is a block diagram of the Regeneration Counter.

Figure 4F:
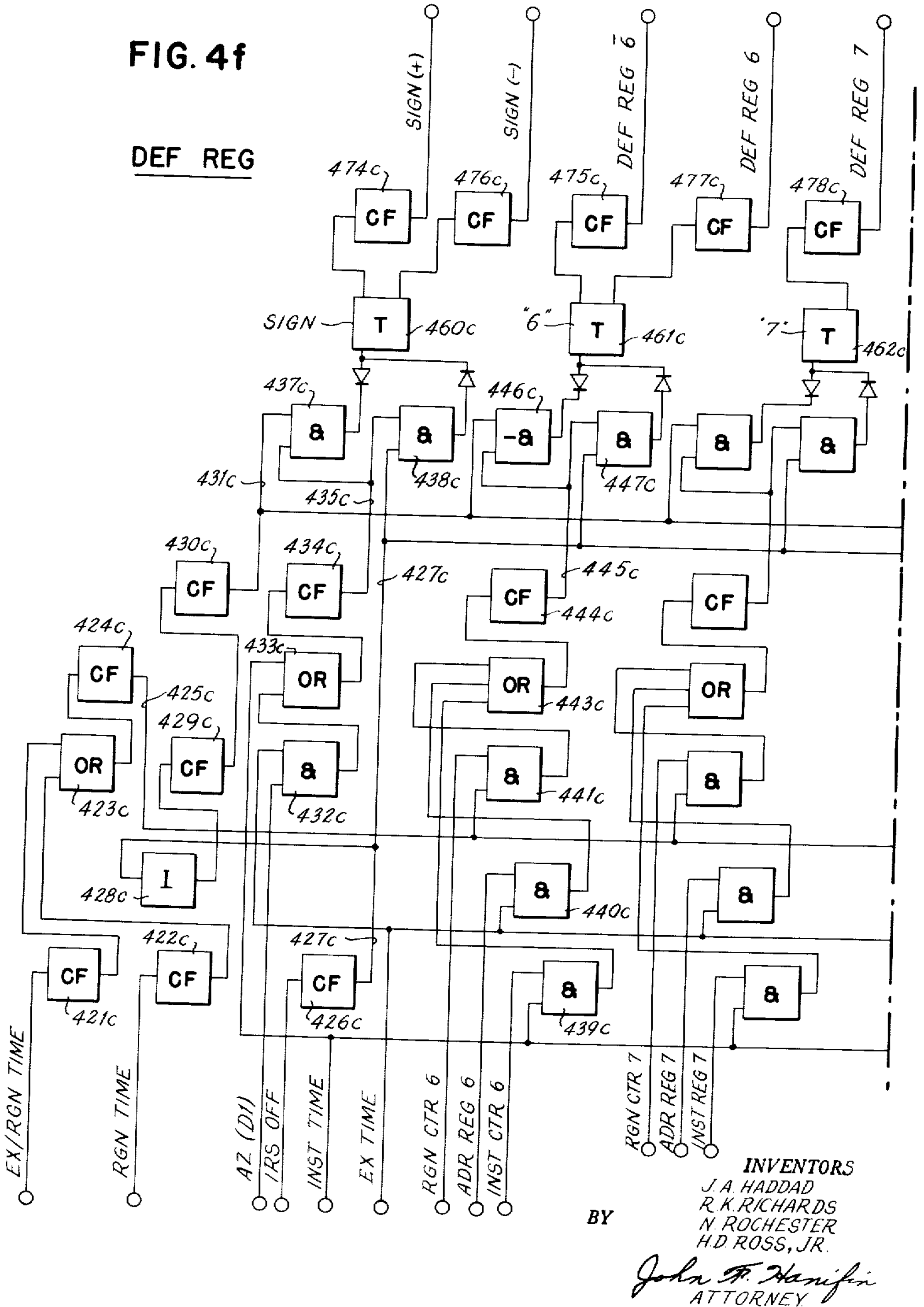
Figure 4G:
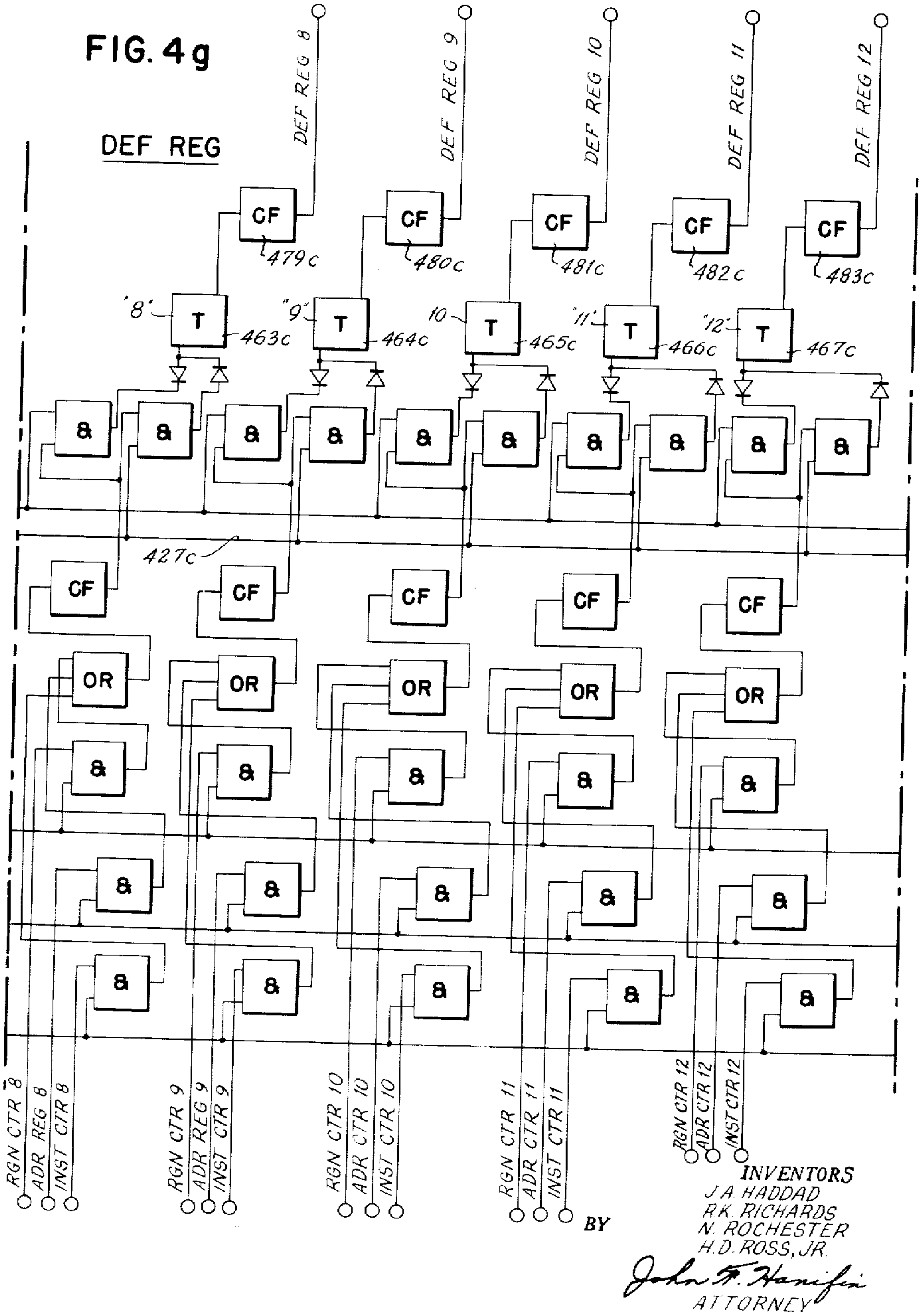
Figure 4H:
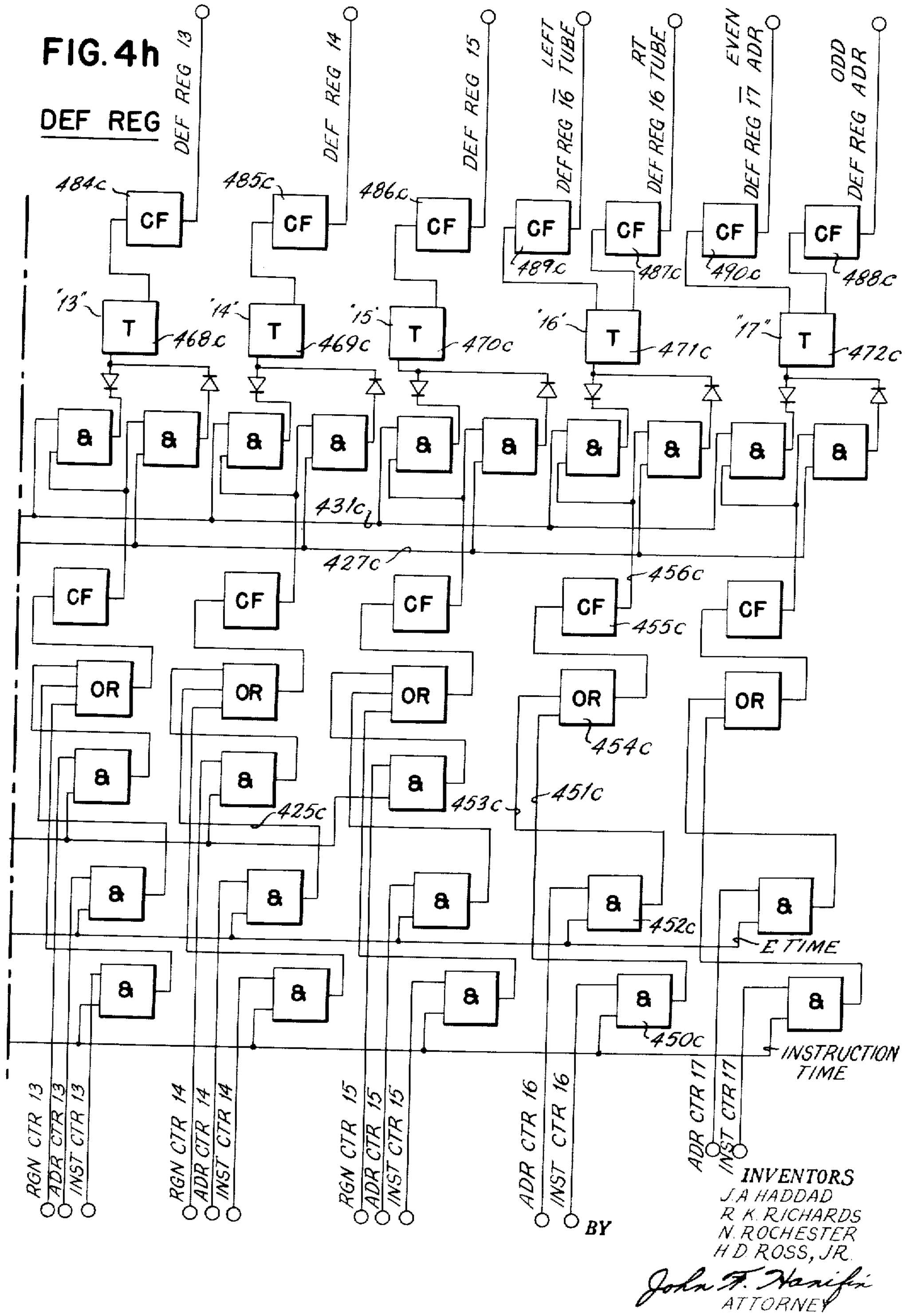

Figs. 4*f*, 4*g* and 4*h*, taken together, with Fig. 4*g* located at the right of Fig. 4*f*, and Fig. 4*h* at the right of Fig. 4*g*, comprise a block diagram of the Deflection Switches and the Deflection Register.

Figure 4I:
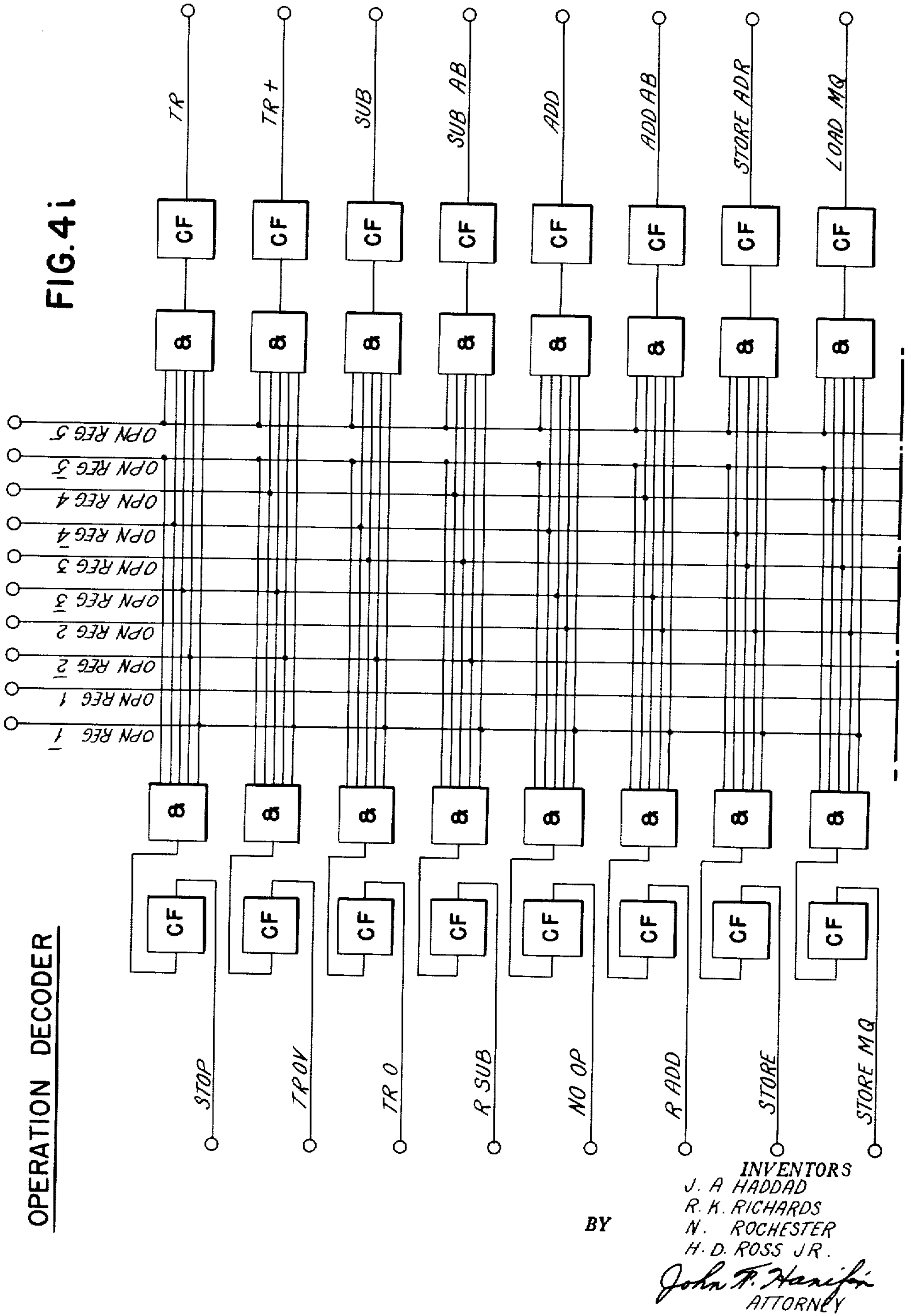
Figure 4J:
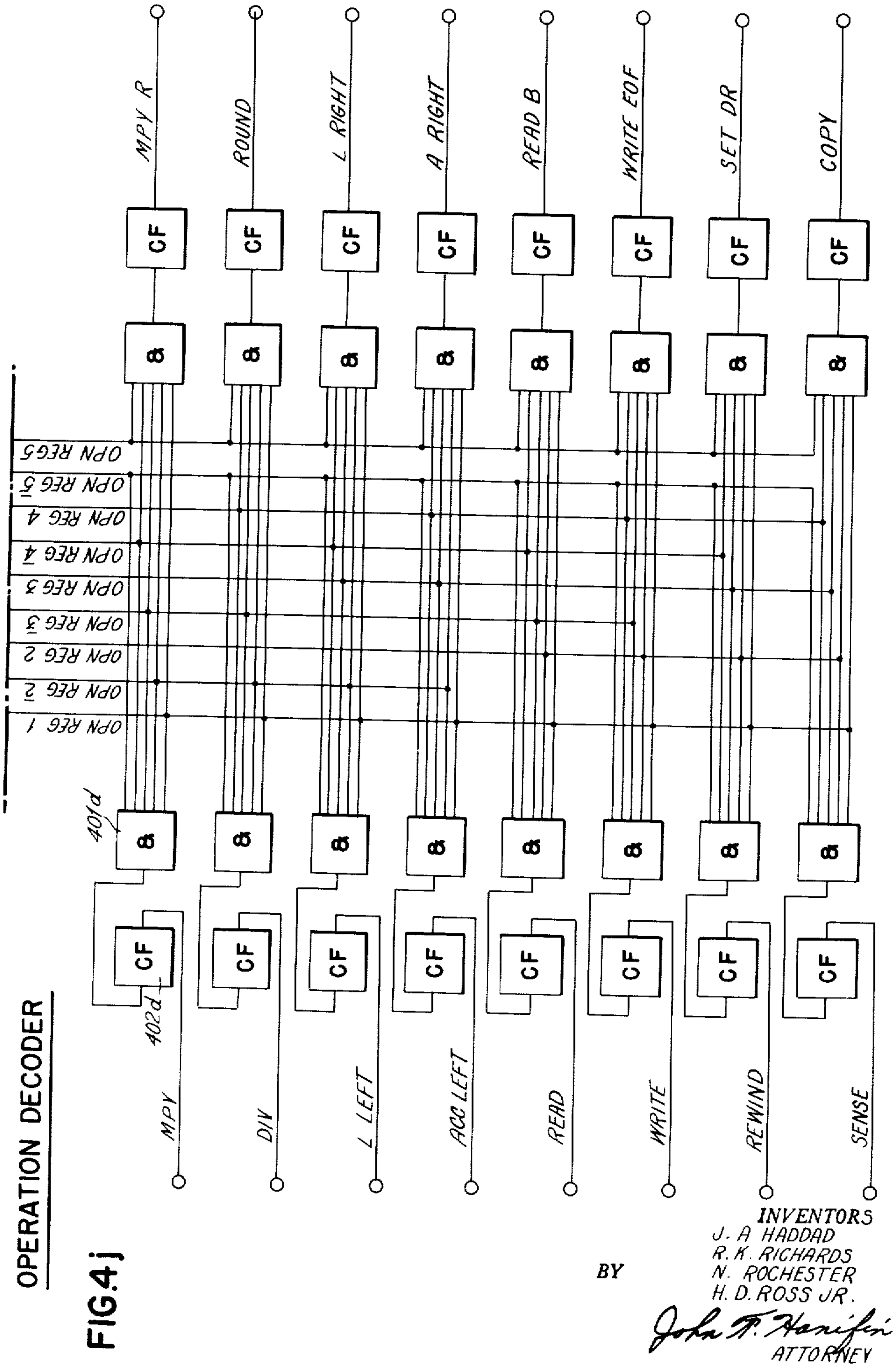

Figs. 4*i* and 4*j*, taken together, with Fig. 4*j* located below Fig. 4*i*, comprise a block diagram of the Operation Decoder.

Figure 5A:
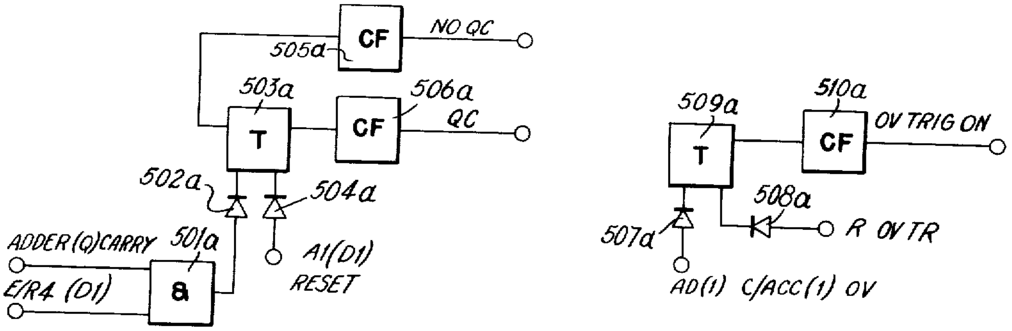

Fig. 5*a* is a block diagram of the Carry and Overflow trigger circuits.

Figure 5B:
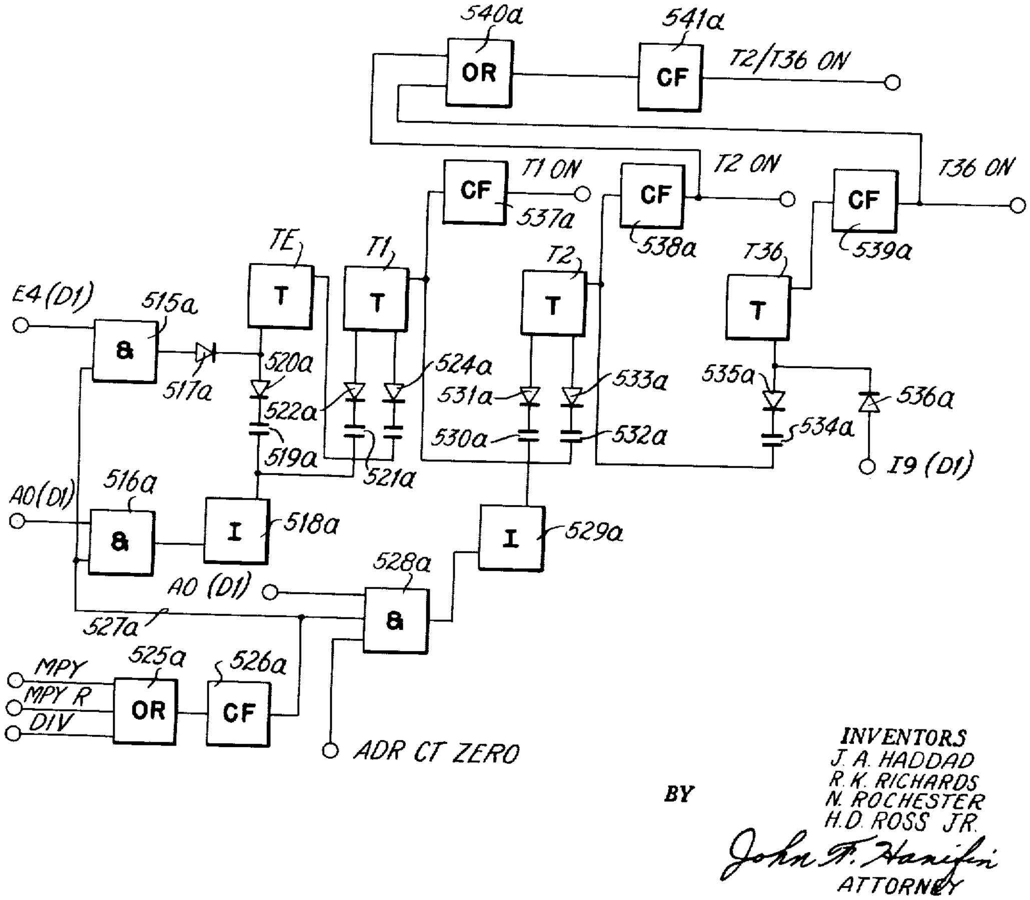

Fig. 5*b* is a block diagram of the Multiply Divide Tally Counter.

Figure 5C:
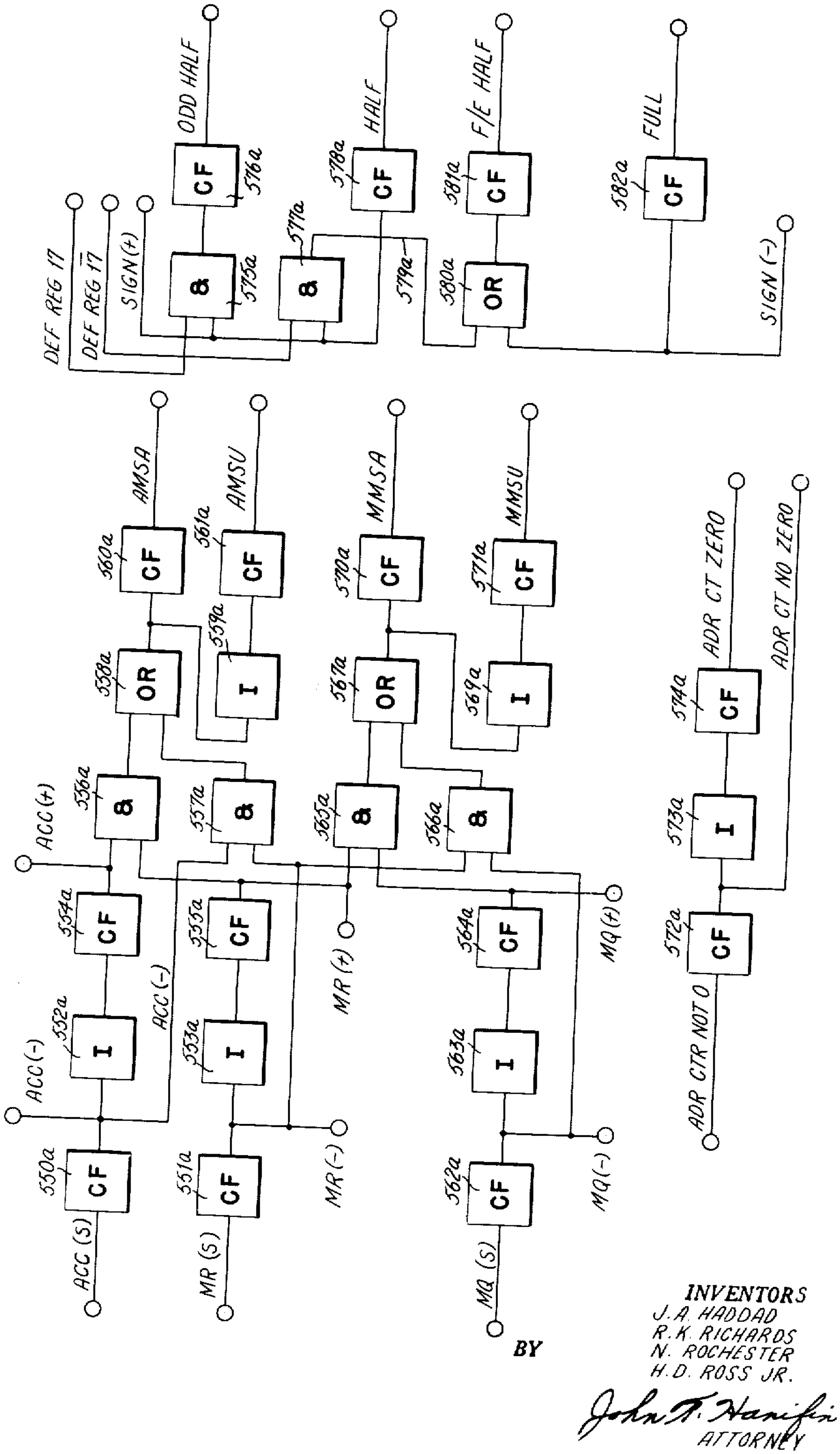

Fig. 5*c* is a block diagram of the Address, Sign and Address Counter Mixer Circuits.

Figure 5D:
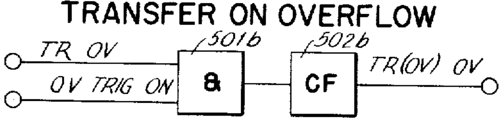

Fig. 5*d* is a block diagram of the TRANSFER ON OVERFLOW Execution Timer.

Figure 5E:
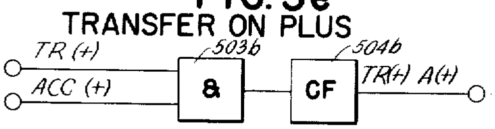

Fig. 5*e* is a block diagram of the TRANSFER ON PLUS Execution Timer.

Figure 5F:
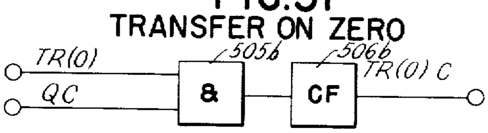

Fig. 5*f* is a block diagram of the TRANSFER ON ZERO Execution Timer.

Figure 5G:
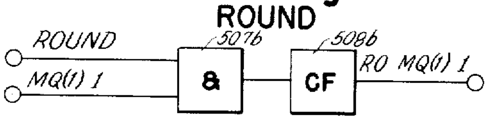

Fig. 5*g* is a block diagram of the ROUND Execution Timer.

Figure 5H:
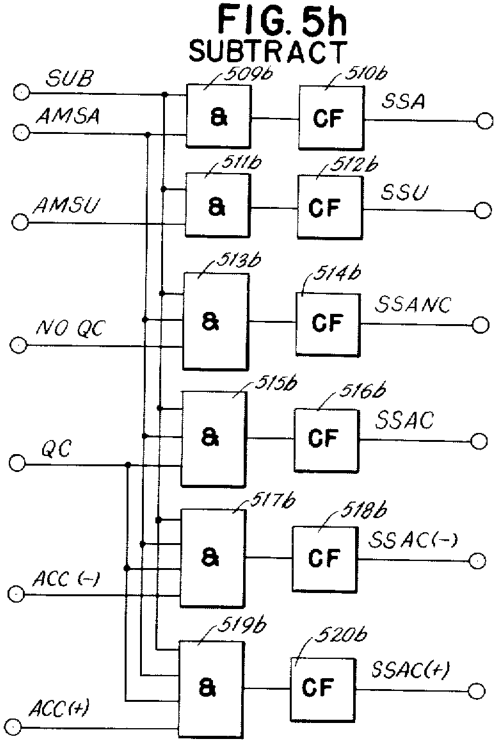

Fig. 5*h* is a block diagram of the SUBTRACT Execution Timer.

Figure 5I:
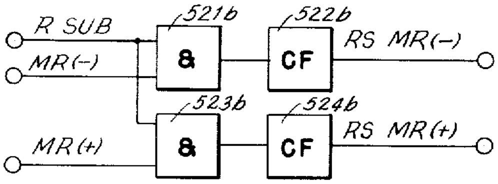

Fig. 5*i* is a block diagram of the RESET SUBTRACT Execution Timer.

Figure 5J:
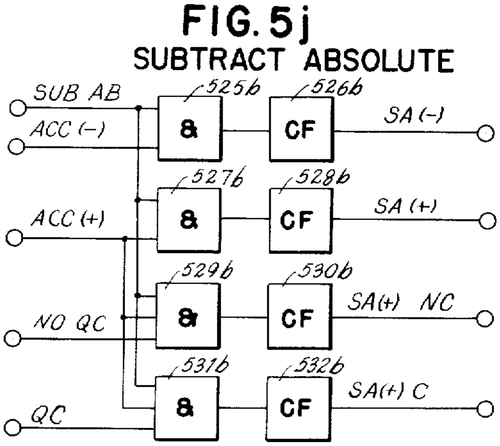

Fig. 5*j* is a block diagram of the SUBTRACT ABSOLUTE Execution Timer.

Figure 5K:
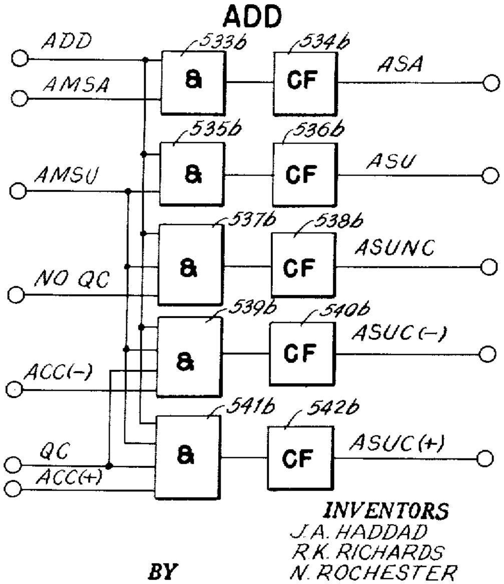

Fig. 5*k* is a block diagram of the ADD Execution Timer.

Figure 5M:
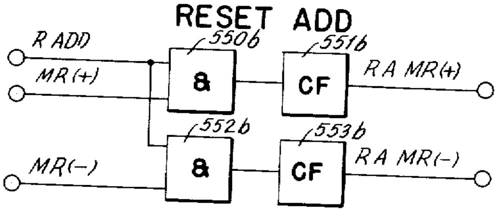

Fig. 5*m* is a block diagram of the RESET ADD Execution Timer.

Figure 5N:
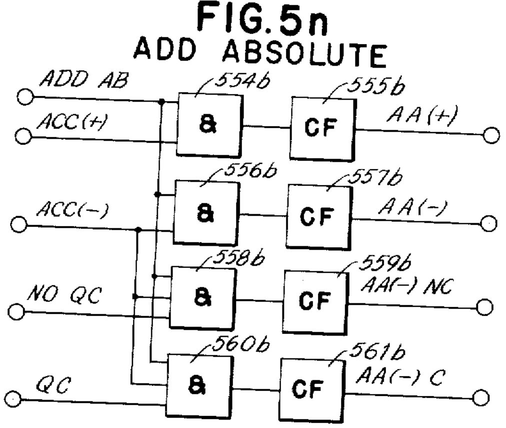

Fig. 5*n* is a block diagram of the ADD ABSOLUTE Execution Timer.

Figure 5R:
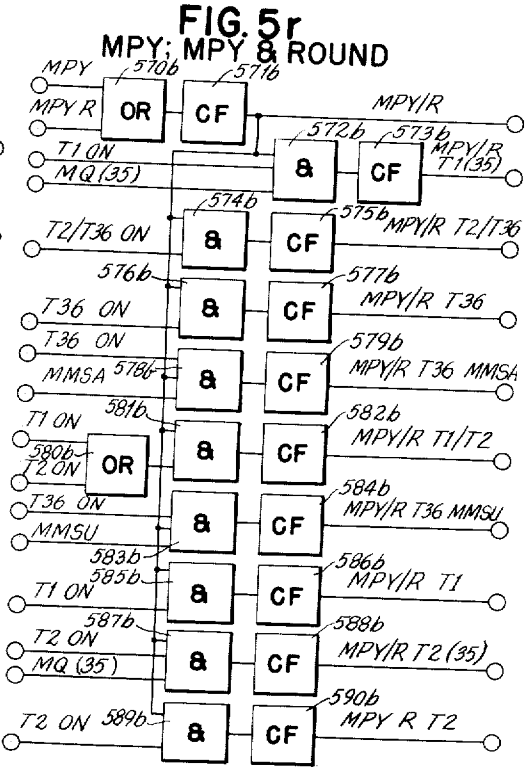
Figure 5P:
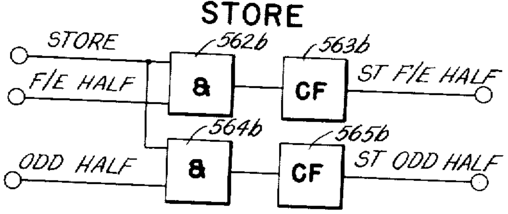

Fig. 5*p* is a block diagram of the STORE Execution Timer.

Figure 5Q:
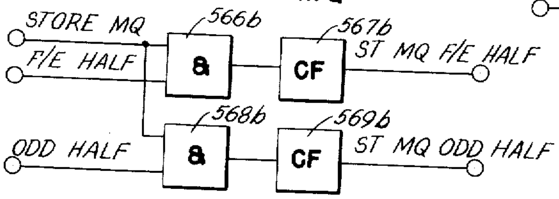

Fig. 5*q* is a block diagram of the STORE MQ Execution Timer.

Fig. 5*r* is a block diagram of the MULTIPLY and MULTIPLY AND ROUND Execution Timer.

Figure 5S:
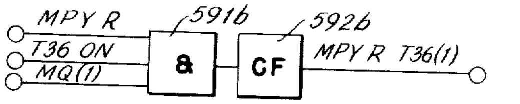

Fig. 5*s* is a block diagram of the further circuits of the MULTIPLY AND ROUND Execution Timer.

Figure 5T:
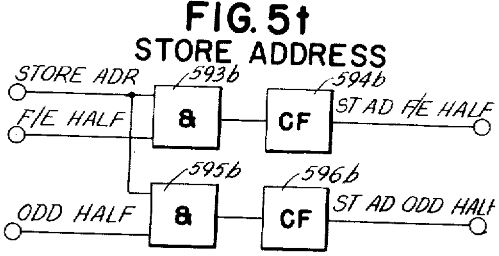

Fig. 5*t* is a block diagram of the STORE ADDRESS Execution Timer.

Figures 5U, 5V, 5W, 5X, 5Y:
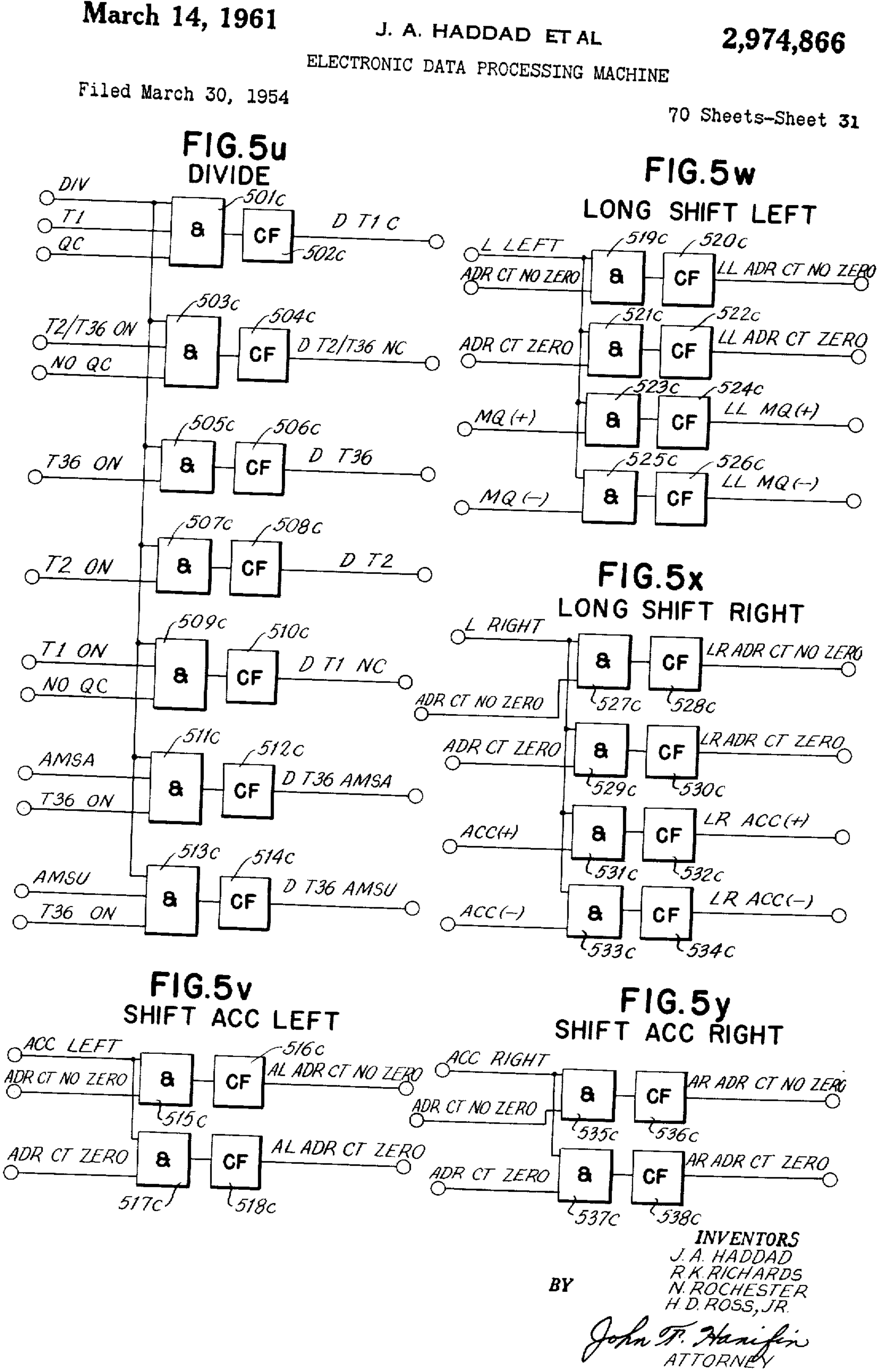

Fig. 5*u* is a block diagram of the DIVIDE Execution Timer.

Fig. 5*v* is a block diagram of the SHIFT ACCUMULATOR LEFT Execution Timer.

Fig. 5*w* is a block diagram of the LONG SHIFT LEFT Execution Timer.

Fig. 5*x* is a block diagram of the LONG SHIFT RIGHT Execution Timer.

Fig. 5*y* is a block diagram of the SHIFT ACCUMULATOR RIGHT Execution Timer.

Figure 5Z:
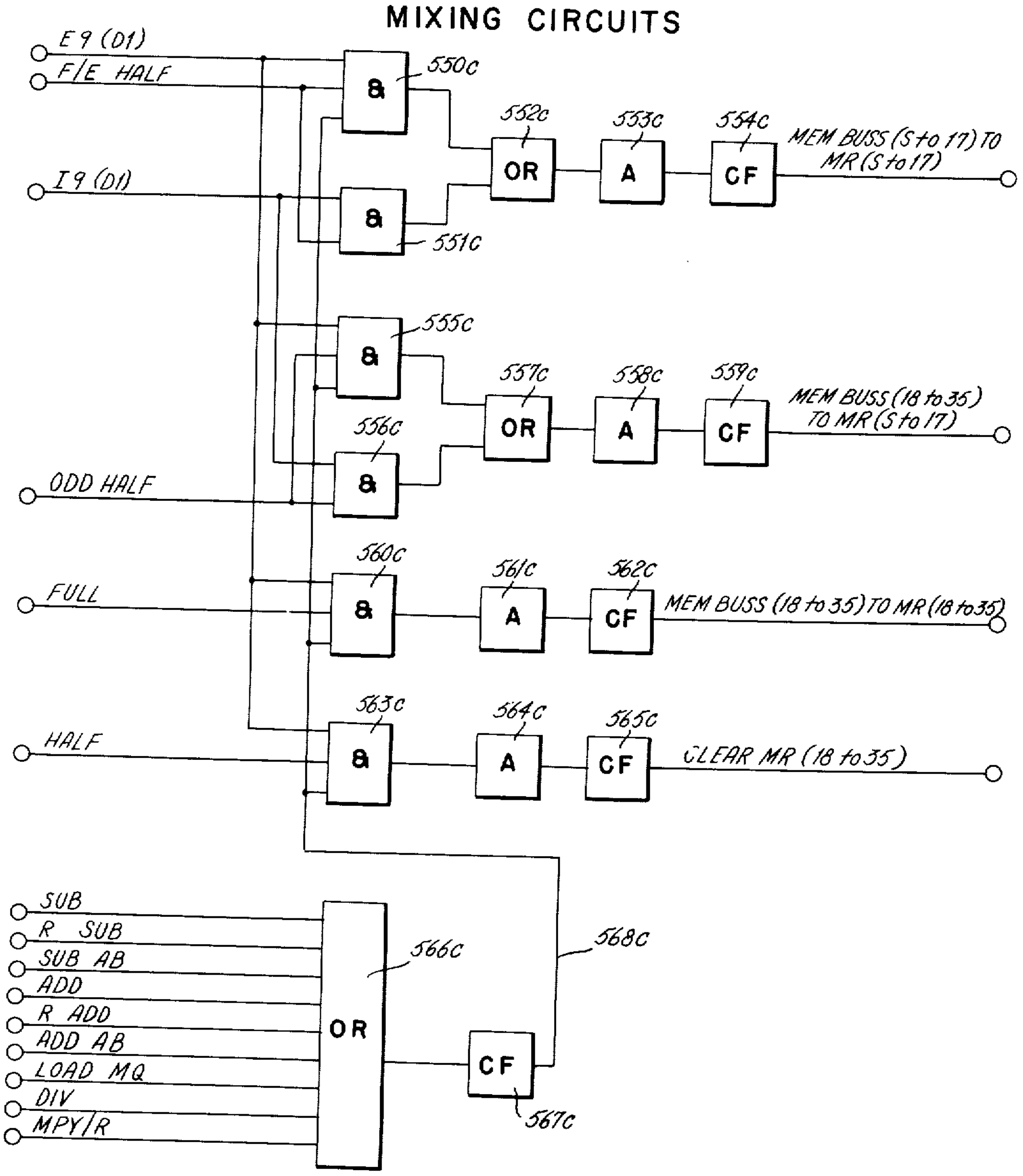
Figure 5A:
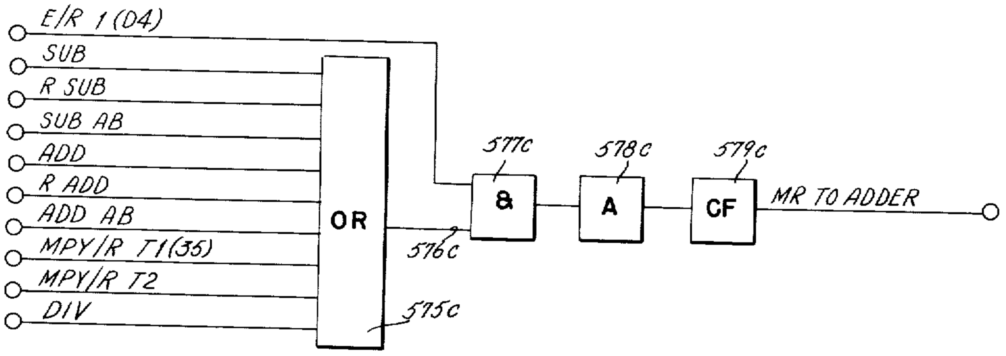
Figure 5A:
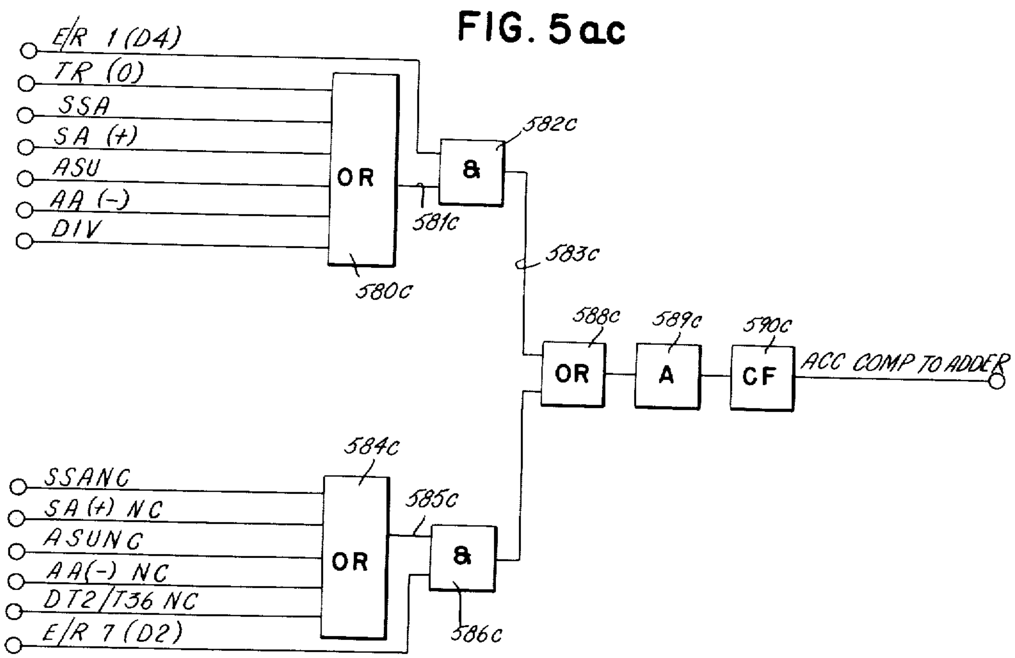
Figure 5A:
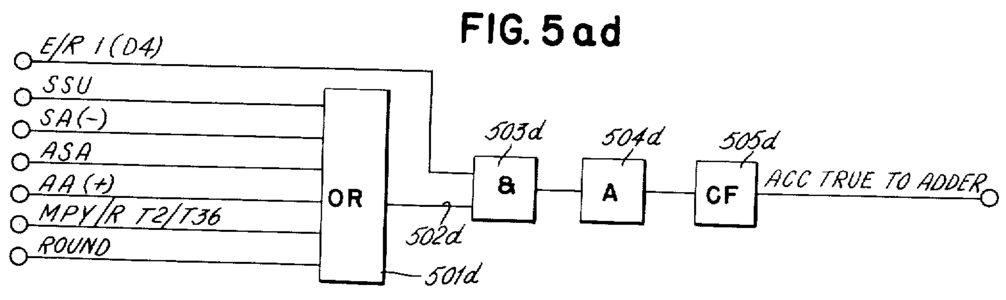
Figure 5A:
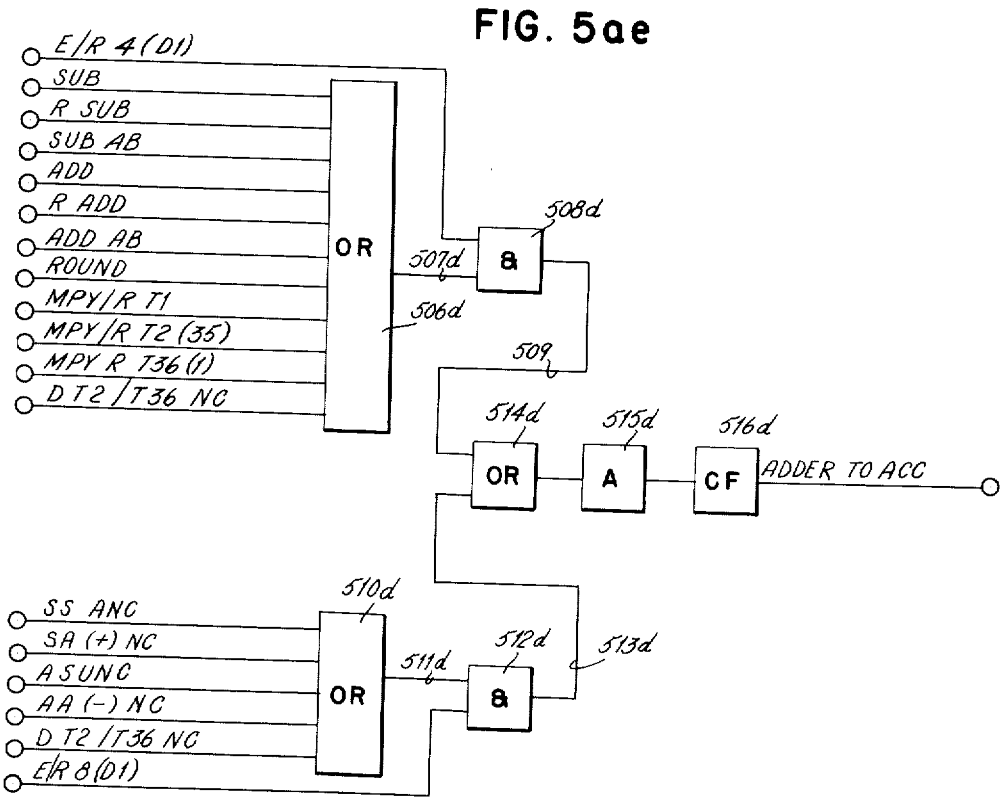
Figure 5A:
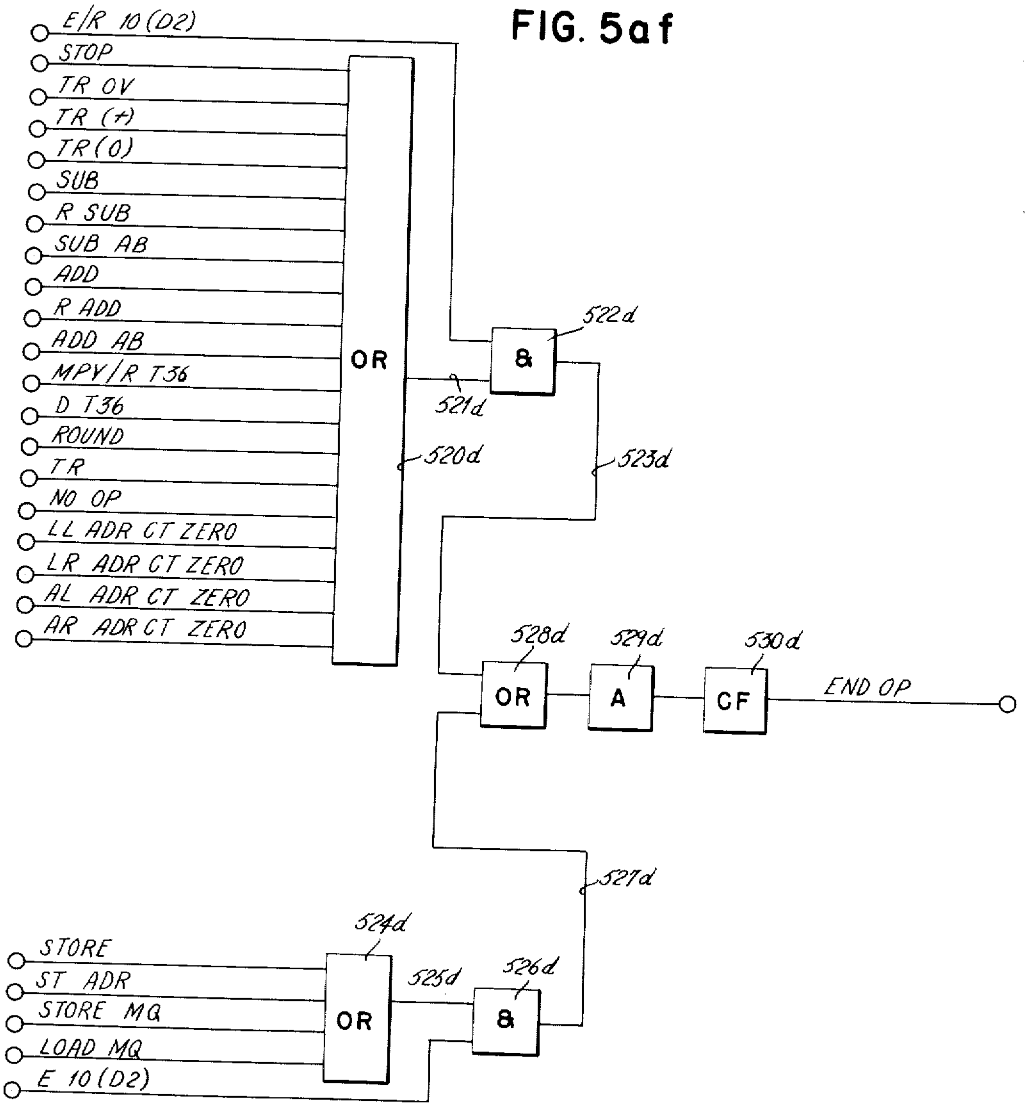
Figure 5A:
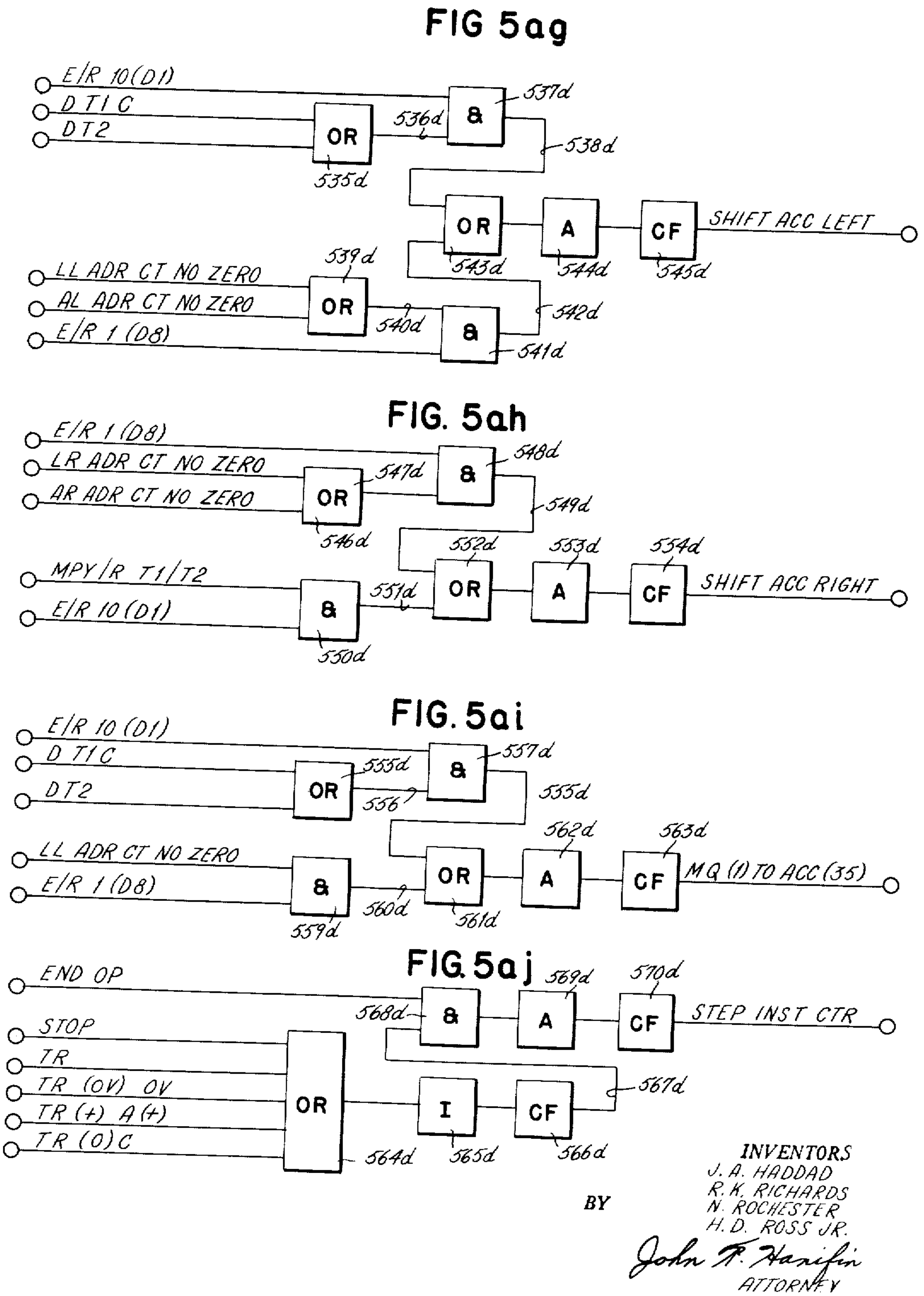
Figure 5A:
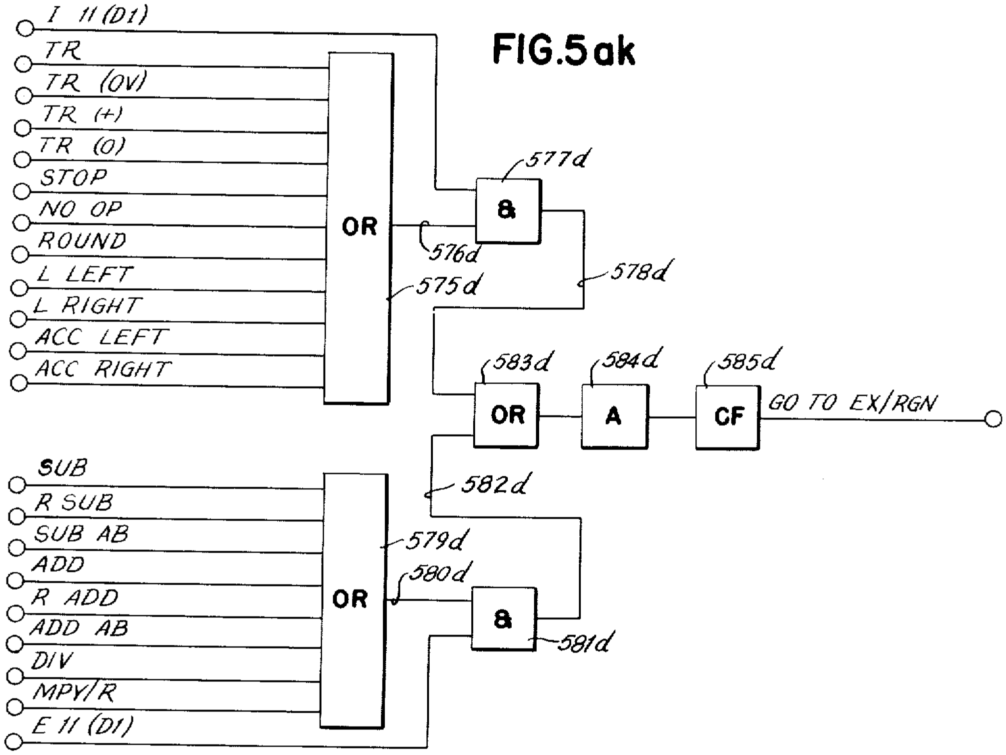
Figure 5A:
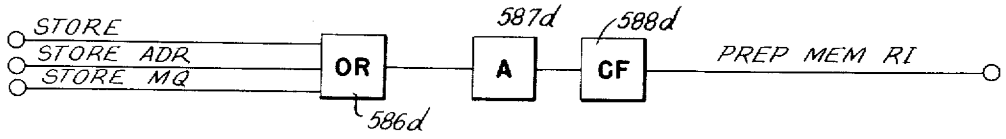
Figure 5A:
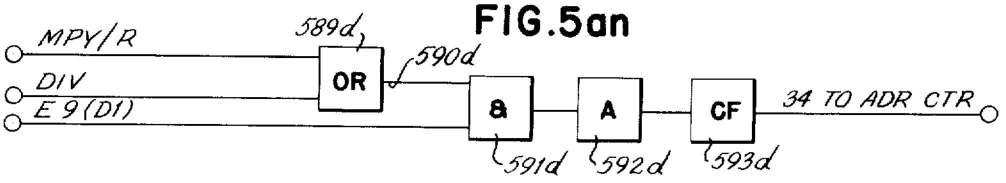
Figure 5A:
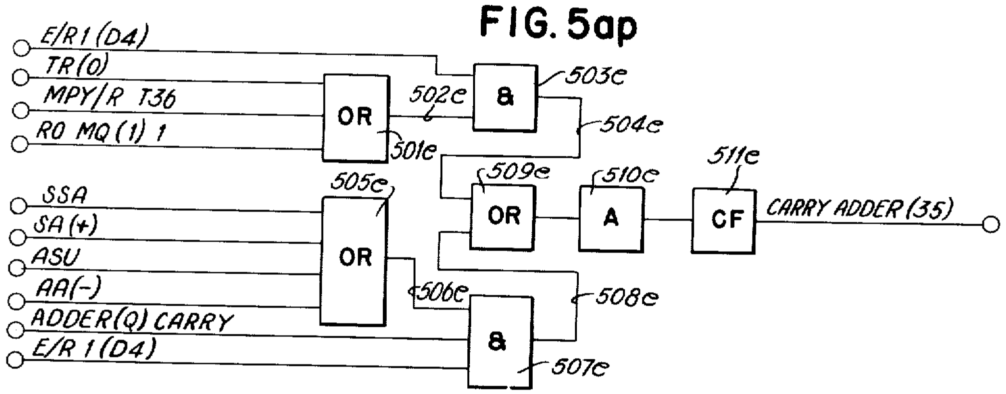
Figure 5A:
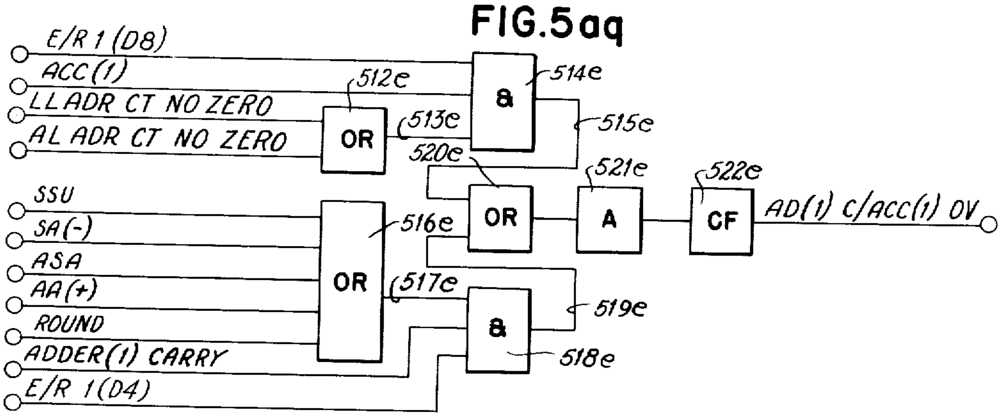
Figure 5A:
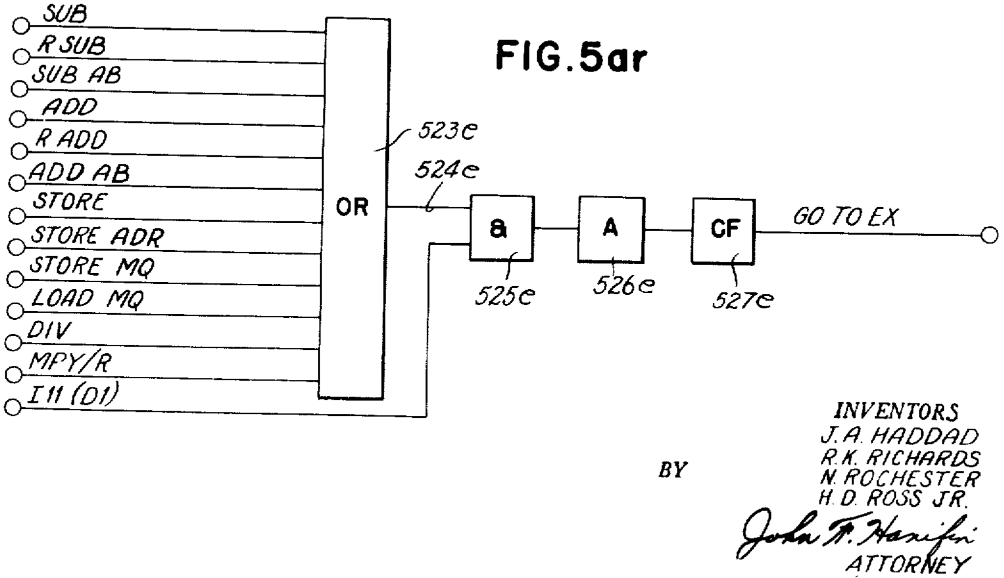
Figure 5A:
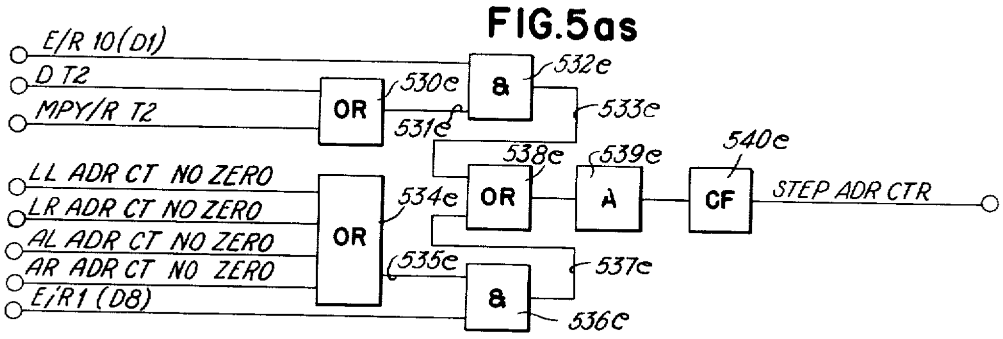
Figure 5A:
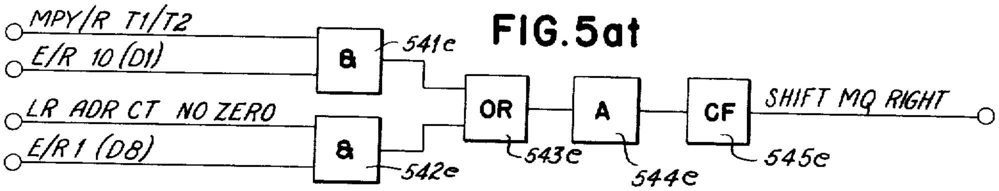
Figure 5A:
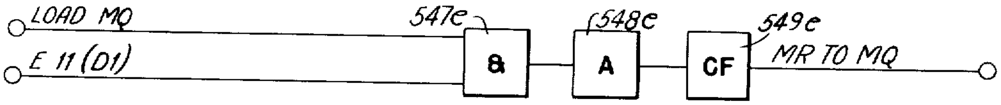
Figure 5A:
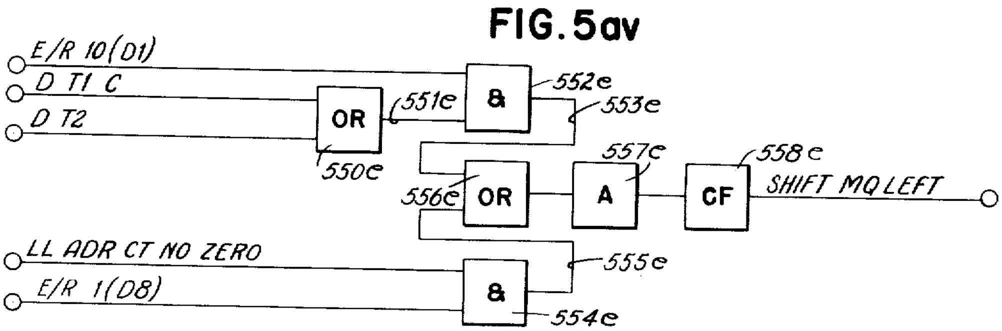
Figure 5A:
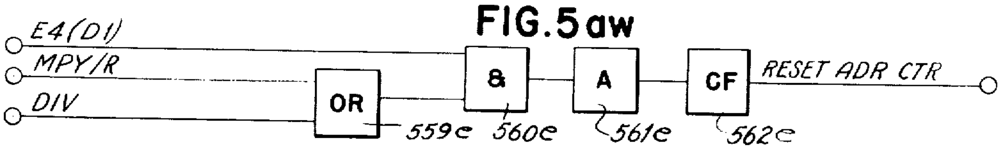
Figure 5A:
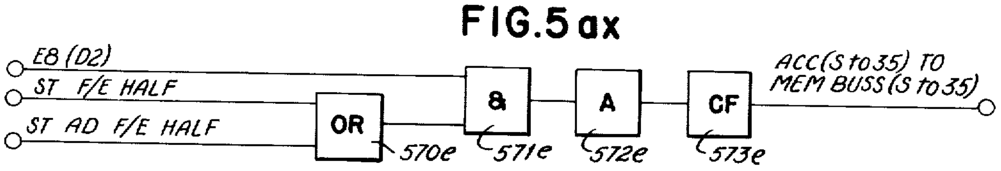
Figure 5A:
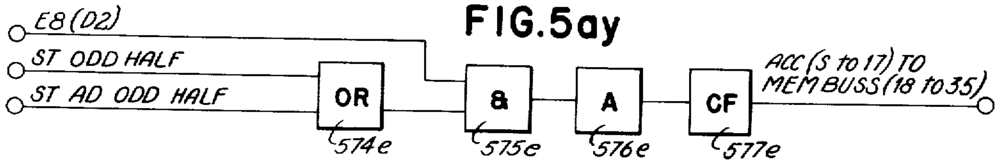
Figures 5A, 5B:
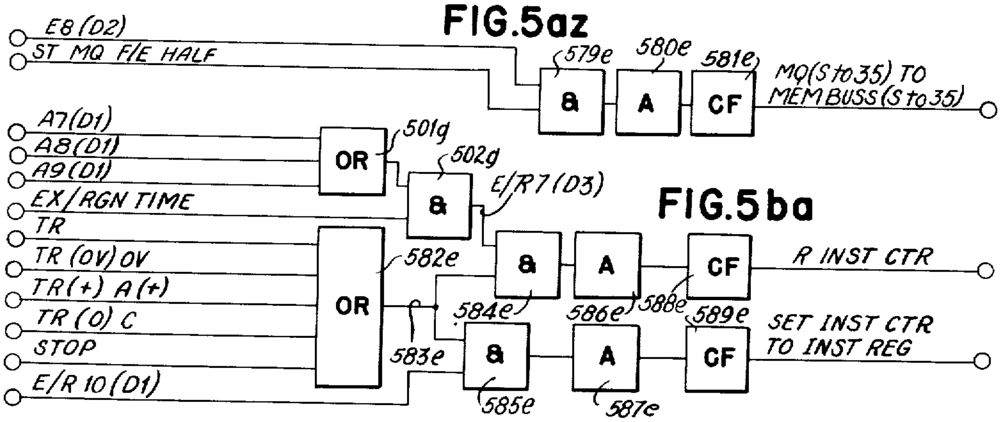
Figure 5B:
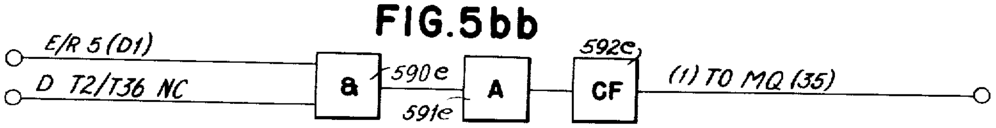
Figure 5B:
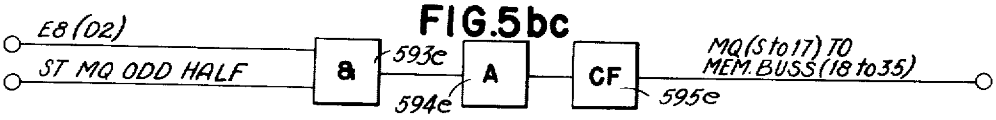
Figure 5B:
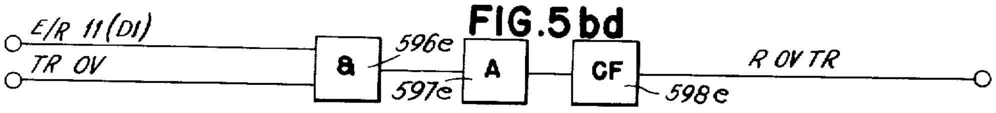
Figure 5B:
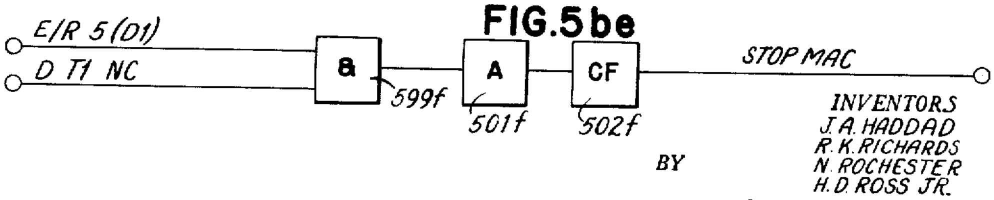
Figure 5B:
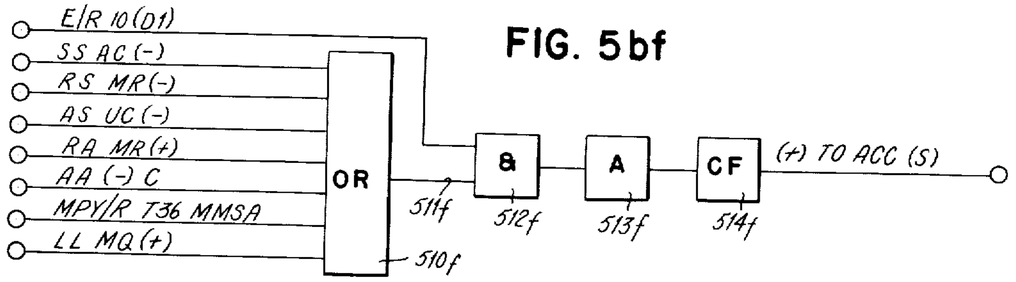
Figure 5B:
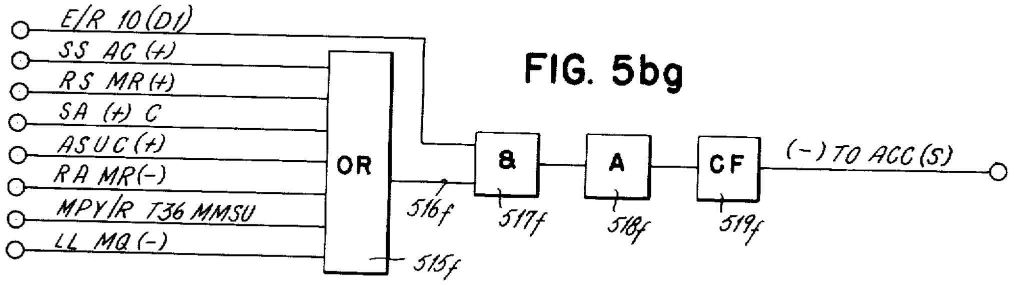
Figure 5B:
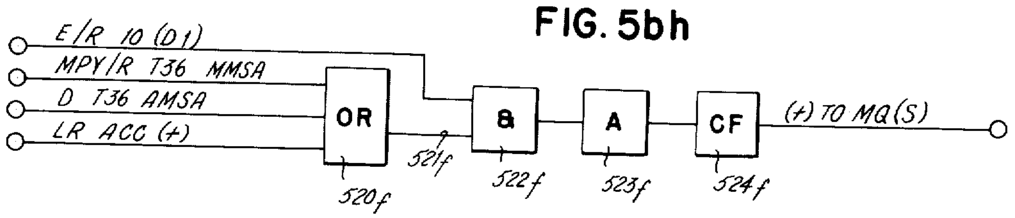
Figure 5B:
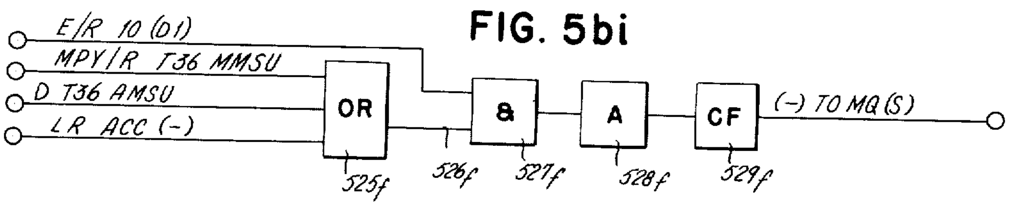

Figs. 5*z*, 5*ab*, 5*ac*, 5*ad*, 5*ae*, 5*af*, 5*ag*, 5*ah*, 5*ai*, 5*aj*, 5*ak*, 5*am*, 5*an*, 5*ap*, 5*aq*, 5*ar*, 5*as*, 5*at*, 5*au*, 5 *av*, 5*aw*, 5*ax*, 5*ay*, 5*az*, 5*ba*, *bb*, 5*bc*, 5*bd*, 5*be*, 5*bf*, 5*bg*, 5*bh* and 5*bi* comprise block diagrams of Mixing Circuits.

Figure 6B:
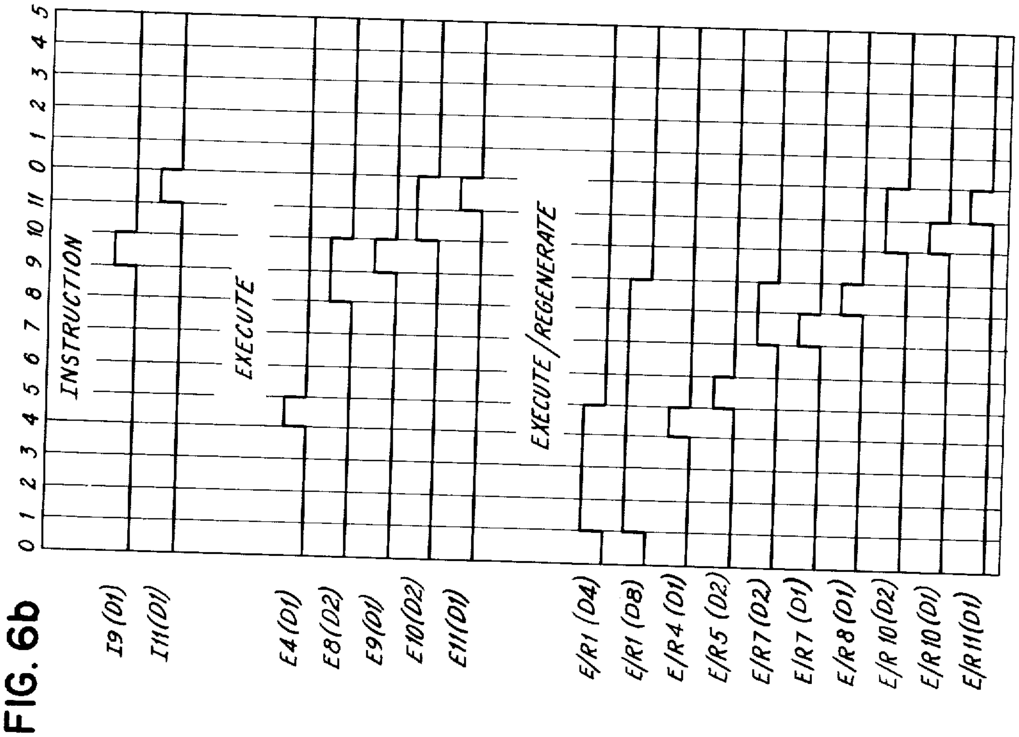
Figure 6A:
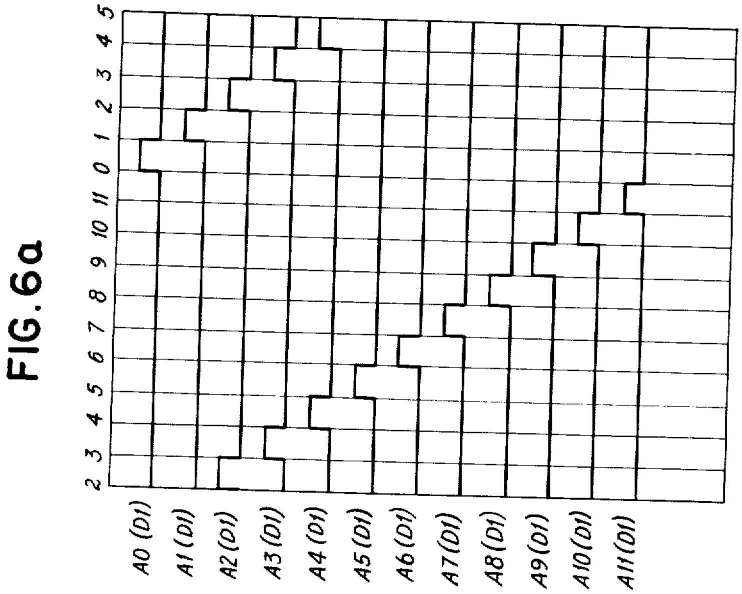

Fig. 6*a* comprises a Timing Diagram for certain outputs of the Clock.

Fig. 6*b* comprises a Timing Diagram for certain outputs of the Gate Generator.

Figure 6C:
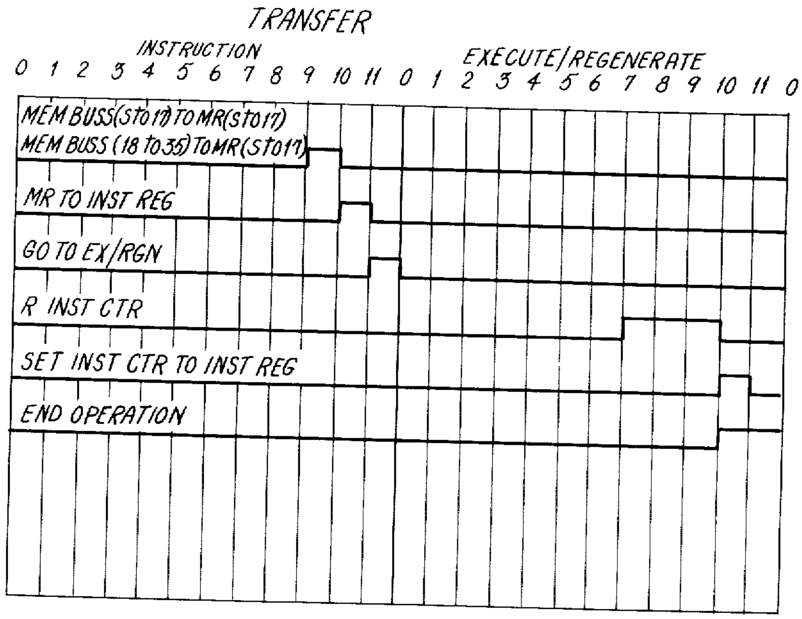

Fig. 6*c* comprises a Timing Diagram for a TRANSFER operation.

Figure 6D:
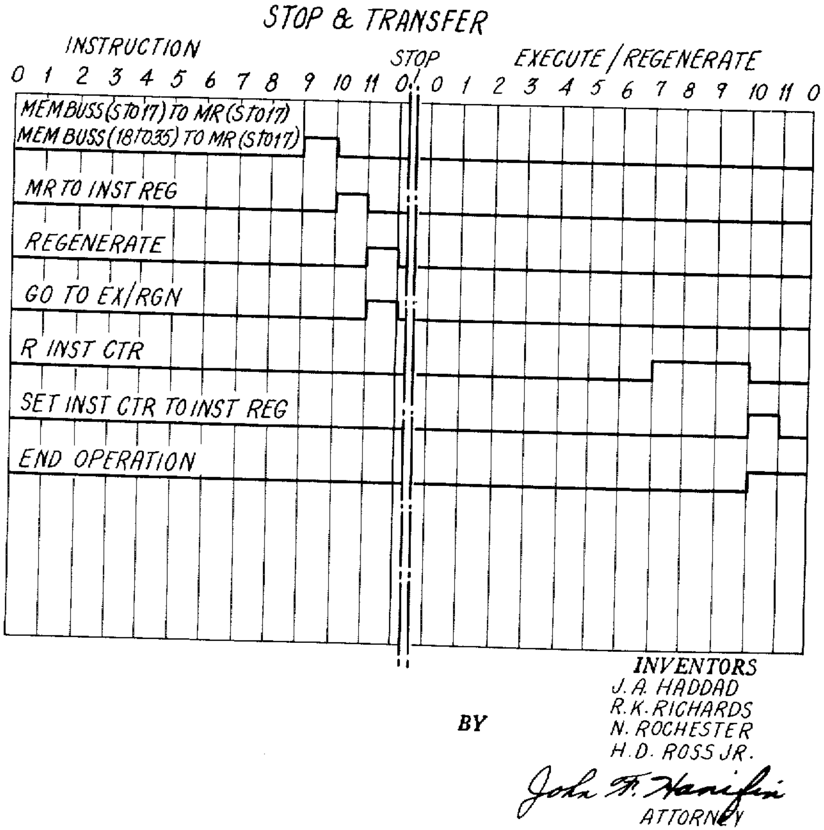

Fig. 6*d* comprises a Timing Diagram for a STOP AND TRANSFER operation.

Figure 6E:
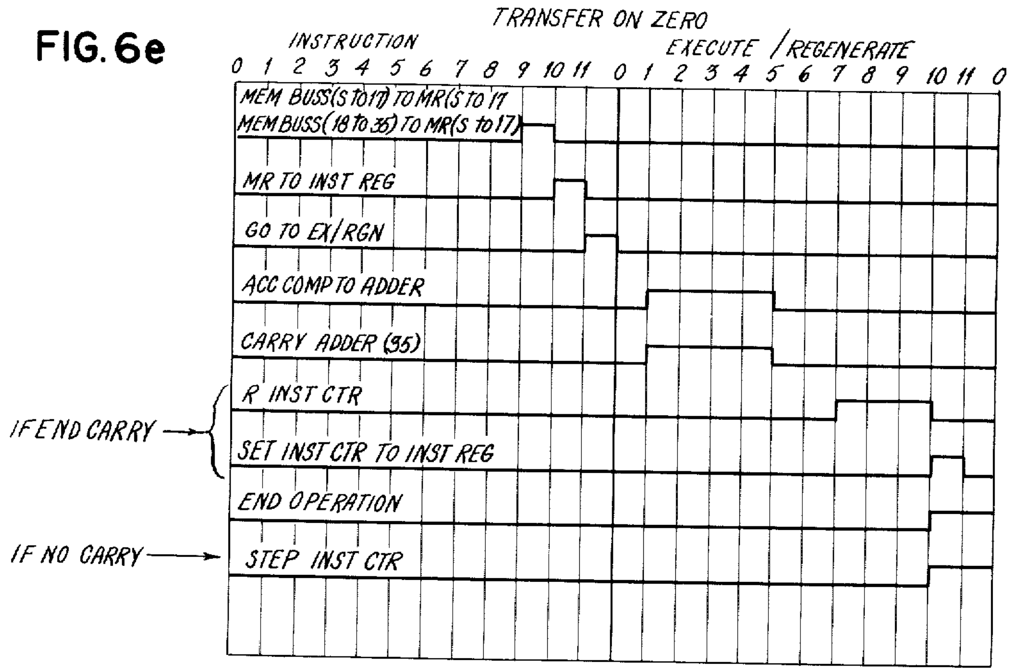

Fig. 6*e* comprises a Timing Diagram for a TRANSFER ON ZERO operation.

Figure 6F:
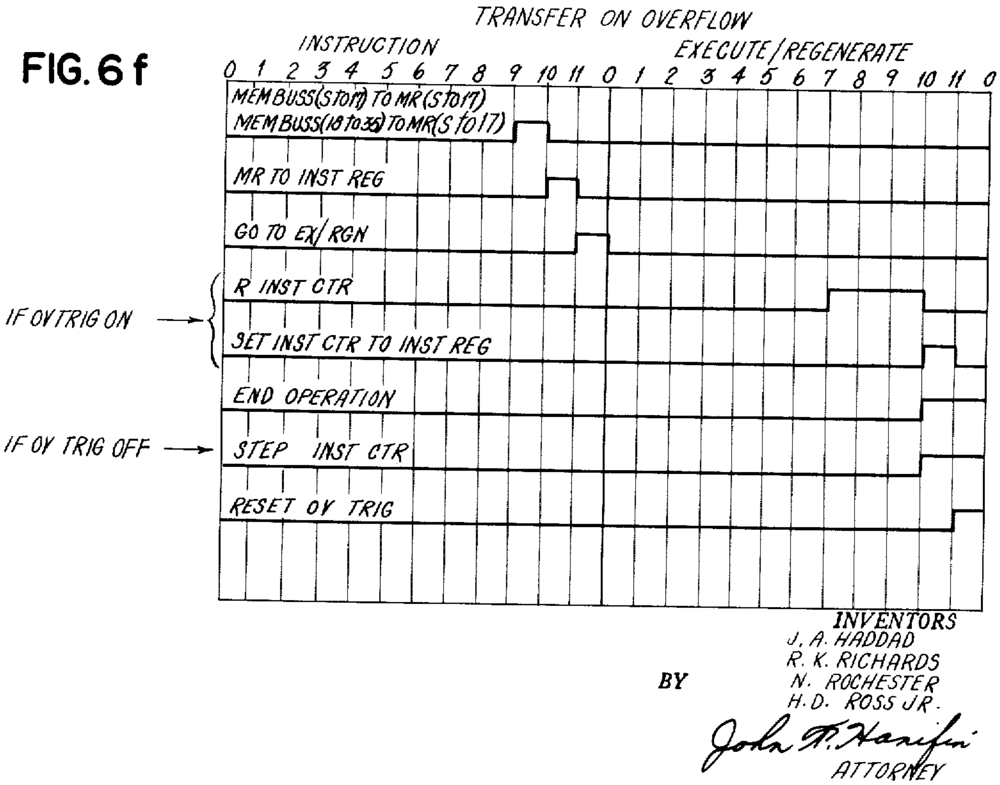

Fig. 6*f* comprises a Timing Diagram for a TRANSFER ON OVERFLOW operation.

Figure 6G:
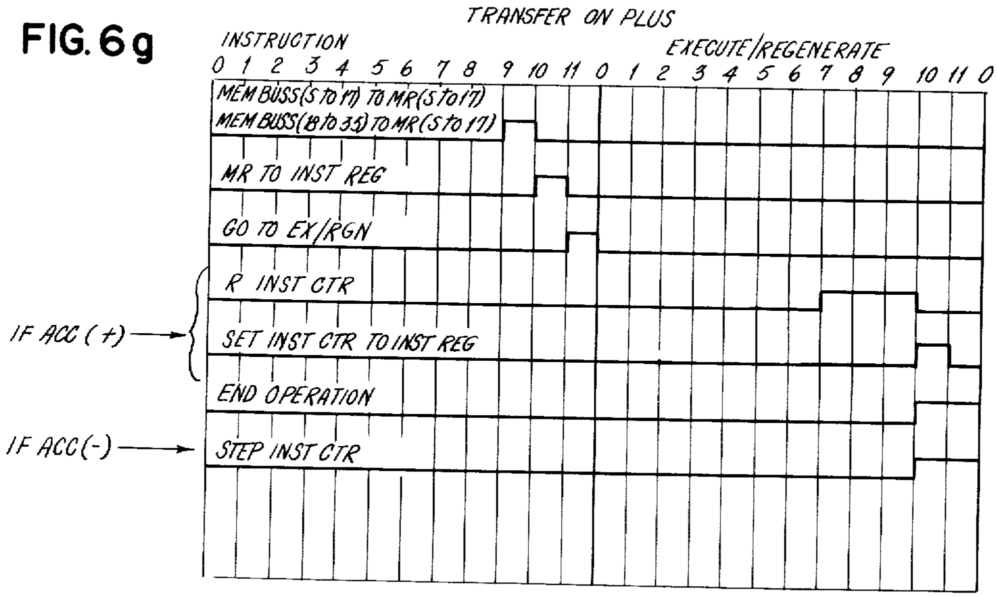

Fig. 6*g* comprises a Timing Diagram for a TRANSFER ON PLUS operation.

Figure 6H:
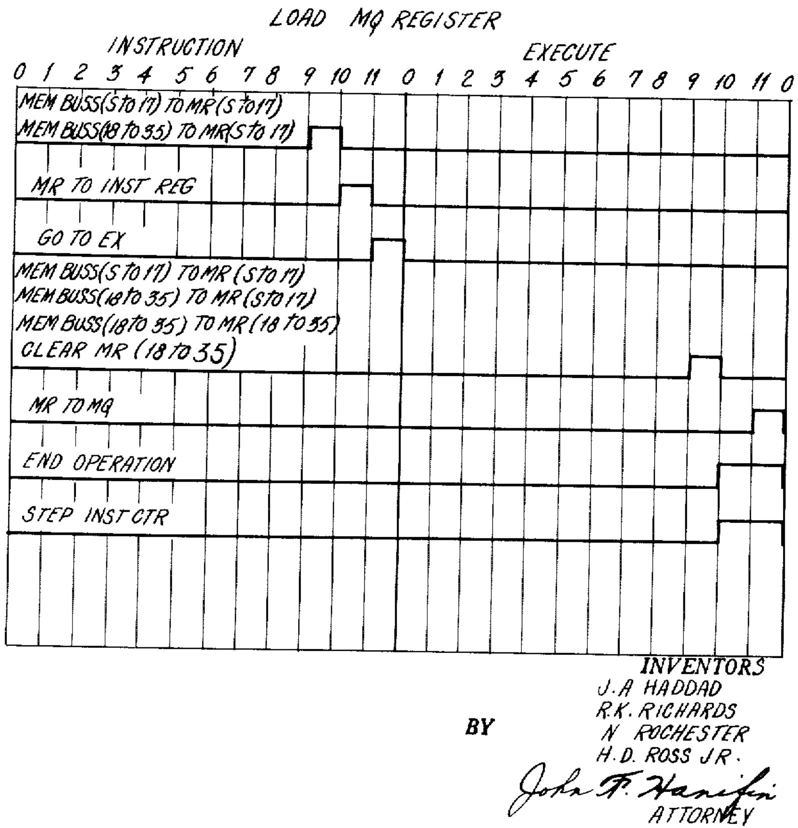

Fig. 6*h* comprises a Timing Diagram for a LOAD MQ REGISTER operation.

Figure 6I:
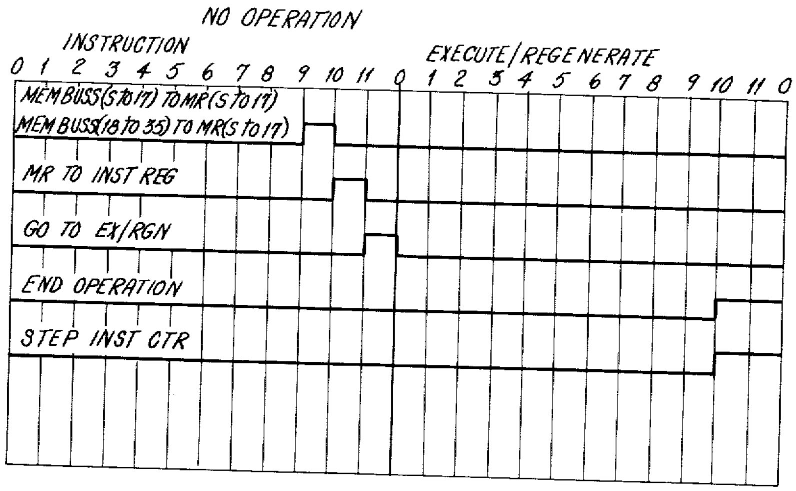

Fig. 6*i* comprises a Timing Diagram for a NO OPERATION.

Figure 6J:
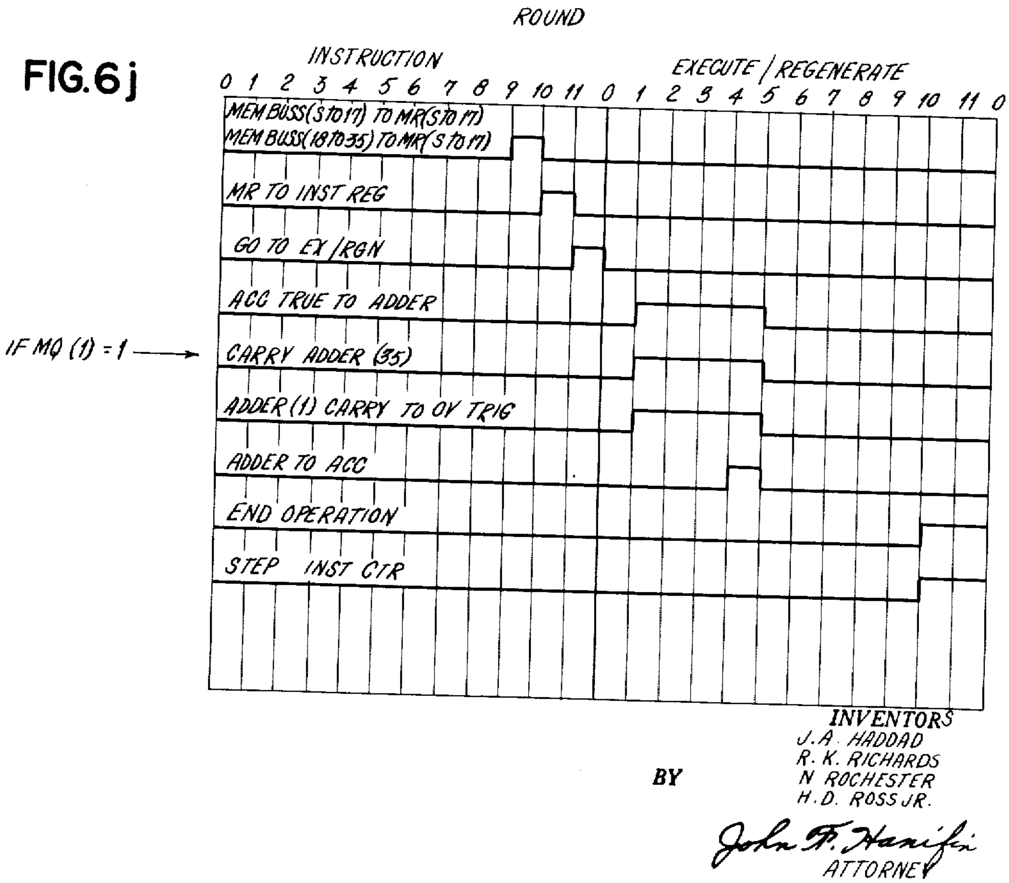

Fig. 6*j* comprises a Timing Diagram for a ROUND operation.

Figure 6K:
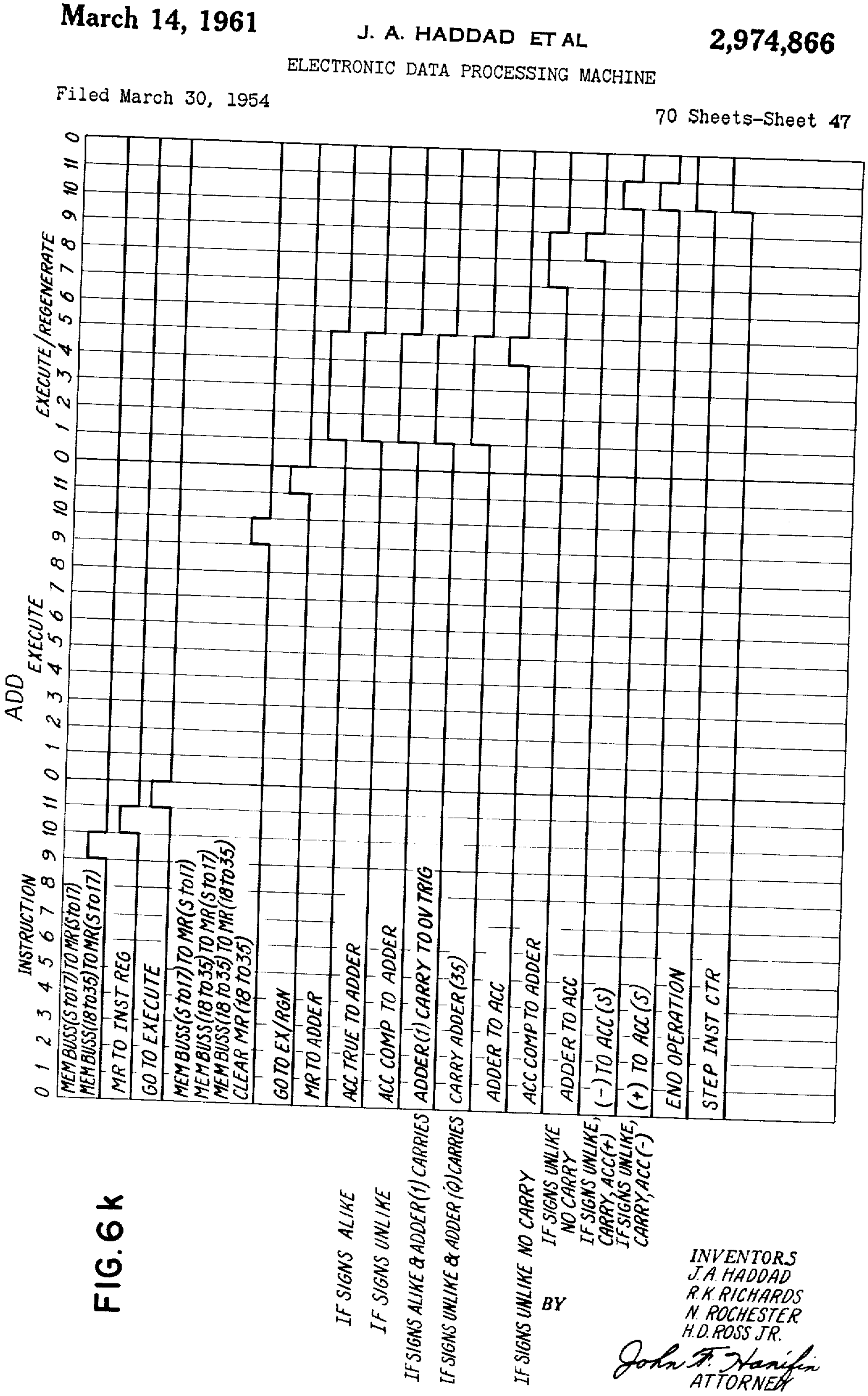

Fig. 6*k* comprises a Timing Diagram for an ADD operation.

Figure 6M:
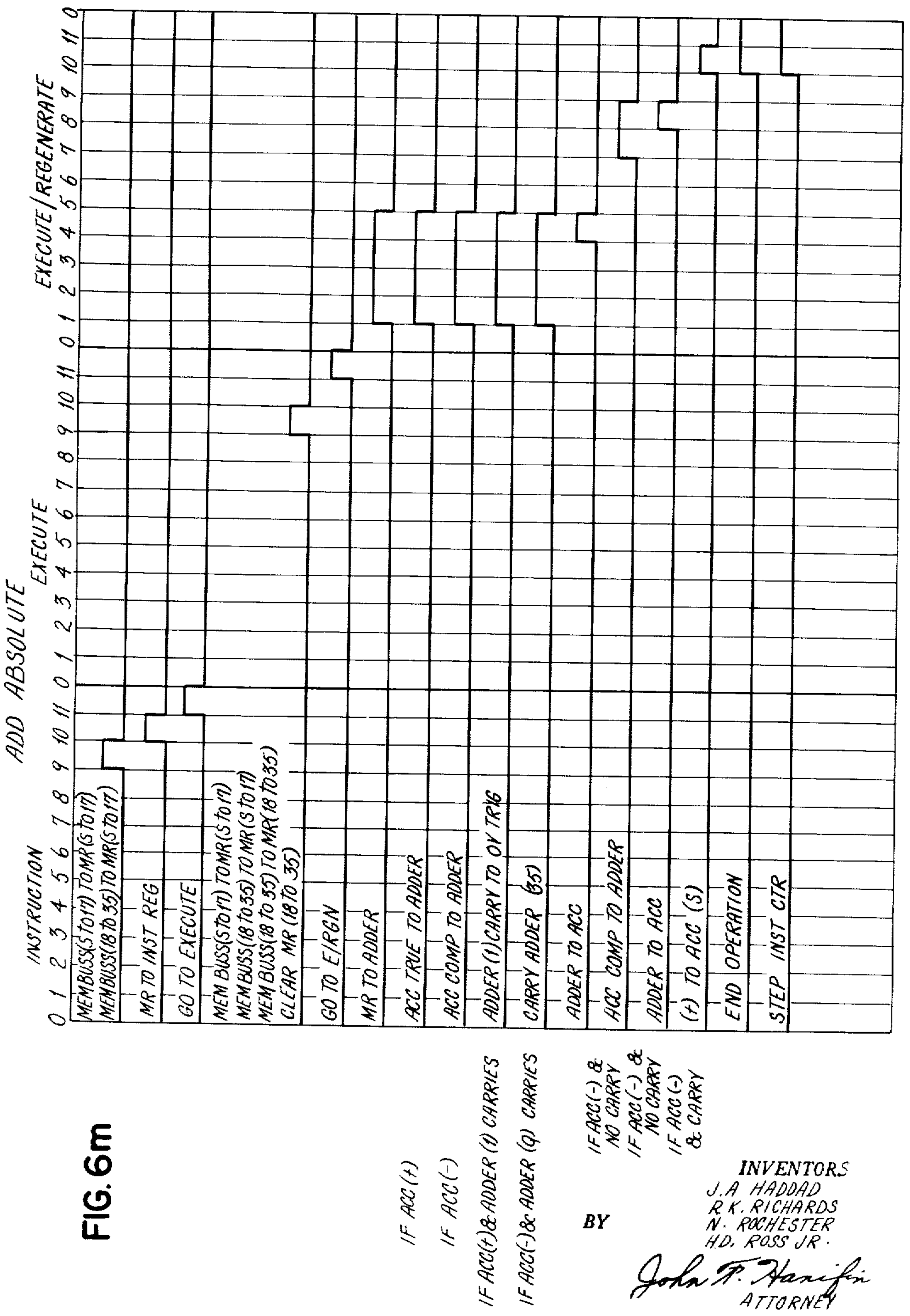

Fig. 6*m* comprises a Timing Diagram for an ADD ABSOLUTE operation.

Figure 6N:
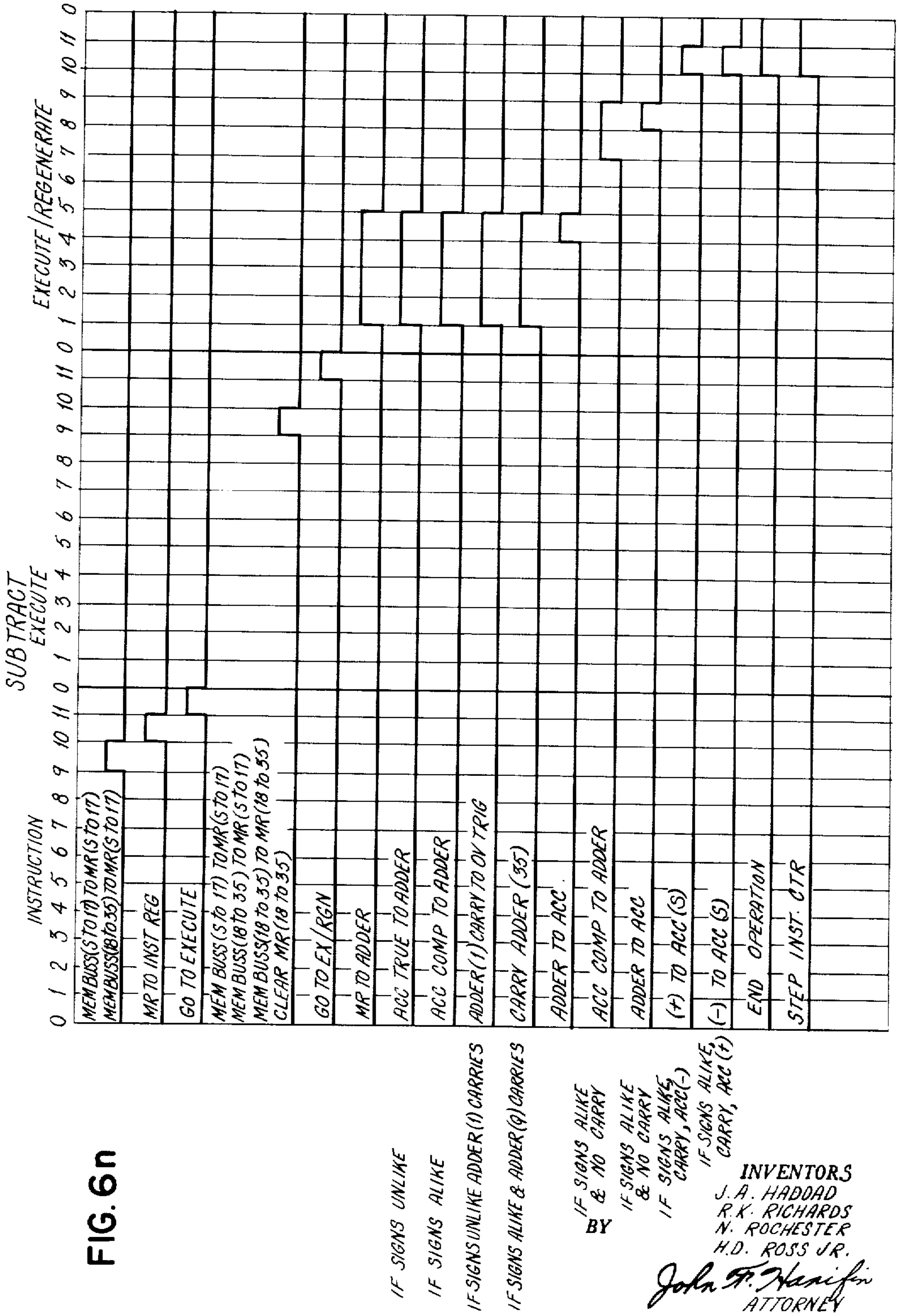

Fig. 6*n* is a Timing Diagram for a SUBTRACT operation.

Figure 6P:
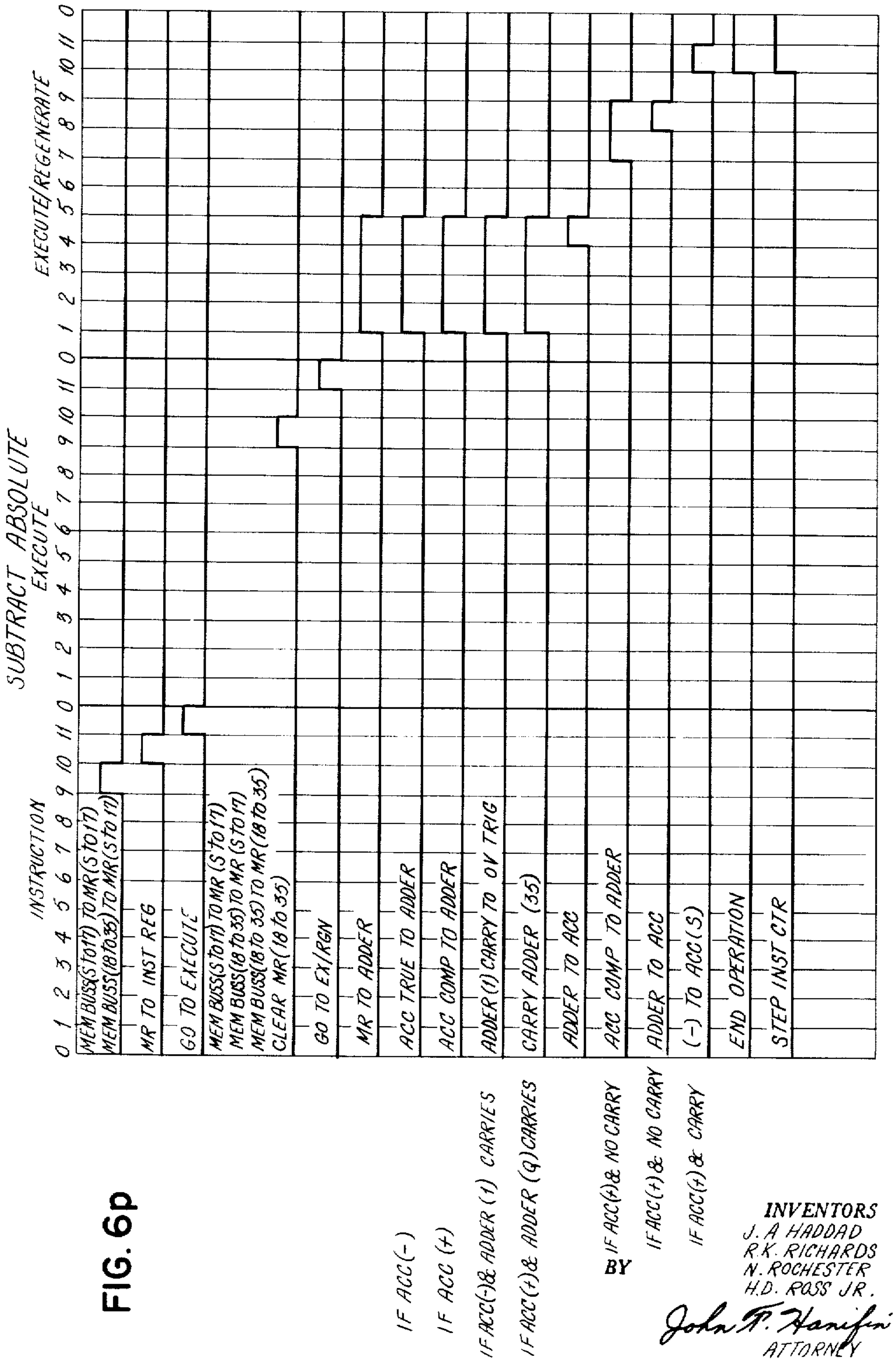

Fig. 6*p* comprises a Timing Diagram for a SUBTRACT ABSOLUTE operation.

Figure 6Q:
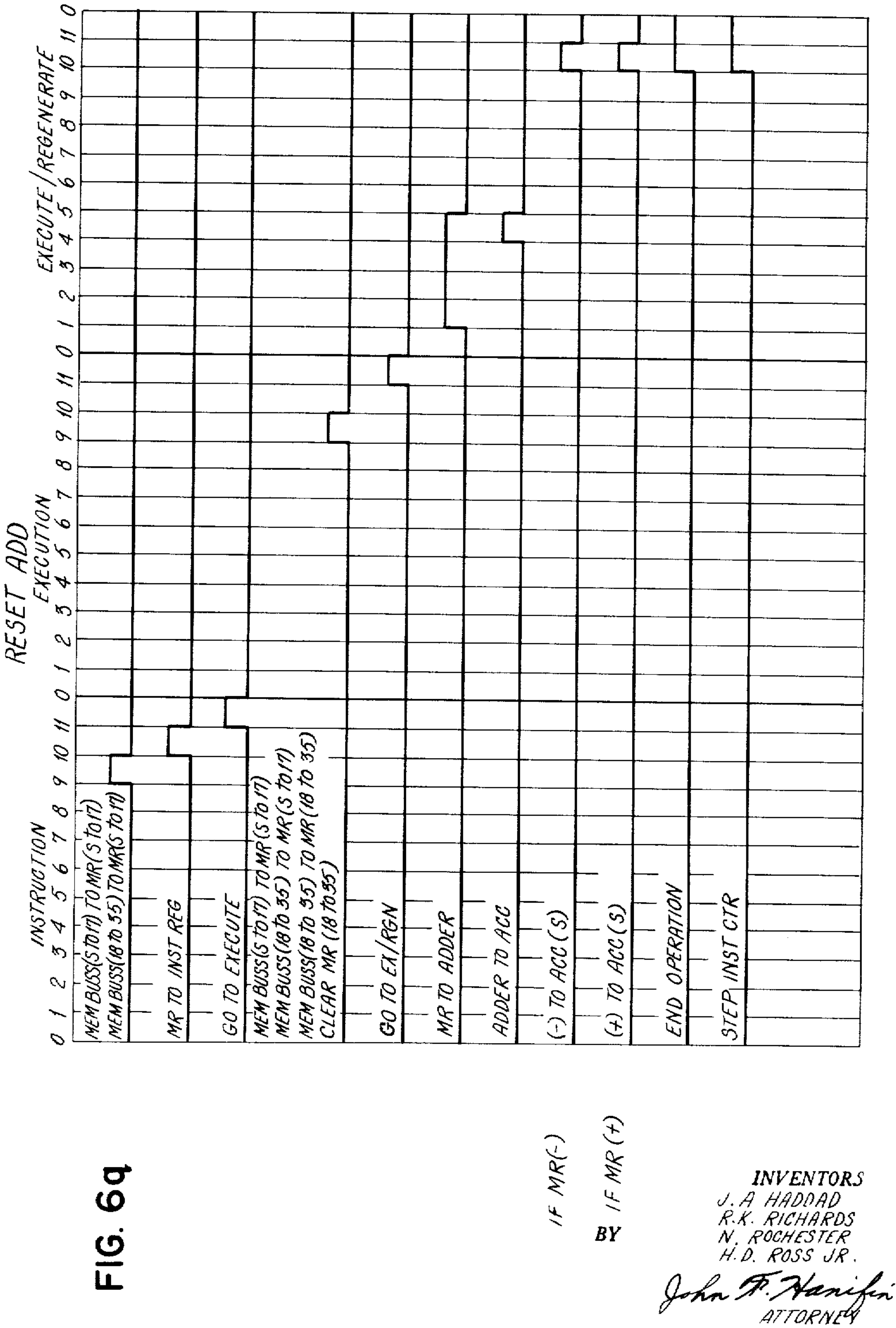

Fig. 6*q* comprises a Timing Diagram for a RESET ADD operation.

Figure 6R:
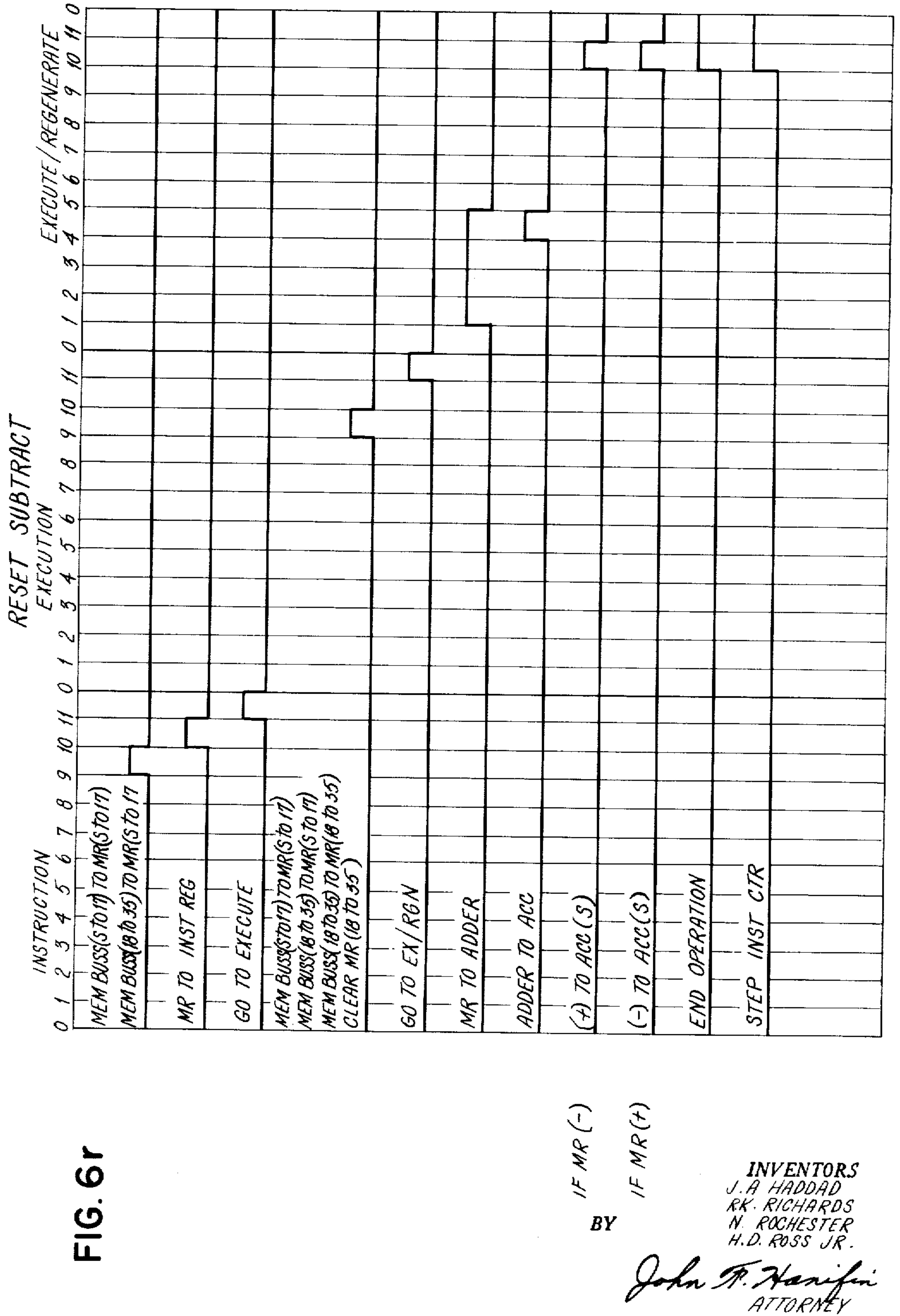

Fig. 6*r* comprises a Timing Diagram for a RESET SUBTRACT operation.

Figure 6S:
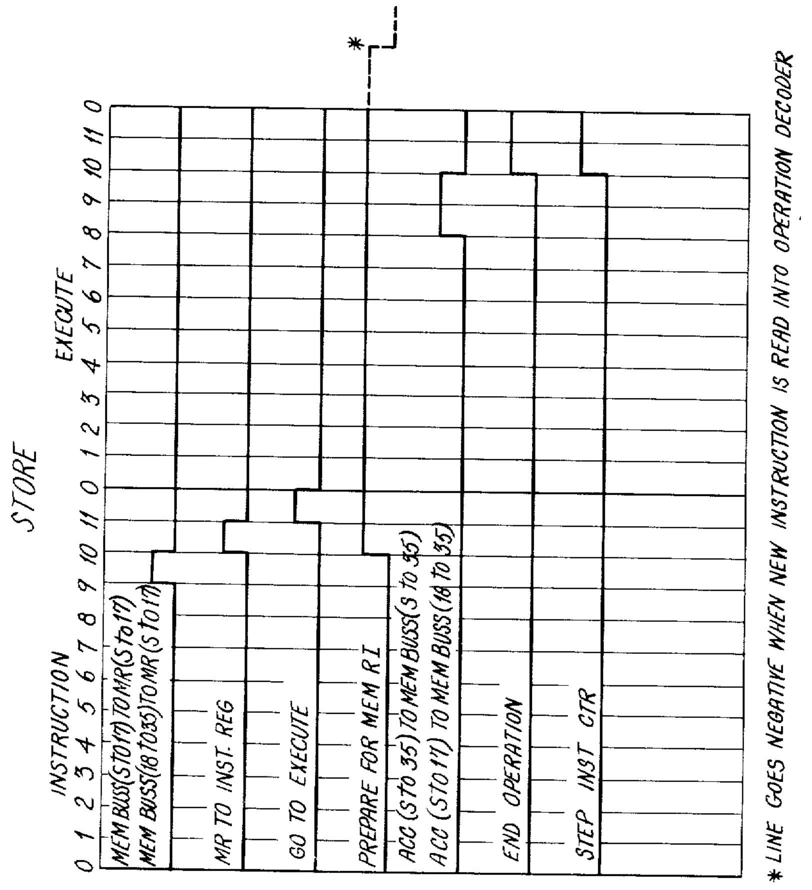

Fig. 6*s* comprises a Timing Diagram for a STORE operation.

Figure 6T:
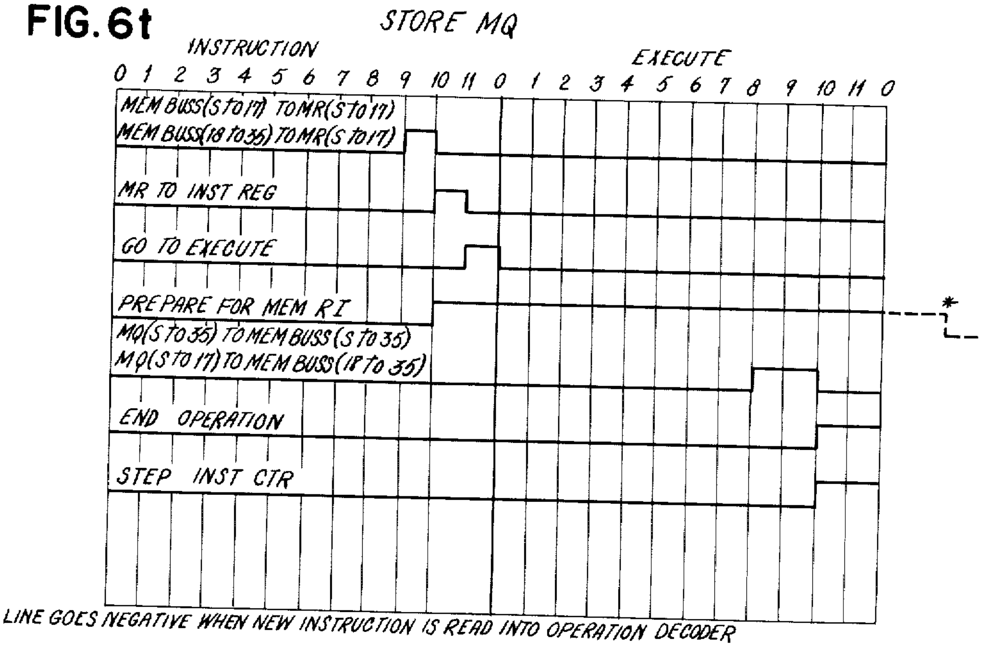

Fig. 6*t* comprises a Timing Diagram for a STORE MQ operation.

Figure 6U:
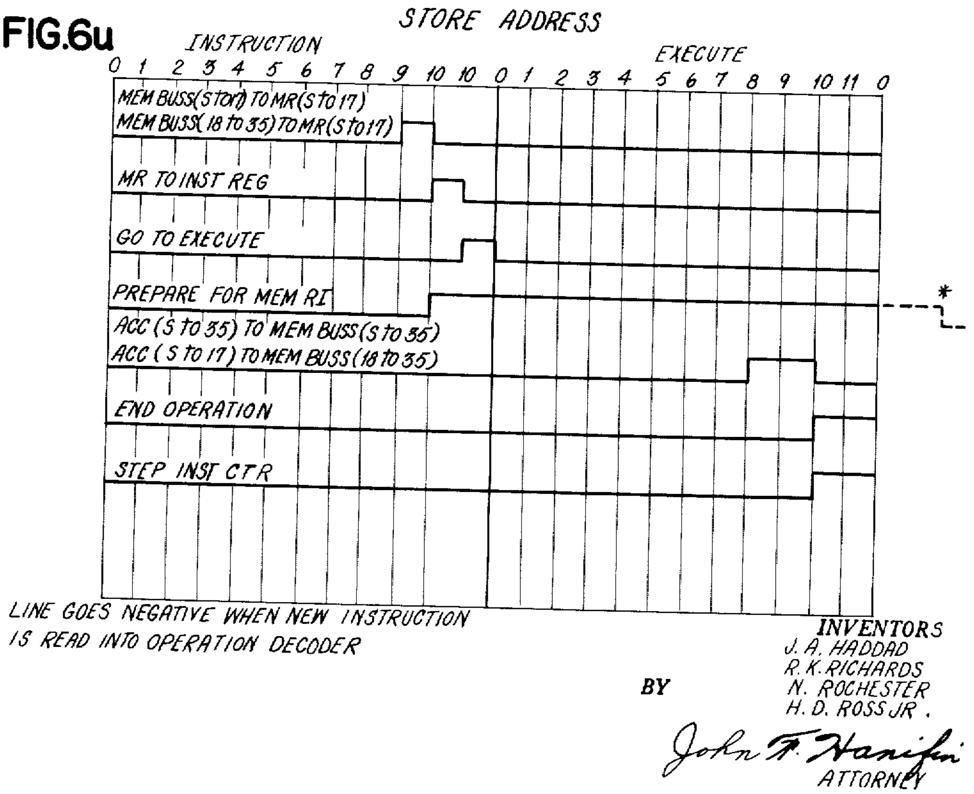

Fig. 6*u* comprises a Timing Diagram for a STORE ADDRESS operation.

Figure 6V:
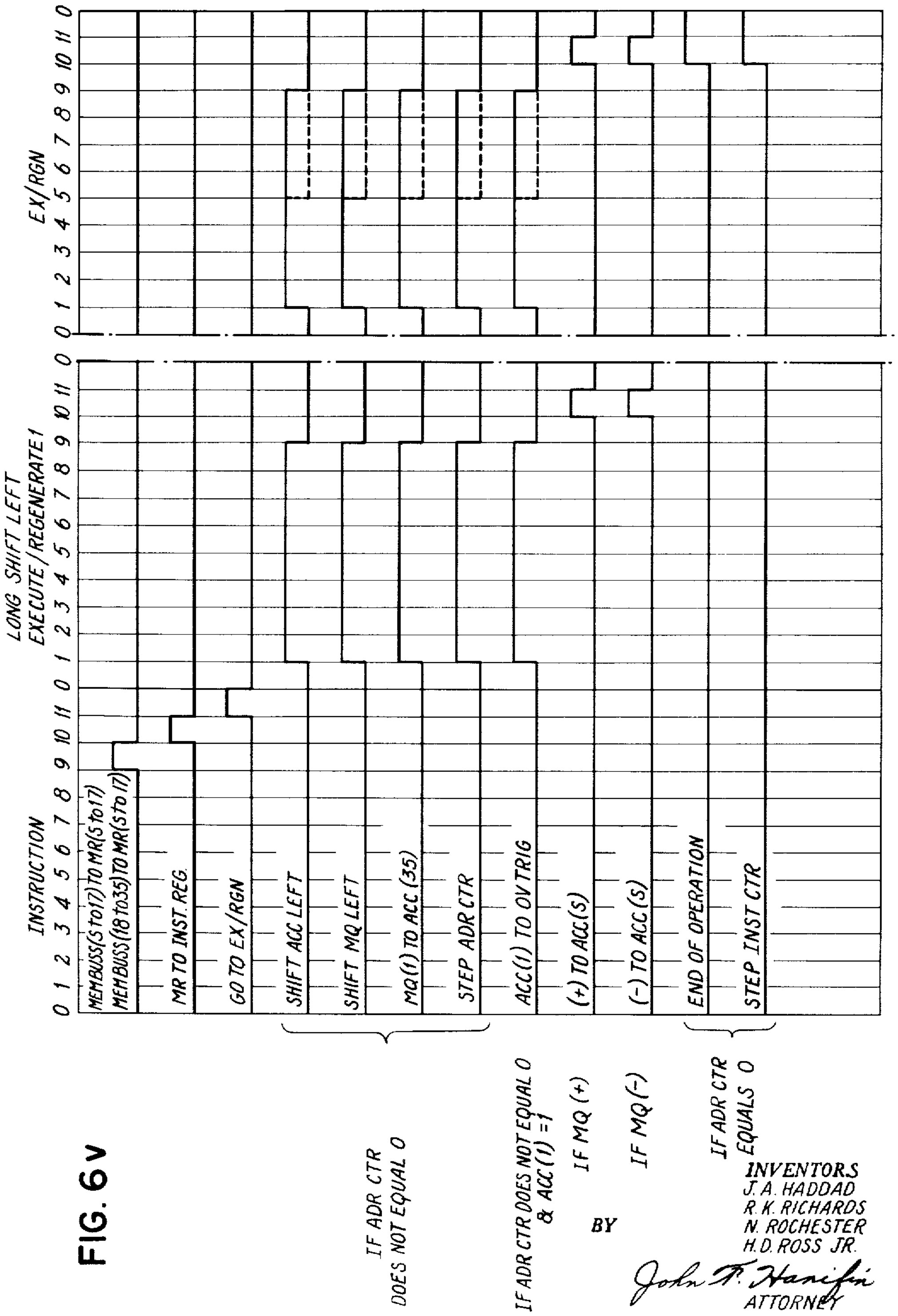

Fig. 6*v* comprises a Timing Diagram for LONG SHIFT LEFT operation.

Figure 6W:
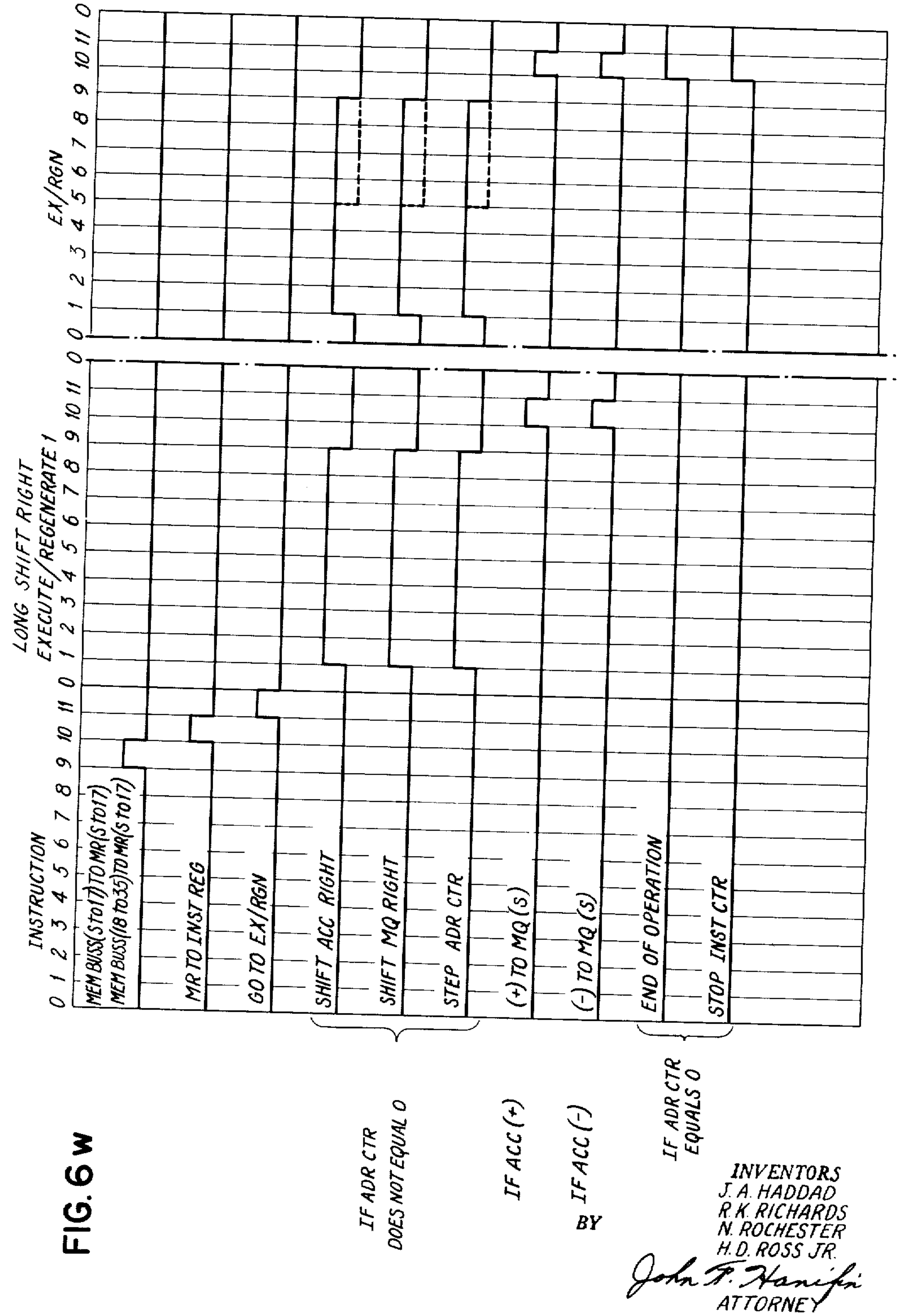

Fig. 6*w* comprises a Timing Diagram for a LONG SHIFT RIGHT operation.

Figure 6X:
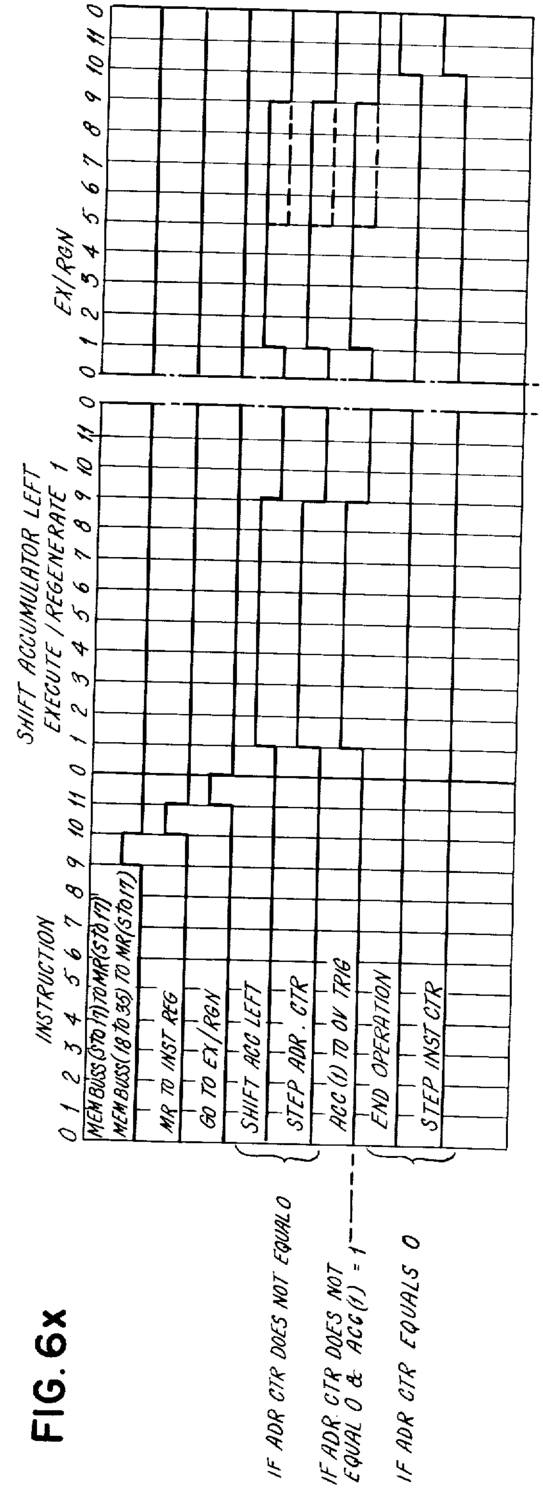

Fig. 6*x* comprises a Timing Diagram for a SHIFT ACCUMULATOR LEFT operation.

Figure 6Y:
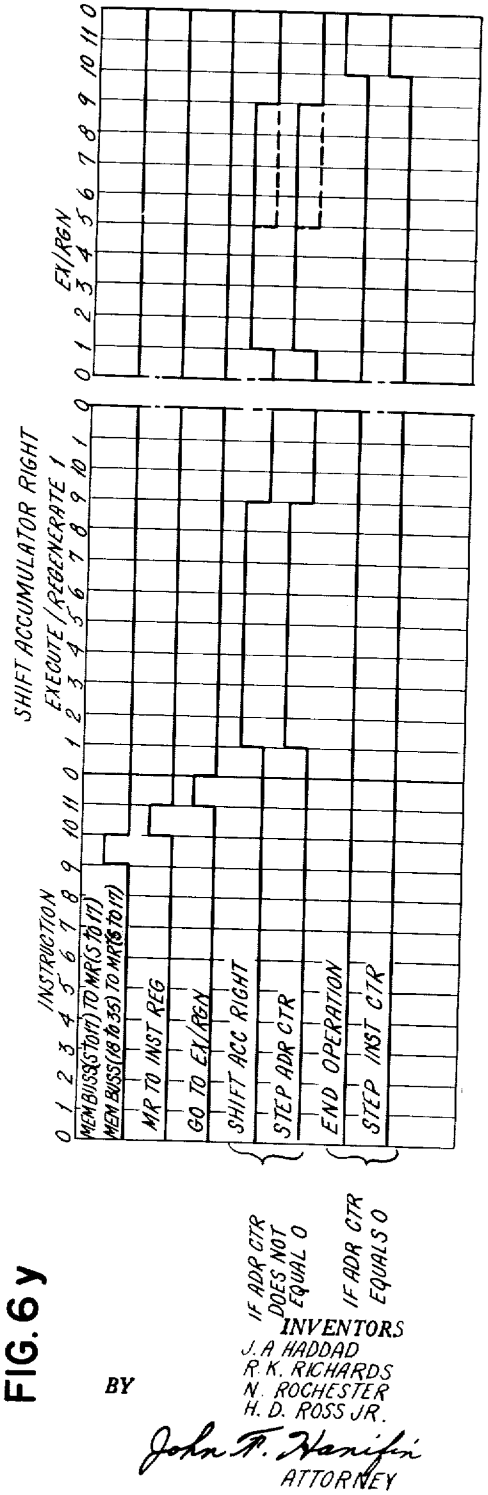

Fig. 6*y* comprises a Timing Diagram for a SHIFT ACCUMULATOR RIGHT operation.

Figure 6Z:
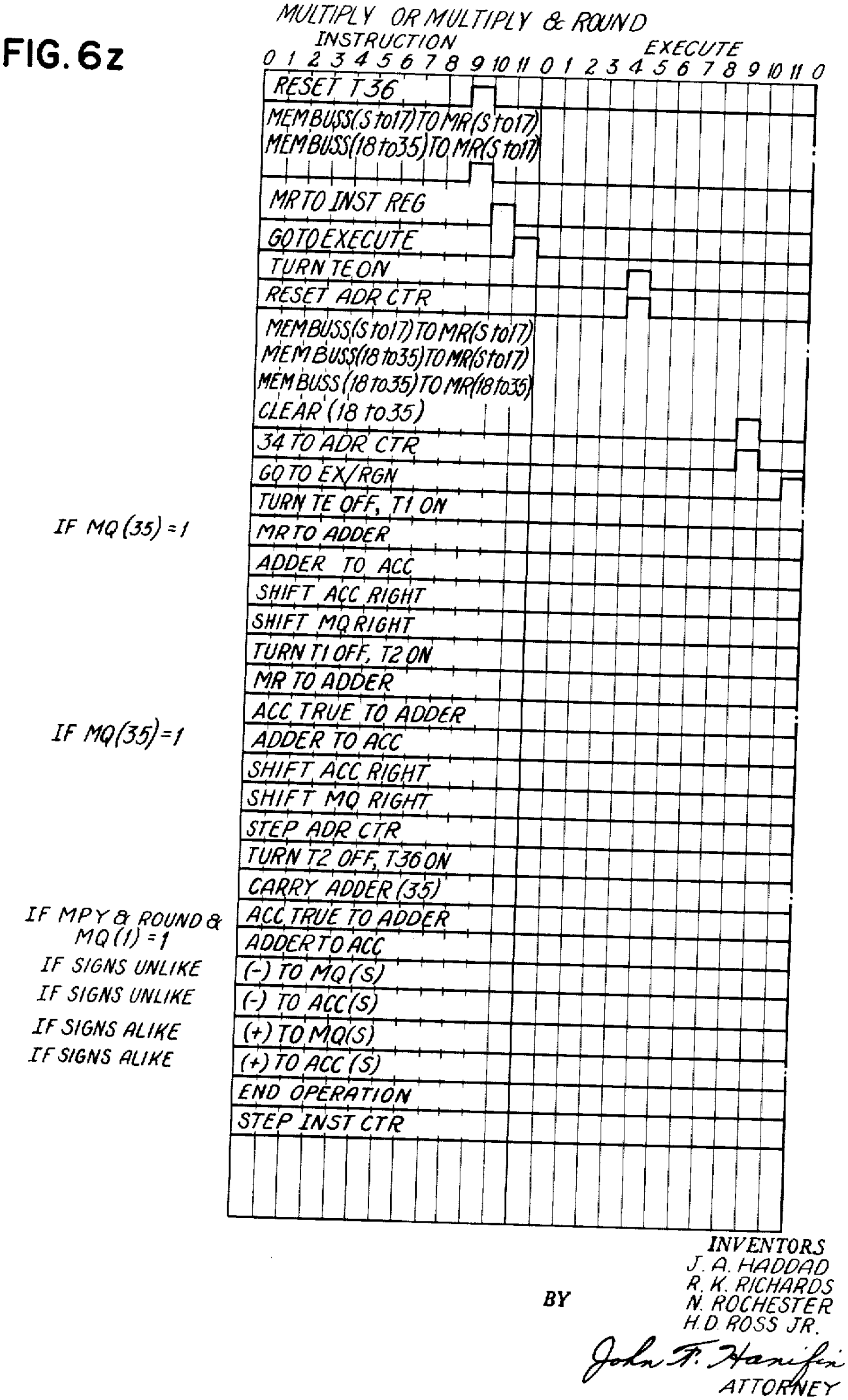
Figure 6A:
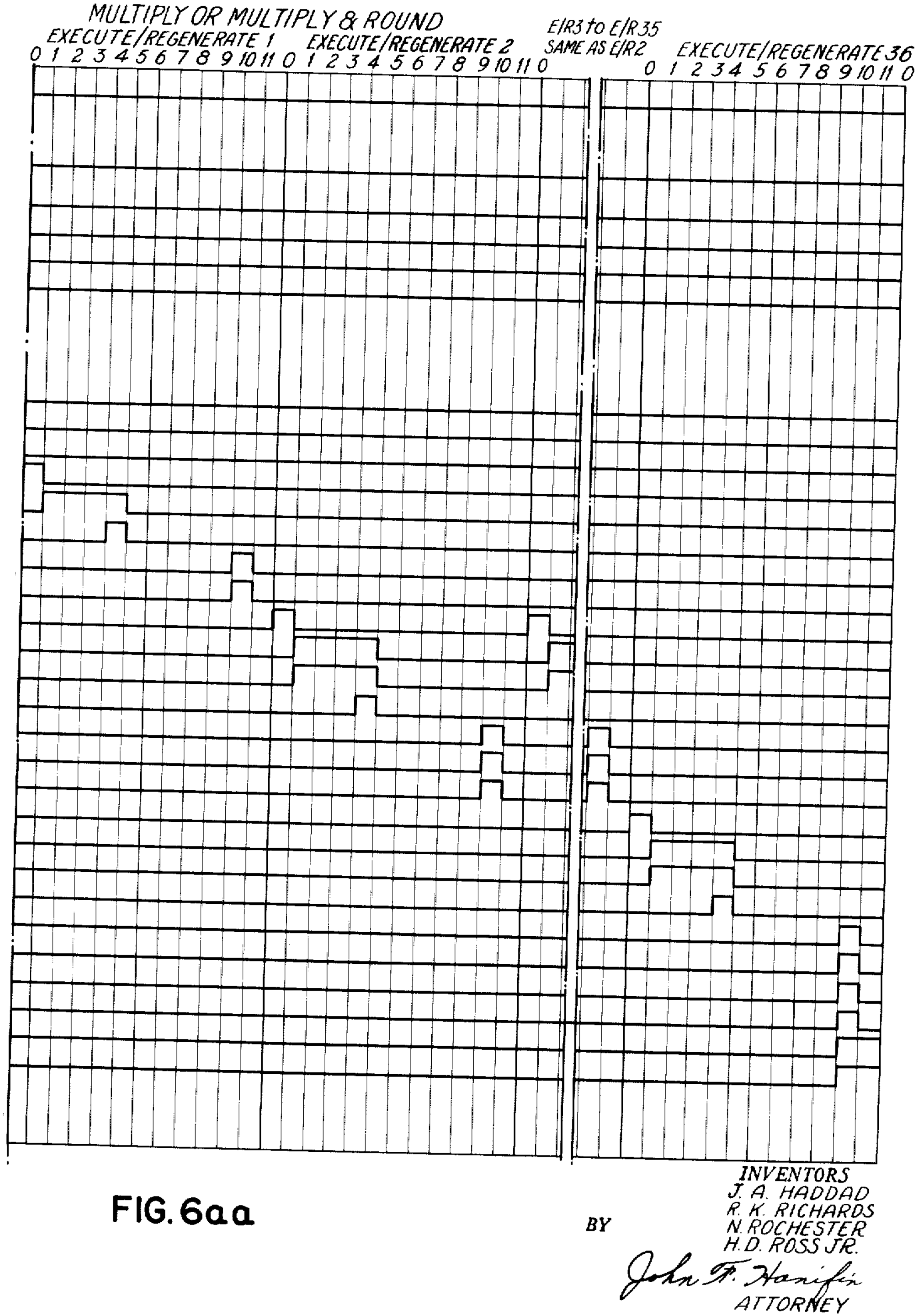
Figure 6A:
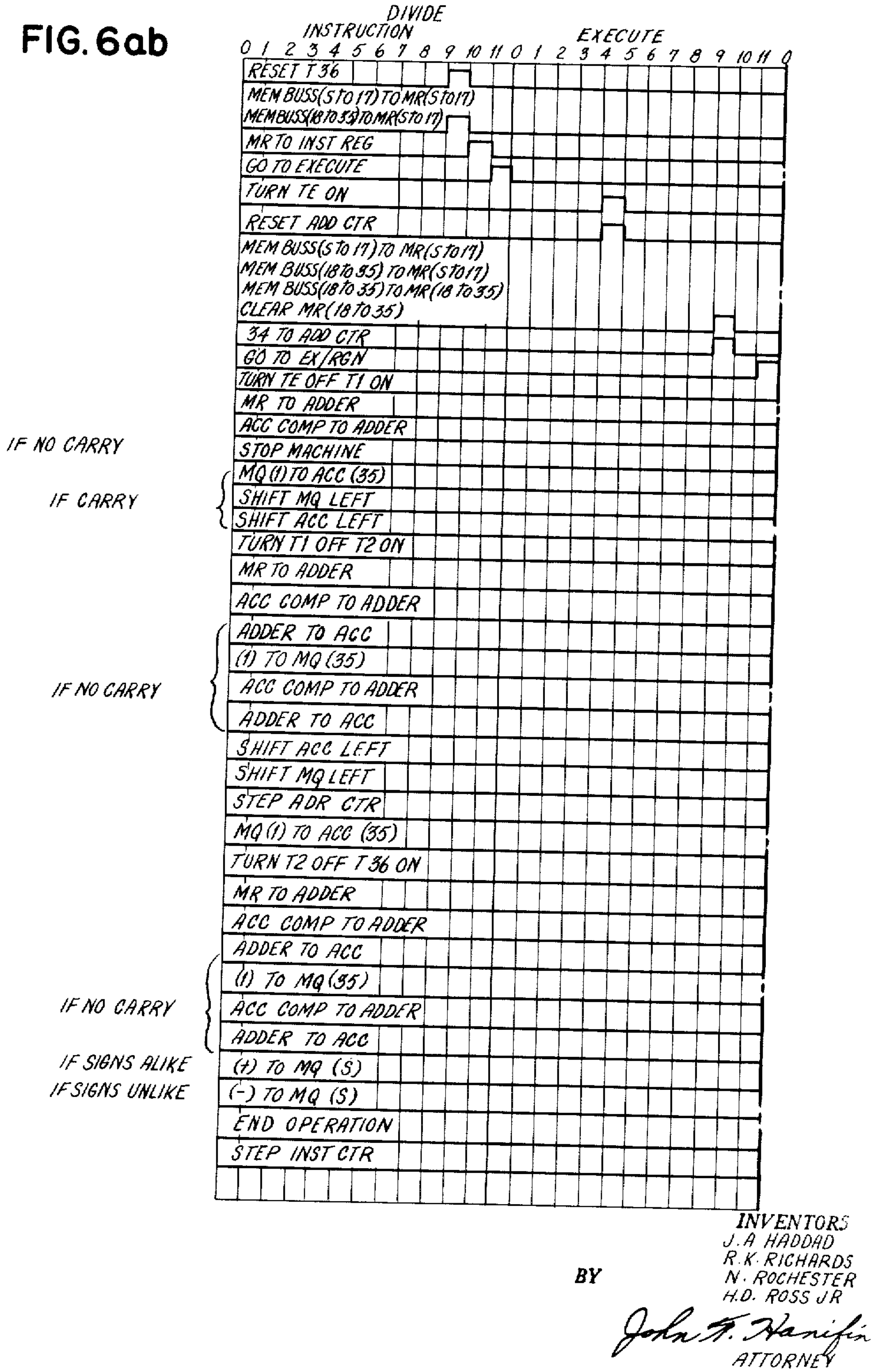
Figure 6A:
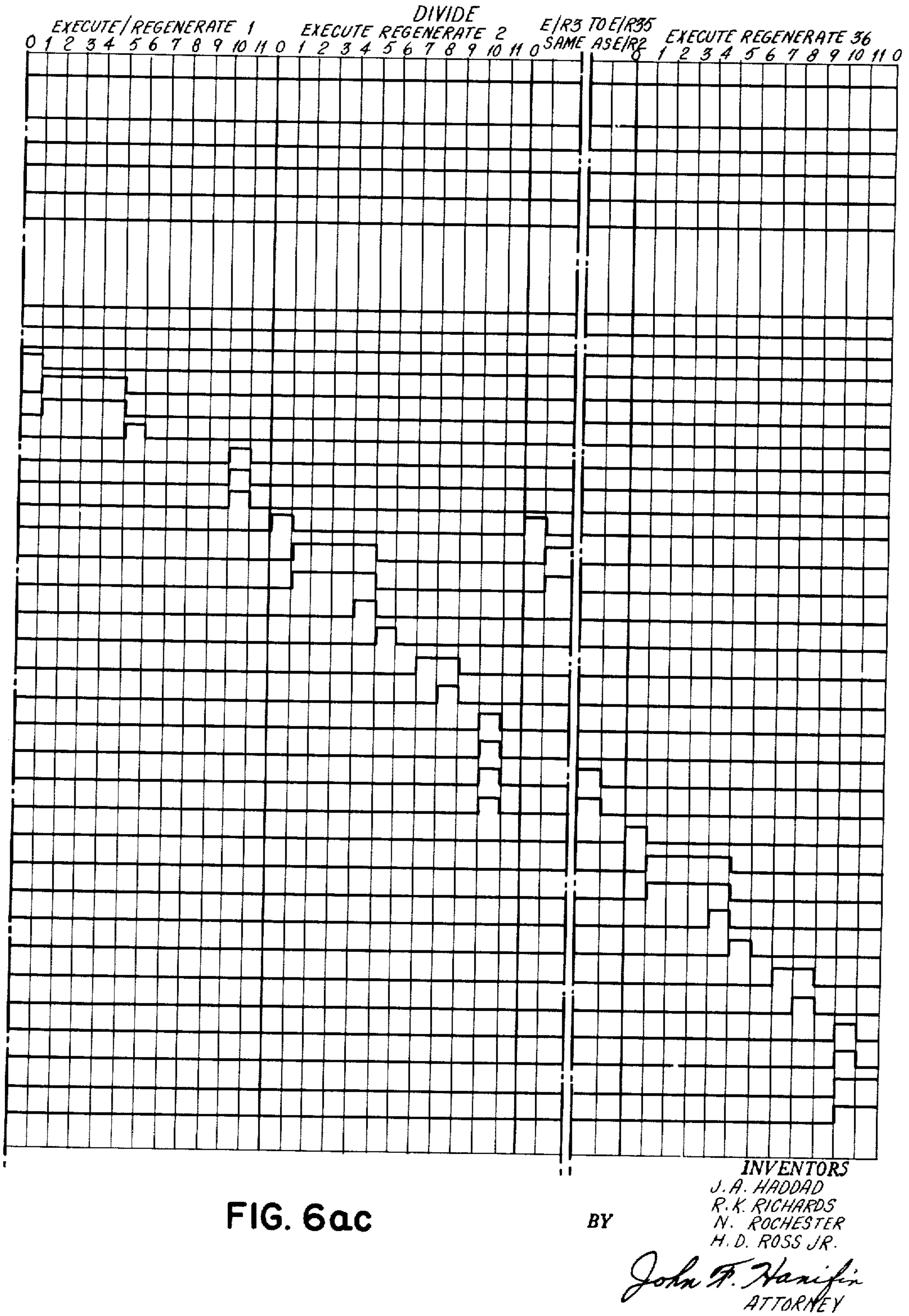
Figure 6A:
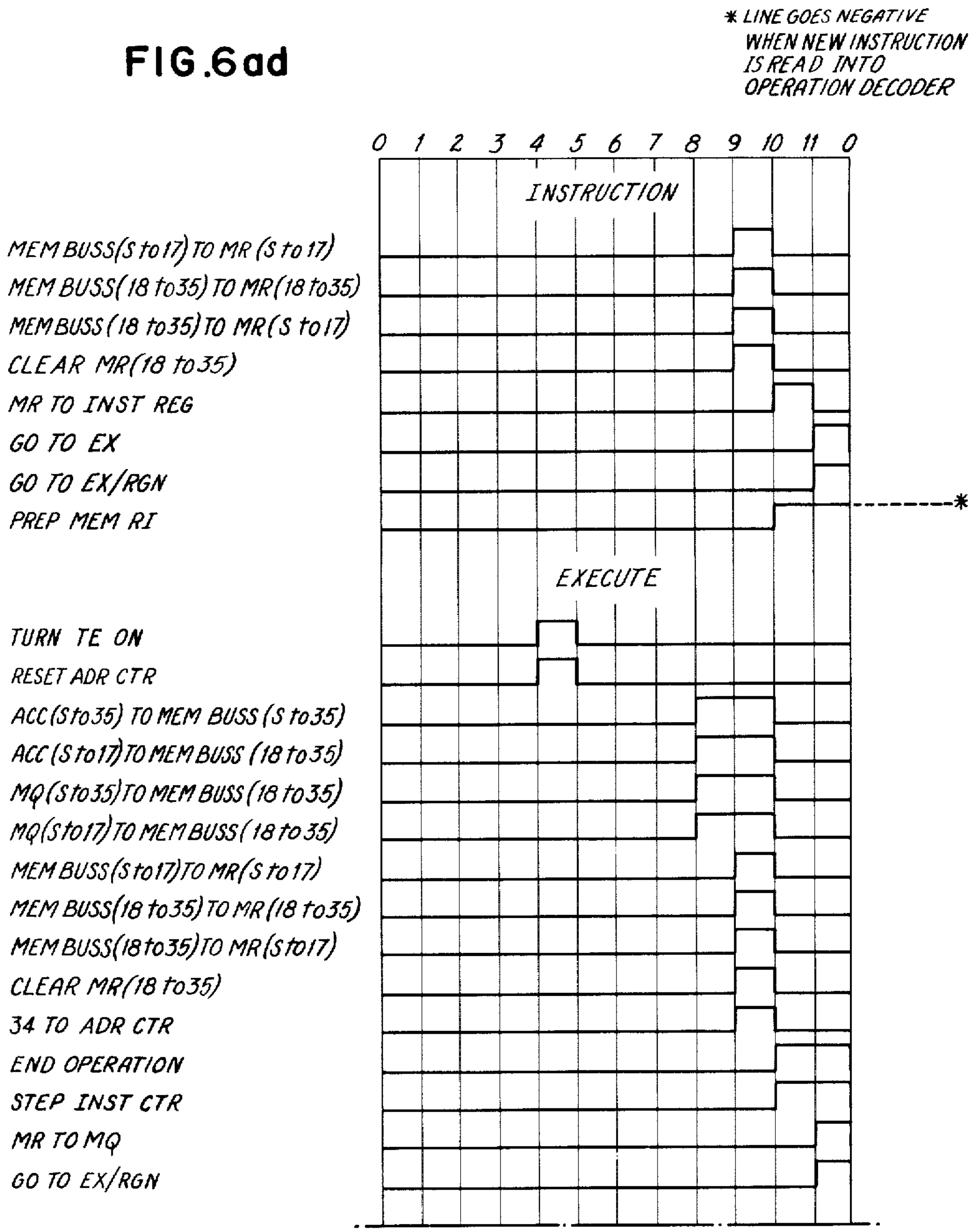
Figure 6A:
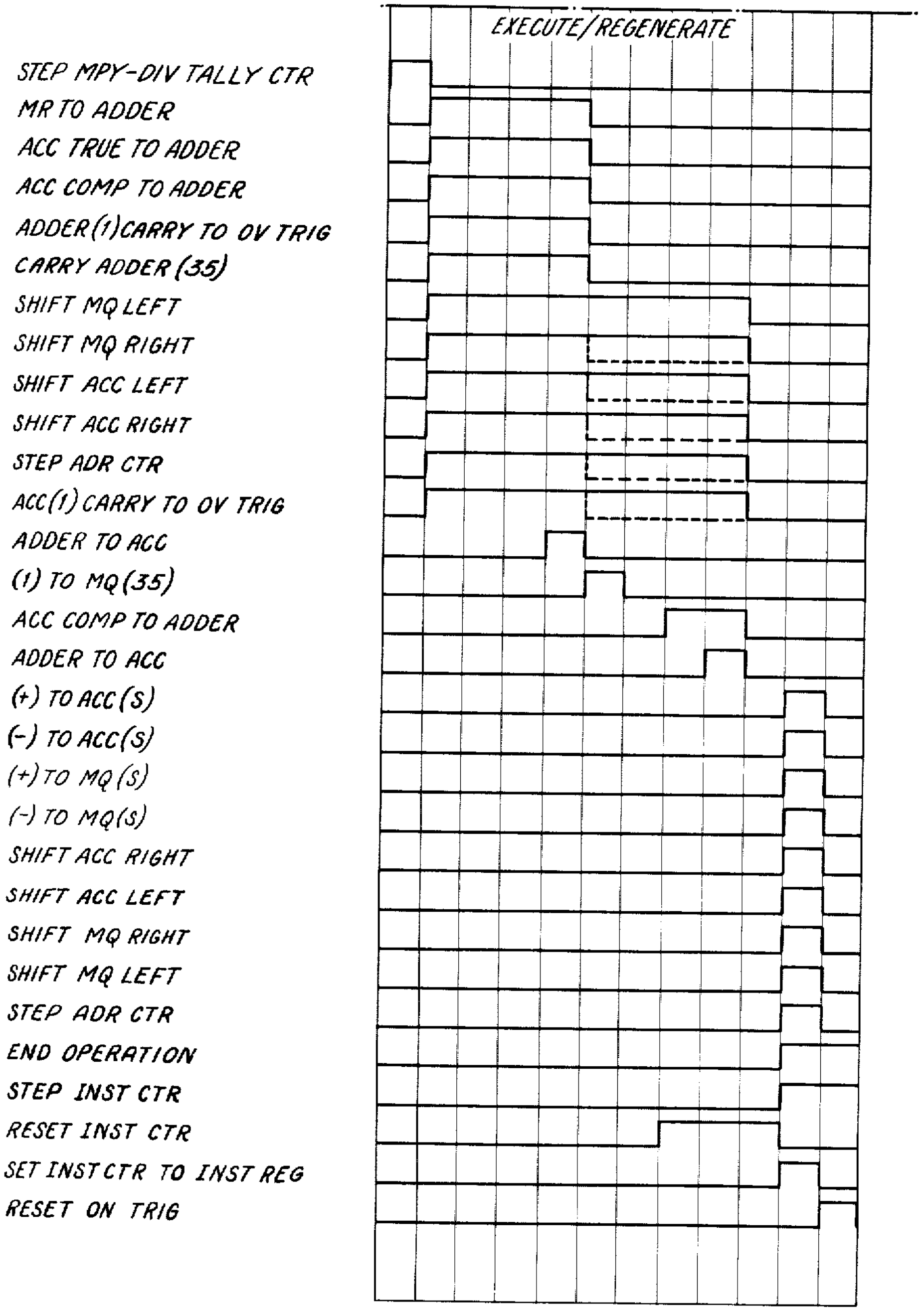

Figs. 6*z* and 6*aa*, taken together, with Fig. 6*aa* to the right of Fig. 6*z* comprises a Timing Diagram for MULTIPLY or a MULTIPLY AND ROUND operation.

Figs. 6*ab* and 6*ac*, taken together, with Fig. 6*ac* arranged to the right of Fig. 6*ab*, comprise a Timing Diagram for a DIVIDE operation.

Figs. 6*ad* and 6*ae*, taken together, with Fig. 6*ad* located above Fig. 6*ae*, comprise Timing Diagram showing all signals developed during various types of character cycles.

Figure 7A:
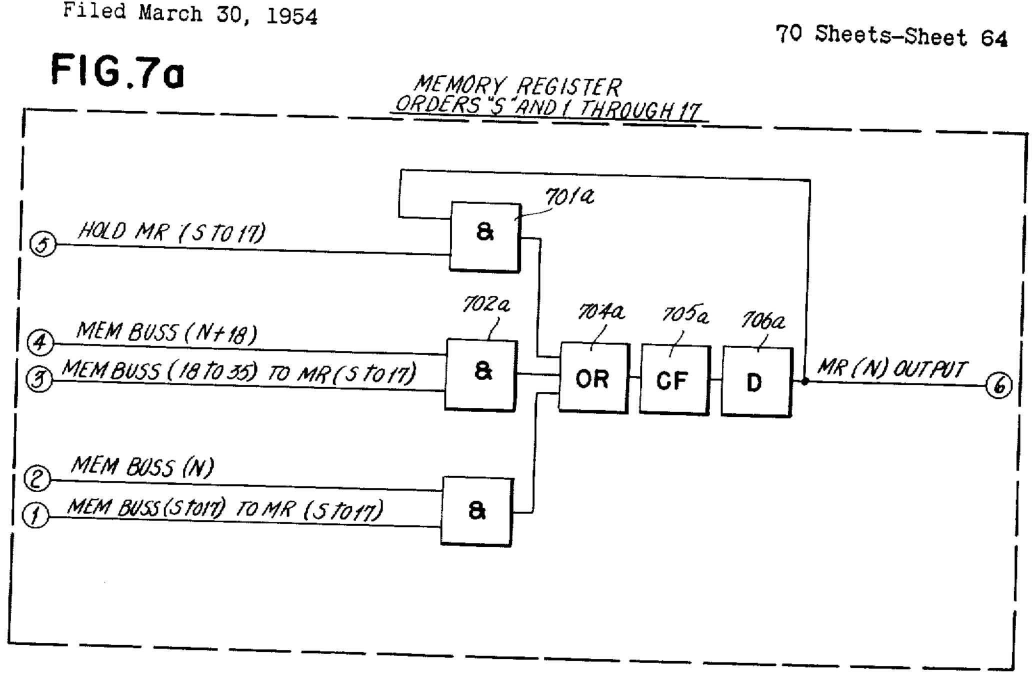

Fig. 7*a* is a block diagram of a Memory Register order, used in Memory Register orders S and 1 through 17.

Figure 7B:
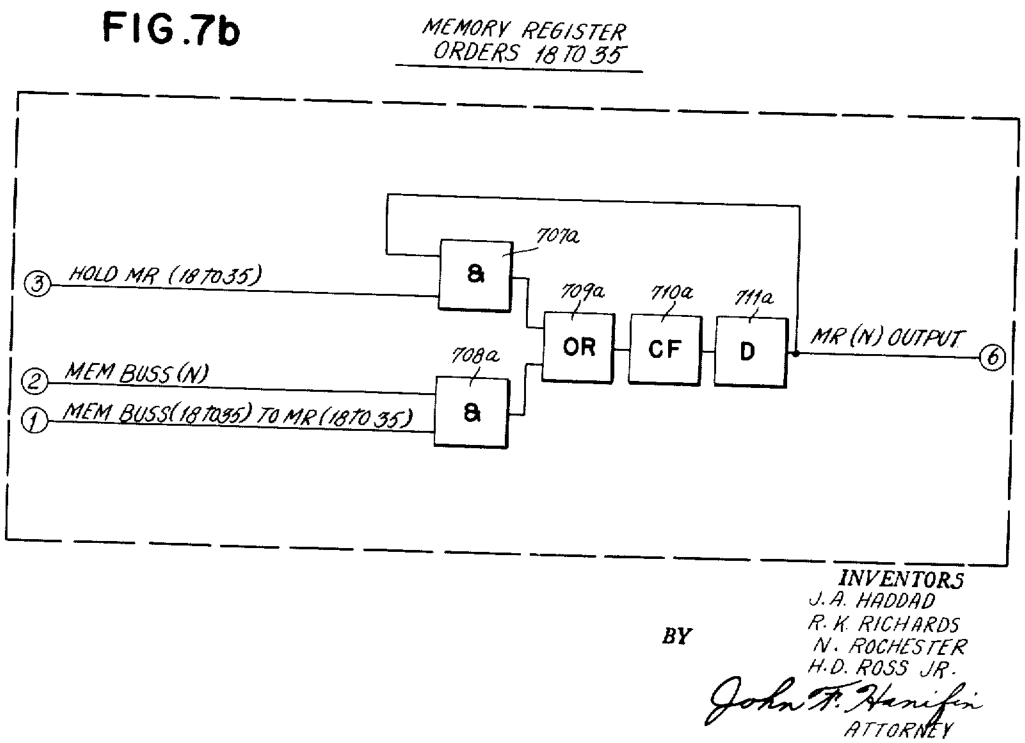

Fig 7*b* is a block diagram of a Memory Register order, representing circuits used in Memory Register orders 18 through 35.

Figure 7C:
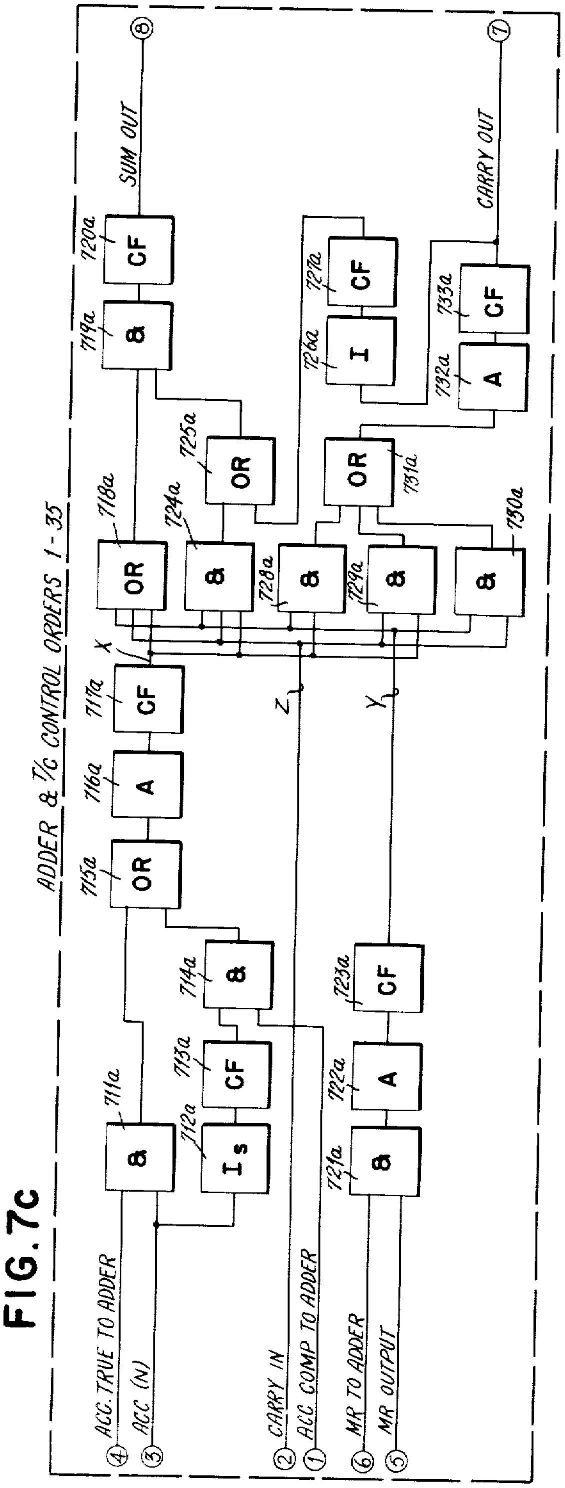

Fig. 7*c* comprises a full adder and true complement controls representative of the adder circuitry for Adders orders 1 through 35.

Figure 7D:
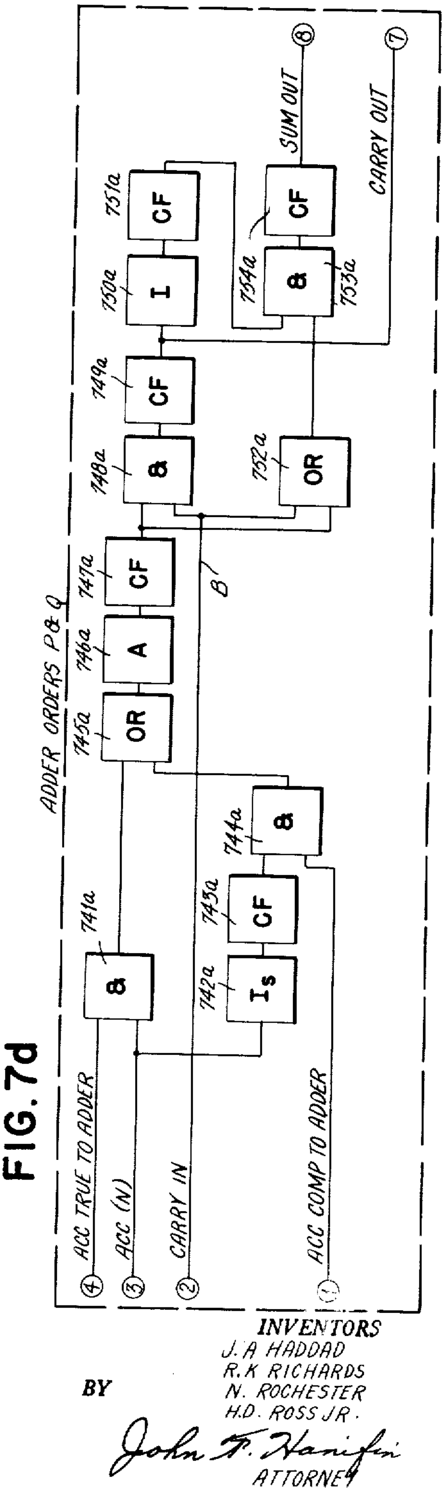

Fig. 7*d* comprises a block diagram of a half adder and true complement controls representative the Adder orders P and Q.

Figure 7E:
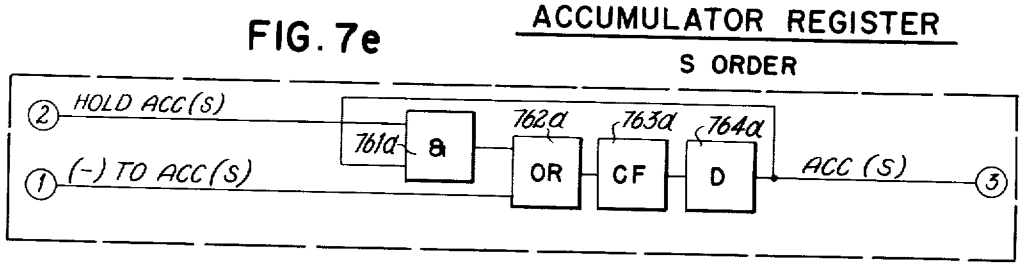

Fig. 7*e* comprises a block diagram of the Sign order of the Accumulator Register.

Figure 7F:
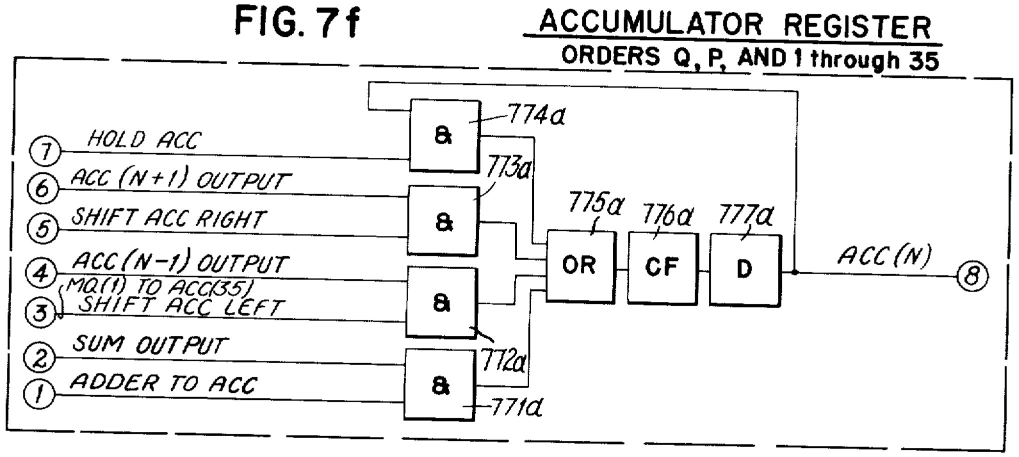

Fig. 7*f* comprises a block diagram of an Accumulator Register order, representative of orders Q, P and 1 through 35.

Figure 7G:
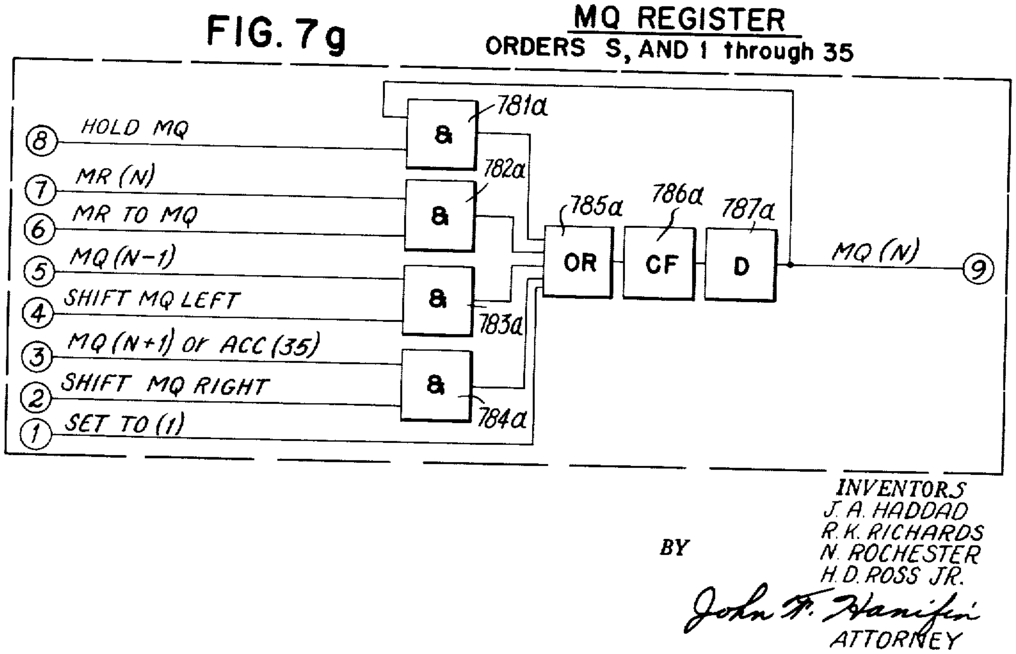

Fig. 7*g* comprises a block diagram of an MQ Register order, representative of orders S and 1 through 35.

Figure 7H:
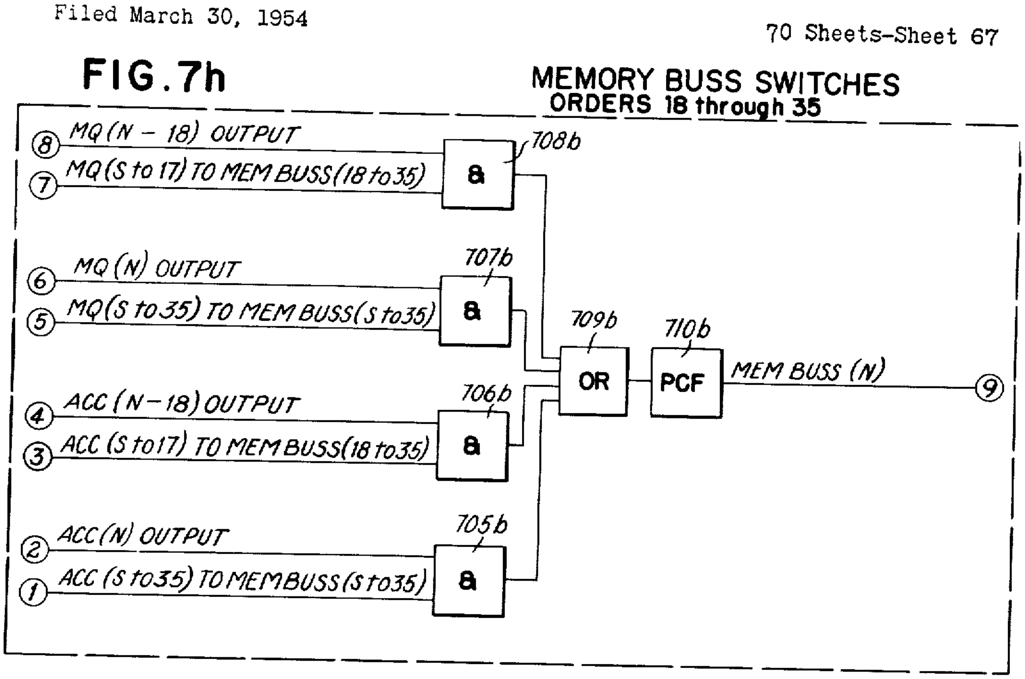

Fig. 7*h* comprises a block diagram of Memory Buss Switch circuits for Memory Buss orders 18 through 35.

Figure 7I:
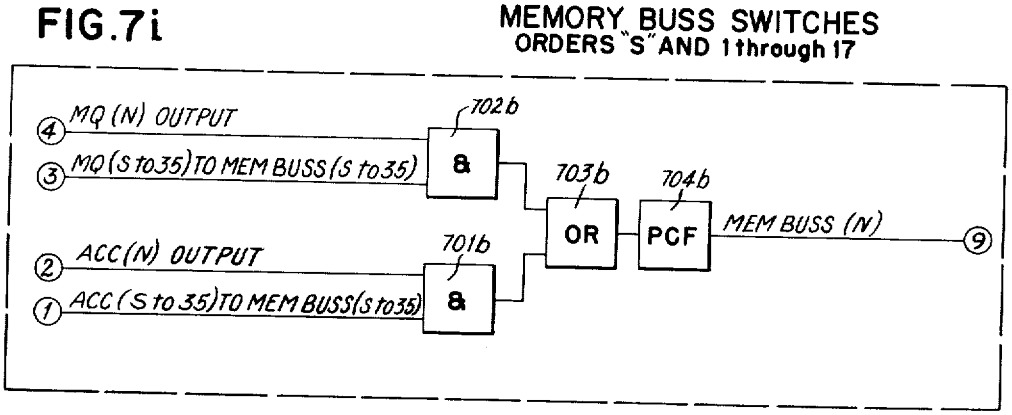

Fig. 7*i* comprises a block diagram of Memory Buss Switches, representative of orders S and 1 through 17.

Fig. 8*a* shows a sample MULTIPLY operation.

Fig. 8*b* shows a sample DIVIDE operation.

Figure 8C:
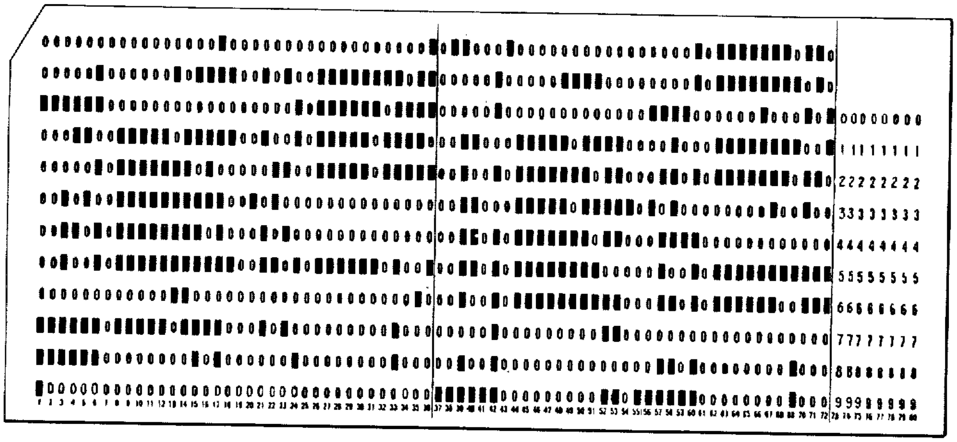
Figure 8D:
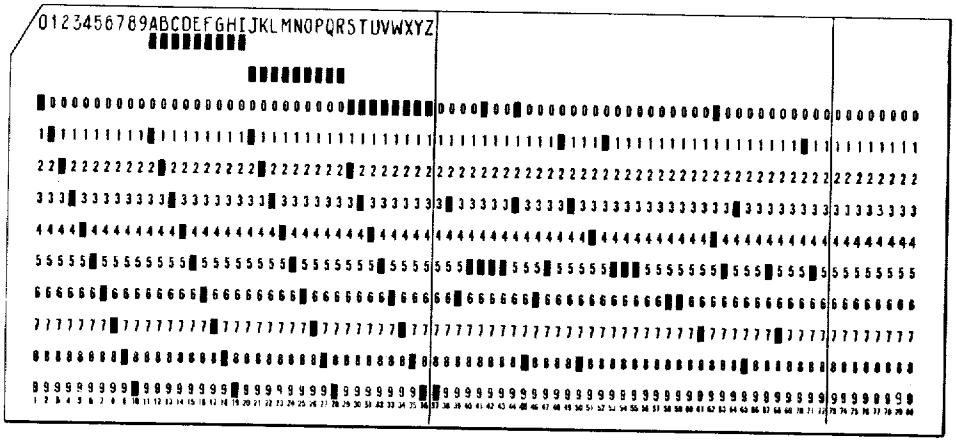

Figs. 8*c* and 8*d* show samples of punched cards, punched, respectively, in binary and decimal codes.

A BRIEF OUTLINE OF THE CALCULATOR

In the novel Calculator comprising this invention, words of 36 bits or half words of 18 bits are manifested or recorded in a pure binary system of notation. In such a binary notation, only two digit values exist, that is, 0 and 1, and these respective binary 0 or binary 1 digits are referred to as bits. The binary point corresponding to a decimal point in a decimal system may of course, occupy any position in the pure binary word. The digital position or orders of a binary number, reading from right to left, of the binary point, correspond in value $2^0$, $2^1$, $2^2$, $2^3$, $2^4$, $2^5$, etc. or decimal digits 1, 2, 4, 8, 16, 32 etc. respectively. The digital position or order for a binary number, reading from LEFT to right, of the binary point, correspond in value to $2^{-1}$, $2^{-2}$, $2^{-3}$, $2^{-4}$, $2^{-5}$, etc., or the decimal or fractional values ½, ¼, ⅛, 1/16, 1/32, 1/64, respectively. The novel Calculator of this invention normally performs operations, on full words, which as stated above consist of 36 bits comprising 35 bits (binary digits) and a sign bit. However, for economy of operation, any of the full words may be split into two half words, each half word as stated above, consisting of 18 bits, comprising 17 bits and a sign bit. A binary number of a full word of 36 bits has a precision equal to that of about a 10 decimal digit number, and the half word corresponds in precision to a number of about 5 decimal digits. As described below, the calculator operates according to a stored program, this program comprising instructions each of which is a half word.

The position of the binary point is determined more or less by the programmer, and the arithmetic operations such as addition, subtraction, multiplication, division, and the like, must be performed according to definite rules. The programmer must keep track of the binary point position.

Figs. 1*a* through 1*g*, taken together, and arranged as shown in Fig. 1*h*, comprise an overall block diagram of an Electronic Data Processing Machine including the novel Calculator and showing, in general, the relationship of the various Units which make up this Machine. The Memory Unit as used in the machine and as illustrated by a labeled block, in Fig. 1*c*, comprises cathode ray tubes used as electrostatic data storage means which have a maximum capacity 2,048 full words of storage (36 bits per word). These 2,048 full words, are stored, on 36 sets, of cathode ray tubes and since any full word may be split into two half words, the total number of half words, which can be stored, is 4,096. The number of cathode ray tubes provided, is chosen at 36, since in the novel Calculator of this invention a full word is 36 bits, so that with 36 sets of cathode ray tubes, 36 bits may be read out of the Memory Unit simultaneously or 36 may be stored, in the Memory Unit, simultaneously, during one cycle of operation. This simultaneous operation is referred to as parallel operation. The Memory Unit, employed herein is shown, described and claimed in the copending application of Philip E. Fox et al., Serial No. 417,702, filed March 22, 1954, now Patent No. 2,950,465, issued August 23, 1960.

The timing of the Calculator is controlled by a Clock which comprises a twelve stage electronic trigger ring. The Clock develops 12 master timing pulses of one microsecond duration each, and a character cycle, of the Calculator, will be defined as one twelve microsecond period (one complete cycle of the Clock). The Clock is illustrated by the labeled block in Fig. 1*b*.

There are four general types of character cycles existing in the Machine operation. These four types of cycles are called Instruction, Execute, Execute/Regenerate, and Regenerate cycles, which are respectively abbreviated as I, E, E/R and R. The type of cycle at any certain time is controlled by a Cycle Timer, also illustrated by a labeled block in Fig. 1*b*.

As set forth in said above identified copending application of Fox et al., the electrostatic storage which comprises Memory for the Machine may be addressed, and the information, stored in Memory, at the respective addresses, may be read out to a Memory Register. All information leaving the Memory Units, enters this Memory Register which comprises 36 Delay Units, S, and 1 through 35, inclusive, each of the type as described below, along with associated switching circuits. The Memory Register designated hereinafter as MR, functions as a buffer storage between Memory and the Computer. The 36 Delay Units of this MR provide storage for 36 bits read from Memory and hold these bits until they are called for by the Calculator. Information is read, out of Memory into the MR, in parallel fashion, that is, 36 bits are read, simultaneously, for a full word, or 18 bits, simultaneously, for a half word. If 36 bits are read they are read into all 36 Delay Units of MR but if a half word is read, they are always read into the Delay Units S, and 1 through 17 of the MR. Information thus read into the MR may not only be transferred to the Calculator but also via a Register of the Calculator, described presently, to other Units of the Machine. The Adder (Fig. 1*d*) represented by labeled blocks, comprises 37 columnar orders, two, of which, are overflow columns P and Q. Each of the columnar orders 1 through 35 of the Adder consists of a group of circuits, as described in detail later, comprising three inputs, and two outputs.

The three inputs are (1) an output from a corresponding column of the MR; (2) an output from a corresponding column of an Accumulator Register described below; (3) a carry output from the Adder columnar order to the right.

The two outputs are: (1) the sum output; (2) a carry output. The sum output is fed to a corresponding column of the Accumulator Register, while the carry output goes, to the Adder column, to the left. In conjunction with, means for controlling the flow of information, the Adder circuitry performs the functions of addition, subtraction, multiplication and division, all as described presently, multiplication and division consisting of a series of additions or subtractions and shifts, so that multiplication and division are also performed, in part, by the Adder circuitry. The Adder is not a register, per se, and therefore does not perform any function of storage, but merely operates, on the information as it is passed therethrough.

The Accumulator Register is used for storing the output of the Adder, and the combination, of the Adder and the Accumulator Register, may be regarded as an Accumulator. The Accumulator Register stores the results, of the operation performed, by the Adder. It consist of 38 columns, 2 of which, namely, Q and P, are for the purpose of overflow, and the other 36 comprising the 35 binary bits, of a full word, and the sign. Each of the columns of the Accumulator Register consists of a Delay Unit, similar to that used in the MR and the contents of the Accumulator Register may be shifted, either to the left or the right. The contents of the Accumulator Register, excluding the contents, of the overflow columns, may be stored, in Memory, by a STORE Instruction, which is given with a Memory address. In this STORE operation, the number is stored, in Memory, and the same number is left unaltered in the Accumulator Register.

The Multiplier Quotient Register, hereinafter referred to, as the MQ has two major functions. One, as its name implies, it holds the Multiplier, for multiplication operations and the Quotient, in division operations. The MQ comprises 36 columns, one, of which, stores a manifestation of the sign of the number stored in the MQ, the remaining 35 columns storing manifestations of the multidigit number itself. Each column contains a Delay Unit, of the type used in the MR, along with suitable switching circuits. Words may be read, from Memory, via the MR into the MQ register by means of a LOAD MQ Instruction, which includes a Memory address, and the contents of the MQ may be read out, and via Memory Buss Switches, be stored in Memory, by means of a STORE MQ Instruction which includes a Memory address. These Memory Bus Switches are illustrated in Fig. 1*e*, and are effective, as described below, to switch the holding of the Accumulator Register to the Memory Busses, for either full or half words, during a STORE Instruction, or to shift the contents of the MQ, either full or half words, to the Memory Busses, during a STORE MQ Instruction.

The Instruction Register (Fig. 1*f*) which may receive information from the MR, serves as a storage Register for an Instruction (a half word) read, from Memory, during an Instruction cycle. The Instruction Register stores the coded binary bit representation, of a particular Instruction, until this Instruction is completely executed, and it is then reset, during the early part of the next Instruction cycle, before a new Instruction, is read, into it, from Memory. Thus, the Instruction Register holds the complete Instruction and the Operation part, of this Instruction is availble to an Operation Decoder (Fig. 1*f*) until the particular operation is complete, while the Address portion of the Instruction, is available to a Deflection Register (Fig. 1*e*) as described below. This Deflection Register comprises a plurality of electronic triggers, each, respectively storing a binary bit representation, of the sign bit, and also of bits 6 through 17, inclusive. An Address Counter portion, of the Instruction Register, is utilized during multiply and divide operations, for the purpose of counting the number of cycles that the Machine completes, during the respective such operations. The purpose of this counter is to insure that a proper number of character cycles occurs, during each of these operations.

The Instruction Counter (Fig. 1*e*) is a 12 stage counter, each stage comprising an electronic trigger, the Counter output being fed to the Deflection Register during each Instruction cycle. The Instruction Counter receives a pulse at the end of each Operation so that on the next Instruction cycle, a succeedingly numbered address in Memory, will be referred to. The Instruction Counter may under certain conditions, also be stepped to cause a skipping of Instructions.

The Regeneration Counter (Fig. 1*e*) comprises ten stages each including an electronic trigger, respectively storing binary bit representations of the bits 6 through 15, inclusive. The Regeneration Counter output, is fed to the Deflection Register during Execute/Regenerate and during Regenerate cycles and is stepped, one count, for each such cycle so that succeeding numbered addresses, in Memory, are addressed and Regenerated, during successive Execute/Regenerate and Regenerate cycles.

Figure 1G:
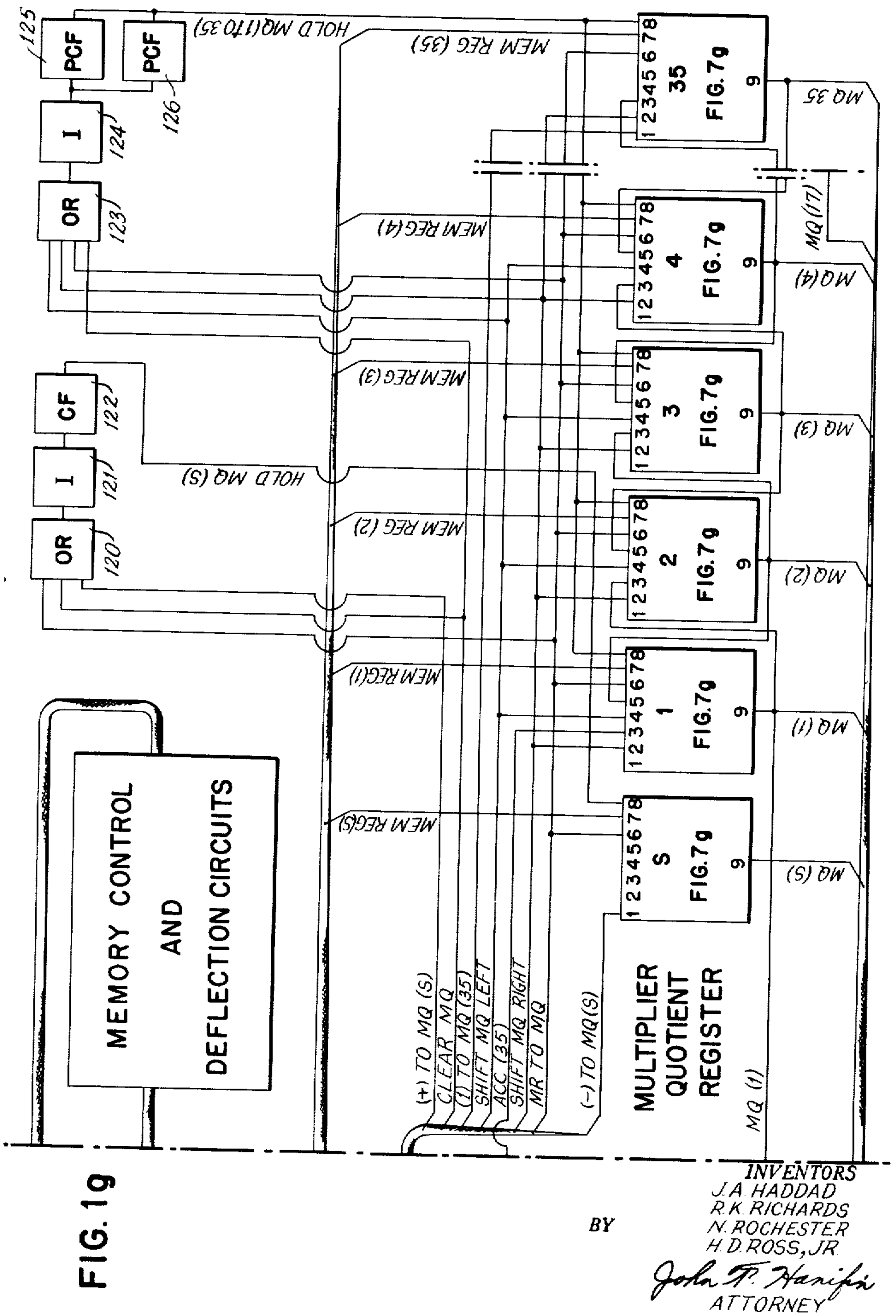

The Deflection Register has 12 orders, each comprising an electronic trigger, whose outputs feed to the Memory Deflection circuits and the Memory Control circuits. This Deflection Register therefore serves as a buffer between the Instruction Register, the Instruction Counter and the Regeneration Counter, on one hand and the Memory Deflection circuits and the Memory Control circuits, on the other hand. The Memory Deflection and Memory Control circuits, represented by the labeled block in Fig. 1*g*, are identical to those described in detail in said above identified Fox et al. application are effective to address and unblank the respective cathode ray tubes comprising Memory for both reading out of or writing in Memory.

The Operation Decoder decodes the manifestations of the "1" to "5" bit permutations which comprise the Operation part, of the Instruction to determine which one, of 32 possible Instructions, the machine will perform. The Operation Decoder comprises a diode matrix circuit which receives these permuted inputs and produces one output only, of any one of 32, thus signalling the particular kind of operation that is to be performed. The Operation Decoder, in accordance with which one of its 32 outputs is thus energized, conditions selectively, various control circuits, which in turn produce the respective type of operation called for.

The information stored in Memory, is categoried into two general classes, according to the purpose for which it is used. These are Instructions and numerical information which is to be processed in accordance with the particular Instruction. The Calculator is made to distinguish between Instructions and numerical information by the selected type of cycle, causing Reading from memory. Information Read-out of Memory, during an Instruction cycle is channeled to the Instruction Register where the stored manifestations of the bits Read-Out comprise a representation of the Instruction. Information Read-out during an Execute cycle, is handled as numeric data. Numeric data is available, either in half words of 18 bits or in full words of 36 bits, but Instructions are always half words. The Gate Generator, illustrated in Fig. 1*b*, controls the basic timing of the Machine and provides signals which are used in the respective operations, as described later. The Address, Sign, and Address Counter Mixer circuits illustrated by a labeled block in Fig. 1*b* combine the outputs from the Sign bits, of the MR, the Accumulator Register, and the MQ, to provide signals indicating that the Signs, are alike or unlike, and also passes signals, from the Instruction Register indicating when the Address Counter reaches a desired count during a multiply or a divide operation and whether a full, an even half or an odd half word is addressed. Outputs from these circuits feed to the Execution Timer and to the Mixing circuits.

A "carry" trigger is utilized to supply an indication that an end carry has occurred from the "Q" position of the Adder during certain operations. An Overflow trigger is utilized to supply an indication that a carry has occurred from the Adder "1" position to the overflow position "P" during certain operations or that a binary 1 has been shifted left from the Accumulator Register 1 position to the Accumulator Register "P" position during other operations.

The Multiply Divide Tally Counter represented by a labeled block in Fig. 1*b* controls the type of cycle, that occurs, during multiply and divide operations, as described below. The Execution Timers via the Mixing circuits, control the data processing throughout the Machine. The particular Execution Timer controlling during a particular type of operation is that Execution Timer related to the particular operation, for example, during an ADD operation, the ADD Execution Timer takes control.

INSTRUCTION REPERTOIRE OF THE MACHINE

In order to obtain a solution for a given problem, a Program is provided comprising a sequence of Instructions, and the respective Operations, carried out under control of these Instructions, in the sequence in which they appear or determined by intermediate results produce the desired solution of the problem. Both the Program and the numeric data for the problem are stored in the machine, the programmer, designing the program so that the steps are carried out in the proper manner.

Before proceeding to the description of the Machine construction and operation a brief discussion of the Instruction Repertoire of the Machine will greatly aid in comprehending fully, the description which later follows. As stated above, each Instruction is stored in a coded permutation of binary 1 and binary 0 representations, each Instruction including 5 such bits to represent, by their permutations of binary 1 and binary 0 bit conditions each of 32 operations, which are recognized respectively by the Operation Decoder whose outputs, respectively control circuits to carry out the particular Instruction so de-coded.

One such Instruction whose 5 coded binary 1 and binary 0 bit values are 00000, comprises STOP and TRANSFER. This Instruction controls circuits which STOP the Calculator as soon as this Instruction is read from Memory. When the Calculator, is again started up, by the operator, the execution of this STOP and TRANSFER Instruction is completed and the Program transfers, so that the next Instruction is taken from the Memory Address, specified by the Address part, of the STOP Instruction. The Program of Instructions will then continue sequentially, from this last Address.

The Instruction TRANSFER whose binary 1, binary 0 code representation is 00001 causes the NEXT Instruction to be taken from that Memory Address, specified by the Address part, of this TRANSFER Instruction. The Program of Instructions, then continues, Address number by Address Number sequentially, from this last Address.

The Instruction, TRANSFER ON AND RESET OVERFLOW abbreviated TR OV whose code representation 00010, will, if the Overflow Indicator is ON, as the result of a previous operation, cause the Program to TRANSFER THE Instruction, at the Memory Address, specified by the Address part, of the TR OV Instruction. The Overflow Indicator is reset, upon the completion of this Instruction. If the Overflow Indicator is OFF, and this TR OV Instruction occurs, the transfer is NOT executed.

The Instruction TRANSFER ON PLUS abbreviated TR+ whose code representation is 00011, will if the Sign of the word in the Accumulator Register, is positive, cause the Program to transfer to the Instruction at THE Memory Address specified by the Address part, of the TR+ Instruction. If the Sign of the word in the Accumulator Register, is negative, the transfer is not executed. It is to be particularly noted, that a positive zero value stored in the Accumulator Register is treated as a positive word, while a negative zero value stored therein, is regarded as a negative word.

The Instruction TRANSFER ON ZERO, abbreviated TR ZERO, whose code representation is 00100 will, if the value of the number stored in the Accumulator Register, is zero, cause the Program to transfer to THE Instruction, at the Memory Address, specified by the Address part, of the TR ZERO Instruction. If the value of number stored in the Accumulator Register is not zero, the last transfer is not executed.

In order to clarify the description, certain of the following Instructions will be described by means of numerical examples. In these examples, the binary point will be arbitrarily considered as occurring in a position between the P and the "1" orders, of the Adder and of the Accumulator Register. In other words, bits 1 through 35, are to the right of the binary point, while bits P and Q, are to the left of the binary point. In most of the numeric illustrations, only 3 or 6 bits, that is binary digits, are illustrated, merely to limit the number of bits to be considered, the modus operandi remaining the same as it would be for a full word of 36 bits or a half word of 18 bits.

The Instruction ADD whose code representation is 01001 causes the number, in the Memory Address, specified by the Address part, of the ADD Instruction to be added, to the number stored in the Accumulator Register. The sum, appears in this Accumulator Register, as will be seen from the description below, while the word, at the specified Memory Address, remains unchanged. The number Read from Memory at the Address specified may be either a full or a half word and, if a half word is specified, it is added, in alignment with the contents of the left half of the Accumulator Register (bit positions 1 through 17) but the sum, which appears in the Accumulator Register is of course the sum of the full Accumulator contents plus the half word value. If this addition produces carries, to the left of the binary point, which, as stated above, lies to the left, of the "1" position, the overflow portion of the sum, appears in the two positions P and Q, to the left of the binary point and the Overflow Indicator, is turned ON.

If an ADD operation results in a zero, value in the Accumulator Register, the Sign of this zero, is the same Sign that was stored in Accumulator Register, prior to initiation of the ADD operation. Thus a negative zero, will appear as the sum stored in the Accumulator Register, if a positive number, is added to a negative number, of equal magnitude, in the Accumulator Register. Various examples of this ADD Instruction are as follows:

| Number from Memory | Accumulator Register Before Operation | Accumulator Register After Operation |
|---|---|---|
| +.011 | +00.011 | +00.110 |
| +.011 | −00.011 | −00.000 |
| −.010 | −00.010 | −00.100 |
| −.010 | +00.010 | +00.000 |
| +.110 | −00.011 | +00.011 |
| −.000 | +00.000 | +00.000 |
| +.110 | +00.110 | [1] +01.100 |
| +.110 | +11.110 | [1] +00.100 |

[1] Overflow Indicator is turned ON if it is not already ON.

The Instruction RESET AND ADD, abbreviated R ADD, whose code representation is 01010 causes the contents of the Accumulator Register to be replaced by the word at the Memory Address indicated by the Address part, of this R ADD Instruction. If a half word is specified, it appears in the left half of the Accumulator Register, that is in bit positions 1 to 17, inclusive while the right half of the Accumulator Register is Reset to 0. The overflow positions, of the Accumulator Register, are always reset to 0, by this Instruction. Various examples of this Instruction are as follows:

| Number from Memory | Accumulator Register Before Operation | Accumulator Register After Operation |
|---|---|---|
| +.011 | anything | +00.011 |
| −.011 | anything | −00.011 |
| +.000 | anything | +00.000 |
| −.000 | anything | −00.000 |

The Instruction ADD ABSOLUTE VALUE, abbreviated ADD AB, whose code representation is 01011 causes the absolute value (value, neglecting Sign) of the number at the Memory Address specified by the Address part, of this Instruction, to be added to the number stored in the Accumulator Register. The sum, appears in the Accumulator Register, while the word at the Address specified, in Memory, remains unchanged. This Instruction, is the same as the ADD Instruction, except that the number, from Memory, is treated as positive, regardless of its actual Sign. Various examples of this Instruction are as follows:

| Number from Memory | Accumulator Register Before Operation | Accumulator Register After Operation |
|---|---|---|
| +.010 | +00.011 | +00.101 |
| −.010 | +00.011 | +00.101 |
| +.010 | −00.011 | −00.001 |
| −.110 | −00.110 | −00.000 |
| −.110 | +00.110 | [1] +01.100 |

[1] Overflow Indicator is turned ON if it is not already ON.

The Instruction SUBTRACT, abbreviated SUB whose code representation is 00101 is the same as the ADD Instruction, except that the Sign of the number, read from the designated Memory Address, is CHANGED, before this number is added, to the number in the Accumulator Register. In other words, the subtraction is performed algebraically, with the result being stored in the Accumulator Register and the number, in Memory, remaining unchanged. Various examples of this Instruction are as follows:

| Number from Memory | Accumulator Register Before Operation | Accumulator Register After Operation |
|---|---|---|
| +.011 | +00.011 | +00.000 |
| +.011 | −00.011 | −00.110 |
| −.010 | −00.010 | −00.000 |
| −.010 | +00.010 | +00.100 |
| +.110 | −00.011 | [1] −01.001 |
| −.000 | +00.000 | +00.000 |
| +.110 | +11.110 | +11.000 |

[1] Overflow Indicator is turned ON if it is not already ON.

The Instruction RESET AND SUBTRACT, abbreviated R SUB whose code representation is 00110 causes the number, at the specified Memory Address, to be placed, in the previously Reset Accumulator Register, except that the Sign of the number from Memory is changed. This Instruction is equivalent to Resetting the Accumulator Register and then performing the operation of subtract. Various examples of this are as follows:

| Number from Memory | Accumulator Register Before Operation | Accumulator Register After Operation |
|---|---|---|
| +.011 | anything | −00.011 |
| −.011 | anything | +00.011 |
| +.000 | anything | −00.000 |
| −.000 | anything | +00.000 |

The Instruction SUBTRACT ABSOLUTE VALUE, abbreviated SUB AV, whose code representation is 00111 causes an operation, similar to the ADD Instruction, except that the number, read from the specified Memory Address, is treated as negative regardless of its actual Sign. Various examples of this Instruction are as follows:

| Number from Memory | Accumulator Register Before Operation | Accumulator Register After Operation |
|---|---|---|
| +.010 | +00.011 | +00.001 |
| −.010 | +00.011 | +00.001 |
| +.010 | −00.011 | −00.101 |
| −.110 | −00.110 | [1] −01.100 |
| +.110 | +00.110 | +00.000 |

[1] Overflow Indicator is turned ON if it is not already ON.

The Instruction NO OPERATION, abbreviated NO OP causes nothing to happen. The result of this Instruction is to progress the Program to the next Instruction. The Address and the Sign of this Instruction, may have any values, being without significance since this Instruction causes nothing to happen. This Instruction, however, finds utility, where it is desired to, in effect, delete an Instruction from a Program. In such an event, the substitution by the Programmer of a NO OPERATION Instruction for some other Instruction, allows the machine, to proceed, without requiring the substitution of another Instruction, in place of the deleted Instruction.

The Instruction STORE whose code representation is 01100 causes the word, in the Accumulator Register to be stored, in Memory at the Address specified by the Address part, of the STORE Instruction. The contents of the Accumulator Register are not changed by this operation, but the word, which was originally stored at THE Address in Memory, is lost by this operation. The bits, in the overflow positions of the Accumulator Register that is bits P and Q, are not included, in the STORE operation. When a full word Address is specified, by the Address part, of the STORE Instruction, the Sign and the 35 bits, to the right, of the binary point, that is, bits 1 through 35 of the Accumulator Register are stored at the specified Address in Memory. When a half word Address is specified, by the Address part of the Instruction, the Sign, and bits 1 to 17, inclusive only, of the Accumulator Register, are stored in the half word Address specified in Memory.

The Instruction STORE ADDRESS abbreviated STORE A whose code representation is 01101 causes 12 bits at the extreme right of the half word, in the specified Memory Address, to be replaced, by the 12 bits of the "6" through "17" bits of the Accumulator Register of a right half word or the 12 bits of the "24" through "35" bits of a right half word.

The remaining 5 bits of the half word (representing the operational portion of the Instruction in this half word) stored in Memory at the specified Address and its Sign, are left unchanged. The contents of the Accumulator Register are not changed by this operation. It should be particularly noted that this Instruction is used, with half word Addresses, only.

An example of this Instruction STORE ADDRESS is as follows:

Accumulator Register +00.00 111 000 111 000 111 000 111 000 111 000 111

Selected Memory Address Before—.01 010 101 010 101 010

Selected Memory Address After—.01 010 000 111 000 111

(The underlined portion indicates those bit positions affected)

The Instruction STORE NUMBER FROM MQ, abbreviated STORE MQ whose code representation is 01110 causes the number in the MQ to be stored, at the Memory Address specified by the Address part of the Instruction. The contents of the MQ are not changed by this operation, but the number, which was originally stored, at the specified Memory Address, is lost. When a full word Address is specified in the STORE MQ instruction, the entire content of the MQ are stored at the Memory Address specified. When a half word Address is given, the left hand 18 bits (The Sign and bits 1 through 17) in the MQ are stored at the half word Memory Address.

The Instruction LOAD MQ Register, abbreviated LOAD MQ whose code representation is 01111 causes the number in the MQ to be replaced by the number from the Memory Address specified by the Address part, of the Instruction. This Instruction may be used with either full or half word Addresses. If a half word is specified, it is entered into the left half of the MQ (bit positions, S, and 1 through 17) and the right half of the MQ is reset to zero. Various examples of this Instruction are as follows:

| Word from Memory | MQ Register Before Operation | MQ Register After Operation |
|---|---|---|
| +.011 | anything | +.011 |
| −.011 | anything | −.011 |
| −.000 | anything | −.000 |

The Instruction MULTIPLY abbreviated MPY whose code representation is 10000 causes the Accumulator Register to be reset to 0 and the number, at the Memory Address specified by the Address part, of the MULTIPLY Instruction (the multiplicand) is multiplied by the number in the MQ (the multiplier). The more significant 35 bits, of the product, appear in the Accumulator Register, the less significant 35 bits appear in the MQ. The Signs, of both the Accumulator Register and of the MQ are set, to the Sign of the product, according to the algebraic Sign rules. When a negative number is multiplied by a positive number and either part, or the whole of the product, is zero, this zero is given a negative Sign.

The multiplicand from the specified Memory Address, may be either a full or a half word. If a half word is specified, the MULTIPLY Instruction operates, as though it were a full word, with 18 zeros on the right. The MQ is always treated as if it contained a full word, even though a half word has just been placed in it. Thus, if a half word has been put into the MQ and a MULTIPLY Instruction is given, with a half word Address, the product would have 34 significant bits and would appear in bit positions 1 through 34 inclusive, of the Accumulator Register. The remaining bit position 35, of the Accumulator Register and the entire MQ would then contain zeros. In the following examples, the Accumulator Register and the MQ are illustrated with maximum contents of five bit positions only to the right of the binary point, instead of the actual 35 positions. Full words, from Memory, are represented as 5 bits and a Sign, half words are represented as 2 bits and a Sign.

| Number from Memory | MQ Before MPY | Accumulator Register After MPY | MQ After MPY |
|---|---|---|---|
| −.11 | −.11 001 | +00.10 010 | +.11 000 |
| +.10 001 | −.11 001 | −00.01 101 | −.01 001 |
| −.11 100 | +.10 010 | −00.01 111 | −.11 000 |
| +.11 101 | +.10 010 | +00.10 000 | +.01 010 |
| −.11 | −.11 000 | +00.10 010 | +.00 000 |
| +.00 001 | −.00 110 | −00.00 000 | −.00 110 |
| −.00 000 | +.10 101 | −00.00 000 | −.00 000 |
| +.01 000 | +.10 000 | +00.00 100 | +.00 000 |

The Instruction ROUND whose code representation is 10011 carries out an operation which, if the most significant bit (in position 1) of the MQ contains a binary 1, the value of the number in the Accumulator Register is increased, by a value equal to $2^{-35}$.

When the Instruction given is a ROUND Instruction the number, in the Address portion, has no significance, thus any values may be used in that portion. Various examples of the ROUND Instructions are as follows; recalling that with the 5 bit capacity illustrated the 5th bit assumes the identity of the least significant bit which corresponds in operation to the 35th bit of the Accumulator Register.

| Accumulator Register Before Round | MQ Before Round | Accumulator Register after ROUND | MQ after ROUND |
|---|---|---|---|
| +00.01 100 | +.10 000 | +00.01 101 | +.10 000 |
| +00.01 100 | +.01 000 | +00.01 100 | +.01 000 |
| +00.11 111 | −.10 000 | [1] +01.00 000 | −.10 000 |
| −00.10 011 | +.10 000 | −00.10 100 | +.10 000 |

[1] Overflow Indicator goes ON if it is not already ON.

The Instruction MULTIPLY and ROUND abbreviated MPY R, whose code representation is 10001 carries out a regular multiply operation which is followed, by a round operation. Various examples of MULTIPLY AND ROUND operations are as follows:

| Number From Memory | MQ Before MPY R | Accumulator Register after MPY R | MQ after MPY R |
|---|---|---|---|
| −.11 | −.11 001 | +00.10 011 | +.11 000 |
| +.10 001 | −.11 001 | −00.01 101 | −.01 001 |
| −.11 100 | +.10 010 | −00.10 000 | −.11 000 |
| +.11 101 | +.10 010 | +00.10 000 | +.01 010 |

The Instruction DIVIDE, abbreviated DIV whose code representation is 10010 performs the basic operation of dividing a 70 bit dividend by a 35 bit divisor to produce a 35 bit quotient and a 35 bit remainder. Before the divide operation is performed, the more significant 35 bits of the divided are placed in the Accumulator Register and the less significant 35 bits of the dividend are placed in the MQ. Then, as the DIVIDE Instruction is given, its Address specifying the Memory Address of the division. Upon completion of the divide operation, the quotient, appears in the MQ and the remainder appears in the Accumulator Register as will be obvious from the detailed description of the divide operation given later. The sign of the dividend is stored, in the Sign position of the Accumulator Register. When the DIVIDE Instruction is given, the Sign of the MQ is ignored. The less significant 35 bits of the dividend which are stored in the MQ are considered as increasing the magnitude of the more significant half of the dividend (that is the 35 bits stored in the Accumulator Register). As a result of the divide operation, the Sign of the quotient stored in the MQ is that given by the algebraic Sign rule. The Sign, of the remainder, remains the same as that of the original dividend. The DIVIDE Instruction may be given, with either full or half word Addresses. Half word divisors are considered as if they were full words, with the 17 significant bits, in the positions, immediately to the right, of the binary point, and the remaining 18 bit positions (to the right) containing zeros. If the dividend is equal to or greater than the divisor, so that the absolute value of the quotient is 1 or greater (assuming we are working in fractional values) the CALCULATOR STOPS, as illustrated below. In the following examples of a divide operation, the Memory Address, the Accumulator Register, and the MQ, are illustrated as if they had a capacity of only 5 bits, to the right of the binary point, instead of the actual 35 bits.

| Number from Memory (divisor) | ACC. REG. Before DIV. (dividend) | MQ Before DIV. (dividend) | ACC. REG. after. DIV. (remainder) | MQ after DIV. (quotient) |
|---|---|---|---|---|
| −.10 110 | +00.01 101 | +.01 010 | +00.01 000 | −.10 011 |
| −.10 110 | +00.01 101 | −.01 010 | +00.01 000 | −.10 011 |
| −.01 100 | −00.00 110 | −.11 011 | −00.00 011 | +.10 010 |
| +.11 101 | +00.10 010 | −.00 100 | +00.00 000 | +.10 100 |
| +.11 100 | −00.00 000 | +.11 001 | −00.11 001 | −.00 000 |
| +.00 000 | +00.01 100 | +.00 000 | Calculator stops: DIV. CHECK | |
| +.01 000 | −00.01 010 | −.01 011 | Calculator stops: DIV. CHECK | |

The Instruction LONG SHIFT LEFT, abbreviated L LEFT whose code representation is 10100 causes the contents of the Accumulator Register and of the MQ to be shifted, to the left, by a number of spaces, specified by the Address part of the Instruction. The bits, which are shifted to the left, come from the MQ register and appear, at the right side of the Accumulator Register. When the L LEFT Instruction is given, the Sign of the Accumulator Register is changed, if necessary, to conform to the Sign of the MQ. The Sign of the MQ is not affected by this operation. The Overflow Indicator is turned ON, if any bits, are shifted to the left, that is any binary 1 bits, are shifted, to the left of the binary point in the Accumulator Register. The number of places shifted cannot exceed 255, but of course, this number, is almost without significance, since a shift of 70 will produce all zeros, in the Accumulator Register and in the MQ. The Sign of this Instruction, has no significance. The following examples of L LEFT assume that the Accumulator Register has a 9 bit capacity and the MQ a 7 bit capacity.

| Instruction [1] | Original Contents of— | | Final Contents of— | |
|---|---|---|---|---|
| | Accumulator Reg. | MQ | ACC. REG. | MQ. |
| L LEFT 0003 | +00.001011 | +.010010 | +01.011010 | [2] +.010000 |
| L LEFT 0003 | +00.001011 | −.010010 | −01.011010 | [2] −.010000 |
| L LEFT 0000 | +00.001011 | −.010010 | −00.001011 | −.010010 |
| L LEFT 0080 | −00.001011 | +.010010 | +00.000000 | [2] +.000000 |

[1] Address is given in the decimal equivalent of the binary number.
[2] Overflow Indicator is turned ON if it is not already ON.

The Instruction LONG SHIFT RIGHT abbreviated L RIGHT whose code representation is 10101 causes the contents of the Accumulator Register and the MQ to be shifted, to the right, by the number of places specified by the Address part of the Instruction. Bits which are shifted to the right, out of the Accumulator Register, are shifted, into the leftmost positions (exclusive of Sign) of the MQ. When a L RIGHT Instruction is given, the Sign of the MQ is changed, if necessary, to conform to the Sign of the Accumulator Register. The Sign of the Accumulator Register and the Overflow Indicator are not affected by this operation. Again the number of places which shift can take place, cannot exceed 255 and again, this is almost without significance if a shift of more than 70 places is required. The Sign of this Instruction has no significance. The following examples of the Instruction L RIGHT are given with an assumed capacity of 9 bits for the Accumulator Register and 7 bits for the MQ.

| Instruction [1] | Original Contents of— | | Final Contents of— | |
|---|---|---|---|---|
| | Acc. Reg. | MQ. | Acc. Reg. | MQ. |
| L RIGHT 0003 | +00.001011 | +.010010 | +00.000001 | +.011010 |
| L RIGHT 0003 | +00.001011 | −.010010 | +00.000001 | +.011010 |
| L RIGHT 0000 | +00.001011 | −.010010 | +00.001011 | +.010010 |
| L RIGHT 0001 | −11.001011 | +.010010 | −01.100101 | −.101001 |
| L RIGHT 0080 | −11.001011 | +.010010 | −00.000000 | −.000000 |

[1] Address given in the decimal equivalent of the binary number.

The instruction SHIFT ACCUMULATOR LEFT, abbreviated A LEFT whose code representative is 10110 causes the contents of the Accumulator Register to be shifted, to the left, by the number of places specified by the Address part, of the Instruction. The emptied places, to the right, in the Accumulator Register, are filled with zeros, and the Sign of the number, in the Accumulator Register is not changed. The last two bits shifted past the binary point, appear in the overflow positions of the Accumulator Register, and any bits shifted beyond these overflow positions are discarded. As the bits are shifted, past the binary point, they are sampled and if a binary 1 is so shifted, the Overflow Indicator is turned ON. This condition, may be detected, by a subsequent TRANSFER ON OVERFLOW Instruction. Again, the number of places called for by such a shift, cannot exceed 255. The Sign of this Instruction has no significance. The following examples of A LEFT Instructions assume that the Accumulator Register, has a capacity of 9 bits.

| Instruction [1] | ACC. REG. Before Operation | Acc. Reg. after operation | Overflow Indicator Before | Overflow Indicator After |
|---|---|---|---|---|
| A LEFT 0001 | −00.001011 | −00.010110 | OFF | OFF |
| A LEFT 0003 | +00.001011 | +01.011000 | OFF | ON |
| A LEFT 0003 | +00.001011 | +01.011000 | ON | ON |
| A LEFT 0001 | +00.001011 | +00.010110 | ON | ON |
| A LEFT 0006 | −00.001011 | −11.000000 | OFF | ON |
| A LEFT 0037 | +00.001011 | +00.000000 | OFF | ON |
| A LEFT 0000 | +00.001011 | +00.001011 | OFF | OFF |

[1] The address part, of the Instruction, is given, in the decimal equivalent of the binary number Addresses; all other columns contain binary numbers.

The Instruction SHIFT ACCUMULATOR RIGHT abbreviated A RIGHT whose code representation is 10111 causes the contents of the Accumulator Register to be shifted, to the right, by a number of places specified by the Address part, of the Instruction. The empty places, to the left, in the Accumulator Register, are filled with zeros, and the bits which are shifted, beyond position 35 of the Accumulator Register, are lost. The two overflow positions, to the left of the imaginary binary point, are included in this shift operation. The Sign of the Accumulator Register is not altered, nor is the Overflow Indicator affected by this operation. Again, the number of places which may be shifted, cannot exceed 255, and the Sign given with this Instruction, is of no significance. The following examples of a SHIFT Instructions assume that the Accumulator Register has a capacity of 9 bits (instead of the actual 38).

| Instruction [1] | Accumulator Register Before Operation | Accumulator Register after Operation |
|---|---|---|
| A RIGHT 0003 | +11.001011 | +00.011001 |
| A RIGHT 0003 | −00.001011 | −00.000001 |
| A RIGHT 0037 | +00.001011 | +00.000000 |
| A RIGHT 0037 | −00.001011 | −00.000000 |
| A RIGHT 0000 | +00.001011 | +00.001011 |

[1] The Address part, of the Instruction, is shown in the decimal equivalent of the binary number Address; all other numbers are in binary form.

Before proceeding to the description of the operation of the various units comprising the Machine, and in particular the CALCULATOR, the detailed circuit diagrams of various standard circuit components employed as logical AND circuits, logical OR circuits, or as triggers, inverters, cathode followers, Delay Units, etc., will be described in detail, with reference being made to their labeled block symbols. Thereafter, properly labeled block symbols, representative of these respective components, will be used in the various figures of the drawings, it being understood that the contents of the respective blocks comprise identical or similar detailed circuitry. It is deemed obvious that those skilled in the art can, as required by operation conditions make the necessary changes in the values of the condensers, resistors, inductances, tube types voltages etc., to provide the most efficient operation under the particular electrical conditions that are encountered. The values herein given are those which have been found most efficient in an actually constructed and operated Electronic Data Processing Machine, including the novel Calculator of instant application.

Before proceeding to the description of the Counters, Registers, Control and Mixing Circuits, a detailed description of several standard component circuits employed, such as logical "AND" circuits, logical "OR" circuits, triggers, inverters, cathode followers, and delay elements, etc. will be given. The properly labeled block symbol representative of these respective components, as they appears in the various figures of the drawings, will thus be understood to comprise identical or similar detailed circuitry, it being obvious to those skilled in the art that changes in the values of components and in the particular assemblages would be made to provide the most efficient operation under the electrical conditions that are encountered. The values given are exemplary only.

STANDARD COMPONENTS

Referring to Fig. 2*a*, there is illustrated the detailed wiring diagram of an inverter, as employed in the invention, and its corresponding block symbol I. Wherever this block symbol appears in the figures describe below, it represents the detailed circuitry of Fig. 2*a*.

A triode **201*a*** of Fig. 2*a*, which may comprise half a 5965 dual triode type tube has its plate connected via a 750 microhenry inductance **202*a* and a 10K resistor 203*a*, in parallel, and a 10K resistor 204*a*, in series to a +150 volt source. The grid of the triode 201*a* is connected via a 150 ohm resistor 205*a*, to a 10K resistor 206*a* connected in parallel with a 39 micromicrofarad condenser 207*a*, whose farther junction is shown connected to an input terminal 1. The plate of the triode 201*a* is also connected by means of a 15 micromicrofarad condenser 208*a*, in parallel with a 160K resistor 209*a*, to an output terminal 5, while a lower junction of the condenser 208*a* and the resistor 209*a* is connected by means of a 330K resistor 210*a*, to a source of −250 volts. This inverter produces a negative shift, at its plate, and, therefore, at its output 5, when a positive shift is applied to the input terminal 1, while a positive shift is produced at its output 5, when a negative shift is applied to the input terminal 1. The inverter also amplifies the signal input, and its components and component values are so chosen as to produce outputs, having short rise and fall time. In this respect, the inductance 202*a*, in the plate circuit, speeds the rise of the plate voltage and when the triode is cut off, this inductance produces a voltage which tends to keep the current flowing. The resistor 203*a* in parallel with the inductance 202*a***, serves as a damper and prevents ringing in the plate circuit after the initial peaking has occurred, due to an input signal.

Another type of inverter is shown in Fig. 2*b*. The operation of this inverter is basically like that of the inverter I, of Fig. 2*a* and is well understood to those skilled in the art so that no further description is deemed necessary.

In Fig. 2*c*, there is shown the detailed circuit diagram and corresponding block symbol of a cathode follower which may be used, either in the form shown in Fig. 2*c* or in several variants thereof. Wherever a cathode follower is used in the circuitry described below, it will be indicated by a block diagram labeled CF.

The cathode follower as shown in Fig. 2*c* is a power amplifier, and is, therefore, used to supply a stable voltage level for driving resistive loads, such as diode AND and OR circuits and for capacitive loads such as wiring capacitance. Their high input impedance and relatively low output impedance make them useful for impedance matching and isolation. Cathode followers do not invert a signal but they may attenuate a signal.

The cathode follower, shown in Fig. 2*c*, may be used with two types of loading which should be considered, one, a resistive load and two, a capacitive load. First, a resistive load will be assumed, and an input voltage of +10 volts. The triode **220*a* will conduct in such a manner as to regulate itself, that is, it will not allow appreciable voltage change from grid to cathode. If the current increases, the triode tends to cut itself off as the cathode voltage tends to rise. This cut off action tends to decrease the current. Conversely, if the current tends to decrease, the cathode voltage will tend to drop, and thus cause the triode to draw more current. This type of self-regulation is called inverse voltage feed back. Current through the cathode circuit causes a voltage drop across a 100 ohm resistor 221*a*. When the input voltage is +10 volts, this drop should about equal the grid to cathode rise, so that the output voltage is almost +10 volts. Should the input signal drop for instance, to −30 volts, then the output voltage will also drop. If one examines tube characteristics, it will be noticed that the current will be less and that the grid to cathode bias is more, when there is more voltage across the tube. In this case, the drop across the 100 ohm cathode resistor 221*a***, is less, and, therefore, it will not compensate for the grid to cathode voltage rise, and the output will be more positive than the input. The regulating action still occurs, although at this lower level.

With +10 volts on the grid of an unloaded cathode follower, employing a 8.3K cathode resistor, the output is about +9.5 volts, and each added six milliamperes of load will increase the drop (from +10 volts) by about 1 volt. The maximum rise of 3 volts may be expected from the cathode follower with an 8.3K load resistor and no additional loading. For each millampere load, this lower level may be expected to rise by about ½ volt. If the cathode resistor is increased, the rise in the lower level is increased also. For example, an increase of 3K in the cathode resistor will cause the lower level to rise about an additional volt. This cathode resistance may vary over a considerable range. The gain of a cathode follower when operating Class A is about 0.9.

For operation of a cathode follower, feeding a capacitive load, assume that there is a capacitance connected from the output to the ground and that the input voltage to be +10 volts. In a steady state condition, the capacitance would be charged +10 volts. If the input voltage were to drop in zero time, to −30 volts, the voltage across the capacitance could not drop immediately, and, therefore, the cathode would be held up, by the capacitance, while the grid dropped to −30 volts. This action cuts off the tube momentarily. The output voltage will drop, at a speed determined by the RC path, consisting of a cathode resistor and the capacitance. When the capacitance voltage drops far enough, the tube begins to conduct, the current from the tube will begin to halt and drop, and eventually hold the output, at a steady state voltage. When the input is suddenly shifted again to +10 volts, the capacitance will be charged by current from the grid and plate circuits of the heavy conducting tube. For values of input capacity for the next stage or stages generally employed in this system, these RC time constants are compared to the rise and fall times of the input, and, therefore, the extremes of cut off, and heavy conduction, may not be reached, and the output follows the input. But if a long cable or large capacitive load is attached to the cathode follower output, then the output will not follow the input voltage shift, but will be determined by the RC paths above. The use of several cathode followers, in parallel, helps to minimize the voltage rise of the circuit at the lower level. Parallel connected cathode followers also provide more current for line charging purposes to speed output voltage shifts, and in addition, the paralleling lowers the effective cathode resistance and thus allows faster discharging of line capacitance. When cathode followers are in parallel, the connections are made at the grids and the outputs. The diodes may not be paralleled.

The standard cathode follower, as shown, in Fig. 2*c*, contains two catcher diodes 222*a* and 223*a*. The catcher diode 223*a*, connected to the −30 volt line, protects the other catcher, and diodes following this circuit, by clamping the output voltage to −30 volts, when the cathode follower input goes negative. This negative voltage catcher also helps set the standard output voltage. The diode 222*a*, connected to the +15 volt line, clamps the output at +15 volts, when the input goes very high, and thus protects the other diode or any diodes fed by this circuit, from other voltages. These two diodes, in effect, protect each other. When cathode followers are paralleled, only needed diodes are used. In this case, enough +15 volt return diodes are used to carry the 24 milliampere zero bias current for each 5965 half tube. The −30 volt return diodes must handle the clamping current through the equivalent cathode resistance, when all tubes are removed. When crystal diodes are paralleled, a resistor (usually 100 ohms) is placed in series with each, to tend to equalize the current through each diode. Otherwise, a low forward resistance of one, may cause it to pass more than rated current.

In Fig. 2*d*, there is illustrated, the detailed circuit diagram and corresponding block symbol of a power cathode follower PCF which operates similarly to the cathode follower of Fig. 2*c*. This circuit is called a power cathode follower because it uses a 5687 tube which is a heavy duty tube. The usual value of the cathode resistor R is 6 kilohms. The usual value of the bias resistor is 300 ohms. The voltage rise through the power cathode follower is greater than that for a standard cathode follower because of the amplification. Because of the tolerances in a type 5687 tube, the rise from a −30 volt input can be as much as 5 volts, for an unloaded cathode follower, with a 6K cathode resistor. With a +10 volt input, the output should also be +10 volts under the above conditions. The action of the power cathode follower, under capacitance loading, is also similar to that of a standard cathode follower. Power cathode followers may be paralleled and in this case, the +15 volt, return catcher diodes, must be able to carry the 80 milliampere, 0 bias current, of each half tube.

Referring to Fig. 2*e*, there is shown a delay line driver type of cathode follower DLD, which is similar to the cathode followers, shown above, except that no load resistor is provided. Inasmuch as the operation of cathode followers has been discussed above, and is apparent to those skilled in the art, no further explanation will be made.

In Fig. 2*f*, there is illustrated the circuit diagram and the corresponding block symbol of an amplifier labeled A, which is known as a grounded grid amplifier. It comprises a pair of triodes 250*a* and 251*a* which together may comprise a type 5965 dual triode. The plate of the triode 250*a* is directly connected to a source of +150 volts, while its grid is connected through a 150 ohm resistor 252*a*, to an input terminal 1. The plate of the triode 251*a* is connected, to a +150 volt source, through a 10K resistor 253*a* and a 750 microhenry inductance 254*a*, in parallel, both in series with an 8.2K resistor 255*a*. The plate of the triode 251*a* is also connected, through a 15 micromicrofarad condenser 262*a* and a 160K resistor 263*a*, in parallel, to an output terminal 5. The lower junction of condenser 262*a* and resistor 263*a* is connected through a 330K resistor 260*a* to a source of −250 volts, as shown. The grid of the triode 251*a* is connected to ground through a 150 ohm resistor 256*a*, and a 47 micromicrofarad condenser 257*a* in parallel with a 9.1K resistor 259*a*. The end of the resistor 256*a*, remote from the triode 251*a*, is also connected via an 18K resistor 258*a* to a source of −30 volts. The cathodes of the two triodes 250*a* and 251*a* are connected, as shown, and are also connected to a −250 volt source, via a resistor 265*a*. The cathodes are also connected, via a diode 264*a* to a source of −30 volts. Assuming we wish to amplify a potential of +10 volts applied to the input terminal 1, the triode 250*a*, acting as a cathode follower, will produce approximately +13 volts at the common cathode resistor. The grid voltage of the right triode is determined by the voltage divider comprising resistors 258*a* and 259*a* and this voltage is −10 volts, as no grid current is flowing. With +13 volts on the cathode and −10 volts on the grid, the triode 251*a* will be cut off, producing +144 volts at the plate. The output signal at terminal 5 is divided between the +144 volt potential and the −250 volt source, as shown, to obtain an output of +10 volts at this output terminal 5. If the voltage of the grid of the triode 250*a* were −20 volts, the cathode would be approximately −18 volts. With −18 volts on the cathode of the triode, 251*a* and −10 volts on its grid, the grid will draw current, reducing the grid to cathode voltage to approximately 0, thus allowing full conduction. The plate voltage will drop to about +70 volts, which is divided via the circuit, as shown, producing an output of −36 volts on the output terminal 5.

This circuit is designed for maximum response. The coil 254*a* in the plate circuit of the triode 251*a* decreases the rise time of the plate, when the input to this grounded amplifier is going in the opposite direction. The 47 micromicrofarad condenser 257*a*, in the grid network of the triode 251*a*, is employed to by-pass the grid to ground and to allow the triode 251*a* to respond faster as the cathode voltage is dropped. When the grid of the triode 251*a* begins to conduct, the voltage at the grid does not drop immediately, but is held up by the potential of this grid condenser 257*a*. This positive grid to cathode voltage provides a surge of plate current to aid the fall of the plate of the triode 251*a*. A clamp power amplifier CPA shown in Fig. 2*g*, and a Sync Power amplifier SPA shown in Fig. 2*h*, are other types of amplifiers used in the machine. Their operation is well known to those skilled in the art, and further explanation of these amplifier circuits is deemed unnecessary.

Fig. 2*i* illustrates the circuit diagram and corresponding block symbol of a trigger T. This trigger comprises a dual triode 280*a* which may comprise a type 5965 tube, the plate of the right hand triode being connected to a +150 volt source, by way of an inductance 281*a* (of a value of 1.0 millihenries as labeled) in series with resistors 282*a* and 283*a*, respectively. The resistors 282*a* and 283a may have values of 5.1K, as indicated in Fig. 2*i*. The left plate of the dual triode 280a is similarly connected to the +150 volt source. The right plate is also connected via a 15 micromicrofarad condenser 284a in parallel with a 360K resistor 285a, to the output terminal 4. This lower connection of condenser 284a and resistor 285a is connected, by way of an 820K resistor 286a to a −250 volt source. The left plate is provided with a similar output connection to terminal 3.

The plate of the right hand triode is also coupled to the grid of the left hand triode via a 15 micromicrofarad condenser 290a and a 68K resistor 287a, in parallel, together in series with a 150 ohm resistor 291a. The plate of the left triode is similarly connected to the grid of the right triode, to thus provide, the now well known cross coupling of the triodes of an electronic trigger. The trigger is regarded as being OFF, when the right hand triode is conducting, and is regarded as being ON, when the left triode is conducting. The grid of the left hand triode is also connected via the resistor 291a, in series with a 91K resistor 288a and a 68K resistor 289a, to a source of −250 volts. Similarly, the grid of the right hand triode is connected, to a −250 volt source. The flip-flop operation of such an electronic trigger is now well known, the trigger being flipped ON or OFF as desired by the application of a negative voltage to a binary input terminal 7, such a negative voltage being applied, to both grids, but being effective, only on the grid of that triode which is already conducting, to thus block its conduction and render this triode non-conducting. When the trigger is already reset OFF (right triode conducting) a negative pulse, applied to the binary input terminal 7, renders the right hand triode non-conducting and the left hand triode conducting.

Fig. 2*j* illustrates the circuit diagram and corresponding block symbol of a single-shot multivibrator SS. This circuit is used to generate gates or pulses of specified time duration, and to provide specified delays. A single-shot multivibrator resembles a trigger circuit, in that it may be shifted from one state to the other state, but differs in that it returns automatically to its one state, after a predetermined time (depending on the values of the circuit constants) without being pulsed from an external source. Its one or normal state may be referred to as its stable state, and its other or abnormal state may be referred to as its quasi-stable state, since it does remain stable, in this latter state, until the predetermined time has elapsed. The single-shot multivibrator illustrated in Fig. 2*j* is cathode coupled. In its stable state, the left triode is cut off and the right triode is conducting heavily and the cathode and the right grid are at about +10 volts, the left plate voltage is +150 volts and the right plate voltage is at about +60 volts. The most common method of tripping a single-shot multivibrator is by plate pullover. When using plate pullover, the left plate of the single-shot multivibrator is conected to the plate of an inverter, the load resistor of its left plate also acting as the load resistor for the pullover inverter. When a positive input is applied to the grid of the pullover inverter, conduction, through the common plate resistor, drops the voltage of the left plate of the single-shot. This negative shift, is coupled through the capacitor CT, to the right grid, cutting off the right triode, and the cathode voltage starts to fall. The left grid is held to about −38 volts, by a voltage divider as illustrated, and as the cathode voltage falls, the left triode starts to conduct, pulling its plate voltage down. Current starts flowing through the cathode resistor, from the left tube and holds the cathode voltage at −36 volts. A clamp diode, as shown, in the cathode circuit, prevents component variations from causing the voltage, on the cathode, to fall below −36 volts. The clamp diode on the left grid prevents the Miller capacitance effect from dropping the left grid voltage below −36 volts. The left tube at this time is conducting, and it is operating very near zero bias. The input pulse may be removed, any time after the left diode begins to conduct, and the circuit will remain, in the quasi-stable state, since the left plate voltage will be held down by the conduction of the left tube. When the input pulse from the pullover inverter, is removed, the decrease in pullover inverter current, flowing through the left plate load resistor, may appear as a slight positive shift in the left plate waveform.

The duration of the single-shot multivibrator output pulse is largely dependent on the value of the discharging capacitor CT connected between the left plate and the right grid, and the value of the resistor RT. Upon discharge of the capacitor CT, the discharge path is from the +220 volt source, through the resistor RT, connected to the right grid, the capacitor CT, the discharge path of the left triode and the cathode resistor, to the −100 volt source. This discharging of the capacitor CT causes the voltage of the right grid to rise. When the voltage, at the right grid, has risen to −42 volts, the right tube will begin to conduct, the cathode voltage will rise again to its original value, cutting off the left tube as it does so. The left plate voltage, therefore, rises towards its original +150 volt level. All component values in this circuit, except that of the condenser CT and the resistance RT are fairly constant. RT and CT may be varied, to determine the duration of the pulse, and therefore, they are called the timing resistor and the timing capacitor. The larger RT and CT, the more time is required for the right grid voltage to rise to −42 volts. The duration of the single-shot pulse in microseconds is approximately 0.25 RT CT, where RT and CT are in megohms and micromicrofarads, respectively. The value of cut off, for the right tube, in this circuit, also affects the timing. All these factors, except RT and CT are fairly constant and enter into said 0.25 coefficient. Various values in components and voltages, therefore, may cause the actual value of the pulse width, to deviate from the calculated value, by as much as plus or minus 20%. Although it was mentioned previously, that the voltage values at the various points in the circuit of Fig. 6*w* return to their stable states, when the single-shot multivibrator timing has ended, such is not rigorously correct. The left plate voltage rises to a new value in about half a microsecond, but this is lower than +150 volts. The voltage is determined by the balance of voltages in the circuit connected to this plate. This positive shift at the left plate is coupled to the right grid, which becomes positive enough to draw heavy grid current in the right tube. The upper level of the right grid voltage is clamped, through the right triode and the +10 clamp diode as shown, connected to the cathode, and this clamping action prevents the voltage on the left plate from rising, to +150 volts, until the coupling capacitor CT again becomes charged, to its original charge. The path for charging current is now from +150 volts, through the 33K left plate load resistor, through the capacitor CT, through the 150 ohm grid resistor and grid to the cathode resistance of the right tube and finally through the 15K cathode resistor connected to −100 volts. The time of recovery, that is, the time required for the left plate voltage to return to +150 volts can be estimated in microseconds at 0.25 CT where CT is in micromicrofarads. It may be noted that the timing resistor has no effect on this time. The recovery time is an important consideration in the single-shot multivibrator operation. If a circuit has not recovered from an operation when a second pulse arrives, the negative shift on the left plate will be smaller and at that time the single-shot multivibrator pulse will be shorter. Therefore, for stable operation, the period of the input pulses must be greater, than the combined time of the output pulse and the recovery time. If the shift in voltage at the left plate at the time of removal of the input pulses is large, it may have a serious effect on the timing of the circuit.

Fig. 2*k* illustrates the detailed circuit diagram and corresponding block symbol of a plus diode AND circuit, while Fig. 2*m* illustrates similarly a minus AND circuit, employed in the invention. Whenever a block, labeled with the symbol &, appears in a block wiring diagram, the contents of the block will comprise a circuit as illustrated in Fig. 2*k*, or one modified simply by the addition of as many input diodes as may be necessary for conditioning the circuit under question while the block labeled with a —& will comprise a circuit as in Fig. 2*m*. The positive AND circuit of Fig. 2*k* requires a coincidence of two +10 volt inputs, for example, applied, respectively, to the lines **201*b* and 203*b*. Such inputs are effective through diodes 202*b* and 204*b*, respectively, which may comprise germanium diodes of standard make, to produce a +10 volt output; the plates of the diodes being joined and connected by a resistor 205*b***, to a source of +220 volts. The minus AND circuit of Fig. 2*m* requires a coincidence of two negative potentials upon its two inputs (or as many inputs as may be employed), to produce a negative output. This minus AND circuit comprises a pair of diodes **207*b* and 209*b* connected, as shown, to a resistor 210*b*, whose lower terminal is connected to a source of —250 volts. Upon application of a negative potential (assume —30 volts), to both the inputs 206*b* and 208*b*, a negative output becomes available on the output line 211*b***. If either of the inputs, is relatively positive, no such negative output will be available.

Referring to Fig. 2*n*, the detailed wiring diagram and corresponding block symbol of a positive OR circuit is illustrated while in Fig. 2*p* a negative OR circuit is illustrated. By comparison with the circuits of Figs. 2*k* and 2*m*, it is seen that the circuitry, per se, of a negative AND circuit and a positive OR circuit are the same, and the circuitry, per se, of a positive AND circuit and a negative OR circuit are also the same. These circuits are employed in different manners in the processing of data, as described below.

Referring to Fig. 2*q*, the detailed circuit diagram and corresponding block symbol of an oscillator are illustrated. This oscillator comprises a triode **221*b* whose cathode is connected to ground through a 220 ohm resistor 222*b*. The grid is connected through a 150 ohm resistor 223*b* and a 100K ohm resistor 224*b* to ground. The far end of this resistor 223*b* is connected by way of a 470 micromicrofarad condenser 225*b* through a portion, of a 200 microhenry inductance 226*b*, and a 1.5K resistor 227*b*, to a power supply of +150 volts. The plate is connected via another portion, of the same 200 microhenry inductance 226*b*, and the resistor 227*b* to +150 volt supply. The bottom portion of the resistor 227*b* is connected via a .01 microfarad condenser 228*b* to ground. The plate is connected via a .01 microfarad condenser 231*b*, in series with a 22 micromicrofarad condenser 229*b* and a 47 micromicrofarad condenser 230*b* to ground, the condensers 229*b* and 230*b*, in series as shown, being shunted by variable condensers 232*b* and 233*b*, as shown. The output is taken from the junction of the condensers 231*b* and 229*b* to an output terminal 1**. The circuit parameters have been so chosen that with the oscillator tuned the circuit oscillates at a frequency of approximately 1 megacycle.

Fig. 2*r* illustrates the detailed circuit diagram and corresponding block symbol of a Sync Generator SG. This circuit uses a shorted delay line to produce a pulse of a predetermined width. The delay line, per se, is described below in Fig. 2*v*. When the input to the clamp generator rises, the dual triode conducts, causing a negative shift to appear at the commoned plates. This negative shift, travels along the delay line, is reflected, at the shorted end, and re-appears at the input end, as a positive shift of the same magnitude. Therefore, a rise in the input of the sync generator, causes a negative pulse to appear at its plate. If then, the tube is cut off, a positive shift results across the input terminals of the delay line as the current flow, through the impedance of the line, ceases. The positive shift travels along the line, is reflected at the shorted end, and appears at the input end, as a negative shift, of approximately the same amplitude. Therefore, a positive shift, at the input of the clamped generator, produces a negative pulse at the plate. The width of either the positive or the negative pulses is twice the width of the delay or in the particular embodiment shown, is approximately 0.34 microseconds.

Fig. 2*s* illustrates the detailed circuit diagram and corresponding block symbol of a sync clipper identified by the symbol SC. This sync clipper amplifies the positive peaks of the sync generator SG (Fig. 2*r*) output. This circuit comprises a ground grid amplifier, whose grounded grid is at approximately —3 volts. The cathode also operates at about —3 volts. A 200K resistor **235*b***, which is connected to a —30 volt source, comprises part of an RC coupling between this circuit and the sync generator of Fig. 2*r*. Low plate and cathode resistances help provide fast rise and fall times while the 100 microhenry inductance **236*b*, in the plate circuit, provides peaking action for fast positive rise, while the .01 microfarad condenser 237*b***, on the grounded grid, helps to speed fall time on a negative shift.

A delay line circuit DL is shown in Fig. 2*u*. This delay line circuit is of a lumped constant type, which consists of a series of L sections, each containing a series inductance and a shunt capacitance. If a pulse is applied to the input terminal 1 of this type of line, current flows through the inductance of the first section to charge the capacitance of that section. As the capacitance becomes charged, its voltage then causes current to flow through the next inductance to charge its corresponding capacitance. This process continues successively from one section to the next along the line. Since it takes a finite time to charge the capacitance of each section through the impedance of its corresponding inductance, the pulse is delayed in its propagation along the line. The delay time, in microseconds per section, is the square root of the product LC, where L is the inductance, per section, in henries, and C is the capacitance for the section, in micromicrofarads.

Referring to Fig. 2*v*, a distributed constant delay line $DL_B$ is shown. A distributed constant delay line resembles a coaxial transmission line except that it is specially constructed so that its inductance and capacitance are relatively large, per unit length. This is necessary so that the desired delay may be obtained, in shorter lengths of line. This type of line differs from the lumped constant type in that the line, per se, instead of discrete components, forms the inductance and the capacitance. Electrically, it acts as a lumped constant line with a very large number of components with very small value, that is, the capacitance and the inductance are distributed continuously along the line. The delay, per unit length, in microseconds, equals the square root of LC, where L is the inductance, in henries, per unit length, and C is the capacitance in micromicrofarads, per unit length.

Fig. 2*t* illustrates the detailed circuit diagram and corresponding block symbol of a microsecond delay unit D, utilized as a storage element. The circuit of this microsecond delay unit is generally of the type shown and described in Reissue Patent No. 23,699, issued August 18, 1953. The slight differences in design between the device of the patent and the particular device described in detail herein, will be apparent from the following description and the notations on Fig. 2*t*. In general, the microsecond delay unit is a device for storing data in which an input pulse may be applied to the input terminal **274*b* at the same time that the previous input pulse appears at the output terminal 294*b***, a delay of one full microsecond occurring between the input and the output, with certain timing of the inputs, as described below, but with a complete isolation between the respective output and input pulses, during any given time interval.

The input terminal **274*b* is connected to one diode of a pair of diodes 275b and 277b, which with the resistor 279b, connected between the junction 278b and a 220 volt source, comprise an AND circuit, generally designated as 273b, the input to a terminal 276b connected to a diode 277b comprising the sync pulse as described below. The junction 278b is connected through a suppressor grid resistor 280b** to the control grid of the triode L, which triode may comprise one half of a 5965 type tube, the other half comprising the triode R.

The plate of the triode L is connected via a resistor 295b, and an inductance coil 296b, in parallel, to a +150 volt source, while the output of the plate is coupled to the grid of the triode R, via a circuit described below.

The triode R is operated as a cathode follower and it is always conducting during the operation of the delay unit. Its cathode load resistor 291b is connected to a −100 volt terminal 293b, which is also connected, through a resistor 284b, to the condenser 281b. The output terminal 294b, is connected to a tap of the cathode resistor 291b and is clamped to a +15 volt source, by a diode, as shown. The CLAMP or hold terminal 290b is connected via a resistor 289b and diodes 288b, 282b, and 283b, in series, to a −30 volt terminal 285b. The junction 295b comprises the junction of diodes 282b and 283b, the resistor 284b and the condenser 281b. The junction 287b of diodes 288b and 282b is connected, via a suppressor resistor 292b, to the control grid of the tube R, and through a condenser 286b to ground. The junction 295b can never be appreciably more negative than the −30 volt terminal 285b, because the diode 383b conducts and maintains the voltage, at junction 295b, up to essentially that of terminal 285b. It is the conduction of the diode 283b, during the initial time, that keeps junction 295b at approximately −30 volts. The resistor 284b tends to prevent the voltage at junction 295b from drifting, between the application of successive clamping pulses. The operation of the microsecond delay unit, requires the use of a SYNC pulse at the input and a CLAMP pulse, as shown. The SYNC pulse is a positive pulse, having a duration between 0.3 and 0.4 microseconds and a repetition rate of 1 megacycle. Its two voltage levels are −30 and +10. The CLAMP pulse is a negative pulse having a width of between 0.2 and 0.3 microsecond. The negative excursion of the CLAMP coincides with the negative excursion of the SYNC. The normal level of the clamp line is −10 volts, and the pulse goes down to between −40 and −45 volts.

Assume the input at terminal 274b to be +10 volts. When the SYNC voltage goes to +10, triode L conducts, producing a negative pulse across the inductance 296b of the plate circuit. The resistor 295b, in parallel with the coil 296b, serves to damp the peak pulse. This pulse is coupled via the condenser 281b, to the junction 295b which is driven to −30 volts. Diode 282 presents a high impedance so that the negative voltage does not discharge the condenser 286b. Next, the SYNC voltage drops to −30 volts. This cuts off triode L and produces a positive pulse in the plate circuit. This pulse is also coupled through the capacitor 281b to the junction 295b. When the pulse exceeds the voltage at the grid of the triode R, it causes diode 282b to conduct. At the same time that the positive pulse is applied to the grid of the triode R, through the diode 282b, the negative CLAMP is applied via resistor 289b and the diode 288b. Thus, there exists the condition of a positive pulse applying charge to the condenser 286b at the same time that the negative CLAMP is removing it. The positive pulse has greater duration than the CLAMP pulse and with the rate of discharge permitted by the resistor 289b, +10 volts will exist at the grid of the triode R. This voltage cannot remain above +10 since this is the level of the CLAMP line except during the interval of the CLAMP pulse. Thus, as long as the input is +10 volts, the output at terminal 294b will remain at +10 volts.

Assume that the output has changed to −30 volts, and that this change takes place during the interval that the SYNC line is at −30 volts. Since there is a + AND circuit 273b at the input, the grid voltage will stay at −30 volts, instead of following the SYNC voltage, and there will be no positive or negative voltages produced in the plate circuit of the triode L. The output at terminal 294b will remain at +10 until the CLAMP pulse discharges the condenser 286b, changing the input of the triode R from +10 volts to −30 volts. If the voltage attempts to go below −30 volts, the diodes 283b and 282b will conduct, clamping it. As long as the input remains at −30 volts, there will be no positive pulses produced and each CLAMP pulse will keep the triodes R grid at −30 volts.

As will now be obvious, the reading in of a 0 to be stored in the microsecond delay unit is much simpler than the reading in of a 1. Since the information line is at −30 volts for a binary 0, no SYNC pulse can be gated through to produce any pulses at the plate of the peaking tube L. Therefore, when the CLAMP pulse tends to discharge the storage capacitor 286b, no opposing pulse will be present to interfere with the discharging action. The discharge path has so large a time constant that the CLAMP pulse can discharge the capacitor to only −25 volts before it disappears. The amplitude of the CLAMP pulse and the value of the resistor 289b were chosen to allow a quick discharge of the capacitor when the unit is reading in a zero over a 1, without giving excessively large glitches.

The microsecond delay unit does not delay a pulse in the sense that a delay line does. When given the proper input, the delay unit produces an artificial pulse which is timed accurately, with respect to the timing pulse of the machine. The information input pulse, in effect, gates the SYNC pulse, so that the fast fall of the SYNC pulse can cut off the peaking triode to obtain the peaking action.

To fulfill these qualifications, the input pulse must be present both before and while the SYNC pulse falls; therefore, the input pulse may be very poorly shaped or entirely absent during the first 0.6 of a microsecond and still be sufficient. On the other hand, the delay unit produces a uniform output pulse which is up to +10 volts, by 0.2 time. If an input pulse should arrive at 0.8 time, the delay is then only 0.4 microsecond. The only time that a delay unit will produce a delay, of one full microsecond, is when it is fed a pulse that comes up at 0.2 time. Such pulse may be from another or even the same delay unit, as in the instant case. The fact that the pulse may be from the same delay unit, i.e. the output may be fed back to the input, is utilized in conjunction with a holding line to retain information in the delay unit so that it acts as a storage device. It is thus seen that the delay unit has two operative states, one state representing —0— and the other state a —1—. To read an information bit of —1— into the delay unit, the input at terminal 274b is made plus. At the same time the HOLD line, which permits feedback of the output to the input, is rendered negative, as will be described in detail below, so that the data originally in the delay unit cannot be fed back to its own input at the time new data is being applied. If the delay unit contains a —1—, the SYNC pulse will be gated in, to produce another —1—, which will appear during the next microsecond, to gate through the following SYNC pulse, since by this time the HOLD line will be plus again, provided a second bit is not being immediately entered. Storing of a zero is merely the suppression of the SYNC pulses by the —25 volt output of delay unit. The process of storage will continue until the HOLD line is made negative, when new information is read in. It should be noted that at the time new information is read in, it has no effect on the information appearing at its output.

CLOCK

Referring to Figs. 3*a* and 3*b* which illustrate, in block diagram form, the Clock and the primary drive circuits which provide signals for the Clock and for the Delay Units. These circuits comprise an oscillator 301 (Fig. 3*b*) which oscillates at a frequency of one megacycle having an output which feeds via power cathode followers 302 and 303 to a signal generator 304. The signal generator 304, and a sync clamp circuit 305 shape the signals produced and feed them to a power cathode follower 306 whose output feeds to three branch circuits. One of these passes via an inverter 307, a power cathode follower 308, a sync power amplifier 309 and an inverter 314 to the line L101.

The output of the cathode followed 306 also feeds to a clamp generator 310 whose output passes via a power cathode follower 311, a clamp power amplifier 312 and an inverter 315 feeding to line L102.

The output of the cathode follower 306 also passes via a power cathode follower 313 to the Clock Drive Line L103.

Signals on the lines L101 and L102 are used in the operation of the Delay Unit D, described above, which requires the use of two special signals, the one on line L101, comprising a "sync" pulse and the one on line L102 comprising a negative "clamp" pulse. The synchronizing pulse on line L101 is a positive pulse having a duration of about 0.3 of a microsecond and the "clamp" pulse is a negative pulse having a duration of about 0.2 microsecond. Both pulses occur, at the one megacycle rate, of the oscillator 301. These two pulses are in phase with one another, which is necessary for proper operation of the Delay Unit.

The signals on the Clock Drive Line L103 are passed through the delay line drive cathode follower 320 and the delay line 321, whereby adjustments can be made, to allow for line delays, etc. in order that those registers, which include the Delay Units D, as their storage elements, are operated in absolute synchronism with the Clock. The outputs of delay line 321 feed via an inverter 322 to the binary input of a trigger 323 which is shifted, alternately, ON and OFF, by successive signals on the Clock Drive Line L103. The output from the left plate of the trigger 323 passes, via a cathode follower 325, to a line 326, while the output from the right plate passes via a cathode follower 324 to a line 327. The Clock, per se, comprises a series of electronic triggers 336 through 347 (Figs. 3*b* and 3*a*). It should be noted that the left grid, of each of the eneven numbered triggers, receives pulses from the line 327 while the left grids of the odd numbered triggers receive their signals from the line 326. With switch 328 in its downward position (Fig. 3*b*) a positive potential, as indicated, is applied via a resistor 329, a diode 330 and one side of a condenser 331, whose other side is grounded, as shown, to turn ON the trigger 336. Trigger 336, remains ON, as long as the switch 328 is in its downward position.

The Clock, is reset, by resetting trigger 336 ON, either when the Machine is first started or after it has been operating. If trigger 336 is "held" ON, as it is when switch 328 is moved to its downward position, then if any other stage of the Clock is ON, the ON condition is stepped, as presently described, until trigger 336 is reached. Since it is already ON, the reset condition of the Clock is reached namely, trigger 336 is ON and all other triggers are OFF.

Assume that the trigger 336 is reset ON, and all other triggers are OFF and that switch 328 is shifted, upward to thus apply a negative potential so that trigger 336 is no longer clamped ON. As the next negative signal occurs on line 327, it is passed via a condenser 332 and a diode 333, to turn OFF the trigger 336. The trigger 336, in going OFF, emits a negative signal via a cathode follower 350, a condenser 351 and a diode 352 to the next trigger 337. This negative going signal is effective to shift the trigger 337 ON. Thus, the signal on line 327 has been effective to shift the ON condition of trigger 336, to trigger 337. Trigger 337 remains ON, until a negative signal occurs on line 326. This negative signal on line 326 is passed via a condenser 353 and a diode 354, to turn the trigger 337 OFF. Trigger 337 in going OFF, emits a positive output, via a cathode follower 355 which is applied via a condenser and a diode to turn ON the trigger 338. Thus, as Clock Drive Pulses occur on line L103, the ON condition of the first trigger 336 of the Clock, is stepped to the succeeding trigger, etc. This process continues until the last trigger 347 (Fig. 3*a*) of the chain, is turned ON, and upon a subsequent occurrence of a negative signal, on line 326, trigger 347 is turned OFF, and emits a negative signal, from its right hand plate via a cathode follower 348, line 348*a*, a condenser 334, and a diode 335, to the right hand input of the first trigger 336, to turn it ON. This entire cycle of operation may be then repeated. Thus, a ring, comprised of cascaded triggers 336 through 347, has one stage only, ON, at any one time, and this ON condition, is stepped along, at a one megacycle rate, the entire cycle being repeated, every 12 microseconds. The first trigger 336 is regarded as the zero or "home" stage of the Clock, trigger 337 as the "1" stage, trigger 338 as the "2" stage, etc. and trigger 347 as the "11" stage. The outputs of these triggers are fed through circuits identical to that of the "home" trigger 336, which will now be described.

Referring to this zero or "home" stage trigger 336, its output, as stated above, passes through the cathode follower 350, to turn ON the next trigger 337. The output of the cathode follower 350 is also passed, via an amplifier 360, a cathode follower 361 and a power cathode follower 362 to line AO (D1). In a similar manner, the outputs of triggers 337 through 347, respectively, are passed, through identical circuits to lines A1 (D1), A2 (D1), A3 (D1), A4 (D1), A5 (D1), A6 (D1), A7 (D1), A8 (D1), A9 (D1), A10 (D1) and A11 (D1), respectively. A plot of the signals occurring on these lines is shown on the Timing Diagram of Fig. 6*a*. These signals occur during all character cycles, whether the Machine is in Instruction time, Execute time, Execute/Regenerate time or Regenerate time. The signals on these lines, occurring during all cycles, may be referred to as follows: The signal on line A2 (D1), for example, may be referred to as a positive pulse, "A" signifying that the pulse occurs during ALL cycles, "2" signifying it occurs, during the "2" time of the Clock cycle, and (D1.0) signifying that the pulse has a duration of one microsecond. These positive signals may be passed through inverters (not shown) when a negative signal is required.

CYCLE TIMER

Referring now to Figs. 3*c* and 3*d* which illustrate the circuits of the Cycle Timer, this Timer determines the type of Character cycle that the Machine is to perform, that is, whether it shall be an Instruction (I) Cycle, an Execute (E) Cycle, an Execute-Regenerate (E/R) Cycle or a Regenerate (R) Cycle. This Cycle Timer, has four output lines (Fig. 3*d*) labeled INST TIME, EX TIME, EX/RGN TIME and RGN TIME. One, and only one, of these outputs is positive at any one time, and each stays positive, for a minimum duration of one Clock cycle, that is, 12 microseconds. The circuits shown may also be regarded as having sub-outputs, labeled I′, E′ and E′/R′. The latter outputs do not actually affect the Machine operation except that the Cycle Timer outputs are cocked or primed, so that, as a required Regeneration cycle, ends, the Machine will then proceed to an I, an E, or an E/R type of cycle, depending upon which one of these three sub-output lines is positive.

Control circuits, described below, are caused to emit signals, signalling Go to Execute, Go to Execute/Regenerate or End of Operation. A Go to Execution signal is a pulse of one microsecond duration which occurs at approximately 11 time of the Clock cycle, and causes the line GO TO EX (Fig. 3*c*) to go positive. This pulse passes via a cathode follower **328*b*, line 329*b*, a condenser 330*c*, and a line 331*b* to an inverter 332*b*. This pulse is shaped so that the output of the inverter 332*b* is a negative pulse, which trips the single-shot multivibrator 333*b*, which emits a 3 microsecond positive signal, which, of course, will be positive from 11 time of the Clock cycle to 2 time of the following Clock cycle. This signal passes through a cathode follower 334*b* and via line 335*b* to a negative AND circuit 362*b*, an AND circuit 363*b*** (Fig. 3*d*) and also to an OR circuit **348*b*** (Fig. 3*c*). This signal feeding through the OR circuit **348*b* and a cathode follower 347*b* conditions an AND circuit 346*b* so that a positive AO (D1) signal passes, via the cathode follower 345*b* through this conditioned AND circuit 346*b* and via an inverter 349*b* and a cathode follower 350*b* to a line RESET, while the output of the cathode follower 345*b*** is also fed to the line SET. Thus, under the assumed conditions, the line SET, has a positive pulse of one microsecond duration occurring at "0" time of the Clock cycle, and the line RESET, has a negative pulse at the same time. The negative signal on line RESET (Figs. 3*c* and 3*d*) is fed to negative AND circuits **360*b*, 362*b* and 364*b***, while the positive signal on the line SET, is fed (Figs. 3*c* and 3*d*) to the positive AND circuits **361*b*, 363*b*, 365*b* and 367*b*. Under the conditions assumed above, the AND circuits 362*b* and 363*b* are conditioned by a positive signal via line 335*b* and, therefore, the negative signal on line RESET, is blocked from passing through the negative AND circuit 362*b*. However, the positive AND circuit 363*b* is conditioned, by the positive signal on line 335*b*, which thus allows the positive signal on the line SET to pass therethrough, to an inverter 374*b*, a condenser 391*b* and a diode 392*b*, to turn ON the trigger 393*b*, which emits a positive signal via a cathode follower 394*b* to the line E′ (a positive signal on the line E′ signifying that the Machine is in an E′ condition, this being an internal condition of the Timer as previously mentioned). The positive signal on the line E′ conditions one input of an AND circuit 395*b*, the other input to this AND circuit 395*b* being positive, unless, as described below, the Machine is in Regeneration. Assuming that the Machine is not in Regeneration, then the output of the AND circuit 395*b* is positive, and feeds via an amplifier 396*b*, a cathode follower 397*b* and a power cathode follower 398*b*, to drive the line EX TIME, positive. Such a positive signal on the line EX TIME, signifies that the Machine is in an Execute type of character cycle. Assume for purposes of explanation, that the Machine WAS in Instruction time, when the GO To Execute signal was received. Under such conditions, a trigger 383*b*** (Fig. 3*d*) would have been ON. At this time, the signal on the line **317*b* is negative, and is fed to the negative AND circuit 360*b* and to the AND circuit 361*b*. The negative signal on the line RESET then passes through the negative AND circuit 360*b*, a cathode follower 371*b* and a diode 380*b*, to turn OFF the trigger 383*b*. Thus, at the time that the trigger 393*b*, is turned ON, by the positive signal on the line SET, the trigger 383*b*** is turned OFF, by the negative signal on the line RESET.

If the machine HAD been in an Execute/Regenerate type of Cycle, then the trigger **303*c* would have been ON, and would have been Reset, by the coincidence of negative signals feeding to the negative AND circuit 364*b* via lines 325*b* and RESET, the output of this negative AND circuit 364*b*, passing via a cathode follower 375*b* and a diode 300*c*, to turn the trigger 303*c*** OFF.

If, instead of the "Go To Execution" signal, the control circuits had emitted a "Go To Execute/Regenerate" signal, then a positive signal would occur on line GO TO EX/RGN (Fig. 3*c*) at 11 time of the Clock cycle, and pass via a cathode follower **318*b*, line 319*b*, the condenser 320*b*, line 321*b* and the inverter 322*b* to trip the single-shot multivibrator 323*b*, which, when tripped, emits a 3 microsecond positive signal, via a cathode follower 324*b* and line 325*b* to the negative AND circuit 364*b*, the AND circuit 365*b*** (Fig. 3*d*) and the OR circuit **348*b*** (Fig. 3*c*). Since the signal is fed, to this OR circuit **348*b*, positive and negative signals, occur on lines SET and RESET, respectively, as described above. Thus, as the positive signal, on the line 325*b*, conditions the AND circuit 365*b*, the positive signal occurring on the line SET, passes through this conditioned AND circuit 365*b*, an inverter 376*b*, a condenser 301*c* and a diode 302*c* to turn the trigger 303*c* ON, which trigger emits a positive signal, via a cathode follower 304*c*, to the line E′/R′, the latter line being positive, when the internal condition of the Cycle Timer is that of an Execute/Regenerate cycle. At the same time, if trigger 383*b* or trigger 393*b*, is ON, each is turned OFF; trigger 383*b* being turned OFF through a coincidence of negative signals on lines 317*b* and RESET feeding via the negative AND circuit 360 *b*, a cathode follower 371*b*, and a diode 380*b*, or trigger 393*b* is being turned OFF, by the coincidence of negative signals on lines 335*b* and RESET, feeding to the negative AND circuit 362*b*, whose output passes through a cathode follower 373*b* and a diode 390*b*, to the trigger 393*b*. A positive signal on the line E′/R′, conditions one input, of the AND circuit 305*c*, the other input to that AND circuit being also positive, provided the Machine is NOT in Regeneration time. Therefore, assuming that the Machine is NOT in Regeneration time, the output of the AND circuit 305*c*, is positive, and passes an amplifier 308*c*, a cathode follower 309*c* and a power cathode follower 310*c***, to drive the line EX/RGN TIME, positive. When this line is positive, the Machine is in an Execute/Regenerate type of cycle.

Now assume that the control circuits emit an End of Operation signal. This signal drives the line END OF OPN (Fig. 3*c*) positive, for two microseconds, at 10 time of the Clock cycle. This 2 microsecond signal passes through a cathode follower **306*b*, to turn ON a trigger 307*b*, and also passes via a cathode follower 309*b* to condition one input, of an AND circuit 310*b* which, when conditioned, passes the ALL (D1) signal; the output of this AND circuit being fed via a cathode follower 311*b* to a line 312*b*, and thence via a condenser 327*b*, line 313*b* and an inverter 314*b* to trip the single-shot multivibrator 315*b*, whose 3 microsecond positive output passes through a cathode follower 316*b* and line 317*b* to the negative AND circuit 360*b*** (Fig. 3*d*) the AND circuit **361*b* and to the OR circuit 348*b*** (Fig. 3*c*). As the signal is fed to this OR circuit **348*b*, a positive signal occurs on line SET, while a negative signal occurs on line RESET, at "0" time of the Clock cycle. The positive signal, on the line SET, passes through the conditioned AND circuit 361*b*, and via an inverter 372*b*, a condenser 381*b* and a diode 382*b* to turn ON the trigger 383*b*. At the same time, the negative signal on line RESET passes via the negative AND circuit 362*b* to turn OFF the trigger 393*b*, or via the negative AND circuit 364*b* to turn OFF the trigger 303*c*. The output of the trigger circuit 383*b*, positive when ON, passes through a cathode follower 384*b*, to drive the line I′ positive. The positive signal, on the line I′, conditions the AND circuit 385*b*, and assuming that the Machine is not in Regeneration, the output of the AND circuit 385*b* is then positive, and passes through an amplifier 386*b*, a cathode follower 387*b* and a power cathode follower 388*b*, to drive the line INST TIME positive; the latter line thus being positive, when the Machine is in an Instruction time. Thus, it has been shown that the Machine may be sent to Instruction time, Execution time or Execute/Regenerate time, by appropriate signals, provided that the Machine is not in Regeneration, and in the event that the Machine IS in Regeneration, as the Cycle Timer is set to one of the above mentioned operations, then the Machine is regarded, as having an internal operation, which is signified by positive signals on lines I′, E′, or E′/R′. It should be noted, that when the End of Operation is signalled, the Machine enters an Instruction time, provided it is NOT in Regeneration or enters the Cycle Timer "internal" operation Instruction time, which is signified by a positive signal on line I′. It should also be noted that the triggers 383***b*, 383*b* and 303*c*, are turned ON or OFF, as the case may be, at "2" time of the Clock cycle.

As described above, the trigger 307*b* (Fig. 3*c*) is turned ON, at 11 time of the Clock cycle, when an End of Operation is signalled. The output of this trigger 307*b* passes through a cathode follower 308*b* to condition one input of an AND circuit 303*b*. Assuming for the present that Regeneration of Memory IS required, at the time the End of Operation is signalled, then the second input to this AND circuit 303*b*, specifically the line RGN REQUIRED, is positive, and the A11 (D1) signal is passed via the AND circuit 303*b*, an OR circuit 304*b*, a cathode follower 305*b*, line 338*b*, a condenser 339*b* and line 340*b* to an inverter 341*b*. The output of this inverter 341*b* trips a single-shot multivibrator 342*b*, which emits a positive signal, via a cathode follower 343*b* and line 344*b*, to the negative AND circuit 366*b* and to the AND circuit 367*b*. Thus, if Regeneration IS required, as an End Of Operation is signalled, a 3 microsecond positive signal occurs on line 344*b*. This 3 microsecond positive signal conditions the AND circuit 367*b* so that the positive signal, occurring on the line SET, as explained above, passes through this AND circuit 367*b*, an inverter 378*b*, a condenser 312*c*, and a diode 313*c*, to turn ON a trigger 314*c*, whose right plate emits a positive signal, via an amplifier 318*c* and a power cathode follower 319c, to drive the line RGN TIME, positive, which signifies that the Machine is in Regeneration. Trigger 314*c*, when ON, also emits a negative signal from its left plate, via cathode followers 315*c* and 316*c* to a line 317*c* which, when negative, blocks passage, of any signals, through the AND circuits 385*b*, 395*b* or 305*c*. Thus, although the Cycle Timer may have an "internal" operation of I′ time, E′ time or E′/R′ time, as signified by positive signals on the lines I′, E′, E′/R′, the external cycle, is a Regenerate cycle, due to the fact that the outputs of the AND circuits 385*b*, 395*b* and 305*c* remain negative as long as Regeneration is required. The Machine is also sent into Regeneration, if for any reason, the Machine is stopped, as a positive signal occurs, at 11 time of every character cycle, on the line STOP (Fig. 3*c*) provided the machine is stopped. This signal, on the line STOP, feeds to the OR circuit 304*b*, described above, and the output of this OR circuit 304*b* going positive, as just described, causes the trigger 314*c* (Fig. 3*d*) to be turned ON.

Thus it is seen that as long as Regeneration is required, positive signals occur on line 344*b*, from 11 time of a Clock cycle to 2 time of the following Clock cycle, for every character cycle, until such time as Regeneration is NO longer required. Circuits which determine how much Regeneration is required, are described in the above identified application of Fox et al.

Assuming that Regeneration is no longer required, as long as the machine is not in a Stop condition, a one microsecond positive signal occurs, at 0 Clock time, on the line NO STOP (Fig. 3*d*) and passes through an inverter 369*b* and a cathode follower 370*b*, to one input of the negative AND circuit 366*b*. The negative AND circuit 366*b* is conditioned, at that time, as the line 344*b* is negative. Upon coincidence of the negative inputs, the output of the negative AND circuit 366*b* is negative, and, therefore, passes via a cathode follower 377*b* and a diode 311*c*, to turn OFF the trigger 314*c*. Trigger 314*c*, going OFF, through the circuits described above, causes the line RGN TIME, to go negative, which signifies that the machine is not in Regeneration time, and also via the cathode followers 315*c*, and 316*c* causes line 317*c* to go positive, so that the internal cycle of I′, E′ or E′/R′ will, as the case may be, cause the Machine to go into an Instruction time, an Execute Time or an Execute/Regenerate time. As Regeneration is completed, the line RGN COMPLETED (Fig. 3*c*) conditions one input of an AND circuit 301*b* (Fig. 3*c*) so that, as a one microsecond signal occurs, on line AO (D1) at 0 time of the Clock cycle, it is passed through this AND circuit 301*b* and a cathode follower 302*b*, to turn OFF the trigger 307*b*. Trigger 307*b*, going OFF, via the cathode follower 308*b* removes a conditioning potential from the AND circuit 303*b*, so that thereafter, as Regeneration is again required, it does not take effect until an End of Operation occurs to turn ON trigger 307*b*.

GATE GENERATOR CIRCUITS

Refer now to Fig. 3*e* which shows the Gate Generator circuits. These circuits mix Clock pulses and output signals from the Cycle Timer, to provide required gates and signals. The signals from the Clock are present on lines A1 (D1), A2 (D1), A3 (D1), A4 (D1), A5 (D1), A7 (D1), A8 (D1), A9 (D1), A10 (D1) and A11 (D1). Outputs from the Cycle Timer are via lines INST TIME, EX TIME and EX/RGN TIME. Signals on the lines A1 (D1), A2 (D1), A3 (D1) and A4 (D1) feed through the cathode followers 310*d* through 314*d* respectively, to the OR circuit 321*d*. Hence one of the inputs to the OR circuit 321*d*, is positive for a period beginning at "1" time of the Clock cycle and continuing until the termination of the fourth time pulse or at the beginning of "5" time of the Clock cycle, namely, a period of four microseconds. The output of the OR circuit 321*d* positive from "1" time of the Clock cycle, for a period of four microseconds, conditions one input of the AND circuit 329*d*. The other input to this AND circuit 329*d* is via line EX/RGN TIME. Upon a coincidence of these two positive inputs to the AND circuit 329*d*, its output emits a positive signal, to the line E/R 1 (D4). Hence the signal, on this line is a signal of 4 microseconds duration, occurring at "1" time of the Clock cycles, during Execute/Regenerate times.

The A1 (D1) Clock signal feeds via the cathode follower 310*d* and a diode 322*d* to turn ON the trigger 324*d*. This trigger 324*d*, remains ON, until an A9 (D1) signal passes through the cathode follower 318*d* and the diode 323*d* to turn the trigger 324*d* OFF. This trigger thus, is ON, from "1" time of the Clock cycle until "9" time of the same Clock cycle. The output from the trigger 324*d*, passes via a cathode follower 325*d* to the AND circuit 330*d*. This signal passes through the AND circuit 330*d*, provided a positive signal is present on the line EX/RGN TIME. Assuming the latter line IS positive, the output of the AND circuit 330*d* then will go positive, for an eight microsecond period, starting at "1" time of the Clock cycle. The output of the AND circuit 330*d* appears on the line E/R 1 (D8) so that the signal on this line of 8 microseconds duration, occurring at "1" time of every Execute/Regenerate cycle.

The OR circuit 326*d* is conditioned by a positive signal on the line A7 (D1) feeding, via a cathode follower 316*d* and also by a positive signal on the line A8 (D1) feeding via a cathode follower 317*d*. Hence the output of the OR circuit 326*d* has a positive output for 2 microseconds, starting at "7" time of every Clock cycle. This output is fed to an AND circuit 331*d* which is also conditioned by a positive signal on line EX/RGN TIME. Assuming that the AND circuit 331*d* is conditioned positive, the output of the OR circuit 326*d* passes through this conditioned AND circuit to the line E/R 7 (D2) so that this line is positive, for 2 microseconds, beginning at "7" time of every Execute/Regenerate cycle.

The OR circuit 327*d* is conditioned by a positive signal on the line A8 (D1) feeding via cathode follower 317*d* and a positive signal on the line A9 (D1) feeding via a cathode follower 318*d*. The output of this OR circuit **327*d*, then is positive, for a 2 microsecond period, beginning at "8" time of every character cycle, and passes through an AND circuit 332*d*, provided a positive signal is present on the line EX TIME. The output of the AND circuit 332*d*** is available on line E8 (D2), this line thus being positive, for 2 microseconds beginning at "8" time of every Execute character cycle.

The OR circuit **328*d* is conditioned by a positive signal on the line A10(D1) feeding via a cathode follower 319*d*, and a positive signal on the line A11(D1) feeding via a cathode follower 320*d*. The output of this OR circuit 328*d* thus is positive, for 2 microseconds, starting at "10" time of every Clock cycle. This output is fed to the AND circuits 333*d* and 334*d*. It passes through the AND circuit 333*d*, provided the machine is in Execute time, as signified by a positive signal on line EX TIME to the line E10(D2) or through the AND circuit 334*d*, provided the line EX RGN TIME is positive, to the line E/R10(D2). The positive signal on line A4(D1) conditions the AND circuits 335*d* and 336*d* via the cathode follower 314*d*. The AND circuit 335*d* is also conditioned by a positive signal on the line EX TIME so that its output is available on line E4(D1) which output thus is positive, for one microsecond starting at "4" time, of every Execute cycle. The remaining outputs of this Gate Generator, are developed by coincidence of similar timed pulses and conditioning potentials and will now be deemed obvious, the signal on the line INST TIME conditioning AND circuits 341*d* and 345*d*,** whereby, by coincidence of timed pulses with the conditioning potential, the signals on lines I9(D1) and I11(D1) are produced. Each of the outputs of the respective AND circuits of Fig. 3*e* indicate by their labeling, the type of cycle (instruction time, Execute time or Execute/Regenerate time) the particular time in the Clock cycle and the duration in microseconds. These "gate" pulses are employed in the Execution Timers and Mixing Circuits described below and are illustrated in the Timing Diagram of Fig. 6*b*.

INSTRUCTION REGISTER

The Instruction Register (Figs. 4*a*, 4*b*, 4*c*) comprises 18 trigger circuits which normally receive information from the Memory Register during Instruction cycles, as indicated by the cabling between the Memory Register and the Instruction Register (Figs. 1*c*, 1*d*, 1*e*, 1*f*). The Instruction Register is functionally sub-divided as follows: One, trigger **412*a*** (Fig. 4*a*) is provided for storing the manifestation of the Sign bit. Triggers **413*a* through 417*a* comprise the Operation portion of the Instruction Register bits 1 through 5 and store the representations of the bits 1 through 5, the permutations of ON and OFF conditions of these triggers indicating the respective operations desired. Triggers 444*a* through 447*a*** (Fig. 4*b*) comprise the Address Register part of the Address portion of the Instruction Register and store the representations of the bits 6 through 9. The Address portion comprises in addition to this Address Register portion, the Address Counter portion comprising triggers **401*b* through 408*b*** (Figs. 4*b* and 4*c*) for storing the representations of the bits 10 through 17.

The outputs of the Instruction Register control the operation of the Machine, during Execution time. It is during Execution time that the contents of the Operation portion, of the Instruction Register, that is the ON and OFF permutations of the triggers storing the respective indications of bits 1 through 5, control the Operation Decoder (Fig. 1*f*) selectively, so that its respective outputs indicate the respective operations indicated by the particular ON and OFF permutations, these operations being for example, ADD, SUBTRACT, MULTIPLY, DIVIDE, etc. The remainder of the Instruction Register, that is, the Sign bit trigger and the triggers for bits 6 through 17, pick the Address, in Memory, from which the data is to be obtained, which is employed in the operation as determined, by the Operation part of the Instruction Register.

The Address Counter, per se, of the Address portion of the Instruction Register is not only used to control the deflection of the cathode ray beams, to select the desired Address, in Memory, but is also used during such operations as MULTIPLY and DIVIDE to insure that a correct number of character cycles have occurred.

Referring to the center section of Fig. 4*b*, signals on lines A4(D1), A5(D1) and A6(D1) are fed to an OR circuit **460*a* whose output passes via a cathode follower 461*a*, to condition one input of an AND circuit 462*a*. The other input to this AND circuit 462*a*** is positive, during Instruction time, since the line INST TIME is rendered positive by the circuits of the Cycle Timer (Figs. 3*c* and 3*d*) when the Machine is in Instruction time. The output of the AND circuit **462*a* passes via a cathode follower 463*a* to the line I4(D3) which feeds to the triggers 412*a* through 417*a*** (Fig. 4*a*) and 444a through **447*a*** (Fig. 4*b*) and to an OR circuit **464*a*** (Fig. 4*b*). As will now be understood from the definition of the labeling, given above, the signal on line I4(D3) is a signal of three microseconds duration occurring at 4 time of every Instruction cycle and is effective, during each Instruction time, to turn OFF the triggers **412*a* through 417*a*** (Fig. 4*a*) which comprise the Operation part of the Instruction Register and to turn OFF the triggers **444*a* through 447*a*** (Fig. 4*b*), which comprise the Address Register portion of the Instruction Register. This I4(D3) signal passes through said OR circuit **464*a*, via an inverter 465*a* and a cathode follower 466*a* to the line ADR CTR RESET, this latter line, going negative, at I4 time, for a period of three microseconds. This line feeds to the triggers 401*b* through 408*b*** (Figs. 4*b* and 4*c*) which comprise the Address Counter, this negative I4(D3) signal on line ADR CTR RESET turning these triggers ON. Thus, shortly after I4 time of each Instruction cycle, the triggers **412*a* through 417*a* of the Operation part of the Instruction Register and 444*a* through 447*a* of the Address Register portion are reset OFF, while triggers 401*b* through 408*b*** of the Address Counter are reset ON. Thus the Operation portion triggers and the Address Register triggers contain binary 0's, while the Address Counter triggers contain binary 1's. The signals on lines MR S (bottom of Fig. 4*a*) and MR1 through MR17 (bottom of Figs. 4*a*, 4*b* and 4*c*) represent the outputs of the Memory Register bits S and 1 through 17, respectively, and the respective lines, are positive, if the respective bit representations stored in the Memory Register represent binary 1's. Conversely, if the respective bit representations stored in the Memory Register represent binary 0's, these lines are relatively negative. The line MR S (Fig. 4*a*), if positive, conditions one input of an AND circuit **400*a*, that is, it conditions this AND circuit provided the Delay Unit storing the Sign bit in the Memory Register is storing a manifestation of a binary 1, which binary 1 is selected, to indicate a negative Sign. The lines MR 1 through MR 5, when positive, and thus representative of binary 1's, condition one input of the respective AND circuits 401*a* through 405*a*** while the lines MR 6 through MR9 (Fig. 4*b*) condition one input of respective AND circuits **435*a* through 439*a*.** The lines MR 10 through MR 17 (Figs. 4*b* and 4*c*) when negative, condition one input of respective "NEGATIVE" AND circuits **470*a* through 477*a*. It should be noted that these negative AND circuits 470*a* through 477*a*** are conditioned when the manifestations of the bits 10 through 17, stored in the Memory Register, represent binary 0's.

During Instruction time, a positive signal on the line INST TIME (Fig. 4*c*) conditions one input of an AND circuit **439*b* so that the positive A10(D1) signal is gated through this AND circuit and a cathode follower 440*b*,** to provide an I10(D1) signal (a one microsecond duration signal, occurring at 10 time, of an Instruction cycle)

on the line MEM REG TO INST REG. This I10(D1) signal is fed to the Operation portion AND circuits 401a through 405a (Fig. 4a) and to the Address Register portion AND circuits 435a through 439a (Fig. 4b) and will pass through THE particular AND circuits, selectively conditioned by positive outputs on the lines MR1 through MR 9, and the outputs, of these selectively conditioned AND circuits, pass via cathode followers 407a through 411a and 440a through 443a respectively, to selectively turn ON, corresponding ones only, of the triggers 413a through 417a, and 444a through 447a. Thus, the setting of the Memory Register Delay Units storing manifestations of the binary —1— or binary —0— characteristics of bits 1 through 9 is transferred bodily to the operation triggers (bits 1 through 5) of the Instruction Register, and to the triggers of the Address Register (bits 6 through 9) of the Instruction Register. Simultaneously, the signal I10(D1) feeds to the Sign AND circuit 400a (Fig. 4a) and, provided that the Sign of the word stored in the Memory Register is negative, under which conditions the line MR S is positive, this signal I10(D1) passes through the conditioned AND circuit 400a and via a cathode follower 406a to turn ON, the Sign trigger 412a.

The negative "clamp" signal on line L102 (see Fig. 3a), which feeds to the various Delay Units D throughout the machine, for example, to the Delay Units comprising the storage elements, per se, of the Memory Register, is passed through an inverter 436b (Fig. 4c) a delay line 437b of the type as described above, and a cathode follower 438b, to a line DELAYED CLAMP, which conditions one input of an AND circuit 430b. The other input to this AND circuit 430b is the positive I10(D1) signal on the line MEM REG TO INST REG. The output of this AND circuit 430b passes via an inverter 431b and cathode followers 432b and 433b to the line —MR TO ADR CTR, which goes negative when the Memory Register is to be gated to the Instruction Register. This negative signal on line —MR TO ADR CTR feeds to the negative AND circuits 470a through 477a, and passes through those particular negative AND circuits which are selectively conditioned by negative signals signifying that a binary 0 representation exists in selected ones of the lines MR 10 through MR 17. Thus, these signals pass selectively through the negative AND circuits 470a through 477a and via negative OR circuits 478a through 485a and cathode followers 486a through 493a to turn OFF selected ones of the triggers 401b through 408b, respectively. Thus, if a binary 0 is stored in a particular bit storage element, of the Memory Register (that is in certain ones of the storage elements for bits 10 through 17) the respective trigger, of the Address Counter (bits 10 through 17) is pulled OFF. For example, if the Memory Register 10 bit is a binary 0, then the line MR 10 (Fig. 4b) feeding to the negative AND circuit 470a, is negative. The negative signal on line —MR TO ADR CTR is then passed through this conditioned negative AND circuit 470a, the negative OR circuit 478a and the cathode follower 486a to turn OFF the trigger 401b, indicative of the "10" bit stored in the 10 bit storage element of the Memory Register.

Thus, during an instruction cycle, the Instruction Register is set to the holding of the Memory Register or in other words the Memory Register is "dumped" into the Instruction Register.

The Address Counter sub-portion of the Instruction Register comprising triggers 401b through 408b (Figs. 4b and 4c) is connected, to count "DOWNWARD," which is the reason that each trigger of this counter is RESET ON, with each trigger signifying that a binary 1, is stored. As each trigger is so reset ON in the manner as described above, those triggers, which change from an OFF to an ON condition, emit negative, "short duration" carry pulses, from their left plate, to the binary input of the succeeding order. Therefore, when these triggers 401b through 408b are reset ON, as described above, by the negative I4(D3) signal, this signal, of three microseconds duration, exists long enough, so that the "short duration" carry pulses, from one order trigger to a succeeding order trigger, are dissipated, the triggers being thus clamped ON by the longer duration, three microsecond signal. Subsequently, as the Memory Register is dumped into the Instruction Register, certain stages are selectively flipped OFF, to indicate binary 0's, but no carry pulse is generated when a trigger is flipped OFF, since the left plate goes from a negative to a positive potential, and such a positive signal from one trigger to the binary input of a succeeding trigger has no effect. There is no connection from the right plates of these to succeeding triggers of the Address Counter. During certain Instructions involving Shifting the Memory Register thus dumps into the Instruction Register, the operational part, calling for an operation involving a Shift, into the Address Register part, anything desired while into the Address Counter is dumped an indication of the amount of Shift desired.

During certain Execute cycles, for example, during Multiply, or Divide operations, an E4 (D1) signal on the line RESET ADR CTR (Fig. 4b) feeds via an OR circuit 464a, an inverter 465a and a cathode follower 466a to the line ADR CTR RESET. The negative signal, thus developed on this line ADR CTR RESET is effective to turn triggers 401b through 408b (Figs. 4b and 4c) ON. Thereafter an E9 (D1) signal on line "34 to ADR CTR" (Fig. 4c) passes via an inverter 434b and a cathode follower 435b to a line "TO SET IN 34." The negative signal thus emitted to this line "TO SET IN 34" passes via the negative OR circuits 478a (Fig. 4b) 479a, 481a, 482a, 483a and 485a, and via cathode followers 486a, 487a, 489a, 490a, 491a and 493a, to triggers 401b, 402b, 404b, 405b, 406b and 408b respectively, to set said triggers OFF. Thus triggers 401b, 402b, 404b, 405b, 406b and 408b are OFF while triggers 403b and 407b are ON. When acting as a binary counter, trigger 408b is regarded as the "1" stage, trigger 407b is the "2" stage, trigger 406b is the "4" stage, trigger 405b is the "8" stage, trigger 404b is the "16" stage, trigger 403b is the "32" stage, trigger 402b is the "64" stage and trigger 401b is the "128" stage. As the Counter counts downward, if stages 403b and 407b are ON and all other stages OFF, a count of 34 is required to step the counter to zero. If all stages are reset ON, a count of 255 is required to step the counter to zero.

The Address Counter is "stepped" by inputs to the "1" input trigger 408b of the Counter as the line STEP ADR CTR (at the right in Fig. 4c) is rendered positive by the control circuits to condition one input of an AND circuit 441b. As Clock pulses occur on a line L103, these pulses are passed via a cathode follower 444b to the other input of this AND circuit 441b whose output is fed via a cathode follower 442b and an inverter 443b to the binary input of the trigger 408b of the Address Counter. As the pulses on line L103 occur at all times and at a one megacycle rate, a pulse is emitted from the inverter 443b and the counter is stepped one count for each microsecond that the line STEP ADR CTR is positive. This trigger 408b, when pulsed, shifts alternately, to ON and OFF conditions as successive pulses occur on the line L103. As it shifts from an OFF to an ON condition, a negative signal is emitted from the left plate and passes via a cathode follower 421b to the binary input of the adjacent trigger 407b which thus assumes ON and OFF conditions alternately as it receives these negative signals from trigger 408b. Trigger 407b, in turn, emits a negative signal directly to the binary input of its adjacent trigger 406b, when it goes from an OFF to an ON condition. In like manner, the trigger 406b on going from OFF to ON, emits negative signals via cathode followers 420b and 410b to its adjacent trigger 405b; trigger 405b emits negative signals, directly to the binary input of its adjacent trigger 404*b*; trigger 404*b* emits negative signals via a cathode follower 409*b* to the binary input of its adjacent trigger 403*b*; trigger 403*b* emits negative signals directly to the binary input of its adjacent trigger 402*b* and the trigger 402*b* emits negative signals directly to the binary input of the trigger 401*b*.

It should be noted that the left plate output of the Sign trigger 412*a* (Fig. 4*a*) is fed via a cathode follower 418*a* to a line IRS OFF (Instruction Register Sign OFF) which is positive, when the trigger 412*a* is OFF. The left and right plates of triggers 413*a* through 417*a* (Fig. 4*a*) emit signals via cathode followers 419*a* through 428*a*, respectively, and the outputs of these cathode followers feed, via lines OPN REG $\overline{1}$, OPN REG 1, OPN REG $\overline{2}$, OPN REG 2, OPN REG $\overline{3}$, OPN REG 3, OPN REG $\overline{4}$, OPN REG 4, OPN REG $\overline{5}$, and OPN REG 5, respectively, to the Operation Decoder. The notation of OPN REG $\overline{5}$, for example, signifies that the line is positive when the 5 bit of the Operation portion of the Instruction Register, contains a binary 0, the short horizontal line above the 5 ($\overline{5}$) indicating that when this line is positive, NO binary 1 is contained, in that bit of storage. A positive signal on line OPN REG 5, however, indicates that there IS a binary 1 stored in that particular bit of storage. The Operation Decoder (described below) decodes the permutations represented by the joint ON and OFF conditions of the triggers storing bits 1 through 5, to determine which type of operation the Machine is to perform.

The outputs of triggers 444*a* through 447*a* (Fig. 4*b*) pass via cathode followers 448*a*, through 451*a*, respectively, to the lines ADR REG 6 through ADR REG 9, respectively, the latter lines being positive, when the trigger conditions indicate the presence of binary 1's. The outputs from the right plates of the triggers 401*b* through 408*b* (Figs. 4*b* and 4*c*) of the Address Counter are passed via cathode followers 411*b* through 418*b*, respectively, to lines ADR CTR 10 through ADR CTR 17, respectively, while on the other hand the output from the left plate of the trigger 405*b* is passed via a cathode follower 419*b* to line ADR CTR $\overline{14}$; the output from the left plate of the trigger 406*b* is passed via a cathode follower 420*b* to line ADR CTR $\overline{15}$; the output from the left plate of trigger 407*b* is passed via a cathode follower 421*b* to line ADR CTR $\overline{16}$; and the output from the left plate of trigger 408*b* is passed via a cathode follower 422*b* to line ADR CTR $\overline{17}$. The lines ADR CTR 10 through ADR CTR 17 feed to the negative AND circuit 445*b* (Fig. 4*c*). These lines ADR CTR 10 through ADR CTR 17, are negative, when the triggers 401b through 408*b* respectively are OFF. When all these triggers are OFF, the holding of the Address Counter is zero. If one or more of the lines ADR CTR 10 through ADR CTR 17, is positive, the output of the AND circuit 445*b* is positive and via the cathode follower 446*b* drives line "ADR CTR NOT 0" positive. Hence this line is positive, when the Address Counter is NOT set to indicate zero. If all triggers 401*b* through 408*b* are OFF, the counter IS at zero, the lines ADR CTR 10 through ADR CTR 17 are negative, all inputs to the negative AND circuit 445*b* are negative and its output via the cathode follower 446*b* drives the line "ADR CTR NOT 0" negative. The outputs on the lines ADR REG 6 through ADR REG 9 (Fig. 4*b*) and on the lines ADR CTR 10 through ADR CTR 17 (Figs. 4*b* and 4*c*) are fed via the Deflection Switches (see Fig. 1*e*) to the Deflection Register, described below, and to the Instruction Counter (Figs. 1*e* and 4*d*). This Instruction Counter controls the selection of addresses, in memory, during instruction time.

Referring to Fig. 4*d*, this Instruction Counter comprises trigger circuits 465*b* through 476*b*, operable individually to ON and OFF conditions, to SET an Address in the Counter and operable in cascade thereafter, to step down the Counter. Each of the triggers 465*b* through 476*b* is connected, respectively, to one of the group of cathode followers 477*b* through 488*b* feeding, respectively, to the lines INST CTR 6 through INST CTR 17. The cathode followers 483*b* through 488*b* have the respective output lines INST CTR 12 through INST CTR 17 which are all connected to the inputs of an AND circuit 489*b*.

The outputs of the triggers 472*b* through 476*b* not only feed to the cathode followers 484*b* through 488*b* but also feed to the binary input of the next trigger. Likewise, triggers 466*b* through 470*b* feed to the binary inputs of their respective next triggers. These latter connections are rendered operative only when a particular trigger shifts from an ON to an OFF condition, to thereby emit a negative signal, from its right plate to the binary input of a next trigger, to shift the latter from one condition to the other. For example, as trigger 476*b*, goes from ON to OFF, a negative output is emitted, from its right plate, and fed via the cathode follower 488*b* to the binary input of the next trigger 475*b*. The trigger 475*b* is thereby shifted to an ON condition, if it happened to be OFF, or to an OFF condition if it happented to be ON. Thus, it is seen that triggers 476*b* through 471*b* and triggers 470*b* through 465*b* are connected, in cascade. This Instruction counter is stepped by an E/R 10 (D2) or an E10 (D2) pulse on line "STEP INST CTR" which conditions one input of an AND circuit 462*b*. A second input to this AND circuit 462*b* is conditioned by an A11 (D1) Clock pulse and when those two inputs, are positive, as sharp positive pulses occur on line L103, at a one megacycle rate, one sharp pulse is passed by the AND circuit 462*b* and via a cathode follower 463*b* and an inverter 464*b* to the binary input of the "1" cascaded trigger 476*b*. This Instruction Counter is thereby stepped, one count, for each negative pulse thus fed to the binary input of this counter input trigger 476*b*. This negative signal thus steps the Instruction Counter, one count, so that, the next Instruction read from Memory, is at the Address in Memory designated by the next sequential number. These negative input signals to the Counter, cause trigger 476*b* to shift, ON and OFF alternately, and when it shifts OFF, it produces a negative pulses which, as described above, is applied to the binary input of the next trigger 475*b*, to thereby shift it from one condition to the other, all in a now well-known manner. Successive pulses, applied to trigger 476*b*, will cause the triggers 475*b* through 471*b* to shift and assume different permutations of ON and OFF conditions, each permutation selectively and exclusively representative of the number of pulses applied to the input trigger 476*b* of the Instruction Counter. When all the triggers 476*b* through 471*b* are ON, all the outputs from their right hand plates are relatively positive, and these signals are fed, via the cathode followers 488*b* through 483*b* to the lines INST CTR 17 through INST CTR 12, respectively. The positive signals on these lines are also all fed, to the AND circuit 489*b*. Since now, all the inputs of the AND circuit 489*b* are relatively positive, its output is positive and is applied via a cathode follower 490*b*, to the binary input of the trigger 470*f*. Since this signal is positive, it can not flip the trigger 470*f* which is of the type which is responsive to negative pulses only, as described above. However, as the next Counter input pulse arrives and is applied to the input trigger 476*b*, the latter shifts OFF and thus removes a relatively positive potential from one input of the AND circuit 489*b*, so that the output of the AND circuit 489*b*, goes relatively negative, which is fed, via the cathode follower 490*b* to flip trigger 470*b*. Thus, it is seen, that with the triggers 471*b* through 476*b* all ON, a subsequent pulse, applied to the Counter input trigger 476*b*, does not have to ripple through each of the triggers 475*b* through 471*b*, in order to flip the trigger 470*b* but instead, immediately upon the shifting of this counter input trigger **476*b*, a pulse is effective via the AND circuit 489*b* and the cathode follower 490*b*, to flip the trigger 470*b***.

Triggers **470*b* through 465*b* are cascade-connected, in a manner similar to triggers 476*b* through 471*b*. Thus, various permutations of ON or OFF conditions are indicated by the signals on all the output lines of the Instruction Counter, INST CTR 6 through INST CTR 17. Normally, the Instruction Counter is stepped, one step, as just explained above, upon the completion of each Operation (as described presently) so that succeeding Instructions stored in Memory, are read from succeedingly numbered Address positions, in Memory. However, it is at times desired to break out of the normal sequence of a program and to transfer to another part of the program. Under these conditions, the line RESET INST CTR is driven positive, for three microseconds, specifically, at "7" time, of an Execute/Regenerate cycle. This positive signal on the line RESET INST CTR is applied to the right grids, of ALL the triggers 465*b* through 476*b***, to shift them ALL OFF. At the same time, signals, on the lines ADR REG 6 through ADR REG 9 (Figs. 4*b* and 4*d*) and ADR CTR 10 through ADR CTR 17 (Figs. 4*b*, 4*c* and 4*d*) are representative of the holding of the Address Register portion of the Instruction Register and of its Address Counter portion, respectively, and these inputs are fed (Figs. 1*e* and 4*d*) to one input of AND circuits **450*b* through 461*b*, respectively. The particular bit represenation of the Address Register or of the Address Counter representing binary 1's, will, as explained above, cause the respective lines containing these binary 1's only, to be positive. Thus, with one input of the AND circuits 450*b*, through 461*b*, selectively conditioned, the occurrence of an E/R 10 (D1) on the line SET INST CTR TO INST REG, permits signals to be passed through those respective AND circuits 450*b* through 461*b* only, which are conditioned by binary 1 representations, to the respective triggers 465*b* through 476*b***, pulling the triggers respectively and selectively, to an ON condition. Thus, it is seen that the holding of the Address Register and of the Address Counter, may be shifted or "dumped" into the Instruction Counter. After such an operation, the next Instruction will, of course, be read, from the particular Address dumped into the Instruction Counter and succeeding Instructions will be read, from succeeding Addresses, beginning at this now "dumped-in" Address as the stepping signals are applied to the line STEP INST CTR.

REGENERATION COUNTER

The Regeneration Counter is illustrated in Fig. 4*e* and comprises trigger circuits **401*c* through 410*c***. This Regeneration Counter is never reset, to any particular number, that is to any pre-chosen permutations of ON or OFF conditions. It may assume any happenstance permutation but thereafter it IS stepped sequentially through all successive ON and OFF permutations, to thus assume in one complete series of operations, Address indications representative of each and every Address on each cathode ray tube of Memory, and repeated operations merely repeat the methodical sequential selection of each and every such Address on each cathode ray tube, in Memory, so that a systematic interrogation of the complete raster on the cathode ray tubes is provided, for Regeneration purposes. As described below, the Deflection Register (see Fig. 1*e*) is controlled by the Regeneration Counter, during ALL Regenerate cycles AND during all Execute/Regenerate cycles.

The Regeneration Counter (Fig. 4*e*) is stepped, one step, during each and every Execute/Regenerate or Regenerate cycle, so that successively numbered Addresses are systematically Regenerated. The Regeneration Counter is thus stepped, one step, under control of a positive signal, on the line EX/RGN TIME (during Execute/Regenerate) or by a positive signal on the line RGN TIME (during Regenerate time) feeding to an OR circuit **495*b*. The output of this OR circuit passes via a cathode follower 496*b*, to condition one input of an AND circuit 497*b*. The other input to this AND circuit is an A4(D1) Clock pulse, which is gated through this conditioned AND circuit during every Regenerate or Execute/Regenerate cycle and via an inverter 498*b* and a cathode follower 499*b* is applied to the binary input of the Regeneration Counter input trigger 410*c*, thereby stepping the counter, one step, as will now be described. The triggers 410*c* through 401*c* are cascade-connected, in the order of descending reference numbers, so that as one trigger goes from ON to OFF, it emits a negative signal, to the succeeding lower reference numbered trigger, to shift it from one condition to the other. The outputs of the triggers 401*c* through 410*c* are passed via respective cathode followers 411*c* through 420*c***, to respective lines RGN CTR 6 through RGN CTR 15. As described in said above identified application of Fox et al., the effect of the "6" bit storage is rendered ineffective during all cycles involving Regeneration.

The Deflection Switches and the Deflection Register (Fig. 1*e*) are illustrated in more detail in block form, in Figs. 4*f*, 4*g* and 4*h*, taken collectively, side by side in that order. This Deflection Register is set to the holding of the address portion of the Instruction Register, during Execute Time, but is set to the holding of the Instruction Counter, during Instruction Time, and alternatively, is set, to the holding of the Regeneration Counter, during either Execute/Regenerate or Regenerate Time.

The Deflection Register (Figs. 4*f*, 4*g* and 4*h*) comprises triggers **460*c* through 472*c***, which represent respectively, the Sign bit, and bits 6 through 17, of the particular word, "Addressing Memory." Manifestations of bits, 6 through 15, are received by the Deflection Switches from the Regeneration counter (see also Fig. 1*e*) also from the Address portion of the Instruction Register and also from the Instruction Counter. The circuits for storing a representation of any one bit, are all similar to each other so that the description of one, given below, will suffice for all.

The circuits for the respective bits 16 and 17, of the Deflection Switches, receive inputs, only from the Address portion of the Instruction Register and from the Instruction Counter, and one such circuit will be described in detail presently, as well as the Sign bit representing circuit.

As described below, the Addressing of a full or of a half word, in Memory, depends upon whether the Sign, of a particular Address, is positive or negative. The Sign is NOT used for Addressing, during Regeneration cycles of any type, but only during Instruction and Execution cycles.

During Instruction time, the information, stored in the Instruction Counter, is to be dumped into the Deflection Register and since, during Instruction time, each Instruction comprises a half word only, circuits are provided and are so operative that the Sign bit representation during Instruction time, is always that of a positive Sign, or in other words, the Sign trigger, is set OFF.

During Execute time, the Sign may be positive or negative, to respectively cause operation on a full or on a half word. Thus, the holding of the Sign bit storage element of the Instruction Register is "dumped" into the Sign trigger, of the Deflection Register, during Execute time.

Referring specifically to Fig. 4*f*, an AND circuit **432*c*** is conditioned, during Execute time, by a positive signal on the line EX TIME, so that the signal, on the line IRS OFF, which is the output line, of the Instruction Register Sign trigger (see Figs. 1*e* and 4*a*) and is positive, when the Sign trigger is OFF, to thus indicate a positive sign, is also applied to this AND circuit **432*g* and is passed through to an OR circuit 433*c*** and a cathode follower 434*c* to a line 435*c*, which feeds to both a negative AND circuit 437*c* and to a plus AND circuit 438*c*. Thus, the signal on line 435*c* is positive, during Execute time, provided that the Sign trigger of the Instruction Register is OFF (to represent a positive sign) or is negative when the Sign trigger of the Instruction Register is ON (to represent a negative Sign). Thus, if the Sign is positive, the plus AND circuit 438*c*, is conditioned, while if the Sign is negative, the negative AND circuit 437*c*, is conditioned. An A2(D1) signal (lower left portion Fig. 4*f*) is passed via a cathode follower 426*c* to a line 427*c* connected to this plus AND circuit 438*c*, so that a positive one microsecond signal, occurring at 2 time of all character cycles is thus applied to this AND circuit, to several other AND circuits, and also, via an inverter 428*c* (Fig. 4*f*) and cathode followers 429*c* and 430*c* to a line 431*c* feeding to the negative AND circuit 437*c*. Thus, the signals on line 431*c*, are negative, at the same time that the signals are positive on line 427*c*. This negative signal on line 431*c* fed to the negative AND circuit 437*c*, passes therethrough, provided the latter is conditioned by a negative signal on the line 435*c*, and turns ON the trigger 460*c*. This trigger is the Sign trigger of the Deflection Register and when ON, indicates a negative Sign. If, however, the signal on line 435*c* is positive, which is an indication that the Instruction Register Sign trigger is OFF, then this line conditions one input of the plus AND circuit 438*c*, so that the positive, one microsecond A2(D1) signal, on line 427*c* is passed through this AND circuit 438*c*, to turn OFF the Sign trigger 460*c*. Thus, it is seen that, during Execution time, the holding of the Instruction Register Sign trigger is "dumped" into the Sign trigger 460*c* of the Deflection Register.

During Instruction time, since only half words are Addressed in Memory, the Sign trigger 460*c* must be turned OFF. This is produced by a positive signal on the line INST TIME, which feeds via the OR circuit 433*c* and the cathode follower 434*c*, to cause line 435*c* to go positive, to condition the plus AND circuit 438*c*, whereby the one microsecond A2(D1) positive signal on line 427*c* passes through this AND circuit to turn OFF the Sign trigger 460*c*. Thus, the Sign trigger 460*c*, is turned OFF, during every INSTRUCTION CYCLE. During Execute/Regenerate or Regenerate cycles, the holding of the Sign trigger 460*c* is immaterial, since only full words are addressed as described in said above identified application of Fox et al.

As stated above, the circuitry for each of the bits "6" through "15" is identical, so that a description of the "6" bit circuits will suffice for all.

During Execute/Regenerate time, a positive signal on the line EX/RGN TIME (extreme lower left corner Fig. 4*f*) is fed to a cathode follower 421*c*, but during Regenerate time, a positive signal, on the line RGN TIME, is fed to a cathode follower 422*c*. The outputs of both these cathode followers 421*c* and 422*c*, which are positive when their input lines are positive, pass via an OR circuit 423*c* and a cathode follower 424*c* to line 425*c*. Thus, this line 425*c* is positive, during all Regenerate or Execute/Regenerate cycles. This line 425*c* conditions one input of several AND circuits, for example, the AND circuit 441*c* (Fig. 4*f*) which is part of the "6" bit circuitry. It should also be noted that the AND circuit 440*c* is conditioned, during Execute time, by a positive signal on the line EX TIME, and the AND circuit 439*c* is conditioned, during Instruction time, by a positive signal on the line INST TIME. These AND circuits 439*c*, 440*c* and 441*c* receive inputs, respectively, from the "6" bit of the Instruction Counter, the "6" bit of the Address portion of the Instruction Register and the "6" bit of the Regeneration Counter. Thus, during Instruction time, while the AND circuit 439*c* is conditioned, the holding of the "6" bit, of the Instruction Counter, via line INST CTR 6, is passed through this AND circuit 439*c*, an OR circuit 443*c* and a cathode follower 444*c*, to line 445*c*. During Instruction time, line 445*c* is positive, provided a binary 1 is contained in the Instruction Counter "6" bit, but is negative, if a binary 0 is contained in that particular bit. If the signal on line 445*c* is negative, signifying a binary 0, then the negative AND circuit 446*c* is conditioned, but if the signal on 445*c* is positive, the plus AND circuit 447*c* is conditioned. If the negative AND circuit 446*c* is conditioned, the one microsecond negative A2(D1) signal, on line 431*c* passes through, to turn OFF, the trigger 461*c*, to thereby represent a binary 0. If, however, the AND circuit 447*c* is conditioned, the positive, one microsecond A2(D1) signal, on line 427*c* passes through this AND circuit 447*c* to turn ON, the trigger 461*c* to thereby represent a binary 1. Thus, the holding of the Instruction Counter "6" bit, is "dumped" into the "6" bit trigger 461*c* of the Deflection Register, during all Instruction cycles. In a similar manner, the holding of the Address portion of the Instruction Register "6" bit feeding via line ADR REG 6 to the AND circuit 440*c*, which is conditioned during Execute time, is passed through to an OR circuit 443*c* and via the circuitry, just described above, to cause the trigger 461*c* to be set, ON or OFF, as the conditions require. Thus, during Execute time, the holding of the Instruction Register "6" bit is dumped, into the "6" bit trigger 461*c*. The holding of the Regeneration Counter "6" bit is fed via line RGN CTR 6 to the AND circuit 441*c*, which is conditioned, as described above, during all Regenerate or all Execute/Regenerate cycles, by a positive signal on line 425*c*. The output of this AND circuit 441*c* is passed via the OR circuit 443*c*, as just described, to gate signals, to set the trigger 461*c*, to an ON or OFF condition, as required. Thus, it is seen that the holdings of the Regeneration Counter "6" bit, the Instruction Register "6" bit or the Instruction Counter "6" bit respectively, is dumped into the "6" bit trigger 461*c* of the Deflection Register, during a Regenerate cycle, an Execute cycle or during an Instruction cycle. Identical circuitry serves to "dump" the holding of the bits "7" through "15" respectively, of the Regeneration Counter, the Instruction Register, and the Instruction Counter into corresponding bit storing triggers, of the Deflection Register.

Referring now to Fig. 4*h*, it will be noted that the triggers 471*c* and 472*c* for bits "16" and "17," respectively, of the Deflection Register, do not receive inputs, from the Regeneration Counter, since, as explained above, the Regeneration Counter stores representations of bits 6 through 15 only. During Instruction time, a positive signal, on the line INST TIME (Fig. 4*h*) conditions an AND circuit 450*c* and the holding of the Instruction Counter bit 16, via line INST CTR 16, is passed through this conditioned AND circuit 450*c* to line 451*c*, while during Execute time, a positive signal on the line E TIME conditions one input to an AND circuit 452*c* so that the holding of the Address portion of the Instruction CTR bit 16, applied via line ADR CTR 16 is passed through this AND circuit to a line 453*c*. Signals on these lines 451*c* and 453*c* are passed through an OR circuit 454*c* and a cathode follower 455*c* to a line 456*c*. A negative signal on line 456*c* conditions a negative AND circuit 457*c* while a positive signal on the same line, conditions a plus AND circuit 458*c*. The negative AND circuit 457*c*, when conditioned, passes the negative, one microsecond A2 (D1) signal, on the line 431*c*, to turn OFF, the "16" bit storing trigger 471*c* to thereby represent a binary 0, while the plus AND circuit 458*c*, when conditioned, passes the positive, one microsecond A2 (D1) signal on line 427*c*, to turn ON, the "16" bit storing trigger 471*c* to thereby represent a binary 1. Thus, it is seen that the trigger 471*c* is turned ON or OFF, according to the holding of the "16" bit storage element of the Address Counter part of the Instruction Register during Execution time, or according to the holding of the "16" bit storage element of the Instruction Counter, during Instruction time. During Regeneration time, the line 456c (Fig. 4h) is negative, since there is NO coincidence of positive signals, either to the AND circuit 450c or to the AND circuit 452c. Thus, the negative AND circuit 457c is conditioned during all Regeneration cycles, to pass the negative A2 (D1) signal, on line 431c, to turn OFF the trigger 471c, and thereby represent only a binary 0. The circuitry for the Deflection Register "17" bit storage element is identical to that just described for the "16" bit. During Regeneration, however, all tubes are unblanked, as described in said above, identified application of Fox et al.

The output from the right plates of the triggers 460c through 472c of the Deflection Register representing the Sign and bits 6 through 17, respectively, are passed through respective cathode followers 476c through 488c to the respective lines SIGN (−) and DEF REG 6 through DEF REG 17. Other outputs of the Deflection Register are from the LEFT plate of the Sign trigger 460c via a cathode follower 474c, to the line SIGN (+); from the LEFT plate to the "$\overline{6}$" bit trigger 461c via a cathode follower 475c to a line DEF REG 6, from the LEFT plate of the "16" bit trigger 471c via a cathode follower 489c to a line DEF REG $\overline{16}$ (positive when the Deflection Register 16 bit contains a binary 0), and from the LEFT plate of the "17" bit trigger 472c via a cathode follower 490c to a line DEF REG $\overline{17}$.

OPERATION DECODER

Details of the Operation Decoder are shown in Figs. 4i and 4j. The Operation Decoder receives ten inputs derived from the manifestations of the 1 to 5 bits, inclusive, comprising the Operation portion of the Instruction Register (see also Fig. 4a) and converts the permutations of the binary 1 and binary 0 holdings, of these 5 bits, into thirty-two separate outputs, only one of which is positive, at any one time. These ten inputs to the Operation Decoder are lines OPN REG 1 through OPN REG 5 and OPN REG $\overline{1}$ through OPN REG $\overline{5}$. These lines are positive, as stated above, when the respective bits contain binary 1's in the case of lines OPN REG 1 through OPN REG 5, or binary 0's in the case of the lines OPN REG $\overline{1}$ through OPN REG $\overline{5}$. Different combinations of these lines feed to the 32 AND circuits of Figs. 4i and 4j, each AND circuit having 5 inputs, so that when all 5 inputs to a particular AND circuit, are positive, its output is positive and thereby energizes, a single selected line, to thus produce the particular operation indicated by the decoded permutation of the Machine by rendering certain control circuits effective. For example, the AND circuit 401d receives inputs from lines OPN REG 1, OPN REG $\overline{2}$, OPN REG $\overline{3}$, OPN REG $\overline{4}$ and OPN REG $\overline{5}$. Thus, if the particular permutation of binary 1 and binary 0 bit values of the 1 through 5 bits of the Instruction Register are 10000, all five inputs to this AND circuit 401d, are positive, and its positive output feeds, via a cathode follower 402d, to drive line MPY positive. Thus, it is seen that if the permutation of binary 1 and binary 0 values of bits 1 through 5 of the Instruction Register, is 10000, the operation called for by the Machine is MULTIPLY. All thirty-two outputs of the Operation Decoder are shown, and they are respectively driven positive, by identical AND circuits and cathode followers, so that no further description is deemed necessary, it being obvious, that the inputs to the respective AND circuits, comprise different combinations of the above ten input lines, so that thirty-two different outputs are available, each of which calls for a particular operation. These outputs as listed on the left side of the Figs. 4i and 4j, reading from top to bottom, are STOP, TR OV (Transfer on Overflow) TR 0 (Transfer on Zero), R SUB (Reset and Subtract) NO OP (No Operation), R ADD (Reset and ADD), STORE, STORE MQ (Store Multiplier-Quotient), MPY (Multiply), DIV (Divide), L LEFT (Long Shift Left), ACC LEFT (Accumulator Shift Left), READ, WRITE, REWIND and SENSE. The outputs of the right side of the Operation Decoder listed to the right proceeding from the top to the bottom in Figs. 5a and 5b are: TR (Transfer), TR + (Transfer on Plus), SUB (Subtract), SUB AB (Subtract Absolute value), ADD, ADD AB (Add Absolute value) STORE ADR (Store Address), LOAD MQ (Load MQ meaning to Read Out of Memory into the MQ Register to thus load it), MPY R (Multiply and Round), ROUND, L RIGHT (Long Shift Right pertaining to the shifting of both the MQ and accumulator Register units jointly), A RIGHT (Shift Accumulator Right, pertaining to the shifting of the Accumulator Register, alone, to the right), READ B (Read Backwards), WRITE EOF (Write End Of File), SET DR (Set Drum) and COPY.

It is apparent, of course, that most of these Instructions pertain to arithmetic operations, which include manipulation of information through the Adder, Accumulator Register and Multiplier Quotient Register. It should also be apparent that certain of these operations pertain to Input/Output Units (not shown) for example, such Instructions as READ, WRITE, REWIND, SENSE, READ BACKWARDS, WRITE END OF FILE, SET DRUM and COPY. These Instructions pertain to an Input/Output device such as shown and described in detail for example in, the co-pending application of Bartelt et al., Serial No. 401,648, filed December 31, 1953. Such an Input/Output device comprises a part of the Electronic Data Processing Machine of which the novel Calculator, comprising the present invention is a part. Their particular operation has no immediate bearing upon the operation of the Calculator but, as stated above, merely may be used to supply data to, or receive data from, the Multiplier Quotient Register.

CONTROL CIRCUITS

Referring again to Fig. 1b of the composite diagram, it should be noted that certain circuits are represented by blocks labeled Multiply, Divide, Tally Counter; Address, Sign and Address Counter Mixer circuits; Carry and Overflow Triggers, Execution Timers, and Mixing Circuits. It is the function of these circuits to develop certain timed pulses which will control the operation of the arithmetic unit per se. The circuitry of these blocks will now be described and the development of the various pulses on the timing Diaphragms given. Later, the Arithmetic Unit, per se, will be described in detail and still later Timing Diagram signals are again referred to, as the various operations performed by the machine are fully described.

Refer now to Fig. 5a which shows the circuitry for the Carry and Overflow triggers. If in the operation of the Arithmetic Unit, a carry output is emitted from the Q position of the Adder which is an end carry, the line ADDER (Q) goes positive and conditions one input of the AND circuit 501a. While this AND circuit is conditioned, an E/R 4 (D1) signal passes through the AND circuit and the diode 502a to turn ON the trigger 503a. Trigger 503a when ON, emits a positive signal via the cathode follower 506a to the line QC (this line when positive indicating that there has been a carry from the Q position). The trigger 503a, when OFF, represents a condition of no carry and at that time emits a positive output via the cathode follower 505a to the line NO Q C. The trigger 503a is reset to an OFF condition, every character cycle, by an A1 (D1) signal feeding via the diode 504a.

The trigger 509a is the Overflow trigger. This trigger may be turned ON by a positive signal on the line AD (1) C/ACC (1) OV, which signifies that there has been a carry from the Adder 1 position or that a binary "1" has been shifted from the Accumulator Register 1 position to the overflow positions Q or P. This positive signal feeds through the diode 507a to turn the trigger 509*a* ON. Trigger 509*a*, when ON, emits a positive signal via cathode follower 510*a* to the line OV TRIG ON. The trigger 509*a* is reset OFF, when a positive signal occurs on the line R OV TR (signifying reset over flow trigger) which feeds through the diode 508*a*.

Refer now to Fig. 5*c*, which shows the circuits for indicating the particular type of address called for; that is full, even half or odd half words, the Signs of the Accumulator Register, the Memory Register and the MQ Register; and signals for indicating whether or not the Address Counter is at a count of zero. A positive output from the Accumulator Register Sign position, via line ACC (S) signifies that the Sign is negative. The signal on the line ACC (S) feeds via a cathode follower 550*a* to the line ACC (−), which is positive when the Accumulator Register contains a negative sign. The signal on the line ACC (−) feeds via an inverter 522*a* and a cathode follower 554*a* to the line ACC (+), which line is positive when the Accumulator Register Sign is positive.

Similar circuits are used for giving indications of the Memory Register Sign and the MQ Register Sign. A signal on the line MR (S) passes via a cathode follower 551*a* to the line MR (−), which is positive when the Memory Register Sign is negative. A signal on the latter line, passes via an inverter 553*a* and a cathode follower 555*a* to the line MR (+). It follows that line MR (+) is positive when the Memory Register Sign is positive.

The MQ Register sign position emits an output via the line MQ (S), which is positive when the Sign of the MQ Register is negative. The signal on this line MQ (S) feeds via a cathode follower 562*a* to line MQ (−), which is positive when the MQ Register Sign is negative. The signal on the line MQ (−) feeds via an inverter 563*a* and a cathode follower 564*a* to the line MQ (+), which is positive when the MQ Register Sign is positive.

If both the Accumulator Register and the Memory Register signs are positive, lines ACC (+) and MR (+) are positive and feed to the AND circuit 566*a* which emits a positive signal to an OR circuit 558*a*. If however, both the Accumulator Register and the Memory Register Signs are negative, the AND circuit 557*a* is conditioned by positive signals on lines ACC (−) and MR (−) and emits positive output to the OR circuit 558*a*. Therefore, the output of the OR circuit 558*a* is positive when both the Accumulator Register and Memory Register Signs are alike, this signal passing via a cathode follower 560*a* to the line AMSA, which line is positive when both the Accumulator Register and the Memory Register Signs are alike. The output of the OR circuit 558*a* is negative, unless the signs are alike, and this signal is passed via an inverter 559*a* and the cathode follower 561*a* to the line AMSU. It follows that this line AMSU is positive when the Accumulator Register and the Memory Register Signs are unlike. A comparison is also made of the Memory Register and the MQ Register signs. If the Memory Register Sign is positive and the MQ Register Sign is positive, both inputs to the AND circuit 565*a* are positive, the output of which feeds to the OR circuit 567*a*. Likewise, if the Memory Register Sign is negative and the MQ Register Sign is negative, both inputs to the AND circuit 566*a*, via lines MR (−) and MQ (−) are positive, and its positive output feeds to the OR circuit 567*a*. It follows then that the output of the OR circuit 567*a*, is positive when both the Memory Register Sign and the MQ Register Sign are positive or if the Memory Register Sign and the MQ Register Sign are positive. The output of this OR circuit 567*a* feeds via a cathode follower 570*a* to the line MMSA. It follows the latter line is positive when the Memory Register Sign and MQ Register Sign are alike. The output of the OR circuit 567*a* also passes via an inverter 569*a* and a cathode follower 571*a*, to a line MMSU, which is positive when the Memory Register and the MQ Register Signs are unlike.

The line ADR CTR NOT 0, which is positive when the Address Counter has not reached the count of zero, feeds via the cathode follower 572*a* to line ADR CT NO ZERO. It follows the latter line is also positive when the Address Counter has not reached a count of zero. The signal on this line ADR CT NO ZERO is also fed via an inverter 573*a* and a cathode follower 574*a* to a line ADR CT ZERO. The line ADR CT ZERO is positive when the Address Counter has reached the count of zero.

As explained above, when an address is given for read out or read into Memory, if the Sign of the address is negative, a full word is addressed, but if the sign is positive, a half word is addressed. Whether the half word addressed is an odd half word or an even half word is dependent upon the condition of the Deflective Register 17 bit.

Referring to the circuits in the right portion of the Fig. 5*c*, if the Sign of the address is negative, the line SIGN (−) is positive and feeds via a cathode follower 582*a* to the line FULL and also via the OR circuit 580*a* and a cathode follower 581*a* to a line F/E HALF. The lines FULL and F/E HALF are positive when a full word is addressed. If the Sign of the address is positive, then the line SIGN (+) is positive to condition one input of each AND circuit 575*a* and 577*a* and also feed via a cathode follower 578*a* to line HALF. The line HALF IS positive when a half word is addressed. The AND circuit 575*a* receives a second input via line DEF REG 17, which is positive, as explained above, when the Deflection Register 17 bit contains a binary 1. The output of the AND circuit 575*a* feeds via a cathode follower 576*a* to a line ODD HALF, which is positive when a half word is addressed and the address is odd as determined by the Deflection Register 17 bit containing a binary 1. The second input to the AND circuit 577*a* is via line DEF REG 17 which is positive when the Deflection Register 17 bit contains a binary 0. Both inputs to the AND circuit 577*a* are positive when a half word is addressed and address is even. Therefore the output of the AND circuit 577*a* is positive when an even half word is addressed and passes via line 579*a*, the OR circuit 580*a* and the cathode follower 581*a* and to line F/E HALF. It follows then that line F/E HALF is positive when a full word or even half word is addressed. The output signals shown on Fig. 5*c* are utilized in the Execution Timer and Mixing Circuits, as described below.

Refer now to Fig. 6*c* which shows the Timing Diagram for a Transfer operation. During the Instruction time preceding a Transfer operation a half word is read out of Memory, via Memory Busses S and 1 through 17 or via Memory Busses 18 through 35 to the Memory Register positions S and 1, through 17. The signal which gates the half word Instruction read from Memory via the Memory Busses to the Memory Register, occurs at 19 (D1) time. Thereafter, at I10 (D1) time, the half word Instruction in the Memory Register is shifted to the Instruction Register which is comprised of a Sign trigger, an Operation Register, an Address Register and an Address Counter. These two signals, at I9 (D1) and I10 (D1) times, for gating a half word Instruction from Memory BUSSES to the Memory Register and from the Memory Register to the Instruction Register, occurs during every Instruction cycle. The next signal shoyn on the Timing Diagram of Fig. 6*c* is an I11 (D1), which signals GO TO EX/RGN. This signal occurs whenever the particular Instruction read from Memory requires an Execute/Regenerate cycle as does a Transfer Instruction. This GO TO EX/RGN signal, controls the cycle Timer, described above, to send the machine into an Execute/Regenerate cycle.

At "7" time, of the Execute/Regenerate Cycle, occurring during the Transfer operation, the Instruction Counter is reset, as described above, as line RESET INST CTR goes positive for three microseconds. Thereafter at "10" time, a one microsecond signal occurs on line SET INST CTR TO INST REG, which causes the holding of the Address Register and Address Counter portions of the Instruction Register to be transferred to the Instruction Counter, as described above. The next Instruction will be read from this address transferred to the Instruction Counter. At 10 time of the Execute/Regenerate cycle, an End of Operation signal is given this particular signal being an E/R 10 (D2) pulse. This End of Operation pulse feeds to the Cycle Timer described above to cause the machine to go into either Regenerate time or into the next Instruction time. The End of Operation pulse is normally used to generate a signal to step Instruction Counter one count, however, during a Transfer operation, this stepping of the Instruction Counter, by one count, is suppressed.

Refer now to Fig. 5*z* in particular to AND circuits 551*c* and 556*c*. If the Instruction addressed by the Instruction Counter is stored at an even half word address, then the line F/E HALF conditions one input of the AND circuit 551*c*. The I9(D1) signal is passed through the conditioned AND circuit 551*c* and via an OR circuit 552*c*, an amplifier 553*c* and a cathode follower 554*c* to drive the MEM BUS (S to 17) TO MR (S to 17) positive. A positive signal on the latter line will, as described below, connect Memory Busses S and 1 through 17 to Memory Register positions S and 1 through 17. If, however, the particular Instruction addressed by the Instruction Counter via the Deflection Register is stored at an odd half word address, the AND circuit 556*c* is conditioned by a positive signal on the line ODD HALF. The I9 (D1) signal then is passed via the conditioned AND circuit 556*c* and via an OR circuit 557*c*, an amplifier 558*c* and a cathode follower 559*c* to drive the line MEM BUS (18 to 35) to MR (S to 17) positive. A positive signal on the latter line, will, as described below, connect Memory Busses 18 through 35, to the Memory Register positions, S and 1 through 17 respectively.

The setting of the Instruction Register to the holding of the Memory Register occurs at I10(D1) time during every Instruction cycle, and is independent of the type operation called for by the Instruction. The development of this signal was described above, during the explanation of the circuits of the Instruction Register.

The GO TO EX/RGN signal occurring at I11(D1) time, as required in a Transfer operation, is developed by the circuits shown on Fig. 5*ak*. When the operation is Transfer, the output of the Operation Decoder (Figs. 4*i* and 4*j*) described above, drives the line TR feeding to the OR circuit 575*d* positive. The output of the OR circuit 575*d*, via line 576*d*, conditions one input of the AND circuit 577*d* and an I11(D1) signal passes via the conditioned AND circuit, line 578*d*, an OR circuit 583*d*, an amplifier 584*d*, and a cathode follower 585*d*, to the line GO TO EX/RGN. This GO TO EX/RGN signal is fed to the Cycle Timer (Figs. 3*c* and 3*d*) described above, to cause the machine to go into an Execute/Regenerate cycle.

The signal to reset the Instruction Counter is developed by the circuitry of Fig. 5*ba* whereby if the operation is Transfer, the output of the Operation Decoder, as explained above, drives the line TR positive. This positive signal on the line TR via an OR circuit 582*e* and 583*e* conditions one input of an AND circuit 584*e*.

During Execute/Regenerate cycles the line EX/RGN time is positive to condition one input of an AND circuit 502*g*. While the AND circuit 502*g* is conditioned, positive signals on lines A7(D1), A8(D1) and A9(D1) pass via an OR circuit 501*g* and the AND circuit 502*g* to line E/R7(D3). It follows that the signal on the latter line is a three microsecond positive signal occurring at 7 time of every Execute/Regenerate cycle. As this AND circuit 584*e* is conditioned, the E/R7(D3) signal is passed through the AND circuit 584*e* and via an amplifier 586*e* and a cathode follower 588*e* to the line R INST CTR. The output of the OR circuit 582*e* via line 583*e* also conditions an AND circuit 585*e* so that an E/R 10 (D1) signal passes via the AND circuit 585*e*, an amplifier 587*e* and a cathode follower 589*e* to the line SET INST CTR TO INST REG. A positive signal on the latter line, as explained above, causes the Instruction Counter to be set to the holding of the Address Register and Address Counter portion of the Instruction Register.

Referring to Fig. 5*af*, the End of Operation signal is developed as the line TR is positive and via an OR circuit 520*d* and line 521*d* conditions an AND circuit 522*d*. As the AND circuit 522*d* is conditioned an E/R 10 (D2) signal passes through the AND circuit 522*d* and via line 523*d*, an OR circuit 528*d*, an amplifier 529*d*, a cathode follower 530*d* to a line END OP. This End of Operations signals feeds to the Cycle Timer (Figs. 3*c* and 3*d*) described above, and also feeds to an AND circuit 568*d* of Fig. 5*aj*. Normally, the End of Operation signal passes via the AND circuit 568*d*, an amplifier 569*d* and a cathode follower 570*d* to drive the line STEP INST CTR and thereby cause the Instruction Counter (Fig. 4*d*) to be stepped one count. However, on certain operations, one of which is Transfer, the Instruction Counter is not stepped. A positive signal on the line TR feeds via an OR circuit 564*d*, an inverter 565*d* and a cathode follower 566*d* to cause line 567*d* to go negative, and thereby remove a conditioning potential from the AND circuit 568*d*. Therefore, on Transfer operations, the End of Operation signal is suppressed so that no signal for stepping of the Instruction Counter is developed. Refer now to Fig. 6*d*, which shows a Timing Diagram for the Stop and Transfer operation. During Instruction time an I9(D1) signal is developed for gating a half word Instruction from Memory Busses S and 1 to 17 or from Memory Busses 18 to 35, to the Memory Register positions S and 1 to 17. An I10(D1) signal is developed for setting the Instruction Register to the holding of the Memory Register. The circuits for developing the I9(D1) and I10(D1) signals are the same as those described above, during an explanation of the Transfer operation. Since these I9(D1) and I10(D1) signals are developed by the exact same circuits during Instruction time of all operations to avoid repetition of explanation of the same circuitry, during a description of various other operations, it will be understood that these Timing signals are developed.

At I11 (D1) time, under control of a Stop and Transfer instruction, a Regenerate signal will occur and also a GO TO EX/RGN signal is emitted. The significance of these two separate signals which are produced, at I11 (D1) time is as follows; The Stop and Transfer operation causes the machine to stop and therefore the machine is sent into Regeneration in order to preserve the information stored in Memory. An 11 time signal, is emitted during every Character Cycle that the machine is in a Stop condition, and as described above, in the explanation of the Cycle Timer (Figs. 3*c* and 3*d*) this signal causes the machine to go into Regeneration and remain in Regeneration until the Stop condition is removed. The GO TO EX/RGN signal is also fed to the Cycle Timer, but the Regeneration always predominates externally. The output of the E/R trigger 303*c* (Fig. 3*d*) of the Cycle Timer, is suppressed. Therefore, the machine is actually in an E′/R′ time internally and stays in that time until the Regeneration trigger 314*c* of the Cycle Timer is reset, as described above. Therefore, the machine completes the Instruction cycle and effectively Stops. The machine remains Stopped and in Regeneration until a Start button (not shown) is energized to remove the Stop condition. At this time, the regenerate trigger of the Cycle Timer is turned OFF, and the machine goes into Execute/Regenerate cycles since the Execute/Regenerate trigger of the Cycle Timer is ON.

The Regenerate signal occurring at 11 time of the cycle, is generated as a Master Stop trigger (not shown) is shifted to an ON condition to thereby condition an AND circuit which passes an A11 (D1) pulse to produce the one microsecond 11 time signal while the machine is stopped. The GO TO EX/RGN signal is developed by circuits of Fig. 5*ak* during a Stop and Transfer Instruction, as the line STOP goes positive and via an OR circuit 575*d* and line 576*d* conditions an AND circuit 577*d*. The AND circuit 577*d* being conditioned passes an A11 (D1) signal, via line 578*d*, an OR circuit 583*d*, an amplifier 584*d*, a cathode follower 585*d* to the line GO TO EX/RGN. However, as stated above, the Regenerate condition predominates, until the Master Stop trigger is turned OFF whereby the machine proceeds into an Execute/Regenerate cycle.

Referring to Fig. 5*ba*, the positive signal present on the line STOP feeds via an OR circuit 582*e* and line 583*e* to condition AND circuit 584*e* and 585*e*. The AND circuit 585*e* while conditioned, passes an E/R7 (D3) signal via an amplifier 586*e* and a cathode follower 588*e* to the line R INST CTR and thereby cause a resetting of the Instruction Counter (Fig. 4*d*). Thereafter, an ER10 (D1) signal is passed through the conditioned AND circuit 585*e* and via an amplifier 587*e* and a cathode follower 589*e* to the line SET INST CTR TO INST REG. The signal on the latter line will cause, the Instruction Counter, as explained above, to be set to the holding of the Instruction Register.

The End of Operation signal is developed by the circuits shown in Fig. 5*af* as the line, STOP goes positive, and via an OR circuit 520*d* and line 521*d* conditions an AND circuit 522*d*. The E/R10 (D2) signal is passed via the conditioned AND circuit 522*d*, line 523*d*, OR circuit 528*d*, amplifier 529*d* and a cathode follower 530*d* to the line END OP. The End of Operation signal feeding to the Cycle Timer sends the machine into Regeneration or into an Instruction cycle, if regeneration is not required. The End of Operation signal also feeds to the AND circuit 568*d* of Fig. 5*aj*, but is prevented from passing through this AND circuit in order to allow stepping of the Instruction Counter as a positive signal on line STOP feeds via an OR circuit 564*d*, an amplifier 565*d*, and a cathode follower 566*d*, to cause the line 567*d* to go negative. Therefore, it is seen that as Master Stop trigger is turned OFF, during a STOP operation, the machine will enter an Execute/Regenerate cycle to develop signals for resetting the Instruction Counter for setting Instruction Counter to the holding of the Instruction Register and to the end of operation.

Referring to Fig. 6*e*, which is a Timing Diagram, a Transfer on Zero operation. The signal for gating a half word Instruction from Memory, via the Memory Busses to the Memory Register occurs at I9 (D1) time, and the signal for dumping the holding of the Memory Register into the Instruction Register occurs at I10 (D1) time, both being generated as described above. The GO to E/RGN signal is developed by the circuits of Fig. 5*k* as line TR (0) goes positive and via the OR circuit 575*d* and line 576*d* conditions one input of the AND circuit 577*d*. The conditioned AND circuit 577*d* passes an I11 (D1) signal via line 578*d*, the OR circuit 483*d*, the amplifier 584*d*, and the cathode follower 585*d* to drive the line GO TO EX/RGN. As the machine enters the Execute/Regenerate cycle, and reaches "1" time of the cycle, an E/R 1 (D4) signal is emitted, to pass the holding of the Accumulator Register in complement form to be passed into the Adder, and at the same time a signal is emitted to add a carry into the Adder position 35. If at this time, the Accumulator Register contains a quantity of zero, each position thereof contains a binary 0 and when complemented each position is represented as holding a binary 1. If then a carry of binary 1 is added into this quantity carries are propagated and an End of Carry occurs from the Adder position Q. If this End Carry results, it is an indication that the Accumulator Register has a holding of zero. Conversely, if an End Carry does not occur from the Adder position Q, it is an indication that the Accumulator Register, had contained something other than zero. Assuming an End Carry occurs, the Transfer is to be effected. Therefore if an End Carry occurs, an E/R 7 (D3) signal is produced to reset the Instruction Counter, and an E/R10 (D1) signal is produced to set the Instruction Counter to the holding of the Instruction Register. If no End Carry occurs these signals are not developed and no Transfer takes place, but the Instruction Counter is stepped by an E/R 10 (D2) pulse. In either event, that is, whether there is Transfer or not, an End of Operation signal is developed at E/R 10 (D2) time.

These signals are developed as follows: Referring to the Fig. 5*ac*, a positive signal on the line TR 0 feeds via an OR circuit 580*c* and line 581*c* to condition an AND circuit 582*c*. The AND circuit 582*c*, when conditioned, allows the E/R 1 (D4) signal to pass via line 583*c*, an OR circuit 588*c*, an amplifier 589*c*, and a cathode follower 590*c*, to the line ACC COMP TO ADDER. This signal, as described below will cause the complement of the value in the Accumulator Register to be fed into the Adder positions Q, P and 1 through 35.

Referring to Fig. 5*ap*, the positive signal on the line TR (0) feeds via an OR circuit 501*e* and line 502*e* to condition the AND circuit 502*e*. The E/R 1 (D4) signal then passes via the conditioned AND circuit 503*e*, line 504*e*, an OR circuit 509*e*, an amplifier 510*e* and a cathode follower 511*e*, to the line CARRY ADDER (35). The signal on the latter line coincident with signal for causing a complement of the value in the Accumulator Register to be passed to the Adder adds a carry to the 35th position of the value.

Refer now to Fig. 5*f*, which is the Execution Timer for a Transfer on Zero operation. If the operation is Transfer on Zero and an End Carry occurs from the "Q" position of the Adder, then lines TR (0) and QC feeding to an AND circuit 505*b* are positive. Upon coincidence of two positive inputs, the output of the AND circuit 505*b* via the cathode follower 506*b* drives line TR (0) C positive, thereby signalling that the operation is Transfer on Zero and an End Carry did occur. A positive signal on the latter line feeds to the OR circuit 582*e* of Fig. 5*ba*, whose output via line 583*e* conditions the AND circuits 584*e* and 585*e*. An E/R 7 (D3) signal passes through the conditioned AND circuit 584*e* and via the amplifier 586*e* and the cathode follower 588*e* to the line R INST CTR. Thereafter E/R 10 (D1) signal passes via the conditioned AND circuit 585*e*, the amplifier 587*e* and the cathode follower 589*e* to the line SET INST CTR TO INST REG. It should be noted, however, that the latter two signals are emitted only upon the condition that an End Carry occurred due to the arithmetic operation of complementing the Accumulator Register and adding 1 to the least significant, i.e., the 35th position. The latter two signals upon being generated are effective, as mentioned above, to reset the Instruction Counter and then to set the Instruction Counter to the holding of the Instruction Register.

Referring now to Fig. 5*af*, during a Transfer on Zero operation, the line TR (0) is positive and via an OR circuit 520*d* and line 521*d* conditions an AND circuit 522*d*. The AND circuit 522*d*, being conditioned passes an E/R 10 (D2) signal via line 523*d*, an OR circuit 528*d*, an amplifier 529*d* and a cathode follower 530*d* to the line END OP and thereby signal End of Operation. This End of Operation signal feeds to the AND circuit 568*b* of Fig. 5*aj*, to develop a Step Instruction Counter signal, unless of course, an END Carry had resulted to cause a Transfer. The latter event, the line TR (0) C, positive to signify the operation is Transfer on Zero and an End Carry had occurred, via an OR circuit **564*d* an amplifier 565*d*, a cathode follower 566*d*, causes line 567*d* to go negative, and thereby block the End of Operation signal from passing through the AND circuit 568*d*** to develop a signal for stepping the Instruction Counter. As indicated on the Timing Diagram Fig. 6*e*, and, as explained above, the signal for stepping the Instruction Counter is conditional upon no End Carry. Therefore, it is seen that signals are developed during Instruction time preceding a Transfer on Zero operation, a half word Instruction is read from Memory via the Memory Busses to the Memory Register. The half word Instruction then held by the Memory Register is dumped into the Instruction Register and an Execute/Regenerate cycle is called for and entered. During the Execute/Regenerate cycle, the complement of the value of the Accumulator Register is passed through the Adder and a one is added to the adder position 35. As a result of this operation, if the value in the Accumulator Register was zero, an End Carry results. If an End Carry results, a Transfer is effected by resetting the Instruction Counter and then setting the Instruction Counter to the holding of the Instruction Register. Thereafter, an End of Operation is signalled. If the Transfer was not effected, due to the fact that the value in the Accumulator Register was not zero, the Instruction Counter is stepped one count.

Refer now to Fig. 6*f*, which shows a Timing Diagram for a Transfer on Overflow operation. During Instruction time, the signals are developed to gate a half word Instruction from Memory via the Memory Busses to the Memory Register and thereafter from the Memory Register to the Instruction Register. A GO TO EX/RGN signal is emitted to send the machine into an Execute/Regenerate cycle. During the Execute/Regenerate cycle, an E/R 5 (D1) signal is produced provided on Overflow has occurred, that is, the overflow trigger, described above, is ON. This E/R 5 (D1) pulse causes the Instruction Counter to be reset. Thereafter, an E/R 7 (D1) signal is emitted to cause the Instruction Counter to be set to the holding of the Instruction Register. However, if there is no overflow, a Transfer is not desired, and, therefore, the program proceeds by stepping the Instruction Counter to the address of next Instruction. An End of Operation signal is emitted whether or not a Transfer is effected. While the End of Operation signal is being emitted, an E/R 11 (D1) signal is generated on line R OV TR to cause the Overflow trigger to be reset OFF.

The I9 (D1) and I10 (D1) signals for gating a half word Instruction from the Memory Busses to the Memory Register, and from the Memory Register to the Instruction Register, are developed by the circuits described above. The GO TO EX/RGN signal is developed by the circuits of Fig. 5*ak* as a positive signal on the line TR (OV) feeds via the OR circuit **575*b*, and line 576*d* to condition the AND circuit 577*d*. An I11 (D1) signal passes via the conditioned AND circuit 578*d*, the OR circuit 583*d*, the amplifier 584*d* and the cathode follower 585*e*** to the line GO TO EX/RGN.

As mentioned above, the signals for resetting the Instruction Counter, and for setting the latter to the holding of the Instruction Register to effect a Transfer, are dependent upon whether or not an overflow had occurred. Referring to Fig. 5*d*, if the operation is Transfer on Overflow, the line TR OV is positive and conditions one input of the AND circuit **501*b***. If the Overflow trigger is ON, signifying an overflow has occurred (see Fig. 5*a*), the line OV TRIG ON is positive, and therefore, with both inputs positive, the output of the AND circuit **501*b*, via the cathode follower 502*b*, causes the line TR (OV) OV to go positive. The signal on the latter line, when positive, feeds through the OR circuit 582*e***, of Fig. 5*ba*, and via line **583*e* to condition the AND circuit 584*e* and 585*e*. The AND circuit 584*e* being conditioned, passes an E/R 7 (D3) signal via the amplifier 586*e*, and the cathode follower 588*e*, to the line R INST CTR. Thereafter, an E/R 10 (D1) passes through the AND conditioned circuit 585*e*, the amplifier 587*e* and the cathode follower 589*e*** to the line SET INST CTR TO INST REG. The E/R 7 (D3) and E/R 10 (D1) signals are gated only if an Overflow has occurred, are effective, to cause a Transfer.

During the Transfer on Overflow operation, an End of Operation signal is generated as the line TR OV is positive and feeds to the OR circuit **520*d*** of Fig. 5*af*. The output of the OR circuit **520*d* via line 521*d* conditions the AND circuit 522*d*. The conditioned AND circuit 522*d*, passes an E/R 10(D2) signal via line 523*d*, the OR circuit 528*d*, the amplifier 529*d*, and the cathode follower 530*d* to the line END OP. This End of Operation signal, of course, feeds the Cycle Timer, and causes the machine to go either into Regenerate or into the next Instruction cycle. The End of Operation signal also feeds to the AND circuit 568*d* and unless an overflow condition exists, this signal passes via AND circuit 568*d*, the amplifier 569*d*, and the cathode follower 570*d* to develop a signal on the line STEP INST CTR. However, the Overflow condition did exist, the line TR(OV) OV is positive and via the OR circuit 564*d*, the amplifier 565*d* and the cathode follower 566*d* drives line 567*d* negative. While line 567*d* is negative the End of Operation signal is prevented from passing through the AND circuit 568*d***.

During a Transfer on Overflow operation, the line TR OV is positive and conditions an AND circuit **596*e*** of Fig. 5*bd*. An E/R 11(D1) signal passes through the conditioned AND circuit **596*d*, an amplifier 597*d* and a cathode follower 598*d*** to the line R OV TR. This E/R 11(D1) signal on line R OV TR causes a resetting of the Overflow Trigger provided, of course, the Overflow Trigger was ON. If the Overflow trigger was OFF, this signal was still emitted, but, the overflow trigger merely remains OFF (see Fig. 5*a*).

Thus, signals are developed during a Transfer of Overflow operation to gate a half word Instruction from the Memory Busses into the Memory Register and from the Memory Register into the Instruction Register. The machine is then sent into an Execute/Regenerate cycle and during this cycle, if an overflow has occurred, the Transfer is effected by resetting the Instruction Counter, and then setting the Instruction Counter to the holding of the Instruction Register. An End of Operation is then signalled, and the Overflow trigger is reset. Howevere, if the Overflow trigger was not ON, the transfer is not effected but the Instruction Counter is stepped one count.

Refer now to Fig. 6*g*, which shows the Timing Diagram for a Transfer on Plus operation. A transfer on Plus operation produces a transfer only if the Accumulator Register Sign is positive. During Instruction time, the I9 (D1) and I10 (D1) signals occur, for gating a half word Instruction from Memory Busses to the Memory Register and for dumping the holding of the Memory Register into the Instruction Register. An I11 (D1) signal is emitted to send the machine into an Execute/Regenerate cycle. During this Execute/Regenerate cycle, if the Accumulator Register Sign is positive, the Instruction Counter is reset by an E/R 7 (D3) pulse and later an E/R 10 (D1) pulse causes the Instruction Counter to be set to the holding of the Instruction Register. However, if the Accumulator Register sign is negative, the Transfer is not effected, but a signal is emitted to step the Instruction Counter. The End of Operation pulse is generated in either event, that is, if the Accumulator Register Sign is positive, or negative. The signals for gating a half word Instruction to the Memory Register, occurring at line I9 (D1) time, and for gating the half word Instruction from the Memory Register to the Instruction Register, occurring at I10 (D1) time, are generated by the circuits described above.

Referring to Fig. 5*ak*, if the operation is Transfer on Plus, the positive signal on line TR (+) passes via an OR circuit **575*d* and line 576*d* to condition an AND circuit 577*d*. Therefore, the I11 (D1) signal passes via the conditioned AND circuit 579*d*, line 578*d*, the OR circuit 583*d*, the amplifier 584*d* and the cathode follower 585*d*** to the line GO TO EX/RGN.

Referring to Transfer on Plus Execution Time of Fig. 5*e*, if the operation is Transfer on Plus, the line TR (+) is positive to condition the AND circuit **503*b***. If the Sign of the Accumulator Register is positive the line ACC (+) is positive. (See Fig. 5*c*.) If both inputs to the AND circuit **503*b* are positive, its output feeds via the cathode follower 504*b* to drive the line TR (+) A (+) positive; a positive signal on the latter line indicating that the operation is Transfer on Plus, and that the Accumulator Register Sign is positive. A positive signal on the line TR (+) A (+) passes via the OR circuit 582*e*** of Fig. 5*ba*, and line **583*e* to condition the AND circuits 584*e* and 585*e*. While the AND circuit 584*e* is conditioned an E/R 7 (D3) signal is passed via the AND circuit 584*e*, the amplifier 586*e*, and a cathode follower 588*e* to the line R INST CTR. Thereafter, the E/R10 (D1) signal passes via the conditioned AND circuit 585*e*, the amplifier 587*e* and the cathode follower 589*e*** to the line SET INST CTR TO INST REG. The resetting of the Instruction Counter and thereafter setting it to the holding of the Instruction Register causes a Transfer operation, and as indicated, this transfer is conditioned upon the Sign of the Accumulator Register being positive. The End of Operation signal is developed by the circuits of Fig. 5*af*, during a Transfer on Plus operation, as the line TR (+) goes positive and via the OR circuit **520*d* and line 521*d* conditions the AND circuit 522*d*, and E/R 10 (D2) signal is passed through the conditioned AND circuit 522*d* and via line 523*d* the OR circuit 528*d*, the amplifier 529*d* and the cathode follower 530*d* to the line END OP. The signal on the latter line feeds to the cycle timer as described above, to send the machine into either Regeneration or to the next Instruction cycle and also to the AND circuit 568*d*** of Fig. 5*aj*. The End of Operation signal passes through AND circuit **568*d*, provided the Accumulator Register Sign is negative, and via the amplifier 569*d* and the cathode follower 570*d* to the line STEP INST CTR. However, if the Accumulator Register Sign has been positive and the Transfer effected, the line TR (+) A (+) is positive and via the OR circuit 564*d*, an inverter 565*d* and a cathode follower 566*d* causes line 567*d* to go negative and remove conditioning from the AND circuit 568*d*** and thereby prevent the End of Operation signal from passing through to generate a signal to allow the Instruction Counter to be stepped. Thus, it is seen that signals are generated during a Transfer on Plus operation, to gate a half word Iinstruction, calling for a Transfer on Plus operation, from the Memory Busses into the Memory Register, from the Memory Register into Instruction Register. At 11 time of Instruction cycle a signal is emitted to send the machine into an Execute/Regenerate cycle. At 5 time of the Execute/Regenerate cyle, provided the Accumulator Register Sign is positive, the Instruction Counter is reset and the Instruction Counter is set to the holding of the Instruction Register. At 10 time of the cycle, the end of Operation signal is emitted and if the Accumulator Register Sign was negative, the Instruction Counter is stepped one count.

Refer now to Fig. 6*h* which is the Timing Diagram for the LOAD MQ REGISTER operation. At I9 (D1) time, the signal is emitted to gate a half word Instruction from the Memory Busses to the Memory Register. Thereafter, at I10 (D1) time, the signal is emitted to gate the half word Instruction from the Memory Register to the Instruction Register and at I11 (D1) time, a GO to EX signal is emitted to send the machine into an Execution cycle. As explained in the application of Fox et al., during an Execute cycle, Memory is either read into or out of. In this instance it is read out of and at E9 (D1) time, a signal is emitted to gate the word at the selected address, into the Memory Register. Thereafter at E11 (D1) time, a signal is emitted to gate the information in the Memory Register into the MQ Register. At E10 time, two microsecond signals are emitted to indicate an End of Operation and step the Instruction Counter.

The signal for gating a half word Instruction from Memory Busses to the Memory Register and for gating the holding of the Memory Register into the Instruction Register, are generated by the circuits described above. The GO TO EX signal is generated by the circuits of Fig. 5*ar*, during a Load MQ operation as the line LOAD MQ goes positive and via an OR circuit **523*e* and line 524*e* conditions one input of the AND circuit 525*e*. The AND circuit 525*e*, while conditioned, passes the I11 (D1) signal via an amplifier 526*e* and a cathode follower 527*e* to the line GO TO EX. This signal feeds to the Cycle Timer, described above, to send the machine to an Execute cycle. It should be remembered that during this Execute cycle, information is read from Memory. The Load MQ Instruction may address a full word, an even half word, or an odd half word and thus a full or half word may be read into the Memory Register. In any event, during a Load MQ register operation, the line LOAD MQ is positive and feeds to one input of an OR circuit 566*c*** of Fig. 5*z*. The output of the OR circuit **556*c* via a cathode follower 567*c* drives the line 568*c* positive. The line 568*c* while positive, conditions AND circuits 550*c*, 555*c*, 560*c* and 563*c*. Assuming that a full word is addressed as part of the Load MQ Instruction, a second input to the AND circuit 550*c* is positive, as the line F/E HALF (signifying a full or even half address word) goes positive. Since two inputs to the AND circuits 550*c* are conditioned positive, an E9 (D1) signal passes via this conditioned AND circuit, an OR circuit 552*c*, an amplifier 553*c*, and a cathode follower 554*c* to the line MEM BUS (S TO 17) TO MR (S TO 17). The signal on the latter line is effective to gate information from Memory Busses S and 1 to 17 to the Memory Register positions S and 1 to 17. At the same time, a second input of the AND circuit 560*c* is conditioned by a positive signal on the line FULL (Signifying a full word address). Therefore while the two inputs conditioned positive, the AND circuit 550*c* passes the E9 (D1) signal via an amplifier 561*c* and a cathode follower 562*c*** to the line MEM BUS (18 to 35) TO MR (18 to 35). A positive signal on the latter line gates information from the Memory Busses 18 through 35 to the Memory Register positions 18 through 35. Thus, by the combination of positive signals on lines MEM BUS (S TO 17) TO MR (S TO 17) and MEM BUS (18 to 35) TO MR (18 to 35) a full word read from Memory to the Memory Busses S and 1 to 35 inclusive is gated to the Memory Register positions S and 1 to 35 respectively.

If a half word address is selected, it is necessary to CLEAR the right half of the Memory Register, that is, positions 18 through 35. Therefore, as a half word address is selected a signal on line HALF conditions a second input of the AND circuit **563*c*. The conditioned AND circuit 563*c* passes an E9 (D1) signal via an amplifier 564*c* and a cathode follower 565*c*** to the line CLEAR MR (18 to 35). The latter line going positive clears or erases, as explained below, the holding of Memory Register positions 18 to 35. If this CLEAR MR (18 to 35) signals were not given, the Memory Register positions 18 to 35 would retain the data previously stored in those positions.

If the half word selected is stored at an even half word address, the signals which condition the AND circuit 550*c*, as described above, are present, since the line F/E HALF IS positive, when full or even half words are addressed, and an E9 (D1) signal will occur on line MEM BUS (S to 17) TO MR (S to 17). However, if the selected half word is stored at an odd address, then a second input to the AND circuit 555*c* via the line ODD HALF is positive. An E9 (D1) signal then passes through the conditioned AND circuit 555*c* and via the OR circuit 557*c*, the amplifier 558*c* and the cathode follower 559*c* to the line MEM BUS (18 to 35) TO MR (S to 17). As the latter line goes positive, information being read out of Memory from Memory positions 18 to 35 to the Memory Busses 18 to 35, is gated to the Memory Register positions S and 1 to 17. This signal on line MEM BUS (18 to 35) TO MR (S to 17) in combination with the signal on line CLEAR MR (18 to 35) is effective to store an half word read from an odd half word address in Memory into the Memory Register positions S and 1 to 17, while Memory Register positions 18 to 35 are all reset to represent zeros.

During a Load MQ operation, the line LOAD MQ is positive and conditions one input to the AND circuit 547*e*, of Fig. 5*au*, to thereby gate an E 11 (D1) signal via that AND circuit, an amplifier 548*e* and a cathode follower 549*e* to the line MR TO MQ. A positive signal on the latter line, as explained below, gates the holding of the Memory Register into the MQ Register. The End of Operation signal ending a Load MQ operation is developed as the line LOAD MQ is positive and feeds via an OR circuit 524*d*, of Fig. 5*af*, and line 525*d* to condition one input of an AND circuit 526*d*. While AND circuit 526*d* is conditioned, the E10 (D2) signal passes through this conditioned AND circuit via line 527*d*, the OR circuit 528*d*, the amplifier 529*d* and the cathode follower 530*d* to the line END OP, and thereby signal an End of Operation. This signal on the line END OP, passes through the normally conditioned AND circuit 568*d*, of Fig. 5*aj*, and via the amplifier 569*d* and the cathode follower 570*d* to the line STEP INST CTR and thereby cause the Instruction Counter to be stepped one count.

Refer to Fig. 6*i*, which is the Timing Diagram for a NO OPERATION. During the Instruction cycle preceding the operation, a half word Instruction selecting NO Operation instruction is read out from Memory to the Memory Busses and is gated into the Memory Register by an I9 (D1) signal. Thereafter, at 10 time of the cycle, the Instruction is gated from the Memory Register into the Instruction Register and at 11 time of the cycle, a signal is emitted to sending the machine into an Execute/Regenerate cycle. During this Execute/Regenerate cycle nothing, except at the usual regeneration, takes place, until an E/R10 (D2) End of Operation signal is emitted, also a signal to allow stepping of the Instruction Counter. The signals occurring at I9 (D1) time and at I10 (D1) time, for gating information from Memory Busses to the Memory Register and from the Memory Register to the Instruction Register, are generated by the circuits described above. The GO TO EX/RGN signal is generated during NO operation, as the line NO OP goes positive and via the OR circuit 575*d*, of Fig. 5*ak*, drives the line 576*d* positive. Line 576*d*, when positive, conditions the AND circuit 577*d* and therefore an I11 (D1) signal is passed via the line 578*d*, the OR circuit 583*d*, the amplifier 584*d* and the cathode follower 585*d* to the line GO TO EX/RGN.

Referring to Fig. 5*af*, the positive signal on line NO OP also passes via the OR circuit 520*d* and line 521*d* to condition the AND circuit 522*d*. The conditioned AND circuit 522*d* passes the E/R 10 (D2) signal via line 523*d*, the OR circuit 528*d*, the amplifier 529*d* and the cathode follower 530*d* to the line END OP, thereby developing an End of Operation signal. A positive signal on the line END OP passes through the normally conditioned AND circuit 568*d*, of Fig. 5*aj*, and via the amplifier 569*d* and the cathode follower 570*d* to the line STEP INST CTR, and thereby cause Instruction Counter to be stepped one count.

Refer now to Fig. 6*j* which is the Timing Diagram for a ROUND operation. During Instruction time, an I9 (D1) signal gates the half word Instruction from the Memory Busses to the Memory Register, thereafter, an I10 (D1) signal dumps the Instruction from the Memory Register into the Instruction Register, and an I11 (D1) signal sends the machine into an Execute/Regenerate cycle.

During the Execute/Regenerate cycle, an E/R 1 (D4) signal is emitted to gate the value held by the Accumulator Register in true form to the Adder, and to connect the carry output from the 1 position of the Adder to the Overflow trigger so that the latter is turned On if an overflow occurs. At the same time, provided the MQ register (1) positions contains a binary 1, a carry is fed to the Adder position 35. An E/R 4 (D1) signal is emitted to gate the output signals of the Adder into the Accumulator Register and E/R 10 (D2) signals are emitted to indicate an End of Operation and also to Step the Instruction Counter.

The I9 (D1) and I10 (D1) signals which gate the half word Instruction from the Memory Busses to the Memory Register and from the Memory Register into the Instruction Register are generated by the circuits described above. Referring to Fig. 5*ak*, the GO TO EX/RGN signal is generated during a Round operation as the line ROUND goes positive and via the OR circuit 575*d* and line 576*d* conditions the AND circuit 577*d*. The conditioned AND circuit 577*d* passes the I11 (D1) signal via line 578*d* the OR circuit 583*d*, the amplifier 584*d* and the cathode follower 585*d* to the line GO TO EX/RGN.

Referring to Fig. 5*ad*, the line ROUND, which is positive during a Round operation, feeds via an OR circuit 501*d* and line 502*d* to condition the AND circuit 503*d*. The AND circuit 503*d*, being conditioned, passes the E/R 1 (D4) via an amplifier 504*d* and a cathode follower 505*d* to the line ACC TRUE TO ADDER, and thereby cause the gating of the value in the Accumulator Register in true form to the Adder.

Referring to the Execution Timer of a Round operation, Fig. 5*g*, an AND circuit 507*d* is conditioned by a positive signal on the line ROUND. If the MQ Register 1 position contains a binary 1, the line MQ (1) 1 is positive, and therefore, the output of the AND circuit 507*d* is positive, and via cathode follower 508*b* causes the line RO MQ (1) 1 to go positive. As the latter line goes positive, it feeds via an OR circuit 501*e*, of Fig. 5*ap*, to cause line 502*e* to go positive. Line 502*e*, when positive, conditions the AND circuit 503*e* to pass an E/R 1 (D4) signal, via line 504*e*, an OR circuit 509*e*, an amplifier 510*e* and a cathode follower 511*e* to the line CARRY ADDER (35). A signal on the latter line, as explained below, causes a carry to be added into the Adder position 35. It should be noted that this signal is generated only if the MQ Register 1 position contains a binary 1.

Referring to Fig. 5*aq* during the Round operation, the line ROUND going positive, passes via an OR circuit 516*e* and line 517*e* to condition one input of an AND circuit 518*e*. The second input to the AND circuit 518*e* is conditioned by a positive signal on the line ADDER (1) CARRY, which indicates a carry output from the Adder 1 order. Thus, when two inputs to the AND circuit 518*e* are conditioned, the E/R 1 (D4) signal passes via the conditioned AND circuit 518*e*, the line 515*e*, an OR circuit 520*e*, an amplifier 521*e* and a cathode follower 522*e* to the line AD (1) C/ACC (1) OV. A positive signal on the latter line as explained above (see Fig. 5*a*) will cause the overflow trigger to be turned ON. Thus, if the carry added to the Adder 35 order propagates so that a carry is emitted from the Adder 1 order, during a Round Operation, the Overflow trigger is turned ON to indicate an Overflow has occurred.

The Adder outputs are gated to the Accumulator Register as a positive signal on the line ROUND passes via an OR circuit 506*d*, of Fig. 5*ae*, and line 507*d* to condition an AND circuit 508*d*. The AND circuit 508*d* while conditioned passes the E/R (D1) signal via line 509*d*, an OR circuit 514*d*, an amplifier 515*d*, and a cathode follower 516*d* to the line ADDER TO ACC.

The End of Operation signal is generated as a positive signal on line ROUND feeds via an OR circuit 520*d*, Fig. 5*af*, and line 521*d* to condition the AND circuit 522*d*. While the AND circuit 522*d* is conditioned, an E/R 10 (D2) signal passes via line 523*d*, an OR circuit 528*d*, an amplifier 529*d*, and a cathode follower 530*d*, to the line END OP. A positive signal on the line END OP passes through the normally conditioned AND circuit 568*d* of Fig. 5*aj*, and via the amplifier 569*d* and the cathode follower 570*d* to the line STEP INST CTR and thereby cause Instruction Counter to be stepped.

Refer now to Fig. 6*k*, which shows the Timing Diagram for an ADD operation. During Instruction time, an I9 (D1) signal gates a half word Instruction from the Memory Busses to the Memory Register; at I10 (D1) time, the Instruction is gated from the Memory Register to the Instruction Register and an I11 (D1) signal GO TO EX sends the machine into an Execution cycle. During the Execution cycle, an E9 (D1) signal gates either a full or a half word read from Memory to the Memory Busses into the Memory Register and an E11 (D1) GO TO EX/RGN signal sends the machine into an Execute/Regenerate cycle.

During the Execute/Regenerate cycle, an E/R 1 (D4) pulse gates the holding of the Memory Register to the Adder, and if the signs of the Memory Register and the Accumulator Register are alike, an E/R 1 (D4) signal gates the holding of the Accumulator Register in true form to the Adder. However, if the Memory Register and Accumulator Register signs are unlike, the holding of the Accumulator Register is passed in complement form to the Adder. If the signs are alike, and as the addition takes place, a carry is emitted from the Adder 1 order, this adder 1 carry is connected to the Overflow trigger circuit setting the trigger to an ON condition (see Fig. 5*a*). If the signs are unlike and a carry is emitted from the Adder (Q) position, an elusive one E/R 1 (D4) carry signal is fed to the Adder 35 order. Also during this Execute/Regenerate cycle, an E/R 4 (D1) signal connects the Adder output to the Accumulator Register, thereby storing the sum of this first addition and the Accumulator Register. If the signs are of the Accumulator Register and the Memory Register are unlike and no End Carry resulted from the first addition, it is indicated by the End Carry trigger 503*a* (Fig. 5*a*) being OFF, then the result in the Accumulator Register is in complement form. Therefore, the holding of the Accumulator Register is again passed through the Adder in order to recomplement. Therefore, if the signs are alike and no carry occurred, an E/R 7 (D2) signal is emitted to pass the holding of the Accumulator Register in complement form to the Adder, and an E/R 8 (D1) signal gates the output of the Adder to the Accumulator Register.

If the Accumulator Register and the Memory Register signs are unlike, an End Carry occurred, and the Accumulator Register Sign is positive, then a negative sign representation is placed in the Accumulator Register Sign order by an E/R 10 (D1) signal. However, if the signs are unlike, an End Carry occurred and the Accumulator Register sign is negative, then a positive sign representation is placed in the Accumulator Sign order by an E/R 10 (D1) signal. The End of Operation signal and the Step Instruction Counter signal are emitted at E/R 10 (D2).

The I9 (D1) and I10 (D1) signals for gating a half word instruction from Memory Busses to the Memory Register, and from the Memory Register to the Instruction Register, are generated by the circuits described above (see Fig. 5*z*). Referring to Fig. 5*ar*, the GO TO EX signal is caused during an ADD operation, as the line ADD goes positive, and via the OR circuit 523*e* and line 524*e* conditions the AND circuit 525*e*. While the AND circuit 525*e* is conditioned, the I11 (D1) signal passes through the AND circuit 525*e* and via the amplifier 526*e* and the cathode follower 527*e* to the line GO TO EX.

During the execute cycle, a full or half word is gated from the Memory Busses to the Memory Register as the signal on line ADD goes positive, and via the OR circuit 566*c* of Fig. 5*z*, the cathode follower 567*c*, and line 568*c* to condition the AND circuits 550*c*, 555*c*, 560*c* and 563*c*. As described above, these AND circuits 550*c*, 555*c*, 560*c* and 563*c* are further conditioned by signals, dependent upon whether the selected address is a full word, an even half word or an odd half word. Thus, as described above, information is gated from the Memory Busses to the Memory Register and is caused by a combination of positive E9 (D1) signals on lines MEM BUS (S to 17) TO MR (S to 17), MEM BUS (18 to 35) TO MR (S to 17), MEM BUS (18 to 35) TO MR (18 to 35) and CLEAR MR (18 to 35).

The E11 (D1) signal for sending the machine into an Execute/Regenerate cycle is developed as the line ADD goes positive, and via the OR circuit 579*d*, of Fig. 5*ak*, drives the line 580*d* positive to condition the AND circuit 581*d*. The AND circuit 581*d*, while conditioned, passes the E11 (D1) signal via line 582*d*, the OR circuit 583*d*, the amplifier 584*d* and a cathode follower 585*d* to the line GO TO EX RGN. Thus, it is seen that an Instruction calling for an ADD operation can be read out of Memory. The machine goes into an Execute cycle for the purpose of reading out the factor to be added algebraically to the value in the Accumulator Register. After the value is read out of Memory to the Memory Register, the machine goes into an Execute/Regenerate cycle, for the purpose of completing the actual addition.

Referring to Fig. 5*k*, which is the ADD Execution Timer, a positive signal on the line ADD conditions one input of the AND circuits 533*b*, 535*b*, 537*b*, 539*b* and 541*b*. The second input to the AND circuit 533*b* is via line AMSA, which is positive, as described above, when the Accumulator Register and Memory Register Signs are alike. The output of the AND circuit 533*b*, passing via the cathode follower 534*b* to line ASA, is positive when the operation is ADD, and the signs (Memory Register and Accumulator Register Signs) are alike. The AND circuit 53*b* receives its second signal via line AMSU, which as described above, is positive when the Accumulator Register and the Memory Register signs are unlike. Therefore, the output of the AND circuit 535*b* feeding via the cathode follower 536*b* to line ASU is positive, when the operation is ADD and the signs are unlike. The AND circuit 537*b* receives an input via the line AMSU and receives a third input via line NO QC which is positive when there was no End Carry, that is, a carry to the Q order of the Adder. Thus, the output of the AND circuit 537*b* passes via the cathode follower 938*b* to line ASUNC which is positive when the operation is ADD, the signs are unlike, and there has been no End Carry. The AND circuit 539*b* receives signals via line ADD, line AMSU, line QC (which indicates there has been an End Carry from the Q order) and from line ACC (—), which indicates that the Accumulator Register Sign is negative. The output of the AND circuit 539*b*, passing via a cathode follower 540*b* to line ASUC (—) is positive, when the operation is ADD, the signs are unlike, there has been an End Carry and the Accumulator Register Sign is negative. The AND circuit 541b receives inputs via lines ADD, AMSU, QC and ACC (+). The output of the AND circuit 541b feeding via the cathode follower 542b to line ASCU (+) is positive when the operation is ADD, the signs are unlike, an End Carry has occurred and Accumulator Register Sign is positive. The outputs of this Execution Timer are referred to as the description of the development of signals for the ADD operation proceeds.

During the operation ADD, the positive signal on the line ADD passes via the OR circuit 575c, of Fig. *5ab*, and line 576c to condition the AND circuit 577c. The AND circuit 577c, while conditioned, passes an E/R1-(D4) signal through the amplifier 578c and the cathode follower 579c to the line MR TO ADDER, the signal on the latter line thereby gating information from the Memory Register to the Adder.

Referring to Fig. *5ad*, a positive signal on the line ASA, which signifies the operation is ADD and the signs are alike, passes via an OR circuit 501d and line 502d to condition the AND circuit 503d. The AND circuit 503d, while conditioned, passes an E/R1(D4) signal through the amplifier 504d and the cathode follower 505d to the line ACC TRUE TO ADDER, thereby gating the holding of the Accumulator Register in true form to the Adder.

Referring to Fig. *5ac*, the signal on line ASU, which is positive when the operation is ADD and the signs are unlike, passes via an OR circuit 580c and line 581c to condition the AND circuit 582c. The AND circuit 582c, while conditioned, passes an E/R1(D4) signal via line 583c, an OR circuit 588c, an amplifier 589c and a cathode follower 590c tothe line ACC COMP TO ADDER. A positive signal on the latter line will transfer the holding of the Accumulator Register to the Adder in complement form.

Referring to Fig. *5aq*, if the operation is ADD and the signs are alike, the signal line ASA is positive and via an OR circuit 516e and line 517e conditions one input of the AND circuit 518e. A second input to the AND circuit 518e is via line ADDER (1) CARRY, which is positive only when there is a carry output from the Adder 1 order. The third input to the AND circuit 513e is an E/R1(D4) signal, which is passed when the other inputs to the AND circuit are positive, via a line 519e, an OR circuit 520e, an amplifier 521e and a cathode follower 522e to the line ADD (1)C/ACC1(OV), and thereby cause the Overflow trigger to be turned ON. It should be noted, however, that the Overflow trigger is turned ON, only if the signs are alike and there has been a carry from the adder 1 position.

If the operation is ADD and the signs are unlike, then the signal on line ASU, described above, is positive, and via an OR circuit 505e, of Fig. *5ap*, and line 506e conditions one input of an AND circuit 507e. If during the ADD operation, an End Carry is emitted from the Q order of the Adder, the line ADDER (Q) CARRY goes positive, and conditions a second input of the AND circuit 507e. While two inputs to the AND circuit 507e are conditioned positive, an E/R1(D4) signal passes via the AND circuit 507e, line 508e, an OR circuit 509e, an amplifier 510e and a cathode follower 511e to the line CARRY ADDER (35), and thereby cause a carry to be emitted to the Adder 35 order.

Referring to Fig. *5ae*, if the operation is ADD, the line ADD is positive and via the OR circuit 506d and line 507d conditions the AND circuit 508d. The AND circuit 508d, while conditioned, passes an E/R4(D1) signal via line 509d, the OR circuit 514d, the amplifier 515d, and the cathode follower 516d to the line ADDER TO ACC, to connect the Adder outputs to the Accumulator Register. When the output of the ADD Execution Timer is a positive signal on the line ASUNC, it signifies the operation is ADD, the signs are unlike and no End Carry occurred, and, therefore, the sum now present in the Accumulator Register is in complement form (this is known by mathematical analysis). It is necessary to recomplement this sum, since it is a rule of the machine to store values in true form. Therefore, referring to Fig. *5ac*, the positive signal on the line ASUNC passes via an OR circuit 584c and line 585c to condition one input of the AND circuit 586c. The AND circuit 586c, while conditioned, passes an E/R7(D2) signal via line 587c, the OR circuit 588c, the amplifier 589c, and the cathode follower 590c to the line ACC COMP TO ADDER and is effective to transfer the complement of the Accumulator Register into the Adder. The output of the Adder, will, of course, be the original sum in true form and the positive signal on line ASUNC passes via an OR circuit 510d, of Fig. *5ae*, and line 511d to condition the AND circuit 512d. The AND circuit 412d, while conditioned, passes an E/R8(D1) signal via line 513d, the OR circuit 514d, the amplifier 515d and the cathode follower 516d, to the line ADDER TO ACC, thereby gating the sum from the Adder in true form into the Accumulator Register. This results in storing the sum in true form in the Accumulator Register. If the operation is ADD, the signs of the Memory Register and Accumulator Register are unlike, and an End Carry occurred during the addition and the Accumulator Register Sign is negative, as explained above, the line ASUC (—) is positive. A positive signal on the line ASUC (—) passes via an OR circuit 510f of Fig. *5bf*, and line 511f to condition an AND circuit 512f. The AND circuit 512f, while conditioned, passes an E/R10(D1) signal, via an amplifier 513f and a cathode follower 514f to the line (+) TO ACC (S) to thereby set the Accumulator Register Sign positive. However, if the operation is ADD, the Signs of the Memory Register and the Accumulator Register were unlike, and no End Carry occurred during the addition, and the Accumulator Register Sign was positive, a positive signal exists on the line ASUC (+). A positive signal on line ASUC (+) passes via an OR circuit 515f, of Fig. *5bg*, and line 516f to condition an AND circuit 517f. The AND circuit 517f, while conditioned, passes an E/R10(D1) signal via an amplifier 518f and a cathode follower 519f to the line (—) TO ACC (S). A positive signal on the latter line is effective, as explained below, to put a minus sign representation in the Accumulator Register Sign position.

A positive signal on the line ADD also feeds via an OR circuit 520d, of Fig. *5af*, and line 521d to condition the AND circuit 522d. The AND circuit 522d, while conditioned, passes an E/R10(D2) signal via line 523d, the OR circuit 528d, the amplifier 529d and the cathode follower 530d to the line END OP, and thereby signal an End of Operation. The signal on line END OP passes through the normally conditioned AND circuit 568d of Fig. *5ak*, and via the amplifier 569d and the cathode follower 570d to the line STEP INST CTR to cause the instruction counter to be stepped.

Refer now to Fig. *6m*, which shows the Timing Diagram for an ADD ABSOLUTE operation. During the Instruction and Execute cycles, signals generated are identical in time for those described for the ADD operation. Proceeding to the Execute/Regenerate cycle, an E/R1(D4) signal gates information from the Memory Register to the Adder, and if the Accumulator Register Sign is positive, the holding of the Accumulator Register in true form is gated in true form to the Adder by an E/R1(D4) signal. However, if the Accumulator Register Sign is negative, the complement of the Accumulator Register is gated to the Adder also by an E/R1(D4) signal.

If the Accumulator Register Sign is positive and a carry is emitted from the adder 1 order, it is an indication of an overflow and the Adder 1 carry is connected to the Overflow trigger by an E/R1(D4) signal to turn the latter ON. If, however, the Accumulator Register Sign is negative, and a carry output occurs from the Adder Q order, an elusive one carry is added to the Adder 35 order by an E/R1(D4) signal. At "4" time of the Execute/Regenerate cycle, an E/R4(D1) signal gates the output of the Adder to the Accumulator Register. Unless the Accumulator Register Sign is negative and no End carry resulted, the value gated to the Accumulator Register is the result of the addition. However, if the Accumulator Register Sign is negative and no End carry resulted, it is an indication that the Adder output gated to the Accumulator Register is in complement form. Therefore, an E/R7(D2) signal is emitted to again pass information from the Accumulator Register in complement form into the Adder, and thereafter an E/R8(D1) signal gates the output of the Adder into the Accumulator Register. This recomplementing and gating of the Adder output to the Accumulator Register results in storing information in the Accumulator Register in true form. If the Accumulator Register Sign is negative, and an End carry resulted, a positive sign representation is stored in the Accumulator Register Sign order by an E/R10(D1) signal. Finally, an End of Operation signal and a signal for stepping the Instruction Counter are emitted at E/R10(D2) time.

The I9(D1) and I10(D1) signals for gating a half word Instruction from the Memory Busses to the Memory Register, and from the Memory Register to the Instruction Register, are developed by the circuits of Fig. 5z described above. The GO TO EX signal is developed during an ADD ABSOLUTE operation, as the line ADD AB goes positive and feeds via an OR circuit 523e, of Fig. 5ar, and line 524e to condition the AND circuit 525e. The AND circuit 525e, while conditioned, passes an I11(D1) signal via the amplifier 526e and the cathode follower 527e to the line GO TO EX.

A positive signal on the line ADD AB also feeds via the OR circuit 566e, of Fig. 5z, and via the cathode follower 567c and line 568c to condition the AND circuits 550c, 555c, 560c and 563c. Other inputs to these AND circuits to gate an E9(D1) signal is dependent upon whether the address of the Instruction called for a full word, an odd half word or even half word. As described above, either a full word, an odd half word or even half word may be read from Memory to the Memory Busses and thus be gated to the Memory Register. As described above, the gating of a full or half word is caused by the combination of positive signals, as required, on lines MEM BUS (S to 17) TO MR (S to 17), MEM BUS (18 to 35) TO MR (S to 17), MEM BUS (18 to 35) TO MR (18 to 35) and CLEAR MR (18 to 35). The GO TO EX/RGN signal is developed as a positive signal on the line ADD AB passes via the OR circuit 579d, of Fig. 5ak, and line 580d to condition the AND circuit 581d. The AND circuit 581d, while conditioned, passes an E11(D1) signal via line 582d, the OR circuit 583d, the amplifier 584d and the cathode follower 585d to the line GO TO EX/RGN.

Refer now to Fig. 5n, which is the Execution Timer for an ADD ABSOLUTE operation. A positive signal on the line ADD AB conditions the AND circuits 554b, 556b, 558b and 560b. The AND circuit 554b also receives an input via line ACC (+), which is positive when the Accumulator Register Sign is positive. The output of the AND circuit 554b passes via the cathode follower 555b to the line AA (+), and is positive when the operation is ADD ABSOLUTE and the Accumulator Register Sign is positive. The AND circuit 556b also receives a signal via the line ACC (−), which is positive when the Accumulator Register Sign is negative. Therefore, the output of the AND circuit 556b passes via the cathode follower 557b to the line AA (−) and is positive when the operation is ADD ABSOLUTE and the Accumulator Register Sign is negative. The AND circuit 558b, besides the signal on the lines ADD AB and ACC (−), also receives a signal via line NO QC, which is positive when the no End carry has occurred from the Adder Q order. The output of the AND circuit 558b passes via the cathode follower 559b to the line AA (−) NC, which is positive when the operation is ADD ABSOLUTE, the Accumulator Register Sign is negative and no END carry has occurred. The AND circuit 560b receives signals via lines ADD AB, ACC (−) and QC, the latter being positive when an End carry has occurred from the Adder to Q order. The output of the AND circuit 560b passes via the cathode follower 561b to line AA (−) C, which is positive when the operation is ADD ABSOLUTE, the Accumulator Register Sign is negative and an End carry has occurred. Proceeding to an explanation of the development of signals occurring during the Execute/Regenerate portion of the ADD ABSOLUTE operation, refer to Fig. 5ab. A positive signal on the line ADD AB passes via the OR circuit 575c and the line 576c to condition the AND circuit 577c. The AND circuit 577c, while conditioned, passes the E/R 1 (D4) signal via the amplifier 578c and the cathode follower 579c to the line MR TO ADDER. A positive signal on the latter line gates information from the Memory Register to the Adder. If the Accumulator Sign is positive, then the holding of the Accumulator Register is gated to the Adder in true form as the signal on line AA (+), which is positive when the operation is ADD ABSOLUTE and the Accumulator Register Sign is positive, passes via the OR circuit 501d, of Fig. 2ac, and line 581c to condition the AND circuit 503d. While the AND circuit 503d is conditioned, an E/R 1 (D4) signal is passed via the amplifier 504d and the cathode follower 505d to the line ACC TRUE TO ADDER. However, if the Accumulator Register Sign is negative, then the complement of the Accumulator Register is gated to the Adder. A positive signal on the line AA (−), which is positive when the operation is ADD ABSOLUTE and the Accumulator Register Sign is negative, is passed through the OR circuit 580c, of Fig. 5ac, and line 581c to condition the AND circuit 582c. The AND circuit 582c, while conditioned, passes the E/R 1 (D4) signal via line 583c, the OR circuit 588c, the amplifier 589c and the cathode follower 590c to the line ACC COMP TO ADDER. Thus, it is seen that one value read from the Memory Register to the Adder, while a second value is read, in either true or complement form, from the Accumulator Register to the Adder.

Referring now to Fig. 5aq, a positive signal on the line AA (+), which is positive when the operation is at ADD ABSOLUTE and the Accumulator Register Sign is positive, passes via the OR circuit 516d and line 517e to condition the AND circuit 518e. A second input to the AND circuit 518e is via line ADDER (1) CARRY, which is positive when a carry is emitted from the Adder 1 order. While this AND circuit 518e is conditioned, an E/R 1 (D4) signal is passed via line 519e, the OR circuit 520e, the amplifier 521e and the cathode follower 522e to the line AD (1) C/ACC (1) OV. A positive signal on the latter line, as described above, will cause the Overflow trigger (Fig. 5a) to be turned ON, signifying that an Overflow has occurred. However, if the Accumulator Register Sign is negative, and an End carry has resulted from the Q order, then a signal on the line AA (−), which is positive when the operation is ADD ABSOLUTE and the Accumulator Register Sign is negative, passes via the OR circuit 505e, of Fig. 5ap, and the line 506e to condition the AND circuit 507e. The second input to the AND circuit 507e. The second input to the AND circuit 507e is conditioned when the line ADDER (Q) CARRY is positive to signify a carry from the Adder Q order. While the AND circuit 507e is conditioned, the E/R 1 (D4) signal is passed via line 508e, the OR circuit 509e, the amplifier 510e and the cathode follower 511e to the line CARRY ADDER (35) to cause a carry to be added to the adder 35 order.

The Adder output is connected to the Accumulator Register as the signal on line ADD AB passes via the OR circuit 506*d*, of Fig. *5ae*, and line 507*d* to condition the AND circuit 508*d*. The AND circuit 508*d*, being conditioned, passes the T/R 4 (D7) signal via line 509*d*, the OR circuit 514*d*, the amplifier 515*d* and the cathode follower 516*d* to the line ADDER TO ACC. Upon termination of the latter signal, a sum should exist in the Accumulator Register. However, if the Accumulator Register Sign is negative, and no End carry has resulted, it is an indication that the sum in the Accumulator Register is in complement form, and, therefore, it is necessary to recomplement the value. This is accomplished as a signal on the line AA (—) NC, which is positive when the operation is ADD ABSOLUTE, the Accumulator Register Sign is negative and no End carry resulted, feeds to the OR circuit 584*c*, of Fig. *5ac*, and via line 585*c* to condition the AND circuit 586*c*. The AND circuit 586*c*, while conditioned, passes E/R 7 (D2) signal via line 587*c* the OR circuit 583*c*, the amplifier 589*c*, and the cathode follower 590*c* to the line ACC COMP TO ADDER thereby causing the complement of the value in the Accumulator Register to be fed to the Adder. The positive signal on the line AA (—) NC also feeds via the OR circuit 510*d*, of Fig. *5ae*, and line 511*d* to condition the AND circuit 512*d*. The E/R 8 (D1) signal passes via the conditioned AND circuit 512*d*, line 513*d*, the OR circuit 514*d*, the amplifier 515*d* and the cathode follower 516*d* to the line ADDER TO ACC. The positive signals on lines ACC COMP TO ADDER and ADDER TO ACC results in the recomplementing operation so that the sum now in the Accumulator Register is in true form. If the operation is ADD ABSOLUTE, if an End carry occurred during the addition, and the Accumulator Register Sign is negative, then the signal on line AA (—) C is positive and feeds via the OR circuit 510*f*, of Fig. *5bf*, and line 511*f* to condition the AND circuit 512*f*. The AND circuit 512*f*, being conditioned, passes an E/R 10 (D1) signal via amplifier 513*f* and the cathode follower 514*f* to the line (+) TO ACC (S), to cause a positive sign representation to be set into the Accumulator Register Sign order.

A positive signal on line ADD AB feeds via the OR circuit 520*d*, of Fig. *5af*, and line 521*d* to condition the AND circuit 522*d*. While the AND circuit 522*d* is conditioned, an E/R 10 (D2) signal is passed via the line 523*d*, the OR circuit 528*d*, the amplifier 520*d* and the cathode follower 530*d* to the line END OP, and thereby signal an End of Operation. The signal on line END OP is passed through the normally conditioned AND circuit 568*d*, of Fig. *5aj*, and via the amplifier 569*d* and the cathode follower 570*d* to the line STEP INST CTR, and thereby cause a stepping of the Instruction Counter.

Refer now to Fig. *6n*, which shows the Timing Diagram for a SUBTRACT operation. The signals developed to effect a subtract operation, are identical to those described above, for an ADD operation, except that the signals are developed under different conditions. No purpose would be served in repeating a description of each of the signals on this Diagram. Such explanation was given during the ADD operation, described above.

The usual I9 (DI) and I10 (DI) signals are developed as described above (see Fig. *5z*). The GO TO EX signal is developed as the signal on line SUB is positive and feeds via the OR circuit 523*e* of Fig. *5ar*, and the line 524*e* to condition the AND circuit 525*e*. The AND circuit 525*e*, while conditioned, passes an I11 (D1) signal through the amplifier 526*e* and the cathode follower 527*e* to the line GO TO EX, thereby sending the machine into an Execute cycle. During the Execute cycle, a positive signal on line SUB feeds via the OR circuit 566*c*, of Fig. *5b*, and the cathode follower 567*c* to line 558*c* and thereby conditioned the AND circuits 550*c*, 555*c*, 560*c*, and 563*c*. A full word, even half word or odd half word is read from Memory to the Memory Busses and is gated into the Memory Register, depending upon the particular address selected by the Subtract Instruction. The gating of a full or half word into the Memory Register is controlled by a combination of signals on the four output lines of Fig. *5z*, as described above. The signal on the line SUB, when positive, also passes via the OR circuit 519*d*, of Fig. *5ak*, and the line 580*d* to condition the AND circuit 581*d*. The AND circuit 581*d*, being conditioned, passes an E11 (D1) signal via the line 582*d*, the OR circuit 583*d*, the amplifier 584*d*, and the cathode follower 585*d* to the line GO TO EX/RGN, and thereby send the machine into an Execute/Regenerate cycle.

Refer now to Fig. *5h*, which is the SUBTRACT Execution Timer. A positive signal on the line SUB conditions one input of each of the AND circuit 509*d*, 511*b*, 513*b*, 515*b*, 517*b*, and 519*b*. The AND circuit 509*b* is also conditioned by a signal on the line AMSA, which is positive when the Accumulator Register and the Memory Register signs are alike. Therefore, the output of the AND circuit 509*b* passes via the cathode follower 510*b* to the line SSA, which is positive when the operation is SUBTRACT and the signs are alike. The AND circuit 511*b* also receives an input via line AMSU, which is positive when the Accumulator Register and Memory Register signs are unlike. Therefore, the output of the AND circuit 511*b* passes via the cathode follower 512*b* to the line SSU, which is positive when the operation is SUBTRACT and the signs are unlike. The AND circuit 513*b* besides signals on lines ADD and AMSA also receives a signal via the line NO QC, which is positive when no End carry occurs from the Q position of the Adder. Therefore, the output of the AND circuit 513*b* passes via the cathode follower 514*b* to the line SSANC, which is positive when the operation is SUBTRACT, the signs are alike and no End carry has occurred. The AND circuit 515*b* is similar to the AND circuit 513*b* except that it receives a third input via line QC, which is positive when an End carry has occurred in the Q order of the Adder. The output of the AND circuit 515*b* passes via the cathode follower 516*b* to line SSAC and is positive when the operation is SUBTRACT, the signs are alike and an End carry has occurred. The AND circuit 517*b* receives the same three inputs as the AND circuit 515*b* and also a signal via the line ACC (—), which is positive when the Accumulator Sign is negative. Therefore, the output of the AND circuit 517*b* passes via the cathode follower 518*b* to line SSAC (—) and is positive when the operation is SUBTRACT, the signs are alike, an End carry has occurred and the Accumulator Register is negative. The AND circuit 519*b* also receives the same signals as the AND circuit 515*b* and further receives a signal via the line ACC (+). Therefore, the output of the AND circuit 519*b* passes via the cathode follower 520*b* to the line SSAC (+) and is positive when the operation is SUBTRACT, the signs are alike, an End carry has occurred, and the Accumulator Register Sign is positive. The signal for gating the holding of the Memory Register to the Adder is developed by the circuits of Fig. *5ab*. During the SUBTRACT operation, the signal on line SUB is positive, and feeds via the OR circuit 575*c*, the line 576*c* to condition the AND circuit 577*c*. The AND circuit 577*c*, while conditioned, passes the E/R 1 (D4) signal via the amplifier 578*c* and the cathode follower 579*c* to the line MR TO ADDER. Refer now to Fig. *5ad*, wherein a positive signal on the line SSU, which, as described above, is positive when the operation is SUBTRACT and the signs are unlike, passes via the OR circuit 501*d* and line 502*d* to condition the AND circuit 503*d*. The AND circuit 503*d*, while conditioned, passes an E/R 1 (D4) signal via the amplifier 504*d* and the cathode follower 505*d* to the line ACC TRUE TO ADDER and thereby gates the holding of the Accumulator Register in true form to the Adder. However, if the Instruction is SUBTRACT and the signs are alike, a positive output from the SUBTRACT Execution Timer via line SSA passes via the OR circuit 580c of Fig. *5ac* and the line 581c to condition the AND circuit 582c. The AND circuit 582c, while conditioned, passes the E/R 1 (D4) signal via line 583c, the OR circuit 588c, the amplifier 589c and the cathode follower 590c to the line ACC COMP TO ADDER and thereby is effective, as described below, to transfer the complement of the Accumulator Register to the Adder.

Referring to Fig. *5ae*, if the operation is SUBTRACT, the line SUB is positive and feeds via the OR circuit 506d and the line 507d to condition the AND circuit 508d. The AND circuit 508d while conditioned, passes an E/R 1 (D4) signal via line 509d, the OR circuit 514d, the amplifier 515d and the cathode follower 516d to the line ADDER TO ACC. A positive signal on the latter line connects Adder outputs to the Accumulator Register. Note that this operation takes place regardless of signs or the values in the Memory Register and in the Accumulator Register.

If the signs are unlike and a carry is emitted by the Adder 1 order, the adder 1 carry signal is fed to the Overflow trigger turning the latter ON. This is accomplished as the signal on line SSU, which is positive when the operation is SUBTRACT and the signs are unlike, feeds via the OR circuit 516e, of Fig. *5ag*, and line 517e to condition one input of the AND circuit 518e. The second input to the AND circuit 518e is via line ADDER (1) CARRY, which is positive when a carry is emitted from the Adder 1 order. While the AND circuit 518e is conditioned, the E/R 1 (D4) signal is passed through the conditioned AND circuit and via line 519e, the OR circuit 520e, the amplifier 521e and the cathode follower 522d to the line AD (1) C/ACC (1) OV to thereby cause the overflow trigger to be turned ON (see Fig. *5a*).

As indicated on the Timing Diagram, if the signs are alike and an End carry is emitted from the Adder Q order, then an elusive one carry is added to the Adder 35 order. This is brought about during the Subtract operation as a positive signal on the line SSA, which is positive when the operation is Subtract and the signs are alike, feeds via the OR circuit 505e, of Fig. *5ap*, and the line 506e to condition one input of the AND circuit 507e. A second input to the AND circuit 507e is via line ADDER (Q) CARRY which is positive when an End carry is emitted from the Adder Q order. While the AND circuit 507e is conditioned, an E/R 1 (D4) signal passes via the conditioned AND circuit and the line 508e, the OR circuit 509e, the amplifier 510e and the cathode follower 511e to the line CARRY ADDER (35), to thus effectively add a carry (elusive one) to the Adder 35 order. The sum output of the Adder must be gated to the Accumulator Register, and this is accomplished during a SUBTRACT operation, as the line SUB goes positive, and feeds via the OR circuit 506d of Fig. *5ab* and the line 507d to condition the AND circuit 508d. The AND circuit 508d, being conditioned, passes the E/R 4 (D1) signal via line 509d, the OR circuit 514d, the amplifier 515d, and the cathode follower 516d to the line ADDER TO ACC, which is effective to gate the output of the Adder to the Accumulator Register.

If the signs were alike and no End carry occurred, it may be determined by mathematical analysis, that the sum which was gated to the Accumulator Register is in complement form, and, therefore, it is necessary to recomplement that value so that a true value will be stored in Accumulator Register. This is accomplished as a positive signal on the line SSANC, which is positive when the operation is SUBTRACT, the signs are alike and no End carry occurred, feeds via the OR circuit 584c of Fig. *5ac* and line 585c to condition one input of the AND circuit 586c. The AND circuit 586c, while conditioned, passes an E/R 7 (D2) signal via line 587, the OR circuit 588c, the amplifier 589c, and the cathode follower 590c to the line ACC COMP TO ADDER. Thus, a complement of the holding of the Accumulator Register is fed to the Adder. The output of the Adder, which will be a complement of the value stored in the Accumulator Register, is gated to the Accumulator Register as the positive signal on the line SSANC also passes via the OR circuit 510d, of Fig. *5ae*, and line 511d to condition the AND circuit 512d. The AND circuit 512d, while conditioned, passes E/R 8 (D1) signal via line 513d, the OR circuit 514d, the amplifier 515d, and the cathode follower 516d to the line ADDER TO ACC. Thus a true value is stored in the Accumulator Register.

Referring to Fig. *5bf*, if during a Subtract operation the signs are alike, an End carry occurred and the Accumulator Register Sign is negative, then the line SSAC (−) is positive and feeds via the OR circuit, 510f of Fig. *5bf*, and line 511f to condition the AND circuit 512f. The AND circuit 512f, while conditioned, passes an E/R 10 (D1) signal via the amplifier 513f and the cathode follower 514f to the line (+) TO ACC (S) to thereby put a positive sign representation in the Accumulator Register Sign order. However, if the operation is SUBTRACT, the signs are alike, and an End carry occurred and the Accumulator Register Sign is positive, then the signal on line SS AC (+) is positive and passes via the OR circuit 515f, of Fig. *5bg*, and line 516f to condition the AND circuit 517f. The AND circuit 517f, while conditioned, passes the E/R 10 (D1) signal via the amplifier 518f and the cathode follower 519f to the line (−) TO ACC (S) and thereby cause a negative sign representation to be stored in the Accumulator Sign order.

Refer now to Fig. *5af*, wherein the line SUB, when positive, feeds via the OR circuit 520d and line 521d to condition the AND circuit 522d. The AND circuit 522d, while conditioned, passes the E/R 10 (D2) signal via line 523d, the OR circuit 528d, the amplifier 529d and the cathode follower 530d to the line END OP to thereby signal an End of Operation. The signal on line END OP is passed via the normally conditioned AND circuit 568d, of Fig. *5aj*, and via the amplifier 569d and the cathode follower 570d to the line STEP INST CTR to thereby cause Instruction Counter (Fig. *4d*) to be stepped.

Refer now to Fig. *6p*, which shows the Timing Diagram of a SUBTRACT ABSOLUTE operation. The signals developed during the Instruction and Execute cycles, are the same as described above, during the ADD operation. During a SUBTRACT ABSOLUTE operation, the value read from Memory into the Memory Register is regarded as positive, regardless of its actual sign. Therefore, in a SUBTRACT ABSOLUTE operation, there are only two possibilities of sign combinations, as distinguished from the four possibilities of a SUBTRACT operation. In the SUBTRACT ABSOLUTE operation, the value in the Memory Register, which is the subtrahend, is regarded as positive. The minuend, in the Accumulator Register, may be positive or negative. At 1 time of the Execute/Regenerate cycle, an E/R 1 (D4) signal is emitted to gate holding of the Memory Register, to the Adder, and if the Accumulator Register Sign is negative, an identically timed signal gates the value from Accumulator Register in true form to the Adder. However, if the Accumulator Register Sign is positive, an E/R 1 (D4) signal is emitted to gate the information from the Accumulator Register in complement form to the Adder. Further, if the Accumulator Register Sign is negative, and the Adder 1 order emits a carry signal, this carry signal is gated to the Overflow trigger turning the latter ON, but if the Accumulator Register Sign is positive, and the Adder Q order emits an end carry, a carry (elusive one) is added to the Adder 35 order. At four time of the Execute/Regenerate cycle, an E/R 4 (D1) signal is emitted for gating the output of the Adder to the Accumulator Register. If upon completion of this subtraction, the Accumulator Register Sign is positive and no End carry occurred, it is an indication that a complement value is stored in the Accumulator Register.

If the value now stored in accumulator storage is in complement form, it is necessary to recomplement the information so that the true value will be stored in the Accumulator Register. Thus, if the Accumulator Register Sign is positive, and no End carry occurred, at 7 time of the Execute/Regenerate cycle an E/R 7 (D2) signal gates the information from the Accumulator Register in complement form to the Adder, and thereafter an E/R 8 (D1) signal gates the output of the Adder to the Accumulator Register. These latter two signals then are effective to cause a recomplementing of the information held by the Accumulator Register. If, as a result of the Subtraction, an End carry occurred and if the sign of the Accumulator Register is positive, then a negative sign representation is stored in the Accumulator Register Sign order by an E/R 10 (D1) signal, otherwise, the Accumulator Register Sign is left undisturbed. The operation is complete at that time so an End of Operation signal is emitted at E/R 10 (D2) time, which signal is also utilized to develop a signal to step the Instruction Counter.

The signals occurring at I9 (D1) and I10 (D1) times, for gating a half word Instruction from the Memory Busses to the Memory Register, and from the Memory Register to the Instruction Register are emitted by the circuits of Fig. 5*z*, described above. The GO TO EX signal is developed as the line SUB AB goes positive, and feeds via the OR circuit **523*e*** of Fig. 5*ar* and line **524*e* to condition the AND circuit 525*e*. The AND circuit 525*e*, being conditioned, passes an I11 (D1) signal through the amplifier 526*e* and the cathode follower 527*e* to the line GO TO EX. The signal on the line SUB AB, when positive, also passes via the OR circuit 566*c*** of Fig. 5*z* and the cathode follower **567*c* and line 568*c* to condition the AND circuits 550*c*, 555*c*, 560*c* and 563*c***. Otherwise, outputs of these circuits, shown on Fig. 5*z*, is dependent upon whether a full, an even or an odd half word is addressed. As described above, the outputs of these circuits determine whether a full word, an even half word or an odd half word is read from Memory to the Memory Register at E9 (D1) time. Referring to Fig. 5*ak*, the line SUB AB, going positive, feeds via the OR circuit **579*d* and line 580*d* to condition the AND circuit 581*d*. The AND circuit 581*d*, while conditioned, passes the E11 (D1) signal via line 582*d*, the OR circuit 583*d*, the amplifier 584*d* and the cathode follower 585*d*** to the line GO TO EX/RGN, thereby sending the machine into an Execute/Regenerate cycle.

Refer now to Fig. 5*j*, which shows the SUBTRACT ABSOLUTE Execution Timer. A positive signal on the line SUB AB conditions the AND circuits **525*b*, 527*b*, 529*b* and 531*b*. A second input to the AND circuit 525*b* is via line ACC (−), which is positive when the Accumulator Register Sign is negative. Therefore, the output of the AND circuit 525*b* passes via the cathode follower 526*b* to the line SA (−) and is positive when the operation is SUBTRACT ABSOLUTE and the Accumulator Register Sign is negative. The AND circuit 527*b* receives a second input via line ACC (+), which is positive when the Accumulator Register Sign is positive. Therefore, the output of the AND circuit 527*b* passes via the cathode follower 528*b*** to the line SA (+) and is positive when the operation is SUBTRACT ABSOLUTE and the Accumulator Register Sign is positive.

The AND circuit **529*b* receives the same inputs as the AND circuit 527*b* and further an input via line NO QC, which is positive when no End carry has occurred from the Q order of the Adder. The output of the AND circuit 529*b* passes via the cathode follower 530*b* to line SA (+) NC, which is positive when the operation is SUBTRACT ABSOLUTE, the Accumulator Register Sign is positive and no End carry has occurred. The AND circuit 531*b* receives the same inputs as the AND circuit 527*b* and further a signal via the line QC, which is positive when an End carry has occurred from the Q position of the Adder. The output of the AND circuit 531*b* passes via the cathode follower 532*b*** to the line SA (+) C and is positive when the operation is SUBTRACT ABSOLUTE, the Accumulator Register Sign is positive and an End carry has occurred.

Refer now to Fig. 5*ab*, wherein a positive signal on the line SUB AB passes via the OR circuit **575*c* and line 576*c* to condition the AND circuit 577*c*. The AND circuit 577*c*, while conditioned, passes the E/R 1 (D4) signal via the amplifier 578*c* and the cathode follower 579*c* to the line MR TO ADDER, thereby gating the holding of the Memory Register to the Adder. If the operation is SUBTRACT ABSOLUTE and the Accumulator Register Sign is negative, the line SA (−) is positive, as explained above, and feeds via the OR circuit 501*d***, of Fig. 5*ad*, and line **502*d* to condition the AND circuit 503*d*. The AND circuit 503*d*, being conditioned, passes the E/R 1 (D4) signal via the amplifier 504*d* and the cathode follower 505*d* to the line ACC TRUE TO ADDER, to thereby gate information from the Accumulator Register in true form to the Adder. If, however, the Instruction is SUBTRACT ABSOLUTE and the Accumulator Register Sign is positive, then the signal on line SA (+) is positive, as explained above, and feeds via the OR circuit 580*c***, of Fig. 5*ac*, and line **581*c* to condition the AND circuit 582*c*. The AND circuit 582*c*, being conditioned, passes the E/R 1 (D4) signal via line 583*c*, the OR circuit 588*c*, the amplifier 589*c* and the cathode follower 590*c* to the line ACC COMP TO ADDER to gate the holding of the Accumulator Register in complement form to the Adder. If the Accumulator Register Sign is negative, and the Adder 1 order emits a carry signal during the Subtraction, then the Adder 1 carry signal is fed to the Overflow trigger to turn the latter ON. This is caused by the action of a positive signal on the line SA (−), which is positive when the operation is SUBTRACT ABSOLUTE and the Accumulator Register Sign is negative, feeding via the OR circuit 516*e*** of Fig. 5*aq*, and line **517*e* to condition one input of the AND circuit 518*e*. The second input to the AND circuit 518*e* is via the line ADDER (1) CARRY which is positive when the Adder 1 order emits a carry. While the AND circuit 518*e* is conditioned, an E/R 1 (D4) signal is passed via line 519*e*, the OR circuit 520*e*, the amplifier 521*e*, and the cathode follower 522*e***, to the line ADDER (1) C/ACC (1) OV to thereby turn ON the overflow trigger (Fig. 5*a*). If the Accumulator Register Sign is positive and the Adder Q order emits an End carry, then the line SA (+), which is positive when the operation is SUBTRACT ABSOLUTE and the Accumulator Register Sign is positive, feeds via the OR circuit **505*e***, of Fig. 5*ap*, and line **506*e* to condition the AND circuit 507*e*. The second input to the AND circuit 507*e* is conditioned by a positive signal on the line ADDER (Q) CARRY which is positive when an End carry is emitted by the Q order of the Adder. While the AND circuit 507*e* is conditioned, an E/R 1 (D4) signal is passed via line 508*e*, the OR circuit 509*e*, the amplifier 510*e* and the cathode follower 511*e*** to the line CARRY ADDER (35), to thereby add a carry (elusive one) to the Adder 35 order.

The output of the Adder is gated to the Accumulator Register as the line SUB AB goes positive and feeds via the OR circuit **506*d***, of Fig. 5*ae*, and line **507*e* to condition the AND circuit 508*d*. The AND circuit 508*d*, being conditioned, passes the E/R 4 (D1) signal via line 509*d*, the OR circuit 514*d*, the amplifier 515*d*, and the cathode follower 516*d*** to the line ADDER TO ACC.

If at this time, it is determined that the Accumulator Register Sign is positive, and no End carry resulted, then the word stored in Accumulator Register, is in complement form and must be recomplemented. Referring to Fig. 5*ac*, as the signal on line SA(+)NC goes positive, it is an indication that the operation is SUBTRACT ABSOLUTE, that the Accumulator Register Sign is positive and that no End carry has occurred, and this signal feeds via the OR circuit 584c and line 585c to condition the AND circuit 586c. The AND circuit 586c, being conditioned, passes the E/R 7 (D2) signal via line 587c, the OR circuit 588c, the amplifier 589c and the cathode follower 590c to the line ACC COMP TO ADDER, to gate the word in the Accumulator Register to the Adder in complement form. The signal on the line SA(+)NC also passes via the OR circuit 510d, of Fig. *5ad*, and line 511d to condition the AND circuit 512d. The AND circuit 512d, while conditioned, passes the E/R 8 (D1) signal via line 513d, the OR circuit 514d, the amplifier 515d and the cathode follower 516d to the line ADDER TO ACC, thereby gate the output of the Adder into the Accumulator Register. These signals are effective to recomplement the value stored in the Accumulator Register as a result of the subtraction.

If the Accumulator Register Sign is positive and an End carry occurred during the subtraction, then the signal on line SA(+)C is positive, as explained above, and via the OR circuit 515f of Fig. *5bg*, and line 516f conditions the AND circuit 517f. The AND circuit 517f, while conditioned, passes the E/R 10 (D1) signal via the amplifier 518f and the cathode follower 519f to the line (−) TO ACC (S), to thereby set the negative sign representation in the Accumulator Register Sign position.

The positive signal line SUB AB also feeds via the OR circuit 520d, of Fig. *5af*, and line 521d to condition the AND circuit 522d. The AND circuit 522d, while conditioned, passes the E/R 10 (D2) signal via line 523d, the OR circuit 528d, the amplifier 529d and the cathode follower 530d to the line END OP and thereby signal an End of Operation. The signal on line END OP passes via the normally conditioned AND circuit 568d, of Fig. *5aj*, and via the amplifier 569d, and the cathode follower 570d to the line STEP INST CTR to thereby cause a stepping of the Instruction Counter.

Refer now to Fig. *6q*, which is the Timing Diagram for a RESET ADD operation. During Instruction time, the I9 (D1) and I10 (D1) signals for gating a half word Instruction from the Memory Busses to the Memory Register and from the Memory Register to the Instruction Register and the I11 (D1) signal for sending the machine into an Execute cycle, are emitted. During the Execute cycle, the full or half word is read out of Memory to the Memory Busses and gated to the Memory Register by a E9 (D1) signal. A E11 (D1) signal is also emitted to send the machine into an Execute/Regenerate cycle. During the Execute/Regenerate cycle, an E/R 1 (D4) signal is emitted gating the holding of the Memory Register to the Adder and thereafter, an E/R 4 (D1) signal is emitted to gate the output of the Adder into the Accumulator Register. Inasmuch as the Holding of the Accumulator Register is not gated to the Adder, effectively, this operation resets the Accumulator Register and transfers the contents of the Memory Register to the Accumulator Register. At E/R 10 (D1) time, a signal is emitted to set the Accumulator Register Sign to agree with the Memory Register Sign. Thus, of the Memory Register Sign is negative, a negative sign representation is placed in the Accumulator Register Sign order while if the Memory Register sign is positive, a positive sign representation is placed in the Accumulator Register Sign order. An End of Operation signal is emitted at E/R 10 (D2) time, and a like signal is emitted to step the Instruction Counter.

The I9 (D1) and I10 (D1) signals are developed, as described above, by the circuits of Fig. *5z*. GO TO EX signal is developed as the line R ADD is positive and feeds via the OR circuit 523e, of Fig. *5ar*, and line 524e to condition the AND circuit 525e. The AND circuit 525e, while conditioned, passes an I11 (D1) signal via the amplifier 526e and the cathode follower 527e to the line GO TO EX.

During the Execute cycle, signals for gating information from the Memory Busses to the Memory Register, and where necessary, for clearing a portion of the Memory Register, are generated as the line R ADD goes positive and feeds via the OR circuit 566c, of Fig. *5z*, and via the cathode follower 567c and line 568c to condition the AND circuits 550c, 555c, 560c and 563c. These AND circuits are also conditioned by signals indicating whether the address of the Instruction selects a full word, an even half word, or an odd half word. The output lines, of Fig. *5z*, as described above, in combination with Memory determine whether a full, an even half, or an odd half word is gated from the Memory Busses to the Memory Register.

Referring to Fig. *5ak*, a positive signal on the line R ADD passes via the OR circuit 579d and line 580d to condition the AND circuit 581d. The AND circuit 581d, while conditioned, passes an E11 (D1) signal via line 582d, the OR circuit 583d, the amplifier 584d, and the cathode follower 585d to the line GO TO EX/RGN, and thereby sends the machine into an Execute/Regenerate cycle. At "1" time of the Execute/Regenerate cycle, an E/R (1) D4 signal is emitted to gate the holding of the Memory Register to the Adder. Referring to Fig. *5ab*, this signal is developed as the line R ADD goes positive and via the OR circuit 575c and line 576c conditions the AND circuit 577c. The AND circuit 577c, being conditioned, passes the E/R 1 (D4) signal via the amplifier 578c and the cathode follower 579c to the line MR TO ADDER. At this time, the holding of the Accumulator Register is not gated to the Adder. Therefore, the output from the Adder will be merely the word read out of Memory into the Memory Register. The output of the Adder is gated to the Accumulator Register as the signal on line R ADD is positive and feeds via the OR circuit 506d, of Fig. *5ae*, and via line 507d to condition the AND circuit 508d. The AND circuit 508d, being conditioned, passes the E/R 4 (D1) signal via line 509d, the OR circuit 514d, the amplifier 515d and the cathode follower 516d to the line ADDER TO ACC.

Refer now to Fig. *5m* which is the RESET ADD Execution Timer. A positive signal on the line R ADD conditions one input of both AND circuits 550b and 552b. The AND circuit 552b also receives a signal via line MR (+), which is positive when the Memory Register Sign is positive. Therefore, the output of the AND circuit 550d passes via the cathode follower 551d to the line RA MR (+) and is positive when the operation is Reset Add, and the Memory Register Sign is positive. The AND circuit 552d receives second input via line MR (−), which is positive when the Memory Register Sign is negative. Therefore, the output of the AND circuit 552b, feeding via the cathode follower 553b to the line RA MR (−) is positive when the operation is Reset Add and the Memory Register Sign is negative.

The signals developed and described thus far for a Reset Add operation, have been effective merely to store in any new information the Accumulator Register. More specifically, these signals have gated the information read out of Memory into the Accumulator Register replacing whatever was formerly stored in the Accumulator Register with the exception of the Sign order.

Refer now to Fig. *5bf*, wherein if the line RA MR (+), which is positive as explained above, when the operation is Reset Add and the Memory Register Sign is positive, feeds via the OR circuit 510f and the line 511f to condition the AND circuit 512f. The AND circuit 512f, being conditioned, passes the E/R 10 (D1) signal via the amplifier 513f and the cathode follower 514f to the line (+) TO ACC (S) to thereby store a positive sign representation in the Accumulator Register Sign order. However, if the output of the Reset Add Execution Timer drove the line RA MR (−) positive, which is an indication that the operation is Reset Add, and the Memory Register sign is negative, this positive signal passes through the OR circuit **515*f*** of Fig. *5bg*, and via line **516*f* to condition the AND circuit 517*f*. The AND circuit 517*f*, being conditioned, passes the E/R 10 (D1) signal via the AND circuit 518*f* and the cathode follower 519*f*** to the line (−) TO ACC (S) to thereby store a negative sign representation in the Accumulator Register Sign position.

Referring to Fig. *5af*, the line R ADD, being positive, feeds via the OR circuit **520*d* and line 521*d* to condition the AND circuit 522*d*. The AND circuit 522*d*, while conditioned, passes the E/R 10 (D2) signal via line 523*d*, the OR circuit 528*d*, the amplifier 529*d*, and the cathode follower 530*d* to the line END OP, to thereby signal an End of Operation. The signal on line END OP is passed through the normally conditioned AND circuit 568*d***, of Fig. *5aj*, and via the amplifier **569*b* and the cathode follower 570*b*** to the line STEP INST CTR to thereby generate a signal for stepping the Instruction Counter.

The RESET SUBTRACT operation, whose Timing Diagram is shown on Fig. *6r*, is identical to the Reset Add operation, except that if the Memory Register Sign is negative, the Accumulator Register Sign is made positive but if the Memory Register Sign is positive, the Accumulator Register Sign is negative.

The I9 (D1) and I10 (D1) signals for gating an Instruction from Memory via the Memory Busses to the Memory Register and for gating this Instruction from the Memory Register to the Instruction Register are developed by circuits of Fig. *5z*, described above. The GO TO EX signal is developed by a positive signal on the line R SUB feeding via the OR circuit **523*e***, of Fig. *5ar*, and line **524*e* to condition the AND circuit 525*e*. The AND circuit 525*e*, being conditioned, passes the I11 (D1) signal via the amplifier 526*e* and the cathode follower 527*e*** to the line GO TO EX, thereby sending the machine into an Execute cycle.

Referring to Fig. *5z*, a positive signal on the line R SUB feeding via the OR circuit **566*c*, the cathode follower 567*c* and line 568*c* conditions the AND circuits 550*c*, 555*c*, 560*c*, and 563*c***. The gating of an E9 (D1) signal through these AND circuits is dependent upon whether a full, an even half or an odd half word is selected by the Instruction. The E9 (D1) output signals, of Fig. *5z*, are effective as described above to gate a full, an even half or an odd half word from the Memory Busses to the Memory Register. The machine is then sent into an Execute/Regenerate cycle, as the line R SUB goes positive, and via the OR circuit **579*d*** of Fig. *5ak* and line **580*d* conditions the AND circuit 581*d*. The AND circuit 581*d*, being conditioned, passes an E11 (D1) signal via line 582*d*, the OR circuit 583*d*, the amplifier 584*d* and the cathode follower 585*d*** to the line GO TO EX/RGN.

Refer now to Fig. *5i*, which is the Execution Timer for a RESET SUBTRACT operation. The line R SUB, when positive, conditions one input of each of the AND circuits **521*b* and 523*b*. The AND circuit 521*b* also receives a signal via line MR (−), which is positive when the Memory Register Sign is negative. Therefore, the output of the AND circuit 521*b* feeds via the cathode follower 522*b* to the line RS MR (−) and is positive, when the operation is Reset Subtract and the Memory Register Sign is negative. The AND circuit 523*b* also receives a signal via line MR (+), which is positive when the Memory Register Sign is positive. Therefore, the output of the AND circuit 523*b* passes via the cathode follower 524*b*** to the line RS MR (+), which is positive when the operation is Reset Subtract, and the Memory Register Sign is positive.

Referring to Fig. *5ab*, a positive signal on the line R SUB feeds via the OR circuit **575*c* and line 576*c* to condition the AND circuit 577*c*. The AND circuit 577*c*, being conditioned, passes the E/R 1 (D4) pulse via the amplifier 578*c* and the cathode follower 579*c* to the line MR TO ADDER, to thereby gate information from the Memory Register to the Adder. It should be noted that no information is gated from the Accumulator Register, to the Adder at this time. Therefore, the output of the Adder is the word read out of Memory to the Memory Register during the Execute cycle. This output of the Adder is gated to the Accumulator Register, as the line R SUB goes positive, and via the OR circuit 506*d***, of Fig. *5ae*, and line **507*d* conditions the AND circuit 508*d*. The AND circuit 508*d*, being conditioned, passes the E/R 4 (D1) signal via line 509*d*, the OR circuit 514*d*, the amplifier 515*d* and the cathode follower 516*d*** to the line ADDER TO ACC. At this point, the numerical information read out of Memory is now in the Accumulator Register. The sign position of the Accumulator Register is taken care of as follows:

Referring to Fig. *5bf*, if the operation is Reset Subtract and the Memory Register Sign is negative, the line RS MR (−) is positive, as explained above, and via the OR circuit **510*f* and line 511*f* conditions the AND circuit 512*f*. The AND circuit 512*f*, while conditioned, passes the E/R 10 (D1) signal via the amplifier 513*f* and the cathode follower 514*f* to the line (+) TO ACC (S), to thereby place a positive sign representation in the Accumulator Register Sign order. However, if the output of the Reset Subtract Execution Timer drives line RS MR (+) positive, which signifies, as explained above, that the operation is Reset Subtract and the Memory Register Sign is positive, then this positive signal passes through the OR circuit 515*f***, of Fig. *5bg*, and via line **516*f* to condition the AND circuit 517*f*. The AND circuit 517*f*, while conditioned, passes the E/R 10 (D1) signal via the amplifier 518*f* and the cathode follower 519*f*** to the line (−) TO ACC (S) to thereby set a negative sign representation in the Accumulator Register Sign order.

The End of Operation signal is developed as the line R SUB goes positive and passes through the OR circuit **520*d***, of Fig. *5af*, and line **521*d* to condition the AND circuit 522*d*. The AND circuit 522*d*, being conditioned, passes the E/R 10 (D2) signal via line 523*d*, the OR circuit 528*d*, the amplifier 529*d*, and the cathode follower 530*d* to the line END OP. The two microsecond End of Operation signal, on line END OP, also passes through the normally conditioned AND circuit 568*d*** of Fig. *5aj* and via the amplifier **569*d* and the cathode follower 570*d*** to the line STEP INST CTR to thereby step the Instruction Counter (Fig. *4d*).

Refer now to Fig. *6s*, which is the Timing Diagram for a STORE operation. An I9 (D1) signal is generated for gating the half word instruction from Memory Busses to the Memory Register, and, thereafter, an I10 (D1) signal is generated, as described above, for gating the Instruction from the Memory Register into the Instruction Register. Thereafter, a GO TO EX signal is emitted to send the machine into an Execution cycle. At approximately I10 time, as the Operation Decoder receives signals representing the Operation portion of the Instruction, that is, bits 1 through 5 from Instruction Register, and thereby cause its output line STORE to go positive, a PREPARE FOR MEM RI (prepare for Memory read in) signal is generated. This signal stays positive until another Instruction is read into the Operation Decoder. When the Memory is prepared for read in, and the machine enters an Execution cycle, a full word, an even half word or an odd half word is gated from the Accumulator Register to the Memory Busses and thus is stored in Memory. An E8 (D2) signal is utilized to gate the output of the Accumulator Register to the Memory Busses. At E10 (D2) time, an End of Operation signal is emitted and a like signal is emitted to step the Instruction Counter.

If the STORE Instruction selects a full word address, orders S and 1 through 35 of the Accumulator Register are fed through Memory Bus Switch circuits to the Memory Busses S and 1 through 35 and bits S and 1 through 35 are stored in Memory. However, if the address is for an even half word, the Accumulator Register orders S and 1 through 35 are gated via the Memory Buss Switch circuits to the Memory Busses S and 1 through 35, but, as described in the application of Fox et al., only the Memory Units, addressed and receiving signals via Memory Busses S and 1 through 17 are unblanked to Store information. In effect, then only information bits from orders S and 1 through 17 of Accumulator Register are Stored in Memory. If the Store Instruction selects an odd half word, the holding of the Accumulator Register orders S and 1 through 17 are transferred by the Memory Buss Switch circuits to Memory Busses 18 through 35, and are Stored in Memory Units 18 through 35, as described in the application of Fox et al. referred to above.

The I9 (D1) and I10 (D1) signals for gating a half word Instruction from Memory Busses to the Memory Register for gating this Instruction from the Memory Register to the Instruction Register are developed by the circuits of Fig. 5*z*, described above. A GO TO EX signal is emitted to send the machine into an Execution cycle, as the line STORE goes positive and via the OR circuit 523*e*, of Fig. 5*ar*, and line 524*e* conditions the AND circuit 525*e*. The AND circuit 525*e*, while conditioned, passes an I11 (D1) signal via the amplifier 526*e* and the cathode follower 527*e* to the line GO TO EX. Referring to Fig. 5*am*, as the signal on line STORE goes positive, which occurs at approximately 10 time of the Instruction cycle, it passes via an OR circuit 586*d*, an amplifier 587*d* and a cathode follower 588*d* to the line PREP MEM RI. As described in the application of Fox et al., the signal on the latter line prepares the Memory for read-in.

Refer now to Fig. 5*p*, which is the STORE Execution Timer. A positive signal on the line STORE conditions one input of each of the AND circuits 562*b* and 564*b*. The AND circuit 564*b* also receives a signal via line F/E HALF, which is positive when a full or even half word is addressed. Therefore, the output of the AND circuit 562*b* passes via the cathode follower 563*b* to the line ST F/E HALF and is positive when the Instruction is Store and when a full or even half word is addressed. The AND circuit 564*b* receives a second input via the line ODD HALF, which is positive when an odd half word is addressed. Therefore, the output of the AND circuit 564*b* passes via the cathode follower 565*b* to the line ST ODD HALF and is positive when the operation is Store and an odd half word is addressed.

Refer now to Fig. 5*ax*, wherein if the operation is Store and a full or even half word address is selected, the line ST F/E HALF feeds via an OR circuit 570*e* to condition and AND circuit 571*e*. The AND circuit 571*e*, while conditioned, passes the E8 (D2) signal via an amplifier 572*e* and a cathode follower 573*e* to the line ACC (S to 35) TO MEM BUSS (S to 35). This signal is effective to connect outputs to the Accumulator Register S and 1 through 35 orders to the Memory Busses S and 1 through 35, respectively. However, if the operation were Store and an odd half word address is selected, the line ST ODD HALF feeds via an OR circuit 574*e*, of Fig. 5*ay*, to condition an AND circuit 575*e*. The AND circuit 575*e*, while conditioned, passes the E8 (D2) signal via an amplifier 576*e* and a cathode follower 577*e* to the line ACC (S to 17) TO MEM BUSS (18 to 35). A positive signal on the latter line causes outputs of the Accumulator Register S and 1 through 17 orders to be gated to the Memory Busses 18 through 35, and this information is stored in Memory Units 18 through 35, as described in the application of Fox et al.

The End of Operation signal is generated as line STORE goes positive and feeds via the OR circuit 524*d*, of Fig. 5*af*, via line 525*d* to condition the AND circuit 526*d*. The AND circuit 526*d*, while conditioned, passes the E10 (D2) signal via line 527*d*, the OR circuit 528*d*, the amplifier 529*d* and the cathode follower 530*d* to the line END OP. The End of Operation signal of two microseconds duration on line END OP also passes through the normally conditioned AND circuit 568*d* of Fig. 5*aj* and via the amplifier 569*d* and the cathode follower 570*d* to the line STEP INST CTR.

Refer now to Fig. 6*t*, which is the Timing Diagram for a STORE MQ Instruction. The timed signals represented on Fig. 6*t* are identical to Fig. 6*s*, described above, except that information is gated from the MQ Register, rather from the Accumulator Register to the Memory Busses.

The I9 (D1) and I10 (D1) signals for gating a half word Instruction from the Memory Busses to the Memory Register and for gating the Instruction from the Memory Register to the Instruction Register, are generated by the circuits of Fig. 5*z*, described above. The GO TO EX signal is developed as a positive signal occurs on the line STORE MQ and feeds via the OR circuit 523*e*, of Fig. 5*ar*, and via line 524*e* to condition the AND circuit 525*e*. The AND circuit 525*e*, while conditioned, passes the I11 (D1) signal via the amplifier 526*e* and the cathode follower 527*e* to the line GO TO EX. A PREPARE MEM RI signal is developed by the circuits on Fig. 5*am*. As the signal on line STORE MQ goes positive, at approximately 10 time of the Instruction cycle as the output of the Operation Decoder changes, it passes via the OR circuit 586*d*, the amplifier 587*d* and the cathode follower 588*d* to the line PREP MEM RI.

Refer now to Fig. 5*q*, which is the Execution Timer for a STORE MQ operation. The line STORE MQ going positive, conditions one input of each of the AND circuits 566*b* and 568*b*. The AND circuit 566*b* also receives a signal via line F/E HALF, which is positive when a full or an even half word address is selected. Therefore, the output of the AND circuit 566*e* passes via the cathode follower 567*b* to the line ST MQ F/E HALF and is positive when the operation is Store MQ and a full or even half word address is selected. The AND circuit 568*b* receives a second input via line ODD HALF, which is positive when an odd half word address is selected. The output of the AND circuit 568*b* passes via the cathode follower 569*b* to the line ST MQ ODD HALF and is positive when the operation is Store MQ and an odd half word address is selected.

Referring to Fig. 5*az*, if the operation is STORE MQ and a full or even half word address is selected, the line ST MQ F/E HALF is positive and conditions an AND circuit 579*e*. The AND circuit 579*e*, while conditioned, passes the E8 (D2) signal via an amplifier 580*e* and a cathode follower 581*e* to the line MQ (S to 35) TO MEM BUS (S to 35). A positive signal on the latter line is effective to gate information from the MQ Register S to 35 orders to the Memory Busses S to 35, respectively. If, however, the operation is STORE MQ, and an odd half word address is selected, the line ST MQ ODD HALF is positive and conditions an AND circuit 593*e* of Fig. 5*bc*. The AND circuit 593*e*, while conditioned, passes the E8 (D2) signal via an amplifier 594*e* and a cathode follower 595*e* to the line MQ (S to 17) TO MEM BUS (18 to 35); a positive signal on the latter line is effective to gate information from the MQ register S to 17 orders to the Memory Busses 18 to 35, respectively.

Referring to Fig. 5*af*, an End of Operation signal is developed as the signal on line STORE MQ goes positive, and feeds via the OR circuit 524*d* and line 525*d* to condition the AND circuit 526*d*. The AND circuit 526*d*, being conditioned, passes the E10 (D2) signal via line 527*d*, the OR circuit 528*d*, the amplifier 529d and the cathode follower 530*d* to the line END OP. The two microsecond End of Operation signal on line END OP is passed through the normally conditioned AND circuit 568*d*, of Fig. 5*aj*, and via the amplifier 569*d* and the cathode follower 570*d* to the line STEP INST CTR.

Refer now to Fig. 6*u*, which shows the Timing Diagram for a STORE ADDRESS operation. During a Store Address operation, the holding of the Accumulator Register orders 6 through 17 only, are stored in Memory Units, 6 through 17, if an even half word address is selected, but if an odd half word address is selected, Accumulator Register orders, 6 through 17 are stored in Memory Units 24 through 35, respectively. A half word address is always selected with a Store Address Instruction, and the effect is to change the address portion of a selected stored Instruction. The Timing Diagram for a STORE ADDRESS operation is identical to the Timing Diagram for the STORE operation, described above. The STORE ADDRESS operation differs from a STORE operation in that during a STORE ADDRESS operation only Memory Units 6 through 17 are unblanked for an even half word address, or positions 24 through 35 for an odd half word address. The unblanking of these Memory Units is shown and described in the application of Fox et al. mentioned above. If a full word address should be given with a STORE ADDRESS Instruction, the operation then performed, as described in the application of Fox et al., is EXTRACT.

During the Instruction cycle during which a STORE ADDRESS Instruction is read from Memory, the I9 (D1) and I10 (D1) signals for gating the half word Instruction from the Memory Busses to the Memory Register, and for gating the half word Instruction from the Memory Register to the Instruction Register are developed by the circuits of Fig. 5*z* described above. The GO TO EX signal, to send the machine into an Execute cycle, is developed as the line STORE ADR is positive and feeds via the OR circuit 523*e*, of Fig. 5*ar*, and line 524*e* to condition the AND circuit 525*e*. The AND circuit 525*e*, while conditioned, passes the I11 (D1) signal via the amplifier 526*e* and the cathode follower 527*e* to the line GO TO EX.

During a STORE ADDRESS operation, the signal preparing Memory for read in is also developed. As the signal on line STORE ADR goes positive, at approximately 10 time of the Instruction cycle, it passes via the OR circuit 586*d* of Fig. 5*am*, and via the AND circuit 587*b* and the cathode follower 588*d* to the line PREP MEM RI. This signal, as described above, stays positive, until another Instruction is read from Memory.

Refer now to Fig. 5*t*, which is the Execution Timer for a STORE ADDRESS operation. The line STORE ADR, going positive, conditions one input of the AND circuits 593*b* and 595*b*. The AND circuit 593*b*, receives a second input via line F/E HALF, which is positive, when a full or even half word address is selected. However, it should be noted that during the STORE ADDRESS operation, as explained above, only half word addresses are selected, so that the line F/E HALF is positive during a STORE ADDRESS operation when an even half word address is selected. Therefore, the output of the AND circuit 593*b* feeds via the cathode follower 594*b* to the line ST AD F/E HALF and is positive when the operation is STORE ADDRESS and an even half word address is selected. The AND circuit 595*b* receives a second input via line ODD HALF, which is positive when an odd half word address is selected. Therefore, the output of the AND circuit 595*b* feeds via the cathode follower 596*b* to the line ST AD ODD HALF and is positive when the operation is STORE ADDRESS and an odd half word address is selected.

If the operation is STORE ADDRESS and an even half word address is selected the line ST AD F/E HALF is positive and via the OR circuit 570*e*, of Fig. 5*ax*, to condition the AND circuit 571*e*. The AND circuit 571*e*, while conditioned, passes the E8 (D2) signal via the amplifier 572*e* and the cathode follower 573*e* to the line ACC (S to 35) to MEM BUS (18 to 35). A positive signal on the latter line, as described below, gates the Accumulator Register outputs for orders S through 35, to Memory Busses S through 35, but only orders 6 through 17 are stored in Memory, as those are the only positions in Memory unblanked. If during a STORE ADDRESS operation, an odd half word address is selected, the line ST AD ODD HALF is positive, and via the OR circuit 574*e*, of Fig. 5*ay*, conditions the AND circuit 575*e*. The AND circuit 575*e*, while conditioned, passes the E8 (D2) signal via the amplifier 576*e* and the cathode follower 577*e* to the line ACC (S to 17) to MEM BUS (18 to 35). A positive signal on the latter line is effective, as explained below, to gate Accumulator Register outputs for orders S through 17 to the Memory Busses 18 through 35. Although information is thereby gated to Memory Busses 18 through 35, only the infomation on Memory Busses 24 to 35 is stored in Memory because only Memory units 24 through 35 are unblanked, as explained in the application of Fox et al., during a Store Address operation as the odd half word address is selected. The End of Operation signal is developed by the circuits of Fig. 5*af*. During a STORE ADDRESS operation, the line ST ADR is positive ,and feeds via the OR circuit 524*d* and the line 525*d* to condition the AND circuit 526*d*. The AND circuit 526*d*, while conditioned, passes the E10 (D2) signal via line 527*d*, the OR circuit 528*d*, the amplifier 529*d*, and the cathode follower 530*d* to the line END OP. The two microsecond End of Operation signal on line END OP passes through the normally conditioned AND circuit 568*d*, of Fig. 5*aj*, and via the amplifier 569*d* and the cathode follower 570*d* to the line STEP INST CTR, thereby causing Instruction counter to be stepped.

Refer now to Fig. 6*v*, which shows the Timing Diagram for a LONG SHIFT LEFT operation. During Instruction time, an Instruction calling for a LONG SHIFT LEFT operation is read out of Memory to the Memory Busses and is gated to the Memory Register by an I9 (D1) pulse and from the Memory Register to the Instruction Register by an I10 (D1) pulse. The address portion of this Instruction is indicative of the number of shifts required and as the Instruction is gated to the Instruction Register, the address Counter portion of the Instruction Register is set to the number of shifts required. An I11 (D1), GO to EX/RGN signal is emitted to send the machine into an Execute/Regenerate cycle. As mentioned above, the maximum number of shifts during the operation is 255, which is the maximum number of counts which may be counted by the Address Counter. As explained below, a shift of eight positions is possible during one Execute/Regenerate cycle, therefore, the maximum number of Execute/Regenerate cycles, in any one LONG SHIFT LEFT operation is 32 or 255 divided by eight. As noted on the Timing Diagram of Fig. 6*v*, during Execute/Regenerate cycles, E/R 1 (D8) signals are emitted to shift the Accumulator Register left, to shift the MQ Register left, to connect the MQ 1 order to the Accumulator Register 35 order and also to step the Address Counter. These four signals are emitted as long as the Address Counter does not equal zero. The signals on the lines SHIFT ACC LEFT, SHIFT MQ LEFT and MQ (1) TO ACC (35), are effective to shift the Accumulator Register and the MQ Register, connected together as one register, one position to the left for each microsecond that the signals on the respective lines are positive. At the same time, the signal on the line STEP ADR CTR, is effective to gate Sync pulses to the Address Counter. The Address Counter is stepped downward a count of 1, every microsecond and therefore counts at the rate of eight counts per Execute/Regenerate cycle, until the number of shifts called for by the address portion of the Instruction has taken place. As the Address Counter reaches zero, the signals on lines SHIFT ACC LEFT, SHIFT MQ LEFT, MQ (1) TO ACC (35) and STEP ADR CTR go negative and thereby stop the shift operation and also stop the stepping of the address Counter. At the same time, the shifts are taking place as long as the Address Counter does not equal zero and as the Accumulator Register order contains a binary 1, the Accumulator Register 1 order, is connected to the Overflow trigger to turn the latter ON. Thus, whenever the Accumulator Register 1 order contains a binary 1, and this binary 1 is shifted to the left to the overflow orders P and Q, the overflow trigger is turned ON to indicate an overflow has occurred. If the Address Counter reaches zero, midway through an Execute/Regenerate cycle, signals for effecting the shift, for stepping of the Address Counter and for connecting the Accumulator Register 1 order to the overflow trigger, go negative.

Assuming the Address Counter is stepped to zero during the fifth microsecond of an Execute/Regenerate cycle, as it would for a shift of say 12, 20, 28 etc., the signals on lines SHIFT ACC LEFT, SHIFT MQ LEFT, MQ (1) TO ACC (35) and STEP ADR CTR go negative as indicated by the dotted portion on the Timing Diagram of the last Execute/Regenerate cycle. During every Execute/Regenerate cycle on the LONG SHIFT LEFT operation, the Accumulator Register Sign order is set to agree with the MQ Register Sign order. Thus, if the Accumulator Register Sign order is positive, an E/R 10 (D1) signal on line (+) to ACC (S) is emitted to place a positive sign in the representation in the Accumulator Register Sign order, but if the MQ Register Sign is negative, an E/R 10 (D1) signal on line (−) TO ACC (S) is emitted to set a negative sign representation in the Accumulator Register Sign position. Of course, once the Accumulator Register Sign is set positive or negative, as the case may be, during the first Execute/-Regenerate cycle, thereafter the mission of the E/R 10 (D1) signals has no effect. It should also be noted that if the Instruction called for a LONG SHIFT LEFT of 0 positions, the result is that the accumulator Register Sign is made to agree with MQ Register Sign, the shift then being of 0 positions. After the shift of the required number of positions has taken place, the machine is in or enters Execute/Regenerate cycle. During this last Execute/Regenerate cycle an End of Operation signal and a signal for stepping the Instruction Counter are emitted.

The I9 (D1) and I10 (D1) signals for gating a half word Instruction from the Memory Busses to the Memory Register and from the Memory Register into the Instruction Register, are generated by the circuits of Fig. 5*z*, described above. The signal occurring an I11 (D1) time, for sending the machine into an Execute/Regenerate cycle, is developed as the line L LEFT, which is an output of the Operation Decoder, goes positive and via the OR circuit 575*d*, of Fig. 5*ak*, and line 576*d*, conditions the AND circuit 577*d*. The AND circuit 577*d*, being conditioned, passes an I11 (D1) signal, via line 578*d*, the OR circuit 583*d*, the amplifier 584*d*, and the cathode follower 585*d*, to the line GO TO EX/RGN. The machine going into Execute/Regenerate cycles, will remain in Execute/Regenerate cycles, until a signal is emitted to send the machine into another type of cycle, and no such signal is emitted until the End of Operation signal occurs, as the operation is completed.

Refer now to Fig. 5*w*, which is the Execution Timer for a LONG SHIFT LEFT operation. The positive signal on the line L LEFT conditions one input of each AND circuit 519*d*, 521*c*, 523*c* and 525*c*. The AND circuit 519*c*, receives a second input via line ADR CT NO ZERO, which is positive when the Address Counter is not at zero, thereby indicating that the Address Counter has not counted the desired number of counts. The outputs of the AND circuit 519*c* feeds via the OR circuit 520*c* to the line LL ADR CT NO ZERO and is positive when the operation is LONG SHIFT LEFT and the Address Counter has not counted to zero. The AND circuit 521*c*, receives a second input from the line ADR CT ZERO, which is positive when the Address Counter has counted to zero. The output of the AND circuit 521*c* passes via the cathode follower 522*c* to the line LL ADR CT ZERO and is positive, when the operation is LONG SHIFT LEFT and the Address Counter has counted to zero. The AND circuit 523*c*, receives a second input via line MQ (+), which is positive when the MQ Register Sign is positive. The output of the AND circuit 523*c* passes via the cathode follower 524*c* to the line LL MQ (+) and is positive when the operation is LONG SHIFT LEFT and the MQ Register Sign is positive. The AND circuit 525*c*, receives a second input via line MQ (−), which is positive when the MQ Register Sign is negative. Therefore, the output of the AND circuit 525*c* passes via the cathode follower 526*c* to the line LL MQ (−) and is positive when the operation is LONG SHIFT LEFT and the MQ Register Sign is negative.

Referring to Fig. 5*ag*, and assuming the operation is LONG SHIFT LEFT and the Address Counter has not counted to zero, then a positive signal on the line LL ADR CT NO ZERO passes via an OR circuit 539*d* and line 540*d* to condition an AND circuit 541*d*. The AND circuit 541*d*, while conditioned, passes an E/R 1 (D8) signal via line 542*c*, an OR circuit 543*c*, an amplifier 544*d* and a cathode follower 545*d* to the line SHIFT ACC LEFT. Therefore, as long as the Address Counter does not go to zero, during a LONG SHIFT LEFT operation, an eight microsecond signal occurs on the line SHIFT ACC LEFT during each Execute/Regenerate cycle. However, if mid-way through the Execute/Regenerate cycle, the Address Counter should go to zero, the conditioning potential is removed from the AND circuit 541*d* as the line LL ADR CT NO ZERO goes negative, and the signal on the line SHIFT ACC LEFT would also go negative.

The signal on the line SHIFT MQ LEFT is developed in the similar manner by the circuits of Fig. 5*av*. Assuming the operation is LONG SHIFT LEFT and the Address Counter is not at zero, the positive signal on the line LL ADR CT NO ZERO conditions one input of an AND circuit 554*e*. The AND circuit 554*e*, while conditioned, passes the E/R 1 (D8) signal, via a line 555*e*, an OR circuit 556*e*, an amplifier 557*e* and a cathode follower 558*e* to the line SHIFT MQ LEFT. The signal on the latter line is an eight microsecond signal occurring during each Execute/Regenerate cycle, until the Address Counter goes to zero. If the address counter goes to zero, between one time and nine time of the Execute/Regenerate cycle, the signal on the line SHIFT MQ LEFT goes negative at the same time.

Referring to Fig. 5*ai*, a positive signal on the line LL ADR CT NO ZERO, conditions one input of an AND circuit 559*d*. The AND circuit 559*d*, while conditioned, passes the E/R 1 (D8) signal via the line 560*d*, an OR circuit 561*d*, an amplifier 562*d* and a cathode follower 563*d* to the line MQ (1) TO ACC (35). A positive signal on this latter line is effective, as explained below, to connect the MQ Register 1 order to the Accumulator Register 35 order, so that as both the Accumulator Register and the MQ Register are shifted to the left, they operate as one register.

Referring to Fig. 5*as*, a positive signal on the line LL ADR CT NO ZERO feeds via the OR circuit 534*e* and 535*e* to condition the AND circuit 536*e*. The AND circuit 536*e*, while conditioned, passes the E/R (D8) signal via line 537*e*, an OR circuit 538*e*, an amplifier 539*e* and a cathode follower 540*e* to the line STEP ADR CTR. A positive signal on the latter line, as explained above, gates the Sync pulses to the Address Counter (Fig. 4c), so that during each microsecond the line STEP ADR CTR is positive, the Address Counter is stepped one count. It should also be noted that the signal on the line STEP ADR CTR goes negative as the Address Counter counts to zero.

The line LL ADR CT NO ZERO, when positive, also passes via an OR circuit 512*e*, of Fig. 5*aq*, and line 513*e* to condition an AND circuit 514*e*. The second input to the AND circuit 514*e* is via line ACC (1), which is positive when the Accumulator Register 1 order contains a binary 1. The AND circuit 514*e*, while conditioned, passes an E/R 1 (D8) signal via line 515*e*, the OR circuit 520*e*, the amplifier 521*e* and the cathode follower 522*e* to the line AD (+) C/ACC (1) OV. The latter line going positive turns ON the overflow trigger (Fig. 5*a*), described above. This means that if the Accumulator Register is being shifted to the left, and a binary 1 occurs in the Accumulator Register 1 order, that binary 1 is shifted to the overflow positions P and Q. This overflow is effectively noted as the Overflow trigger is turned ON.

Refer now to Fig. 5*bf*, and assuming that the operation is LONG SHIFT LEFT and the MQ Register Sign is positive, the positive signal on line LL MQ (+) feeds via the OR circuit 510*f* and line 511*f* to condition the AND circuit 512*f*. The AND circuit 512*f*, while conditioned, passes E/R 10 (D1) signal via the amplifier 513*f* and the cathode follower 514*f* to the line (+) TO ACC (S). The signal on the latter line is effective to store a positive sign representation in the Accumulator Register Sign positioned. As mentioned above, this E/R 10 (D1) signal occurs on line (+) TO ACC (S) during each Execute/Regenerate cycle of a LONG SHIFT LEFT operation, but is effective only during the first Execute/Regenerate cycle of the operation.

If, however, during a LONG SHIFT LEFT operation, the MQ Register Sign is negative, a positive signal on line LL MQ (−) feeds via the OR circuit 515*f*, of Fig. 5*bg*, and line 516*f* to condition the AND circuit 517*f*. The AND circuit 517*f* while conditioned passes an E/R 10 (D1) signal via the amplifier 518*f* and the cathode follower 519*f* to the line (−) TO ACC (S) to thereby set a negative sign representation in the Accumulator Register Sign order.

As mentioned above, the End of Operation signal, during a LONG SHIFT LEFT operation is not developed until the Address Counter reaches zero. Referring to Fig. 5*af*, the line LL ADR ZERO, which is positive during a LONG SHIFT LEFT operation when the Address Counter is at zero, feeds via the AND circuit 520*d* and line 521*d* to condition the AND circuit 522*d*. The AND circuit 522*d*, while conditioned, passes the E/R 10 (D2) signal via line 523*d*, the OR circuit 528*d*, the amplifier 529*d*, and the cathode follower 530*d* to the line END OP. This two microsecond End of Operation signal on line END OP besides feeding to the Cycle Timer, also feeds via the normally conditioned AND circuit 568*d*, of Fig. 5*aj*, and via the amplifier 569*d* and the cathode follower 570*d* to the line STEP INST CTR. Thus, it is seen signals are developed during a LONG SHIFT LEFT operation so that the Accumulator Register and the MQ Register are connected together as one register and are shifted to the left a maximum of eight positions during each Execute/Regenerate cycle. If a binary 1 is shifted to the left beyond the Accumulator Register 1 order, the Overflow trigger is turned ON. The Accumulator Register Sign is set to the holding of the MQ Register Sign, and after shifting the required number of positions (a maximum of 255 positions and a maximum of eight positions per Execute/Regenerate cycle), an End of Operation signal and an STEP INST CTR are emitted.

Refer now to Fig. 6*w*, which is the Timing Diagram for a LONG SHIFT RIGHT operation. During Instruction time, the signals developed are identical to those described in the LONG SHIFT LEFT, just explained. The machine goes into Execute/Regenerate cycles and during each Execute/Regenerate cycle, as long as the Address Counter does not go to zero, the E/R 1 (D8) signals are developed for shifting the Accumulator Register to the right, for shifting the MQ Register to the right (which signal is also effective to connect the 35 order of the Accumulator Register to the MQ Register 1 order), and for stepping the Address Counter. These signals will be developed for as many Execute/Regenerate cycles as are required until the Address Counter goes to zero. During a LONG SHIFT RIGHT operation, the MQ Register Sign order is set to the holding of the Accumulator Register Sign order. Therefore, if the Accumulator Register Sign is positive, a (E/R 10 (D1) signal on line (+) TO MQ (S) occurs, to set the Accumulator Register Sign order to represent a positive sign. If, however, the Accumulator Register Sign is negative, an E/R 10 (D1) signal is emitted on line (−) TO MQ (S) to set a negative sign representation in the Accumulator Register Sign order. These signals are developed during all Execute/Regenerate cycles until the number of required shifts has been completed and as the Address Counter goes to zero, these positive signals are terminated. During the last Execute/Regenerate cycle, which is the Execute/Regenerate cycle during which, or before which, the Address Counter goes to zero, an End of Operation and a Step Instruction Counter signals are emitted.

The I9 (D1) and the I10 (D1) signals, for gating a half word Instruction from the Memory Busses into the Memory Register and from the Memory Register to the Instruction Register, are developed by the circuits of Fig. 5*z*, described above. A GO TO EX/RGN signal is developed by the circuits on Fig. 5*ak*, as the line L RIGHT goes positive and via the OR circuit 575*d* and the line 576*d*, conditions the AND circuit 577*d*. The AND circuit 577*d*, while conditioned, passes the I11 (D1) signal via line 578*d*, the OR circuit 583*d*, the amplifier 584*d* and the cathode follower 585*d* to the line GO TO EX RGN.

Refer now to Fig. 5*x*, which is the Execution Timer for a LONG SHIFT RIGHT operation. The line L RIGHT going positive, conditions one input of each AND circuit 527*c*, 529*c*, 531*c* and 533*c*. The AND circuit 527*c* receives a second input via line ADR CT NO ZERO, which is positive when the Address Counter has not counted to zero. The output of the AND circuit 527*c* feeds via the cathode follower 528*c* to the line LR ADR CT NO ZERO and is positive, when the operation is LONG SHIFT RIGHT and the Address Counter has not counted to zero. The AND circuits 529*c* receives a second input via line ADR CT ZERO, which is positive when the Address Counter has counted to zero. The output of the AND circuit 529*c* passes via the cathode follower 530*c* to line LR ADR CT ZERO and is positive when the operation is LONG SHIFT RIGHT and the Address Counter has counted to zero. The AND circuit 531*c* receives a second input via the line ACC (+) which is positive when the Accumulator Register Sign is positive. The output of the AND circuit 531*c* passes via the cathode follower 532*c* to the line LR ACC (+) and is positive when the operation is LONG SHIFT RIGHT and the Accumulator Register Sign is positive. The AND circuit 533*c* receives its second input via line ACC (−), which is positive when the Accumulator Register Sign is negative. The output of the AND circuit 533*c* passes via the cathode follower 534*c* to line LR ACC (−) and is positive when the operation is LONG SHIFT RIGHT and the Accumulator Register Sign is negative.

Referring to Fig. 5*ah*, and assuming that the operation is LONG SHIFT RIGHT and the Address Counter has not counted to zero, the line LR ADR CT NO ZERO is positive and via an OR circuit 546*d* and line 547*d* conditions an AND circuit 548*d*. The AND circuit 548*d*, being conditioned, passes the E/R 1 (D8) signal via line 549*d*, an OR circuit 552*d*, an amplifier 553*d*, and a cathode follower 554*d* to the line SHIFT ACC RIGHT. The signal on the latter line will remain positive, for eight microseconds unless the Address Counter goes to zero, which would remove the conditioning potential from the AND circuit 548*d* and therefore, cause the line SHIFT ACC RIGHT to go negative. It should be noted that as long as the machine remains in a LONG SHIFT RIGHT operation, and as long as the Address Counter does not go to zero, the machine remains in an Execute/Regenerate cycles, and an E/R 1 (D8) signal is gated to the line SHIFT ACC RIGHT.

Referring to Fig. 5*ag*, a positive signal on the line LR ADR CT NO ZERO conditions the AND circuit 542*e*. The AND circuit 542*e* while conditioned, passes the E/R 1 (D8) signal via an OR circuit 543*e*, an amplifier 544*e* and a cathode follower 545*e*, to the line SHIFT MQ RIGHT. A positive signal on the latter line is effective to shift the MQ Register to the right, one position for each microsecond that the line is positive, and also for connecting the Accumulator Register 35 order to the MQ Register 1 order. The signal on the latter line occurs during each Execute/Regenerate cycle, and is eight microseconds in duration, until the Address Counter counts to zero.

Referring to Fig. 5*as*, a positive signal on the line LR ADR CT NO ZERO passes via the OR circuit 534*e* and line 535*e* to condition the AND circuit 536*e*. The AND circuit 536*e*, when conditioned, passes the E/R 1 (D8) signal via line 537*e*, the OR circuit 538*e*, the amplified 539*e* and the cathode follower 540*e* to the line STEP ADR CTR and thereby causes a stepping on the Address Counter (see Fig. 4*c*), one count, for each microsecond the line STEP ADR CTR is positive. This line STEP ADR CTR remains positive, until the Address Counter reaches a count of zero, at which time the line LR ADR CTR NO ZERO goes negative, and thereby removes the conditioning potential from the AND circuit 536*e*. Until the Address Counter reaches zero, however, the eight microseconds signals occur during each Executive/Regenerate cycle until the Address Counter does count to zero.

Referring to Fig. 5*bh*, if the operation is LONG SHIFT RIGHT and the Accumulator Register Sign is positive, the line LR ACC (+) is positive and via an OR circuit 520*f* and line 521*f* conditions an AND circuit 522*f*. The AND circuit 522*f*, while conditioned, passes an E/R 10 (D1) signal via an amplifier 523*f* and a cathode follower 524*f* to the line (+) TO MQ (S) to thereby set a positive sign representation into the MQ Register Sign Order. However, if the operation is LONG SHIFT RIGHT and the Accumulator Register Sign is negative, the line LR ACC (−) is positive and feeds via an OR circuit 525*f*, of Fig. 5*bi*, and line 526*f* to condition the AND circuit 527*f*. The AND circuit 527*f*, while conditioned, passes the E/R 10 (D1) signal via amplifier 528*f*, and a cathode follower 529*f* to the line (−) TO MQ (S) to thereby set a negative sign representation into the MQ Register Sign order. The End of Operation signal and the STEP INST CTR signal are developed only during the last Execute/Regenerate cycle when the Address Counter has stepped to zero. The End of Operation signal is developed by the circuits of Fig. 5*af*. The line LT ADR CT ZERO which is positive when the operation is LONG SHIFT RIGHT and the Address Counter has counted to zero, feeds via the OR circuit 520*d* and the line 521*d* to condition the AND circuit 522*d*. The AND circuit 522*d*, while conditioned, passes the E/R 10 (D2) signal via line 523*d*, the OR circuit 528*d*, the amplifier 529*d*, and the cathode follower 530*d* to the line END OP. This two microsecond End of Operation signal, besides feeding to the Cycle Timer, is also passed through the normally conditioned AND circuit 568*d*, of Fig. 5*aj*, and via the amplifier 569*d* and the cathode follower 570*d* to the line STEP INST CTR.

Refer now to Fig. 6*x*, which is the Timing Diagram for an SHIFT ACCUMULATOR LEFT operation. This timing diagram is identical to the Timing Diagram (Fig. 6*v*) for a LONG SHIFT LEFT operation, except that no signals are emitted for shifting the MQ register to the left or for connecting the MQ Register 1 order to the Accumulator Register 35 order and further no signal is provided for setting the Accumulator Register Sign to the holding of the MQ Register sign. The reason for this difference is during SHIFT ACCUMULATOR LEFT operation is that only the Accumulator Register is shifted and the MQ Register remains undisturbed.

The I 9 (D1) signal and I 10 (D1) signals for gating a half word Instruction from the Memory Busses to the Memory Register and from the Memory Register to the Instruction Register, are developed by the circuits of Fig. 5*z*, described above.

The signal for sending the machine into an Execute/Regenerate cycle is developed by the circuits of Fig. 5*ak*. During SHIFT ACCUMULATOR LEFT operation, the line ACC LEFT goes positive and feeds via the OR circuit 575*g* and line 576*e* to condition the AND circuit 577*d*. The AND circuit 577*d*, while conditioned, passes the I 11 (D1) signal, via line 578*d*, the OR circuit 583*d*, the amplifier 584*d* and the cathode follower 585*d* to the line GO TO EX/RGN.

Refer now to Fig. 5*v*, which is the Execution Timer for an SHIFT ACCUMULATOR LEFT operation. The line ACC LEFT, which is an output of the Operation Decoder goes positive and conditions one input of each AND circuit 515*c* and 517*c*. The AND circuit 515*c*, receives a second input via line ADR CT NO ZERO, which is positive when the Address Counter has not counted to zero. The output of the AND circuit 515*c*, feeds via the cathode follower 560*c* to the line AL ADR CT NO ZERO and is positive when the operation is SHIFT ACCUMULATOR LEFT while the Address Counter has not counted to zero. The AND circuit 517*c*, receives a second input via line ADR CT ZERO, which is positive when the Address Counter has counted to zero. The output of the AND circuit 517*c* passes via the cathode follower 518*c* to the line AL ADR CT ZERO and is positive when the operation is SHIFT ACCUMULATOR LEFT and the Address Counter has counted to zero.

During the Execute/Regenerate cycles, while the operation is SHIFT ACCUMULATOR LEFT and the Address Counter has not counted to zero, the line AL ADR CT NO ZERO goes positive and via the OR circuit 539*d* and the line 540*d* conditions the AND circuit 541*d*. The AND circuit 541*d*, while conditioned, passes the E/R 1 (D8) signal via line 542*d*, the OR circuit 543*d*, the amplifier 544*d*, and the cathode follower 545*d* to the line SHIFT ACC LEFT. Each microsecond that the latter line is positive causes, as explained below, the Accumulator Register to shift one position to the left. The line SHIFT ACC LEFT goes positive, for eight microseconds during each Execute/Regenerate cycle, until the Address Counter counts to zero. The line AL ADR CT NO ZERO, while positive, also feeds via the OR circuit 534*e*, of Fig. 5*as*, and line 535*e* to condition the AND circuit 536*e*. The AND circuit 536*e*, while conditioned, passes the E/R 1 (D8) signal via line 537*e*, the OR circuit 538*e*, the amplifier 539*e* and the cathode followed 540*e*, to the line STEP ADR CTR. Each microsecond the latter line is positive, gates a Sync pulse to the Address Counter to step that counter one count.

The line AL ADR CT NO ZERO, while positive, also feeds via the OR circuit 512*e*, of Fig. 5*aq*, and via line 513*e* conditions one input of the AND circuit 514*e*. The AND circuit 514*e*, also receives a signal via line ACC (1), which is positive when the Accumulator Register 1 order contains a binary 1. While the AND circuit 514e is conditioned, it passes an E/R 1 (D8) signal via line 515e, the OR circuit 520e, the amplifier 521e and the cathode follower 522e to the line AD (1) C/ACC (1) OV, and thereby cause the overflow trigger to be turned ON. It should be noted that the overflow trigger is turned on in this instance, only if a binary 1 is shifted from the Accumulator Register 1 order to the overflow orders P and Q. The End of Operation signal is developed by the circuits of Fig. *5af*, during the Execute/Regenerate cycle that the Address Counter has counted to zero. As the line AL ADR CT ZERO goes positive, it feeds via the OR circuit 520d and line 521d to condition the AND circuit 522d. The AND circuit 522d, being conditioned, passes the E/R 10 (D2) signal via line 523d, the OR circuit 528d, the amplifier 529d and the cathode follower 530d to the line END OP. This two microsecond End of Operation signal on line END OP is also passed through the normally conditioned AND circuit 568d of Fig. *5aj*, and via the amplifier 569d, and the cathode follower 570d, to the line STEP INST CTR.

Refer now to Fig. *6y*, which is the Timing Diagram for an SHIFT ACCUMULATOR RIGHT operation. The signals represented on this Timing Diagram are identical to those described in Fig. *6w*, for the LONG SHIFT RIGHT operation, except that no signals are emitted to shift the MQ register, nor are any signals emitted for setting the MQ Register sign positions. No signals are required for the control of the MQ Register, since the SHIFT ACCUMULATOR RIGHT operation involves shifting of the Accumulator Register only.

The I9 (D1) and I10 (D1) signals for gating the half word Instruction from the Memory Busses to the Memory Register and for gating the Instruction from the Memory Register to the Instruction Register are developed by the circuits of Fig. *5z*, described above.

The GO TO EX/RGN signal, which sends the machine into Execute/Regenerate cycles, is developed by the circuits of Fig. *5ak*. As the line ACC RIGHT which is an output of the Operation Decoder, goes positive, it feeds via the OR circuit 575d, and line 576d to condition the AND circuit 577d. The AND circuit 577d, being conditioned, passes the I11 (D1) signal via line 578d, the OR circuit 583d, the amplifier 584d and the cathode follower 585d to the line GO TO EX/RGN.

Refer now to Fig. *5y*, which is the Execution Timer for an SHIFT ACCUMULATOR RIGHT. The positive signal on the line ACC RIGHT conditions one input of each AND circuit 535c and 537c. The second input to the AND circuit 537c, is via line ADR CT NO ZERO, which is positive when the Address Counter has not counted to zero. Therefore, the output of the AND circuit 535c, feeding via the cathode follower 536c, to the line AR ADR CT NO ZERO is positive, when the operation is SHIFT ACCUMULATOR RIGHT and the Address Counter has not counted to zero. The AND circuit 537c receives a second input via line ADR CT ZERO, which is positive when the Address Counter has counted to zero. Therefore, the output of the AND circuit 537c, passes via the cathode follower 538c, to line AR ADR CT ZERO and is positive when the operation is a SHIFT ACCUMULATOR RIGHT and the Address Counter has counted to zero.

Referring to Fig. *5ah*, if the operation is SHIFT ACCUMULATOR RIGHT and the Address Counter has not counted to zero, the line AR ADR CT NO ZERO is positive and feeds via the OR circuit 546d and the line 547d to condition the AND circuit 548d. The AND circuit 548d, while conditioned, passes an E/R 1(D8) signal via line 549d, the OR circuit 552d, the amplifier 553d, the cathode follower 554d, to the line SHIFT ACC RIGHT. The signal on the latter line then is an eight microsecond signal during each Execute/Regenerate cycle, until the Address Counter counts to zero. At the same time a positive signal on the line AR ADR CT NO ZERO passes via the OR circuit 534e, of Fig. *5as*, and line 535e to condition the AND circuit 536e. The AND circuit 536e, while conditioned, passes the E/R 1 (D8) signal via line 537e, the OR circuit 538e, the amplifier 539e and the cathode follower 540e to the line STEP ADR CTR. The signal on the latter line is also an eight microsecond signal occurring at one time of each Execute/Regenerate cycle, until the Address Counter counts to zero. Of course, as the Address Counter counts to zero, the signal on the line STEP ADR CTR goes negative, as the conditioning potential is removed from the AND circuit 536e.

As indicated on the Timing Diagram (Fig. *6y*), the End of Operation signal and the STEP INST CTR signal are emitted only during the last Execute/Regenerate cycle. Referring to Fig. *5af*, if the line AR ADR CT ZERO is positive, it signifies that the operation is SHIFT ACCUMULATOR RIGHT and the Address Counter has counted to zero. The signal on the latter line passes via the OR circuit 520d and line 521d to condition the AND circuit 522d. The AND circuit 522d, while conditioned, passes the E/R10 (D2) signal via line 523d, the OR circuit 528d, the amplifier 529d and the cathode follower 530d to the line END OP. This two microsecond End of Operation signal on line END OP is fed to the Cycle Timer and is also passed through the normally conditioned AND circuit 568d, of Fig. *5aj*, and via the amplifier 569d and the cathode follower 750d to the line STEP INST CTR.

Referring now to the composite of Figs. *6z* and *6aa*, which shows the Timing Diagram for a MULTIPLY or a MULTIPLY AND ROUND operation. The explanation of the MULTIPLY and the MULTIPLY AND ROUND operations have been combined, since operations are identical with the exception that during a MULTIPLY AND ROUND operation, a binary 1 may be added to the 35th order of the Accumulator Register to Round off the most significant 35 orders of the product. As mentioned above, before entering a MULTIPLY operation, the MQ Register should be loaded with the Multiplier by a prior Instruction, such as, a LOAD MQ Instruction or a LONG SHIFT RIGHT Instruction.

During the Instruction cycle, as usual, the half word Instruction, which in this case is a MULTIPLY or a MULTIPLY AND ROUND Instruction is read out of Memory and is gated from the Memory Busses to the Memory Register by an I9 (D1) signal. An I10 (D1) signal gates the Instruction from the Memory Register to the Instruction Register, and an I11 (D1) signal GO TO EX is emitted to send the machine into an Execute cycle. Also during this Instruction cycle, and for that matter during all Instruction cycles, an I9 (D1) signal is emitted to reset a trigger T36 of the Multiply Divide Tally Counter, Feb. *5b*, which is explained below.

During the Execute cycle, a signal is emitted at E4 (D1) time for turning a trigger TE ON (trigger TE also being a trigger of the Multiply Divide Tally Counter) and also for resetting the Address Counter, as described above. An E8 (D1) signal is emitted for gating a full or half word Multiplicand from the Memory Busses to the Memory Register, and a signal, occurring at the same time, sets the Address Counter to a count of thirty-four. Thereafter, a GO TO EX/RGN signal is emitted at E11 (D1) time.

At "0" time of the Execute/Regenerate 1 cycle, an E/R 0 (D1) signal is emitted to turn the trigger TE, of the Multiply Divids Tally Counter, OFF, and the trigger T1, of the same counter, to an ON condition. An E/R 1 (D4) signal is emitted to connect the Memory Register to the Adder, provided the 35th order of the MQ Register contacts a binary 1. Note, however, the Accumulator Register is not connected to the Adder at this time. An E/R 4 (D1) signal is emitted to connect the output of the Adder to the Accumulator Register.

If the MQ Register 35 order contained a binary 0, then no information would have been gated to the Adder, and as the Adder output is gated to the Accumulator Register, all orders of the Accumulator Register are reset to zero. However, if the MQ Register 35 order contains a binary 1, thence since the holding of the Memory Register is gated to the Adder, as the Adder output is connected to the Accumulator Register, the multiplicand which is present in the Memory Register is gated to the Adder, and is also gated to the Accumulator Register to replace the word, if any, formerly stored in the Accumulator Register. E/R 10 (D1) signals are emitted during this first Execute/Regenerate cycle for shifting the Accumulator Register and the MQ Register, as one register, one order to the right. Since these signals are but one microsecond in duration both the Accumulator Register and the MQ Register, are shifted one order to the right and since signals are applied to both Registers, to shift them to the right, the Registers are connected together as one register, with the 35th order of the Accumulator Register being connected to the 1 order of the MQ register. The machine then proceeds to another Execute/Regenerate cycle, it being an Execute/Regenerate 2 type of cycle.

At 0 time of the Execute/Regenerate 2 cycle, an E/R 0 (D1) signal is emitted to turn trigger T1 of the Multiply Divide Tally Counter OFF and to turn trigger T2 of the same Tally Counter ON. The Memory Register is connected to the Adder, by an E/R 1 (D4) signal and the holding of the Accumulator Register, which may contain zeros or the Multiplicand is gated in true form to the Adder. The effect of the operation thus far, is that the multiplicand factor is added to the multiplicand value shifted one order to the right. If the MQ Register 35 order contains a binary 1, the Adder is connected to the Accumulator at four time of the cycle as an E/R 4 (D1) signal occurs. If however, the MQ Register 35 order, contains a binary 0, the output of the Adder is not connected to the Accumulator Register. In either event, however, whether or not the Adder is connected to the Accumulator Register, E/R 10 (D1) signals are emitted to shift both the Accumulator Register and the MQ Register, acting as one register, one order to the right. An E/R 10 (D1) signal is also emitted for stepping the Address Counter, which results in stepping the Address Counter one count. The Execute/Regenerate 2 cycle is repeated for thirty three additional cycles, therefore, the Execute/Regenerate 3 through Execute/Regenerate 35 cycles are identical to the cycle represented for Execute/Regenerate 2. After thirty-four identical cycles, the Address Counter will have been stepped to zero, since as stated above, a thirty-four was set into the Address Counter and it was stepped one count, during each of the thirty four cycles. As the Execute/Regenerate 36 cycle is entered, an E/R 0 (D1) signal is emitted to turn the trigger T2, of the Multiply Divide Tally Counter OFF and T36 of the same counter ON. Then, at 1 time of the cycle, the holding of the Accumulator Register is connected to the Adder in true form and a carry signal is fed to the 35th order of the Adder. This addition of one to the holding of the Accumulator Register, which holds the 35 most significant positions of the product, is a Round operation. The rounding is completed, by an E/R 4 (D1) signal gating the output of the Adder to the Accumulator Register, if the operation is Multiply and Roland and the MQ Register 1 order contains a binary 1, which order is the most significant order of the MQ Register. In a MULTIPLY operation, or in an MULTIPLY AND ROUND operation, where the 1 order of the MQ Register contains a binary 0, during the Execute/Regenerate 36 cycle, this E/R 4 (D1) signal is emitted to connect the Adder output to the Accumulator Register. Under either of the latter conditions, the final result is the result at the completion of the Execute/Regenerate 35 cycle, and at that time the Accumulator Register contains the 35 most significant orders of the product. Thereafter E/R 10 (D1) signals are emitted to set the Accumulator Register Sign and the MQ Register Sign to appropriate positive or negative representations, according to the alegbraic rules of Multiplication; that is, if the Memory Register and MQ Register signs are unlike, both the MQ Register sign and the Accumulator Register sign are set to a negative sign representation but if the signs are alike, both the Accumulator Register Sign and the MQ Register Sign are set to positive sign indications.

An End of Operation is signalled, during the Execute/Regenerate 36 cycle by an E/R 10 (D2) signal and the same signal is utilized to step the Instruction Counter.

Before discussing the circuits developing the signals represented on the Timing Diagram, the Multiply Divide Tally Counter shown on Fig. 5*b*, should be described. This Tally Counter is not a counter in the strict sense but consists of four triggers TE, T1, T2 and T36. Each trigger should be in an OFF condition as the machine enters A MULTIPLY, and a MULTIPLY AND ROUND or a DIVIDE operation. During a MULTIPLY, a MULTIPLY AND ROUND or a DIVIDE operation, one of the inputs via lines MPY, MPY R or DIV to the OR circuits **525*a* is positive. The outputs of the OR circuit 525*a* then positive passes via the cathode follower 526*a* and the line 527*a* to condition one input of each AND circuit 515*a*, 516*a* and 528*a*. Lines MPY, MPR R, and DIV, which are outputs of the Operation Decoder, do not go to positive until approximately 10 time of the Instruction cycle. Therefore, the A0 (D1) signals cannot possibly pass via the AND circuits 516*a* and 528*a* during Instruction cycles. However, as the machine enters an Execute cycle, of a MULTIPLY, a MULTIPLY AND ROUND or a DIVIDE operation an A0 (D1) signal passes via the AND circuit 516*a*, an inverter 518*a*, a condenser 519*a* and a diode 520*a* to the trigger TE and via a condenser 521*a* and a diode 522*a* to the trigger T1. Since both triggers TE and T1 are OFF, this A0 (D1) signal is without effect. Liewise, the A0 (D1) signal, if it should be gated through the AND circuit 528*a* and an inverter 529*a* to the trigger T2 has no effect on the trigger T2 since it is OFF. During the Execute cycle, however, an E4 (D1) signal is gated through the conditioned AND circuit 515*a* and via the diode 517*a* to turn the trigger TE ON. The trigger TE remains ON, until the following character cycle which is the Execute/Regenerate 1 cycle. At "0" time of that cycle an A0 (D1) signal passes via the AND circuit 516*a*, the inverter 518*a*, the condenser 519*a* and the diode 520*a* to turn OFF the trigger TE. It follows trigger TE is ON from "4" time of the Execute cycle until "0" time of the Execute/Regenerate 1 cycle. The same signal which turns OFF the trigger TE, has no effect on the trigger T1, since at that time, trigger T1 is OFF. However, as the trigger TE goes OFF, a signal is emitted from its right plate, via a condenser 523*d* and a diode 524*a* to turn ON trigger T1. The trigger T1 remains ON until the next character cycle, at which time the A0 (D1) signal passes via the AND circuit 516*a*, the inverter 518*a*, the condenser 521*a* and the diode 522*a*, to turn trigger T1 OFF. It follows Trigger T1 has been ON during the Execute/Regenerate 1 cycle. The right plate output of the trigger T1, positive while the trigger is ON, is passed via the cathode follower 537*a* to the line T1 ON. As the trigger T1 is turned OFF, the output at its right plate going negative, passes via a condenser 532*a* and a diode 533*a* to the trigger T2, turning the latter ON. Trigger T2, while ON, emits a positive output from its right plate via the cathode follower 538*a* to the line T2 ON. As mentioned above, a count of 34 was set into the Address Counter during the Execute cycle, therefore, as the trigger T2 goes on, it remains ON, until a sufficient number of cycles have occurred for the Address Counter to count to zero, this being 34 cycles. Thus, the trigger T2 is ON, from the beginning of Execute/Regenerate 2 cycle until the Address Counter counts to zero, upon the completion of the Execute/Regenerate 35 cycle. Therefore, as the machine enters an Execute/Regenerate 36 cycle, the AND circuit 528a is conditioned by a positive signal on the line 527a and also by a positive signal on the line ADR CT ZERO. While the AND circuit 528a is conditioned, an A0 (D1) signal is passed via an inverter 529a, a condenser 530a and a diode 531a, to turn OFF trigger T2. Trigger T2 going off, emits a negative signal via the condenser 534a and the diode 535a to turn trigger T36 ON. Trigger T36 while ON, emits a positive signal via the cathode follower 539a to the line T36 ON. Trigger T36 will remain ON, until the next Instruction cycle, when an I9 (D1) signal is passed via the diode 536a to turn the trigger T36 OFF. The line T2 ON, when positive feeds via the OR circuit 540a and the cathode follower 541a to the line T2/T36 ON. Likewise, when the line T36 ON is positive, it feeds via the same OR circuit 540a and the cathode follower 541a to the line T2/T36 ON. Thus, the signal on the line T2/T36 is positive when either trigger T2 or trigger T36** is ON.

Refer now to Fig. 5*r*, which shows the Execution Timer for MULTIPLY and MULTIPLY AND ROUND operations. When the operation is MULTIPLY, the line MPY, which is an output of the Operation Decoder, is positive and feeds to the OR circuit 570b. If the operation is MULTIPLY AND ROUND, the line MPY R which is also an output of the Operation Decoder, is positive and also feeds to the OR circuit 570b. The output of the OR circuit 570b passes via the cathore follower 571b to the line MPY/R which is positive during either a MULTIPLY or a MULTIPLY AND ROUND operation. The signal on the line MPY/R conditions one input of each AND circuit 572b, 574b, 576b, 578b, 581b, 583b, 587b and 589b. Other inputs to the AND circuits 572b are via lines T1 ON, which is positive when the Trigger T1 of the Tally counter is ON, and line MQ (35), which is positive when the MQ Register 35 order contains a binary 1. The output of the AND circuit 572b feeds via the cathode follower 573b to the MPY/R T1 (35) and is positive when the operation is MULTIPLY or MULTIPLY AND ROUND, while the T1 trigger is ON and the MQ Register 35 order contains a binary 1. Since the trigger T1 is ON, only during the Execute/Regenerate 1 cycle, then the signal on the latter line is positive only during the Execute/Regenerate 1 cycle. The second input to the AND circuit 574b is via line T2/T36 ON, which indicates that the trigger T2 or the trigger T36 of the Multiply Divide Tally Counter is ON (also indicating that the machine is in a Execute/Regenerate 2 through Execute/Regenerate 36 cycle). The output of the AND circuit 574b passes via the cathode follower 575b to the line MPY/R T2/T36 and is positive when the operation is MULTIPLY or MULTIPLY AND ROUND, and the trigger T2 or the trigger T36 is ON. The AND circuit 576b receives a second input via line T36 ON which is positive when trigger T36 of the Multiply Divide Tally Counter is ON. The output of the AND circuit 576b feeds via the cathode follower 577b to the line MPY/R T36 and is positive when the operation is MULTIPLY or MULTIPLY AND ROUND and the trigger T36 is ON. The AND circuit 578b receives the same inputs as the AND circuit 576b and further an input via line MMSA, which is positive when the Memory Register and the MQ Register signs are alike. The output of the AND circuit 578b feeds via the cathode follower 579b to the line MPY/R T36 MMSA, which is positive when the operation is MULTIPLY or MULTIPLY AND ROUND, trigger T36 is on and the Memory Register and the MQ Register signs are alike. The AND circuit 581b receives a second input conditioned positive by a positive signal on the line T1 ON, which is positive when the trigger T1 is ON, or a positive signal on the line T2 ON, feeding via the OR circuit 580b. The output of the AND circuit 581b passes via the cathode follower 582b to the line MPY/R T1/T2 and is positive when the operation is MULTIPLY or MULTIPLY AND ROUND and the trigger T1 or the trigger T2 is ON. The AND circuit 583b receives signals, besides the signal on the line MPY/R, via lines T36 ON, which is positive when the trigger T36 is ON and via line MMSU, which is positive when the Memory Register and the MQ register signs are unlike. The output of the AND circuit 583b feeds via the cathode follower 584b to line MPY/R T36 MMSU and is positive when the operation is MULTIPLY or MULTIPLY AND ROUND, trigger T36 is ON, and the Memory Register and the MQ Register signs are unlike.

The second input to the AND circuit 585b, is via line T1 ON. Therefore, the output of the AND circuit 585b feeding via the cathode follower 586b to the line MPY/R T1 is positive, when the operation is MULTIPLY or MULTIPLY AND ROUND and the trigger T1 is ON. The AND circuit 587b also receives signals via line T2 ON, and line MQ 35, the latter line being positive when the MQ Register 35 order contains a binary 1. The output of the AND circuit 587b feeds via a cathode follower 588b to the line MPY/R T2 (35) and is positive when the operation is MULTIPLY or MULTIPLY AND ROUND, the trigger T2 is ON and the MQ Register 35 order contains a binary 1. The AND circuit 589b receives a second input via line T2 ON. Therefore, the output of the AND circuit 589b, feeding via the cathode follower 590b to the line MPY/R T2 is positive when the operation is MULTIPLY or MULTIPLY AND ROUND and the trigger T2 is ON.

Referring to Fig. 5*s*, the lines MPY R, which is positive when the operation is MULTIPLY AND ROUND, T36 ON, which is positive when the trigger T36 is ON and MQ (1), which is positive when the MQ Register 1 order contains a binary 1, feed via the AND circuit 591b and the cathode follower 592b to the line MPY/R T36 (1). It follows that the latter line is positive if the operation is MULTIPLY and ROUND, the trigger T36 is ON, and the MQ Register 1 order contains a binary 1.

Refer again to the Timing Diagram of Figs. 6*z* and 6*aa*. The I9 (D1) and I10 (D1) pulses for gating a half word Instruction from the Memory Busses to the Memory Register and from the Memory Register to the Instruction Register are developed by the circuits of Fig. 5*z*, described above. At I9 time a one microsecond signal is effective to reset trigger T36 OFF (Fig. 5*b*) if it should be ON. The GO TO EX signal is generated as the line MPY/R, which is positive during a MULTIPLY or a MULTIPLY AND ROUND operation, feeds via the OR circuit 523e, of Fig. 5*ar*, and via line 524e to condition the AND circuit 525e. While the AND circuit 525e is conditioned, an I11 (D1) signal is passed via the amplifier 526e and the cathode follower 527e to the line GO TO EX.

During the Execute cycle, an E4 (D1) signal is emitted (See Fig. 5*b*) to turn trigger TE, of the Multiply Divide Tally Counter ON. A positive signal on the line MPY/R feeds via an OR circuit 599e, of Fig. 5*aw*, to condition an AND circuit 560e. As the AND circuit 560e is conditioned, an E4 (D1) signal is passed via an amplifier 561e and a cathode follower 562e to the line RESET ADR CTR. A signal on the latter line is effective, as described above, to reset the Address Counter (Figs. 4*b* and 4*c*) so that all orders contain binary 1's.

Referring to Fig. 5*z*, a positive signal on the line MPY/R, passes via the OR circuit 566c and the cathode follower 567e and line 568e to condition the AND circuit 550c, 555c, 560c and 563c. An E9 (D1) signal gated through one or more of these AND circuits, depending upon whether a full or a half word is addressed. As described above, the E9 (D1) signals are effective to gate the full or half word as the case may be from the Memory Busses to the Memory Register. At the same time, a positive signal on the line MPY/R feeds via an OR circuit 589*d*, of Fig. 5*ar*, and line 590*d* to condition an AND circuit 591*d*. The AND circuit 591*d*, while conditioned, passes the E9 (D1) signal via an amplifier 592*d* and a cathode follower 593*d* to the line 34 TO ADR CTR and thereby, as explained above, set a count of 34 to the Address Counter. The machine is then sent into Execute/Regenerate cycles, as a positive signal on the line MPY/R feeds via the OR circuit 579*d* of Fig. 5*ak*, and line 580*d* to condition the AND circuit 581*d*. The AND circuit 581*d*, while conditioned, passes an E11 (D1) signal via line 582*d*, the OR circuit 583*d*, the amplifier 584*d*, and the cathode follower 585*d* to the line GO TO EX/RGN. As the machine enters first Execute/Regenerate cycle, which is Execute/Regenerate 1 cycle, an A0 (D1) signal is effective to turn OFF THE trigger TE and turn ON the trigger T1 (See Fig. 5*b*). During the Execute/Regenerate 1 cycle, provided the MQ Register 35 order contains a binary 1, the Memory Register is connected to the Adder. A positive signal on the line MPY/R T1 (D35), which, as explained above, is positive during a MULTIPLY or MULTIPLY AND ROUND operation, when trigger T1 is ON, to indicate the machine is in the Execute/Regenerate 1 cycle, and when the MQ Register 35 order contains a binary 1, feeds via the OR circuit 575*c*, of Fig. 5*ab*, and line 576*c* to condition the AND circuit 577*c*. The AND circuit 577*c*, while conditioned, passes the E/R 1 (D4) signal via an amplifier 578*c* and a cathode follower 579*c* to the line MR TO ADDER. Also during the Execute/Regenerate 1 cycle, a signal is emitted for connecting the Adder to the Accumulator Register as the line MPY/R T1, which is positive when the operation is MULTIPLY or MULTIPLY AND ROUND, and trigger T1 is ON, passes via the OR circuit 506*d*, of Fig. 5*ae*, and line 507*d* to condition the AND circuit 508*d*. The AND circuit 508*d*, while conditioned, passes the E/R 4 (D1) signal via line 509*d*, the OR circuit 514*d* the amplifier 515*d*, and the cathode follower 516*d*, to the line ADDER TO ACC. The combination of the latter two signals, as mentioned above, means that if a binary 1 is present in the MQ Register 35 order, the Multiplicand will be set into the Accumulator Register. If a binary 1 were not stored in the MQ Register 35 order, the Memory Register would not be connected to the Adder, and, as the Adder is connected to the Accumulator Register, the Accumulator Register is reset to a holding of zero value.

Now refer to Fig. 5*ah*, wherein a positive signal on the line MPY/R T1/T2, which is positive when the operation is MULTIPLY or MULTIPLY AND ROUND and the trigger T1 or the trigger T2 is ON, signifying respectively, that the machine is in an Execute/Regenerate 1 cycle, or in one of the cycles Execute/Regenerate 2 through Execute/Regenerate 35 conditions the AND circuit 550*e*. The AND circuit 550*e*, while conditioned, passes the E/R 10 (D1) signal via line 551*d*, an OR circuit 552*d*, an amplifier 553*d* and a cathode follower 554*d* to the line SHIFT ACC RIGHT, thereby causing the Accumulator Register to shift one position to the right. At the same time, the positive signal on the line MPY/R T1/T2 conditions an AND circuit 541*e*, of Fig. 5*at*. The AND circuit 541*e*, while conditioned, passes the E/R 10 (D1) signal through the OR circuit 543*e*, the amplifier 544*e*, and the cathode follower 545*e* to the line SHIFT MQ RIGHT.

The machine remains in Execute/Regenerate cycles and proceeds to Execute/Regenerate 2 cycle at 0 time of this cycle, an A0 (D1) signal, fed to the Multiply Divide Tally Counter, turns OFF the trigger T1 and thereby turn ON the trigger T2 (see Fig. 5*b*). The Execute/Regenerate cycles, Execute/Regenerate 2 through the Execute/Regenerate 35, are identical in operation, and as long as the trigger T2 of the Multiply Divide Tally Counter remains ON, the machine is in this type of Execute/Regenerate cycle. During the Execute/Regenerate 2 cycle, an E/R 1 (D4) signal, is emitted for connecting the Memory Register to the Adder as the line MPY/R T2 goes positive and via the OR circuit 575*c*, of Fig. 5*ab*, and line 576*c* conditions and the AND circuit 577*c*. The AND circuit 577*c*, while conditioned, passes D 4549 the E/R 1 (D4) signal via an amplifier 578*c* and a cathode follower 579*c* to the line MR TO ADDER. At the same time, a positive signal on the line MPY/R T2/T36 is also positive and feeds via the OR circuit 501*d*, of Fig. 5*ad*, and line 502*d* to condition the AND circuit 503*d*. The AND circuit 503*d*, while conditioned, passes the E/R 1 (D4) signal via the amplifier 504*d*, and the cathode follower 505*d*, to the line AAC TRUE TO ADDER and thereby gates the holding of the Accumulator Register in true form to the Adder. Next, if the MQ Register 35 order contains a binary 1, an E/R 4 (D1) signal is emitted to connect the output of the Adder to the Accumulator Register, as the signal on line MPY/R T2 (35), which, as explained above, is positive if the operation is MULTIPLY or MULTIPLY AND ROUND; and the trigger T2 is ON (signifying that the machine is in an E/R 2 through E/R 35 cycle) passes via the OR circuit 506*d*, of Fig. 5*ae*, and line 507*d* to condition the AND circuit 508*d*. The AND circuit 508*d*, while conditioned, passes the E/R 4 (D1) signal via line 509*d*, the OR circuit 514*d*, the amplifier 515*d* and the cathode follower 516*d* to the line ADDER TO ACC.

A positive signal on the line MPY/R T1/T2 conditions the AND circuit 550*d*, of Fig. 5*ah*. The AND circuit 550*d*, while conditioned, passes the E/R 10 (D1) signal via line 551*d*, the OR circuit 552*d*, the amplifier 553*d*, and the cathode follower 554*d*, to the line SHIFT ACC RIGHT. At the same time, the positive signal on the line MPY/R T1/T2 conditions an AND circuit 541*e*, of Fig. 5*at*. The AND circuit 541*e*, while conditioned, passes the E/R 10 (D1) signal via the OR circuit 543*e*, the amplifier 544*e* and the cathode follower 545*e* to the line SHIFT MQ RIGHT. A signal is also emitted at the same time for stepping the Address Counter as signal on line MPY/R T2, which is positive when the operation is MULTIPLY or MULTIPLY AND ROUND and the trigger T2 is ON, passes via the OR circuit 530*e*, of Fig. 5*as*, and line 531*e* to condition the AND circuit 532*e*. The AND circuit 532*e*, while conditioned, passes the E/R10 (D1) signal via line 533*e*, the OR circuit 538*e*, the amplifier 539*e* and the cathode follower 540*e* to the line STEP ADR CTR.

The signals just described as being developed during the all Execute/Regenerate cycles up to Execute/Regenerate 35 cycle. During the Execute/Regenerate 35 cycle, the Address Counter is stepped to zero, having counted down a total of 34 counts. The machine then enters the Execute/Regenerate 36 cycle. At 0 time of the Execute/Execute/Regenerate 36 cycle, a one microsecond signal is gated to turn OFF the trigger T2 of the Multiply Divide Tally Counter and thereby to turn ON Trigger T36. This one microsecond signal is gated as the Address Counter goes to zero (see Fig. 5*b*).

During the Execute/Regenerate 36 cycle, a carry is added to the Adder 35 order, as the signal line MPY/R T36, which is positive when the operation is MULTIPLY or MULTIPLY AND ROUND and the machine is in the Execute/Regenerate 36 cycle feeds via an OR circuit 501*e*, of Fig. 5*ap*, and via line 502*e* to condition the AND circuit 503*e*. The AND circuit 503*e* while conditioned passes the E/R 1 (D4) signal via line 504*e*, the OR circuit 509*e*, the amplifier 510*e*, and the cathode follower 511*e*, to the line CARRY ADDER (35). At the same time, the line MPY/R T2/T36 is positive, and via the OR circuit 501*d*, of Fig. 5*ad*, and line 502*d* conditions the AND circuit 503*d*. The AND circuit 503*d*, while conditioned, passes the E/R 1 (D4) signal via the amplifier 504*d* and the cathode follower 505*d* to the line ACC TRUE TO ADDER. Thus, the holding of the Accumulator Register in true form is gated to the adder while a carry is added to the Adder 35 order. Then if the operation is MULTIPLY AND ROUND and the MQ Register 1 order contains a binary 1, the Adder output is connected to the Accumulator Register. This is caused by a positive signal on the line MPY R T36 (1) which is positive when the operation is MULTIPLY AND ROUND, the trigger T36 is ON and a binary 1 is contained in the MQ Register 1 order feeding via the OR circuit 506*d*, of Fig. 5*ae*, and line 507*d* to condition the AND circuit 508*d*. The AND circuit 508*d* being conditioned, passes the E/R 4 (D1) signal via line 509*d*, the OR circuit 514*d*, the amplifier 515*d*, and the cathode follower 516*d* to the line ADDER TO ACC.

During the Execute/Regenerate 36 cycle, the Accumulator Register Sign order and the MQ Register Sign order are set to represent positive or negative signs in accordance with the rules of algebraic multiplication. If the signs of the Multiplicand and the Multiplier were unlike, as originally stored in the Memory Register and the MQ Register, then as the machine enters the Execute/Regenerate 36 cycle, a line MPY/R T36 MMSU is positive, and feeds via the OR circuit 525*f*, of Fig. 5*bi*, and line 526*f* to condition the AND circuit 527*f*. The AND circuit 527*f*, while conditioned, passes the E/R 10 (D1) signal via the amplifier 528*f* and the cathode follower 529*f* to the line (—) to MQ (S) and thereby sets a negative sign representation the Accumulator Register Sign order. At the same time, the positive signal on the line MPY/R T36 MMSU feeds via the OR circuit 515*f*, of Fig. 5*bg*, and line 516*f* to condition the AND circuit 517*f*. The AND circuit 517*f*, while conditioned, passes the E/R 10 (D1) signal via the amplifier 518*f* and the cathode follower 519*f* to the line (—) TO ACC(S) to thereby set a negative sign representation in the Accumulator Register Sign order.

If the Multiplier and Multiplicand signs were alike, then positive signs are set in the MQ Register Sign order and the Accumulator Register Sign order. A positive signal on the line MPY/R T36 MMSA, which is positive when the operation is MULTIPLY or MULTIPLY AND ROUND, the T36 trigger is ON, and the Memory Register and MQ Register signs are alike, feeds via the OR circuit 520*f*, of Fig. 5*bh*, and line 521*f* to condition the AND circuit 522*f*. The AND circuit 522*f*, while conditioned, passes the E/R 10 (D1) signal via the amplifier 523*f* and the cathode follower 524*f* to the line (+) TO MQ (S) to thereby set a positive sign representation in the MQ Register Sign order. At the same time, the positive signal line MPY/R T36 MMSA feeds via the OR circuit 510*f*, of Fig. 5*bf*, line 511*f* to condition the AND circuit 512*f*. The AND circuit 512*f*, being conditioned, passes the E/R 10 (D1) signal via an amplifier 513*f* and the cathode follower 514*f* to the line (+)TO ACC (S) to thereby store a positive sign representation in the Accumulator Register Sign position.

The End of Operation signal is generated during the Execute/Regenerate 36 cycle as the line MPY/R T36 feeds via the OR circuit 520*d*, of Fig. 5*af*, and line 521*d* to condition the AND circuit 522*d*. The AND circuit 522*d*, while conditioned, passes the E/R 10 (D2) signal, via line 523*d*, the OR circuit 528*d*, the amplifier 529*d*, and the cathode follower 530*d* to the line END OP. The End of Operation signal on line END OP passes via the normally conditioned AND circuit 568*d*, of Fig. 5*aj*, and via the amplifier 569*d* and the cathode follower 570*d* to the line STEP INST CTR. The circuits for generating signals used during a MULTIPLY or a MULTIPLY AND ROUND operation, have now been described.

Refer now to the composite of Figs. 6*ab* and 6*ac* which show the Timing Diagram for a DIVIDE operation. During Instruction time an I9 (D1) signal is emitted which resets the trigger T36 of the Multiply Divide Tally Counter, and at the same time a half word Instruction read out of Memory to the Memory Busses is gated to the Memory Register. An I10 (D1) signal is emitted for gating the half word Instruction from the Memory Register to the Instruction Register and an I11 (D1) signal is emitted sending the machine into an Execute cycle. During the Execute cycle, an E4 (D1) signal is emitted to turn ON the trigger TE of the Multiply Divide Tally Counter, and an E4 (D1) signal is also emitted to reset the Address Counter. An E9 (D1) signal is emitted as a full or half word read out of Memory to the Memory Busses to gate the word to the Memory Register and an E9 (D1) signal is emitted to set a count of 34 into the Address Counter. An E11 (D1) signal is emitted to send the machine into Execute/Regenerate cycles.

At 0 time of the Execute/Regenerate 1 cycle, an A0 (D1) signal is gated to turn OFF the trigger TE of the Multiply Divide Tally Counter, and thereby to turn ON the trigger T1. The triggers of the Multiply Divide Tally Counter as explained above, determine which Execute/Regenerate cycle, or Execute cycle that the machine is in during MULTIPLY, MULTIPLY AND ROUND and DIVIDE operations. During the Execute/Regenerate cycle the holding of the Memory Register is connected to the Adder and the holding of the Accumulator Register is connected to the Adder but in complement form. This, in effect, subtracts the holding of the Memory Register, or the Divisor, from the most significant positions of the Dividend, which is stored in the Accumulator Register. If no End carry results from the subtraction, it is an indication that the quotient would be greater than 1 (remember the binary point is to the left of the 1 order) therefore, the machine is stopped by an E/R 5 (D1) signal. However, if a carry does result from the subtraction, it is an indication that the DIVIDE operation can be performed, and therefore one microsecond signals are emitted to connect the MQ Register 1 order to the Accumulator Register 35 order and to shift the MQ Register and the Accumulator Register as one register one position to the left. The machine then proceeds into Execute/Regenerate 2 cycle and at 0 time of the cycle, an A0 (D1) signal is gated by the circuits of the Multiply Divide Tally Counter to turn OFF the trigger T1 and thereby turn ON the trigger T2. During the Execute/Regenerate 2 cycle, the Memory Register is connected to the Adder and the complement of the value in the Accumulator Register is fed to the Adder, to thereby subtract the Divisor from the partial dividend. If no End carry results from this subtraction, the Adder is connected to the Accumulator Register by an E/R 4 (D1) signal and a binary 1 is stored in the MQ Register 35 order by an E/R 5 (D1) signal. As a result of connecting the output of the Adder to the Accumulator Register, the holding of the Accumulator Register is in complement form. Therefore, in order to recomplement, an E/R 7 (D2) signal is emitted to gate the holding of the Accumulator Register in complement form to the Adder and then an E/R 8 (D1) signal connects the output of the Adder to the Accumulator Register. If an End carry had resulted from the subtraction, then the output from the Adder would not have been gated to the Accumulator Register, the Accumulator Register would have retained the information held at the start of the cycle and no binary 1 would have been stored in the MQ Register 35 order. Since no binary 1 is stored in the MQ Register 35 order effectively a binary 0 is stored in that order.

Later in the cycle, E/R 10 (D1) signals are emitted to connect the MQ Register 1 order to the Accumulator Register 35 order to shift the MQ Register to the left and to shift the Accumulator Register to the left, thereby shifting both the Accumulator Register and the MQ Register, as one register, one position to the left. At the same time an E/R 10 (D1) signal is emitted to step the Address Counter one count. The signals generated during Execute/Regenerate 3 through Execute/Regenerate 35 cycles are identical to those generated during the Execute/Regenerate 2 cycle. During the Execute/Regenerate 35 cycle as the Address Counter is stepped, it has been stepped 34 counts and as it counts downward it is at zero. As the Address Counter reaches zero, the machine enters the Execute/Regenerate 36 cycle and an A0 (D1) signal is passed through circuits of the Multiply Divide Tally Counter to turn OFF the trigger T2 and thereby turn ON the trigger 36. During this last Execute/Regenerate cycle, E/R 1 (D4) signals are emitted to connect Memory Register to the Adder and to pass the holding of the Accumulator Register in complement form to the Adder. If no End carry results from this subtraction, then the output from the Adder is gated to the Accumulator Register by an E/R 4 (D1) pulse, a binary 1 is stored in the MQ Register 35 order by an E/R 5 (D1) signal and mathematically, it is known that the sum now in the Accumulator Register is in complement form. Therefore, in order to recomplement the sum, the holding of the Accumulator Register is passed to the Adder in complement form by an E/R (D2) signal and the output of the Adder is gated to the Accumulator Register by an E/R 8 (D1) signal. Of course, if an End carry had resulted, the output of the Adder would not have been gated to the Accumulator Register and no binary 1 would be stored in the MQ Register 35 order. At this point the sign of the MQ Register, which contains the quotient, is set according to the algebraic rules of division, that is, if the Divisor and Dividend signs are alike, a positive sign representation is stored in the MQ Register Sign order but if the signs of the Divisor and Dividend are unlike, a negative sign representation is stored in the MQ Register Sign order by an E/R 10 (D1) signal. During the Execute/Regenerate 36 cycle, an End of Operation is signalled by an E/R 10 (D2) pulse and a similar signal is emitted for stepping the Instruction Counter.

The signals represented on the Timing Diagram of Figs. 6*ab* and 6*ac* are generated as follows:

The resetting of the Trigger T36 of the Multiply Divide Tally Counter is by an I9 (D1) signal (see Fig. 5*b*). The I9 (D1) and I10 (D1) signals for gating a half word Instruction from the Memory Busses to the Memory Register and from the Memory Register to the Instruction Register are developed by the circuits of Fig. 5*z*, described above. The GO TO EX signal is developed as the line DIV, which is an output of the Operation Decoder, goes positive and feeds via the OR circuit **523*e*** of Fig. 5*ar*, and line **524*e* to condition the AND circuit 525*e*. The AND circuit 525*e*, while conditioned, passes the I11 (D1) signal via the amplifier 526*e* and the cathode follower 527*e* to the line GO TO EX. While the machine is in the Execute cycle, an E4 (D1) signal is passed via the AND circuit 515*a*** (see Fig. 5*b*) to turn trigger TE ON. At the same time, a positive signal on the line DIV passes via the OR circuit **559*e***, of Fig. 5*aw*, to condition the AND circuit **560*e*. The AND circuit 560*e*, while conditioned, passes the E4 (D1) signal via an amplifier 561*e* and a cathode follower 562*e*** to the line RESET ADR CTR.

Referring to Fig. 5*z*, a positive signal on the line DIV passes via the OR circuit **566*e*, the cathode follower 567*e* and line 568*e* to condition the AND circuits 550*c*, 555*c*, 560*c*, and 563*c***. An E9 (D1) signal is gated through these AND circuits but the gating is dependent upon whether a full word, an even half word, or an odd half word is addressed. As described above, the circuits shown on Fig. 5*z*, which pass the E9 (D1) signal causes either a full or a half word to be gated from the Memory Busses to the Memory Register. At the same time, a positive signal on the line DIV passes via the OR circuit **589*d***, of Fig. 5*an*, and line **590*d* to condition the AND circuit 591*d*. The AND circuit 591*d*, while conditioned, passes the E9 (D1) signal via the amplifier 592*d* and the cathode follower 593*d* to the line 34 TO ADR CTR. A GO TO EX/RGN signal is emitted to send the machine into an Execute/Regenerate cycle, as a positive signal occurs on the line DIV and passes via the OR circuit 579*d***, of Fig. 5*ak* and line **580*d* to condition the AND circuit 581*d*. The AND circuit 581*d*, while conditioned, passes the E11 (D1) signal via line 582*d*, the OR circuit 583*d*, the amplifier 584*d* and the cathode follower 585*d*** to the line GO TO EX/RGN.

At 0 time of the Execute/Regenerate cycle, an A0 (D1) signal is gated through to the AND circuit **516*a*** (Fig. 5*b*), to turn OFF trigger TE and thereby turn on trigger T1.

Refer now to the DIVIDE Execution Timer shown in Fig. 5*u*. A positive signal on the line DIV conditions one input of each AND circuit **501*c*, 503*c*, 505*c*, 507*c*, 509*c*, 511*c* and 513*c*. The AND circuit 501*c* also receives signals via line T1, which is positive when the trigger T1 is ON, and line QC, which is positive when an End carry has occurred from the Adder Q order. The output of the AND circuit 501*c* feeds via the cathode follower 502*c* to the line D T1 C and is positive when the operation is DIVIDE, the Trigger T1 is ON, and an End carry has occurred. The AND circuit 503*c*, besides the signal on the line DIV, also receives signals via lines T2/T36 ON, which is positive when the Machine is in Execute/Regenerate 2 through Execute/Regenerate 36 cycles, and a signal via a line NO QC, which is positive when no End carry has occurred from the Adder Q order. The output of the AND circuit 503*c* passes via the cathode follower 504*c* to the line D T2/T36 NC, and is positive when the operation is DIVIDE, when the Machine is in an Execute/Regenerate 2 through Execute/Regenerate 36 cycle, and there is no End carry from the Adder Q order. A second input to the AND circuit 505*c* is via line T36 ON. Therefore, the output of the AND circuit 505*c* passes via the cathode follower 506*c* to the line D T36 and is positive when the operation is DIVIDE and the trigger T36 is ON (during an Execute/Regenerate 36). The AND circuit 507*c* receives a second input via line T2 ON, which is positive when trigger T2 is ON. The output of the AND circuit 507*c* passes via the cathode follower 508*c* to the line D T2 and is positive when the operation is DIVIDE and the trigger T2 is ON. The AND circuit 509*c* receives inputs via lines T1 ON, which is ON during the Execute/Regenerate 1 cycle, and line NOQC, which is positive when no End carry has occurred. The output of the AND circuit 509*c* passes via cathode follower 510*c* to the line D T1 NC and is positive when the operation is DIVIDE, the trigger T1 is ON and no End carry has occurred. The AND circuit 511*c* receives inputs via line AMSA, which is positive when the Accumulator Register and the Memory Register Signs are alike and via line T36 ON, which is positive when the machine is in an Execute/Regenerate 36 cycle. The output of the AND circuit 511*c* passes via the cathode follower 512*c* to the line D T36 AMSA and is positive when the operation is DIVIDE, the trigger 36 is ON and the Accumulator Register and the Memory Register Signs are alike. The AND circuit 513*c* receives signals via line AMSU, which is positive when the Accumulator Register and the Memory Register Signs are unlike, and via line T36 ON, which is positive when the machine is in an Execute/Regenerate 36 cycle. The output of the AND circuit 513*c* passes via the cathode follower 514*c* to the line D T36 AMSU and is positive when the operation is DIVIDE, the trigger T36** is ON and the Accumulator Register and the Memory Register Signs are unlike.

Referring again to the Timing Diagram, during the Execute/Regenerate cycle, as well as during other Execute/Regenerate cycles of the DIVIDE operation, the Memory Register is connected to the Adder, and the holding of the Accumulator Register in Complement form is gated to the Adder by E/R 1 (D4) signals. Referring to Fig. 5*ab*, a positive signal on the line DIV passes via the OR circuit **575*c* and line 576*c* to condition the AND circuit 577*c*. The AND circuit 577*c*, being conditioned, passes the E/R 1 (D4) signal via the amplifier 578c and the cathode follower 579c to the line MR TO ADDER. At the same time, the positive signal on the line DIV passes via the OR circuit 580c**, of Fig. *5ac*, and line 581c to condition the AND circuit 582c. The AND circuit 582c, while conditioned, passes the E/R (D4) signal via line 583c, the OR circuit 588c, the amplifier 589c and the cathode follower 590c to line ACC TO ADDER. Thus, during each Execute/Regenerate cycle of the DIVIDE operation, these signals occur to effect a subtraction of the Divisor from the Dividend or partial Dividend.

If during the Execute/Regenerate cycle no End carry occurs, from the subtraction, it is an indication, as mentioned above, that the quotient will be equal to or greater than one, and that will in effect exceed the capacity of the machine since under the assumed conditions, the machine is operating on a fractional basis, that is, the binary point is regarded as being to the left of the one order. The signal for stopping the machine is generated as the signal line D T1 NC is positive, when the operation is Divide, the Machine is in the Execute/Regenerate 1 cycle and no End carry has occurred to condition the AND circuit 599e of Fig. *5be*. The AND circuit 599e, while conditioned, passes E/R 5 (D1) signal via an amplifier 501f and a cathode follower 502f to the line STOP MAC. A positive signal on the latter line is effective to STOP the Machine and control circuits (not shown) which in turn emit signals to the cycle Timer to send the Machine into Regenerate cycles, as explained above. The output from the Adder is not connected to the Accumulator Register during the Execute/Regenerate 1 cycle. However, if no carry resulted from the subtraction, then E/R 10 (D1) signals are emitted for shifting the Accumulator Register and the MQ Register, acting as one register, one position to the left. The signals are generated as follows:

Referring to Fig. *5ai*, a positive signal on the line D T1 C, which is positive during a DIVIDE operation, when the T1 trigger is ON and if an End carry had occurred, passes via the OR circuit 555d and line 556d to condition an AND circuit 557d. The AND circuit 557c, being conditioned, passes an E/R 10 (D1) signal via line 558d, the OR circuit 561d, the amplified 562d and the cathode follower 563d to the line MQ (1) TO ACC (35) to thereby connect the MQ Register 1 order to the Accumulator Register 35 order. Referring to Fig. *5av*, a positive signal on the line D D1 C feeds via the OR circuit 550e and line 551e to condition the AND circuit 552e. The AND circuit 552e, being conditioned, passes the E/R 10 (D1) signal via line 553e, the OR circuit 556e, the amplifier 557e and the cathode follower 558e to the line SHIFT MQ LEFT. Referring to Fig. *5ag*, a positive signal on line D T1 C also passes via the OR circuit 535d and line 536d to condition the AND circuit 537d. The AND circuit 537d, while conditioned, passes the E/R 10 (D1) signal via line 538d, the OR circuit 543d, the amplifier 544d, and the cathode follower 545d to the line SHIFT ACC LEFT.

As the Machine enters an Execute/Regenerate 2 cycle, an A0 (D1) signal is gated to turn OFF the trigger T1 of the Multiply Divide Tally Counter, and thereby turn ON the trigger T2 (see Fig. *5b*). As described above, E/R 1 (D4) signals are emitted each Execute/Regenerate cycle, for connecting the Memory Register to the Adder, and also for gating the holding of the Accumulator Register in Complement form to the Adder.

Referring to Fig. *5ae*, a positive signal on the line D T2/T36 NC, which is positive when the operation is DIVIDE, trigger T2 or trigger T36 is ON and no End carry occurs as a result of the substraction of the Divisor from the partial Dividend, passes via the OR circuit 506d and line 507d to condition the AND circuit 508d. The AND circuit 508d being conditioned, passes the E/R 4 (D1) signal via line 509d, the OR circuit 514d, the amplifier 515d and the cathode follower 516d to the line ADDER TO ACC. At the same time, the positive signal on the line D T2/T36 NC conditions an AND circuit 590e of Fig. *5bb*. The AND circuit 590e, being conditioned, passes the E/R 5 (D1) signal via an amplifier 591e and a cathode follower 592e to the line (1) TO MQ (35); a signal on the latter line placing a binary 1 in the MQ Register 35 order.

Referring to Fig. *5ac*, a positive signal on the line D T2/T36 NC also passes via the OR circuit 584c and line 585c to condition the AND circuit 586c. The AND circuit 586c, being conditioned, passes the E/R 7 (D2) signal, via line 587c, the OR circuit 588c, the amplifier 589c, and the cathode follower 590c to the line ACC COMP TO ADDER. Thus, the holding of the Accumulator Register is passed in Complement form to the Adder. Also, the output of the Adder during these conditions is gated to the Accumulator Register to thereby complete the Recomplementing, as the line D T2/T36 NC being positive, feeds via the OR circuit 510d of Fig. *5ae*, to condition the AND circuit 512d. The AND circuit 512d, being conditioned, passes the E/R 8 (D1) signal via line 513d, the OR circuit 514d, the amplifier 515d and the cathode follower 516d to the line ADDER TO ACC. During the Execute/Regenerate 2 cycle, at 10 time of the cycle, an E/R 10 (D1) signals are emitted connecting the MQ Register 1 order to the Accumulator Register 35 order for shifting the MQ Register to the left and the Accumulator Register to the left one order, and also for stepping the Address Counter. These signals are developed as a positive signal occurs on the line D T2, which feeds via an OR circuit 555d, of Fig. *5ai*, and line 556d to condition the AND circuit 557d. The AND circuit 557d, being conditioned, passes the E/R 10 (D1) signal via line 558d, the OR circuit 561d, the amplifier 562d and the cathode follower 563d to the line MQ (1) TO ACC (35). A positive signal on the line D T2 also passes via the OR circuit 535d, of Fig. *5ag*, and line 536d to condition the AND circuit 537d. The AND circuit 537d, being conditioned, passes the E/R 10 (D1) signal via line 538d, the OR circuit 543d, the amplifier 544d and the cathode follower 545d to the line SHIFT ACC LEFT. The positive signal on the line D T2 will also pass via the OR circuit 530e, of Fig. *5as*, and line 531e, to condition the AND circuit 532e. The AND circuit 532e, being conditioned, passes the E/R 10 (D1) signal via line 533e, the OR circuit 538e, the amplifier 539e and the cathode follower 540e to the line STEP ADR CTR. These signals generated during the Execute/Regenerate 2 cycle, with the exception of the signal for turning the trigger T1 OFF and the trigger T2 ON, also occur during cycles Execute/Regenerate 3 through Execute/Regenerate 35. During the Execute/Regenerate 35 cycle, the Address Counter on being stepped one count reaches a count of zero, and as the Machine enters the Execute/Regenerate 36 cycle, an A0 (D1) signal is gated to turn OFF the trigger T2 of the Multiply Divide Tally Counter, and the trigger T36 ON (see Fig. *5b*). During this Execute/Regenerate 36 cycle, as during all Execute/Regenerate cycles, of the DIVIDE operation, as explained above, the Memory Register is connected to the Adder, and the Complement of the holding of the Accumulator Register is connected to the Adder, both by E/R 1 (D4) signals. If an End carry results from this subtraction, the Machine merely proceeds to set the MQ Register Sign in accordance with the algebraic rules of division. However, it no carry results, the output from the Adder is transferred to the Accumulator Register, a binary 1 is stored in the MQ Register 35 order and further, since the number gated to the Accumulator Register from the Adder is in Complement form, the number in the Accumulator Register is Recomplemented by again passing the holding of Accumulator Register to the Adder in Complement form. Therefore, as a positive signal occurs on the line D T2/T36 NC, which is positive when the operation is DIVIDE, the trigger T2 or the trigger T36 is ON (the latter being effective during an Execute/Regenerate 36 cycle) and no End carry has resulted, and passes via the OR circuit 584c of Fig. 5*ac*, and line 585c to condition the AND circuit 586c. The AND circuit 586c, being conditioned, passes the E/R 7 (D2) signal via line 587c, the OR circuit 588c, the amplifier 589c and the cathode follower 590c to the line ACC COMP TO ADDER. A positive signal on line D T2/T36 NC also passes via the OR circuit 510d, of Fig. 5*ae*, and line 511d to condition the AND circuit 512d. The AND circuit 512d, being conditioned, passes an E/R 8 (D1) signal via line 513d, the OR circuit 514d, the amplifier 515d and the cathode follower 516d to line ADDER TO ACC. A positive signal on the line D T2/T36 NC also conditions the AND circuit 590e, of Fig. 5*bb*. The latter AND circuit, being conditioned, passes the E/R 5 (D1) signal via an amplifier 591e and a cathode follower 592e to the line (1) TO MQ (35).

If the Accumulator Register and Memory Register signs are alike, line D T36 AMSA is positive and via the OR circuit 520f, of Fig. 5*bh*, and line 521f conditions the AND circuit 522f. The AND circuit 522f, being conditioned, passes the E/R 10 (D1) signal via the amplifier 523f and the cathode follower 524f to the line (+) TO MQ (S) to thereby set the MQ Register Sign order to represent a positive sign. However, if the Accumulator Register and the Memory Register Signs are unlike, during the Execute/Regenerate 36 cycle, the line D T36 AMSU is positive and feeds via the OR circuit 525f, of Fig. 5*bi*, and line 526f to condition the AND circuit 527f. The AND circuit 527f, being conditioned, passes an E/R 10 (D1) signal via the amplifier 528f and the cathode follower 529f, to the line (−) TO MQ (S), to thereby set a negative sign representation in the Accumulator Register Sign order. The End of Operation signal is also emitted, during the Execute/Regenerate 36 cycle, as the line D T36 is positive and feeds via the OR circuit 520d, of Fig. 5*af*, and line 521d to condition the AND circuit 522d. The AND circuit 522d, being conditioned, passes the E/R 10 (D2) signal via line 523d, the OR circuit 528d, the amplifier 529d and the cathode follower 530d to the line END OP. The two microsecond End of Operation signal on line END OP is also passed via normally conditioned AND circuit 568d, of Fig. 5*aj*, and via the amplifier 569d and the cathode follower 570d to the line STEP INST CTR.

Thus, all signals required for the completion of a DIVIDE operation have been described. Before proceeding to the description of the Memory Register, the Adder, the Accumulator Register and the MQ Register, it should be noted that all signal developed during an Instruction Execute or Execute/Regenerate cycles are shown on Fig. 6*ad* and 6*ae*.

ARITHMETIC UNIT

*General*

In the CONTROL CIRCUITS, described above, Timing Charts and signals represented thereon, for each operation, are developed up to the point when this developed signal would feed to the Arithmetic Unit, per se. By the Arithmetic Unit, per se, is meant the following devices, which will later be separately described:

(1) The Memory Register
(2) The Adder including the True/Complement control
(3) The Accumulator Register
(4) The Multiplier Quotient Register, and
(5) The Memory Buss Switches The relative location of each of these devices is illustrated by the composite formed of Figs. 1*a* through 1*g*, assembled together as illustrated in Fig. 1*h*.

Briefly, the Memory Register, hereinafter referred to as the MR, contains 36 orders namely, S, and 1 through 35, of which the S order, and orders 1–4 and 35 are individually illustrated in Fig. 1*c*, the dash-dot lines, indicating the omitted orders, 5 through 34. The "S" order and orders 1 through 17, an exemplary one of which is illustrated in Fig. 7*a*, are similar to one another, while orders 18 to 35, an exemplary one of which is illustrated in Fig. 7*b* are also similar to one another.

The Adder comprises orders Q, P and 1 through 35, the broken away section of Fig. 1*d*, indicating the omitted orders 5 through 34. Orders Q and P are similar to one another and an exemplary one is illustrated in Fig. 7*d*, while orders 1 through 35 are similar to one another and an exemplary one is illustrated in Fig. 7*c*.

The Accumulator Register (Fig. 1*d*) comprises orders S, Q, P and 1 through 35, the broken away section in Fig. 1*d* indicating the omitted orders 5 through 34. The S order is illustrated in Fig. 7*e*, while an exemplary one, of the orders Q, P and 1 through 35, which are similar to one another, is illustrated in Fig. 7*f*.

The Multiplier Quotient Register (Fig. 1*g*) hereinafter referred to as the MQ comprises orders S, and 1 through 35, the broken away section in Fig. 1*g* indicating the omitted orders 5 through 34, each of the orders S, and 1 through 35 being similar and an exemplary one being illustrated in Fig. 7*g*.

The Memory Buss Switches (Fig. 1*e*) comprise orders S, and 1 through 35, the broken away section in Fig. 1*e* indicating the omitted orders 5 through 34, the S order and orders 1 through 17, being similar, and an exemplary one being illustrated in Fig. 7*i*. Orders 18 through 35 are also similar and an exemplary one is illustrated in Fig. 7*h*.

*Development of certain signals*

Before proceeding to a detailed description of each of the circuits which comprise the Memory Register, the Adder, the Accumulator Register, the MQ and the Memory Buss Switches, reference will be had to Fig. 1*a* which illustrates how HOLD signals are developed for preserving information in the Delay Units of the Memory Register and the Accumulator Register. If either one of the lines "MEM BUSS (S to 17) TO MR (S to 17)" or "MEM BUSS (18 to 35) TO MR (S to 17)" is positive, it acts via an OR circuit 101, an inverter 102, a cathode follower 103, and parallel connected power cathode followers 104 and 105 to render the line HOLD MR (S to 17) negative, so that whenever either the line "MEM BUSS (18 to 35) TO MR (S to 17)" or the line "MEM BUSS (S to 17) TO MR (S to 17)" goes positive, the line HOLD MR (S to 17) goes negative. If both inputs to the OR circuit 101 are negative, then the line HOLD MR (S to 17) remains positive. When either line CLEAR MR (18 to 35) or "MEM BUSS (18 to 35) TO MR (18 to 35)" connected to an OR circuit 106 is positive, the output of this OR circuit acts via an inverter 107, a cathode follower 108 and parallel connected power cathode followers 109 and 110 to drive the line HOLD MR (18 to 35) negative. If both the inputs to this OR circuit 106 are negative, the signal on the line HOLD MR (18 to 35) remains positive.

If either one of the respective inputs comprising line SHIFT ACC RIGHT, line SHIFT ACC LEFT or line ADDER TO ACC, goes positive, each of which feeds to an OR circuit 112, its output via an inverter 113, a cathode follower 114 and a power cathode follower 115, drives the line HOLD ACC negative. If all of these lines SHIFT ACC RIGHT, SHIFT ACC LEFT, or ADDER TO ACC are negative, the signal on the line HOLD ACC remains positive.

If input line "(+) TO ACC (S)" goes positive, which feeds to an inverter 116, its output via a cathode follower 117 drives the line HOLD ACC (S) negative. If the signal on the line "(+) TO ACC (S)" is negative, the signal on the line HOLD ACC (S) remains positive.

Referring now to Fig. 1*g* of the composite, a positive signal on any one of the input lines "(+) TO MQ (S)"

CLEAR MQ or MR TO MQ, feeding to an OR circuit 120, produces an output which, via an inverter 121 and a cathode follower 122, drives the line HOLD MQ (S) negative. If any one of these lines "(+) TO MQ (S)", CLEAR MQ or MR TO MQ is negative, the line HOLD MQ (S) remains positive.

The OR circuit 123 (Fig. 1*g*) receives inputs via lines CLEAR MQ, SHIFT MQ LEFT, SHIFT MQ RIGHT and MR TO MQ, so that is output, via an inverter 124 and the parallel connected power cathode followers 125 and 126, render the line HOLD MQ (1 to 35) negative, when any one of these inputs to the OR circuit 123 goes positive. Otherwise the signal on the line HOLD MQ (1 to 35) remains positive.

(1) MEMORY REGISTER

Referring to the blocks of Fig. 1*c* representing the Memory Register, a signal on the line HOLD MR (18 to 35) feeds to terminal 3 of the block representing Memory Register order 35 and this line also feeds to the respective terminals 3 of orders 18 through 34. The line HOLD MR (S to 17) feeds to terminals 5 of the blocks representing Memory Register orders S, and 1 through 17, as represented, for example, by the blocks illustrated for orders S, and 1 through 4. The line "MEM BUSS (18 to 35) TO MR (18 to 35)" feeds to terminal 1 of the block representing Memory Register order 35, and also to the terminal 1 of Memory Register orders 18 through 34. The line "MEM BUSS (18 to 35) TO MR (S to 17)" feeds to terminal 3 of Memory Register orders S, and 1 through 17. The line "MEM BUSS (S to 17) TO MR (S to 17)" feeds to terminal 1 of each of the Memory Register orders, S, and 1 through 17.

It should be noted that the Memory Buss (line MEM BUSS (35) feeds to terminal 2 of the block representing the Memory Register order 35 and similarly, orders 18 through 34, which are similar to order 35, receives inputs from "corresponding" Memory Busses, respectively. It should also be noted that the line MEM BUSS (S) feeds to terminal 2 of the Memory Register S order, the line MEM BUSS (1) feeds to terminal 2 of the Memory Register 1 orders, the line MEM BUSS (2) feeds to terminal 2 of the Memory Register 2 order and "corresponding" Memory Register Busses feed to Memory Register orders 3 through 17.

The line MEM BUSS (18) feeds to terminal 4 of the S order of the Memory Register, as well as to the "18" order, the line MEM BUSS (19) feeds to terrminal 4 of the Memory Register order 1, as well as to the "19" orders, etc., so that Memory Register orders S through 17 receive inputs from BOTH "corresponding" Memory Buss orders and also from Buss orders, which are 18 orders removed from the corresponding orders of the Memory Register. If a full word is Addressed, the Sign bit and bits 1 through 35 of the full word are Read out of Memory to the Memory Busses, S and 1 through 35, as described in said above identified application of Fox et al. At the same time, the Control Circuits apply positive signals to line "MEM BUSS (S to 17) TO MR (S to 17)" of Fig. 1*c*, and to line MEM BUSS (18 to 35) TO MR (18 to 35)" while negative signals are applied, as described above, to the lines HOLD MR (S to 17) and HOLD MR (18 to 35). By the combination of these signals, just described, the respective holding of each Memory Buss S, and 1 through 35, is gated to the Memory Register orders S, and 1 through 35. If an ODD half word is Addressed, the line "MEM BUSS (18 to 35) TO MR (S to 17)" is plus (Fig. 1*a*) and produces a negative signal on the line HOLD MR (S to 17) of Figs. 1*a* and 1*c*, as described above, and at the same time, a signal, CLEAR MR (18 to 35) is generated (Fig. 1*a*), as described above, to produce a negative signal on the lone HOLD MR (18 to 35) (Figs. 1*a* and 1*c*) By means of these signals, information is gated from the Memory Busses 18 to 35 to the Memory Register orders 18 to 35, which are in effect reset to zeros, by reason of the negative signal on line HOLD MR (18 to 35). If an EVEN half word is called for, from Memory, then a positive signal occurs on the line "MEM BUSS (S to 17)" as described above (Fig. 1*a*) to produce a negative signal on the line HOLD MR (S to 17) which is fed to Fig. 1*c*, and a positive signal, produced on the line CLEAR MR (18 to 35) of Fig. 1*a*, will produce a negative signal on the line HOLD MR (18 to 35) which is fed to Fig. 1*c* to produce a gating of information from the Memory Busses S, and 1 through 17, to the Memory Register orders S, and 1 through 17, while Memory Register orders 18 through 35 are effectively reset to zeros by the negative potential of the line HOLD MR (18 to 35).

Referring to Fig. 7*a*, there is illustrated therein, a circuit exemplary of the respective Memory Register orders S, and 1 through 17. The storage device, per se, of this circuit is a Delay Unit **706*a*, of the type described in detail above in the description of the STANDARD COMPONENTS. This Delay Unit 706*a* may receive inputs via AND circuits 701*a*, 702*a* or 703*a*. The outputs of these AND circuits 701*a*, 702*a*, or 703*a*, pass via an OR circuit 704*a* and a cathode follower 705*a* to this Relay Unit. Thus, if the output of any one of these AND circuits 701*a*, 702*a* or 703*a*** is positive, a positive signal is fed to this Delay Unit.

The signal applied to terminal 5 of Fig. 7*a*, is in turn fed via a line HOLD MR (S to 17) to one input of the AND circuit **701*a*, whose other input may be conditioned by the output from the Delay Unit 706*a*, so that when this output IS positive to so condition this other input of AND circuit 701*a*, the output of the Delay Unit 706*a* passes through an via OR circuit 704*a* and the cathode follower 705*a***, back to the Delay Unit, to thus complete the recirculation loop which, as described above, maintains a manifestation of a binary 1 bit stored in the Delay Unit until the recirculation loop is broken by making line HOLD MR (S to 17) negative.

Whenever a full or an even half word is called for, the line MEM BUSS (S to 17) to MR (S to 17) is fed, via terminal 1, to condition one input of the AND circuit **703*a*, which receives a second input via terminal 2, to a "corresponding" Memory Buss "N," that is, a particular buss "corresponding" in number to the particular Memory Register order. If the signal on the line MEM BUSS (N) is positive, it feeds through the now conditioned AND circuit 703*a* and via the OR circuit 704*a* and the cathode follower 705*a*, to the Delay Unit 706*a*. At the same time that the signal to terminal 1 goes positive, the signal on terminal 5**, goes negative to break the recirculation loop, to thus effectively erase the former holding of the Delay Unit, while the new information is Read-In. The signals on the line "MEM BUSS (S to 17) TO MR (S to 17)" normally goes positive, for one microsecond, when the transfer of information is to take place.

A third source of input to the Delay Unit **706*a*, is via the AND circuit 702*a* which receives information from THAT Memory Buss order, which is 18 orders removed to the right, of the "corresponding" order of the Memory Register, that is, $N+18$ orders. This occurs, when an ODD half word is Addressed. The line connected to terminal 4 is MEM BUSS ($N+18$) which corresponds to a Memory Buss order, 18 bits to the right of the Memory Register order under consideration. This line, when positive, conditions one input of this AND circuit 702*a*, so that a one microsecond signal on the line "MEM BUSS (18 to 35) TO MR (S to 17)" from terminal 3, passes via this now conditioned AND circuit 702*a*, the OR circuit 704*a*, and the cathode follower 705*a* to the Delay Unit 706*a*. At the same time, the line HOLD MR (S to 17) from terminal 5 goes negative, to break the recirculation loop, so that during the one microsecond period, the former holding of the Delay Unit 706a is erased, and a new bit of information is stored via the AND circuit 702a. The output of the Delay Unit 706a is applied via line MR (N) OUTPUT to terminal 6** to thus manifest the bit stored in the Delay Unit of the particular (N) order of the Memory Register.

By reference to the Timing Diagram of Figs. 6*ad* and 6*ae*, it is seen that during an Instruction cycle, the signals MEM BUSS (S to 17) TO MR (S to 17), MEM BUSS (18 to 35) TO MR ( 18 to 35), MEM BUSS (18 to 35) TO MR (S to 17) and CLEAR MR (18 to 35) are one microsecond signals, occurring at I9 time of each such Instruction cycle.

Referring to Fig. 7*b*, there is illustrated a Memory Register order exemplary of any one of the orders 18 to 35. A Delay Unit 711a is provided with two input sources. The output of the Delay Unit 711a feeds back to one input of an AND circuit 707a, whose other input, via terminal 3 and line HOLD MR (18 to 35) when positive, permits recirculation of the Delay Unit output, when positive, as described above in connection with Fig. 7*a*. The other input to Delay Unit 711a is via an AND circuit 708a which receives information on one of its inputs from Memory Buss order (N) "corresponding" to THE Memory Register order under consideration. This AND circuit 708a is gated by a positive signal on its other input, received via terminal 1 and line MEM BUSS (18 to 35) TO MR (18 to 35), to pass the information on this "corresponding" Memory Buss (18 to 35) to the Delay Unit 711a. As is seen from the Timing Diagram of Fig. 6*ad*, this signal MEM BUSS (18 to 35) TO MR (18 to 35) occurs at I9 (D1) time. Simultaneously (Fig. 1*a*), this signal produces a negative signal on line HOLD MR (18 to 35) which negative signal is applied via terminal 3 (Fig. 7*b*) via line HOLD MR (18 to 35) to one input of the AND circuit 707a to break the recirculation path and thus erase the former holding of the Delay Unit 711a. Both AND circuits 707a and 708a feed via an OR circuit 709a and a cathode follower 710a to the Delay Unit 711a. The output of this Delay Unit is via a line MR (N) OUTPUT which is thus representative of the binary 1 or binary 0 manifestation, stored in the Delay Unit in the respective order of the Memory Register. The outputs of the Memory Register orders S, and 1 through 35 (with the exception of the S order, which is described below) feed to corresponding orders of the Adder (Figs. 1*c* and 1*d*) and MR orders S, and 1 through 35, ALL feed via the wires and cables, as shown in Figs. 1*c*, 1*d* and 1*g* to "corresponding" orders of the MQ. Further, orders S, and 1 through 17 of the MR feed, via the wires and cable as shown in Figs. 1*c*, 1*d*, 1*e* and 1*f* to the Instruction Register (Fig. 1*f*) as stated above.

Referring to the Timing Diagram, Fig. 6*ad*, it is seen that this transfer from MR to the Instruction Register takes place at I10 (D1) time, which is subsequent to I9 (D1) time, when, as described above, a full or a half word is gated from the Memory Busses to MR. Further, it is noted from the Timing Diagram of Fig. 6*ad* (under EXECUTE) that the lines MEM BUSS (S to 17) TO MR (S to 17), MEM BUSS (18 to 35) TO MR (18 to 35), MEM BUSS (18 to 35) TO MR (S to 17) and CLEAR MR (18 to 35) may receive positive one microsecond signals at E9 time. These signals, occurring during Execute cycles, are effective, when a word is being READ-OUT of Memory, to the Memory Register, preparatory to being operated on during a particular Instruction called for. Thus it is seen that either full or half words may be READ-OUT of Memory, during an Execute cycle, while during an Instruction cycle, a half word ONLY is READ-OUT of Memory, since each Instruction comprises a half word only.

(2) ADDER AND TRUE/COMPLEMENT CONTROL

Referring to Figs. 1*d*, 7*c* and 7*d*, it is seen that the Adder True/Complement control sections of orders Q, P and 1 through 35, receive inputs from "corresponding" Accumulator Register orders, via the respective input terminals 3, while orders 1 through 35 of the Adder also receive inputs, from "corresponding" Memory Register orders, via the respective input terminals 5. Orders Q, P and 1 through 34 receive Carry inputs, via the respective input terminals 2 from the order to the right, the order 35 input terminal 2 receiving a Carry from the Q order, developed as described above, which may be an "artifically injected" Carry. Each of the Adder orders, Q, P and 1 through 35 has an output, via a respective output terminal 8, which is connected to an input terminal 2 of a "corresponding" order of the Accumulator Register, and each Adder order feeds a Carry from its terminal 7 to an input terminal 2 of the Adder order to the left with the exception of the Q order, which feeds to the 35 order, as described below.

There are four control signals feeding to the Adder. One is an E/R 1 (D4) signal on the line MR to ADDER (see Fig. 6*ae*) for gating the holding of the MR to the Adder (see also Figs. 1*d* and 7*c*) the second is an E/R 1 (D4) on line ACC TRUE TO ADDER (see Fig. 6*ae*) for gating the holding of the Accumulator Register, in True form, to the Adder (see also Figs. 1*d* and 7*c*) the third control signal is an E/R 1 (D4) signal, or, on occasion, an E/R 7 (D2) signal on line ACC COMP TO ADDER (for both see Fig. 6*ae*) for transferring the holding of the Accumulator Register, in Complement form, to the Adder (see also Figs. 1*d* and 7*c*) while the fourth control signal E/R 1 (D4) on line CARRY ADDER (35) (see Fig. 6*ae*), which is effective, to insert a Carry, into the Adder order 35 (see Fig. 1*d* and the "equivalent" Carry In signal of Fig. 7*c*). This latter Carry, as stated above, may be an "artificial" Carry or may be the Carry output of the Q order, of the Adder. The Carry output from terminal 7 of the Q order (Figs. 1*d* and 7*d*) feeds to a line labeled ADDER Q CARRY in Fig. 1*d*, but it is to be recalled that, as described above, this Carry passes through additional switching circuits, before feeding to the Adder order 35 input terminal 2, as the signal on line CARRY ADDER (35) of Fig. 1*d*.

Referring to Fig. 7*c*, there is illustrated an exemplary order, representative of any one of the Adder orders 1 through 35, respectively, including the True/Complement controls, associated with the respective order. The input to the Adder, per se, is via lines X, Y and Z, representing, respectively, the Accumulator Register output to the Adder, the Memory Register output to the Adder, and a carry input, from the next lower order stage. The corresponding Sum and Carry outputs are represented, respectively, on the lines SUM OUT and CARRY OUT.

The output, from the corresponding order of the Memory Register, is fed to terminal 5, and thus to line MR (N) to thereby condition an AND circuit 721a. This output from the Memory Register, therefore, if positive, represents a binary 1, to thus gate a four microsecond signal, applied via terminal 6 to the line MR TO ADDER (see Fig. 6*ae*) at E/R 1 (D4) time, to the AND circuit 721a, so that it passes via a non-inverting amplifier 722a of the type described above under STANDARD COMPONENTS and a cathode follower 723a, to the line Y. If this output from the Memory Register is a binary 0, then the line MR (N) is negative, which prevents passage of the four microsecond signal, so that line Y remains negative.

The output from the corresponding order of the Accumulator Register, feeds to terminal 3, and thus to line ACC (N). The signal on this line, is positive, when a binary 1 is stored, in the corresponding order of the Accumulator Register, but is negative, when a binary 0 is stored therein, and feeds to an AND circuit 711a and also to an inverter 712a. Assuming that a binary 1 is stored in the corresponding Accumulator Register order, the AND circuit 711a is conditioned, so that, as a four microsecond signal is fed to the terminal 4 and line ACC TRUE TO ADDER at E/R 1 (D4) time (Fig. 6ae) this signal passes via the now conditioned AND circuit 711a, an OR circuit 715a, a non-inverting amplifier 716a, and a cathode follower 718a to the line X. Thus, if the output of the corresponding Accumulator Register order is a binary 1, and the line ACC TRUE TO ADDER is conditioned, there will be a binary 1 positive output, from the cathode follower 718a to the line X. If a binary 0, however, were present, in the corresponding Accumulator Register order, then the 4 microsecond signal E/R 1 (D4) is not gated to the AND circuit 711a, since the latter would NOT be conditioned.

Assuming a positive signal on line ACC (N), representing a binary 1, this also feeds through the above mentioned inverter 712a, and a cathode follower 713a, to one input of an AND circuit 714a. Under the conditions assumed, this AND circuit 714a would not be conditioned, since the positive output, from the Accumulator Register has been inverted by inverter 712a. However, if a binary 0 were present, in the corresponding Accumulator Register order, the signal on the line ACC (N) would be negative, and by inversion in inverter 712a, would condition the AND circuit 714a. The other input to this AND circuit 714a, is via line ACC COMP TO ADDER, connected to terminal 1, to which an E/R 1 (D4) signal is applied (Fig. 6ae) and, with a binary 0 output assumed, as next above, will pass through the conditioned AND circuit 714a, the OR circuit 715a, the non-inverting amplifier 716a, and the cathode follower 717a to the line X.

Thus, it is possible to have either a True or a Complement representation of the holding of the corresponding Accumulator Register order, applied to the line X, which feeds to an OR circuit 718a, and also to one input of a three input AND circuit 724a, and to one input, of the two input AND circuits, 728a and 729a of the Adder, per se.

There are occasions when an E/R 7 (D2) signal occurs on the line ACC COMP TO ADDER (Fig. 6ae) and in such instances, the Complementing of the Accumulator Register output takes place at "7" time, it being noted that the positive signal, if there be one, reaching the line X from the cathode follower 717a, is a 2 microsecond signal instead of a 4.

The input to terminal 2 feeds the line CARRY IN which is a Carry output, from the succeeding lower order, and is substantially coincident with the signals, present on the lines X and Y, since there is relatively no time delay in the passage of information, through the Adder, for the forming of the Sum and Carry outputs.

In brief summary, there are three possible inputs to the Adder per se, one via line X, which is the True or Complement representation of the corresponding binary 1 or binary 0 value stored in the Accumulator Register, secondly an input via line Y, which is the binary 1 or binary 0 manifestation of the value, stored in the corresponding order of the Memory Register, and thirdly, a signal on line Z, which is the Carry, from the next lower order of the Adder. The outputs of certain blocks of the Adder, may be tabulated as follows:

The output of the OR circuit 718a is positive, if there is a binary 1 present, on at least one of the inputs X, Y or Z. The output of the AND circuit 724a, is positive, if, and only if, there are binary 1's present on all three inputs X, Y and Z. The output from the AND circuit 728a is positive, if there are binary 1's present on input lines X and Y. The AND circuit 729a has a positive output, if there are binary 1's present on input lines X and Z. The output of the AND circuit 730a is positive, if binary 1 inputs are present on input lines Y and Z. The outputs of the AND circuits 728a, 729a or 730a, when positive, signify a Carry, since a sum of at least 1+1 is represented. The outputs of all these three AND circuits, fed to an OR circuit 731a, so that its output is positive, if a Carry has occurred. This output feeds, via a non-inverting amplifier 732a and a cathode follower 733a to the line CARRY OUT, which feeds, via a terminal 7, to the Carry input, of the next higher order. The signals on this line CARRY OUT also feed, via an inverter 726a and a cathode follower 727a to an OR circuit 725a. Thus, this input, to the OR circuit 725a, via the cathode follower 727a, is positive, only if there has been NO carry. Therefore, if NO carry output has occurred, a positive signal is passed, through this OR circuit 725a, to condition an AND circuit 719a. The second input to this AND circuit 719a is via the OR circuit 718a, whose output is positive, as stated above, if at least one input X, Y or Z contains a binary 1. Therefore, the output of the AND circuit 719a, is positive, provided there is NO carry and there is, at least one, input to the OR circuit 718a. This output of the AND circuit 719a passes via a cathode follower 720a to the line SUM OUT and thus to terminal 8.

Thus, it is seen that if there are two binary 1 inputs to the Adder, via lines X, Y and Z, a Carry output occurs. However, if there is only one binary 1 input, to the Adder, there is NO Carry output so that plus is applied via the OR circuit 725a, whose output comprises one input to the AND circuit 719a which, with one input, thus positive, to the OR circuit 718a, this AND circuit 719a passes a signal, via the cathode follower 720a to provide a Sum output.

There still remains to be considered the condition, wherein binary 1's are present, on all three lines X, Y and Z which provide not only a Carry output but also a Sum output. Thus, if all three lines X, Y and Z are positive, representing binary 1's, the output of the AND circuit 724a, is positive, and feeds, via the OR circuit 725a to condition the AND circuit 719a. The AND circuit 719a will then pass a positive signal, applied to it via the OR circuit 718a, which has a positive output since all three of its inputs are positive (only one being necessary to develop a positive output) and the output of AND circuit 719a is applied via the cathode follower 720a to the line SUM OUT and thus to terminal 8. At the same time, a Carry output will be developed, since AND circuits 728a, 729a and 730a all emit positive signals which pass via the OR circuit 731a, the non-inverting amplifier 732a and the cathode follower 733a to the line CARRY OUT and to terminal 7.

Referring now to Fig. 7d, which illustrates an exemplary circuit representative of the Adder orders P and Q, the input, from the "corresponding" order of the Accumulator Register, passes through True-Complement control circuits, identical to those described above for the Adder orders 1 through 35, blocks 741a through 747a of Fig. 7d, corresponding to the blocks 711a through 717a of Fig. 7c. Thus, it is seen that signals, on line "A" of the Adder per se, in Fig. 7d, represent either True or Complement, binary 0 or binary 1 value manifestations, from corresponding orders of the Accumulator Register. Likewise, when input terminal 2, (Fig. 7d) is positive, to represent a binary 1 Carry, it is fed via the line CARRY IN, to line B of the Adder, per se. The operation of the remaining circuitry of Fig. 7d, is that of a half Adder, having two inputs. If there are binary 1 inputs, that is positive signals, on both lines A and B, simultaneously, the resulting SUM is zero, with a Carry of a binary 1. If there is a binary 1 present on line A, but a binary 0 on line B, the result is a binary 1 SUM and a binary 0 Carry. Likewise, if there is a binary 0 on line A, but a binary 1 on line B, the result is a SUM of binary 1 and NO Carry. The final condition, if there are binary 0's on both lines A and B, produces a SUM of binary 0, and a Carry of binary 0. The output of the AND circuit 748a is positive, only when it receives two positive inputs, so that if both lines, A and B, have binary 1's, the output of the AND circuit 748a goes positive, and via a cathode follower 749a, drives the line CARRY OUT, positive, which is applied to terminal 7. When a binary 1 is present, on either line A or B, or both, the output of the OR circuit 752a, goes positive, and conditions the AND circuit 753a. If a Carry output, did occur, which signifies that both lines A and B contain binary 1's, the positive output of a cathode follower 749a, signifying a binary 1, is inverted, by an inverter 750a, and passed via a cathode follower 751a to an AND circuit 753a. Thus, if both lines A and B contain binary 1's the result is a Carry output, but the Sum output is BLOCKED, from passing through the AND circuit 753a. However, if a binary 1 is present on line A or B, there still is a positive output, from the OR circuit 752a, and, since there is NO Carry, the inverter 750a cannot invert, a plus input, since there is none, so that the AND circuit 753a IS conditioned, and a positive output from the OR circuit 752a passes through this conditioned AND circuit 753a, and the cathode follower 754a, to the line SUM OUT and thus to terminal 8.

Thus, it is seen that if binary 1's are present on both lines A and B, a binary 1 Carry out is developed, but the SUM output is a binary 0. If a binary 1 is present, on line A or B, a binary 0 Carry output is developed, but the SUM output is a binary 1. If binary 0's are present on both lines A and B, then both output lines, the SUM OUT and CARRY OUT, remain negative to signify binary 0's.

3. ACCUMULATOR REGISTER

Referring again, to Fig. 1*d*, a block diagram of the Accumulator Register is illustrated therein. It is to be noted that the Sign order (see also Fig. 7*e*) is different from all the other orders of the Accumulator Register (see Fig. 7*f*).

The Q, P and 1 through 35 orders, are alike and an exemplary order is illustrated in Fig. 7*f*.

Each order of the Accumulator Register comprises a Delay Unit, of the type as described above, and as indicated (Figs. 7*e* and 7*f*, respectively), there are two sources of HOLD voltage namely, the line HOLD ACC (S) (Fig. 7*e*) and the line HOLD ACC (Fig. 7*f*).

The line HOLD ACC (S) for the Sign order is connected to terminal 2 (Fig. 7*e*), while the line HOLD ACC (Fig 7*f*) is connected to terminal 7 and feeds to all the Accumulator Register orders Q, P and 1 through 35. These orders, Q, P and 1 through 35 each receive said input, from "corresponding" orders of the Adder and these same orders have outputs, which feed to respective terminals 3 (Fig. 1*d*) of the True/Complement controls, described above, of corresponding orders, of the Adder.

Order 35, of the Accumulator Register (Fig. 1*d*) receives an input via its terminal 4, from the MQ order 1 (Fig. 1*g*) which is effective, when the control line "MQ (1) to ACC (35)" feeding to terminal 3 of this 35th order (Fig. 1*d*) goes positive (see also Fig. 7*f*) to permit the contents of MQ order 1 to be introduced into the Accumulator Register 35. On a LONG SHIFT LEFT Instruction or a DIVIDE Instruction, as described below, this signal "MQ (1) to ACC (35)" is applied to terminal 3 of the 35th order, instead of SHIFT ACC LEFT (Fig. 7*f*). The outputs of "corresponding" orders of the Adder, are gated to the Accumulator Register as the line ADDER TO ACC connected to the respective terminals 1 (Figs. 1*d* and 7*f*) goes positive. A signal on this line (Fig. 1*a*) also causes the line HOLD ACC, to go negative, at the same time, as described above, in connection with Fig. 1*a*. The holding of the Accumulator Register may also be shifted, to the right, or to the left, by positive signals on the respective lines SHIFT ACC RIGHT connected to the respective terminals 5, or line SHIFT ACC LEFT connected to the respective terminals 3 (Figs. 1*d* and 7*f*), this shifting occurring, at the rate of one order, for each microsecond that the respective lines are positive. The signals on the lines SHIFT ACC RIGHT and SHIFT ACC LEFT (Fig. 1*a*) also respectively cause the line HOLD ACC to go negative (see also Fig. 7*f*).

It should be noted that the outputs at respective terminals 8 of the Accumulator Register orders feed to an input terminal 4, of the next higher order (Fig. 1*d*) and also to an input terminal 6, of the next lower order. It is these output signals, which are gated to the respective Delay Units, during a SHIFT ACCUMULATOR LEFT or a SHIFT ACCUMULATOR RIGHT operation, as the case may be, or during a LONG SHIFT LEFT or a LONG SHIFT RIGHT operation. The output of the Q order shifts to the right only, so that in Fig. 7*f*, the line SHIFT ACC LEFT is not used, in the Q order.

The output of Accumulator Register order 35, besides feeding to order 34 also feeds to terminal 3 of the MQ 1 order (Figs. 1*d*, 1*g* and 7*g*). The orders S and 1 through 35 of the Accumulator Register also have outputs (Figs. 1*d* and 1*e*) which feed to "corresponding" orders of the Memory Buss Switches, described below. As the Accumulator Register is shifted left, the output of the 1 order is connected to the MIXING CIRCUITS (Figs. 1*d*, 1*e* and 1*b*) and thence to the Overthrow Trigger (Fig. 1*b*), as described above. Therefore, if a binary 1 is stored in the Accumulator Register 1 order, and the Accumulator Register is shifted to the left, one order, an Overflow automatically results.

Referring now to Fig. 7*e*, which illustrates the Accumulator Register Sign order, again the basic storage element is a Delay Unit designated as 764a. The condition of the Delay Unit is dependent upon the binary 1 or binary 0 character of the inputs, from either one of two sources. One is the recirculating feed back, feeding from the output of the Delay Unit and passing through the AND circuit 761a, provided the line HOLD ACC (S) connected to the terminal 2, is positive, to thereby condition this AND circuit 761a whose output then passes, via an OR circuit 762a and a cathode follower 763a, to the input of the Delay Unit 764a.

On occasions, when it is necessary to put a positive Sign indication into the Delay Unit, that is, a holding of a binary 0, the HOLD ACC (S) voltage only, is made negative (see inverter 116 and cathode follower 117 of Fig. 1*a*), so that the line HOLD ACC (S) of Fig. 7*e* is rendered negative, and thus, regardless of what was formerly stored in the Delay Unit, the Delay Unit output then goes negative, which need not be recirculated, since a negative output IS produced by the Delay Unit unless it is forced to produce a positive output, which positive output, must be recirculated to be sustained, all as described above under STANDARD COMPONENTS.

However, when it is necessary to enter a negative Sign, into the Accumulator Sign order (a binary 1) a positive signal is fed directly into the OR circuit 762a (Fig. 7*e*) via input terminal 1, to line "(−) to ACC (S)" implying Minus Sign TO ACC (S) order. The effect of this positive input to this OR circuit 762a, which passes directly via the cathode follower 763a, to the Delay Unit 764a, even though the AND circuit 761a is operative for feed back, is to inject a binary 1, that is a positive signal, into the Delay Unit, regardless of what was there previously. The recirculating loop of the Delay Unit is NOT broken at this time. Thus, if a binary 1, was formerly stored in the Delay Unit, it is recirculated, in an attempt to again store a binary 1, which merely results, in a binary 1 being stored (if a binary 0 is stored, no recirculation is produced, since none is required). The output of the Sign position, via line ACC (S) to terminal 3, is POSITIVE to indicate the storage of a "negative" Sign and conversely if NEGATIVE to indicate a "positive" Sign. The output terminal 3, as indicated in Figs. 1*d* and 1*e* is connected to terminal 2 of the Memory Buss Switches, order S, described below and also is connected, as shown in Figs. 1*e* and 1*a* to the Sign Mixer circuits, described above in connection with Fig. 5*c*.

Referring to Fig. 7*f*, there is illustrated an exemplary circuit representative of the Accumulator Register orders Q, P, and 1 through 35. It may be noted (see Fig. 1*d*) that input terminals 5 and 6, of the Q position, are NOT used, so that consequently, the AND circuit 773*a* (Fig. 7*f*) and its corresponding output to the OR circuit 775*a*, are NOT employed, in this Q order. The circuitry of these orders is somewhat similar to the circuitry of the orders of the Memory Register, described above, in that a Delay Unit 777*a* (Fig. 7*f*) comprises the storage element, per se, of the respective orders. As illustrated in Fig. 7*f*, this Delay Unit 777*a*, may receive an input, via one of four AND circuits. This Delay Unit may receive an input, as its output is recirculated, via an AND circuit 774*a*, provided line HOLD ACC, which is connected to terminal 7, remains positive, thus conditioning this AND circuit, whose output passes via an OR circuit 775*a*, and a cathode follower 776*a* to this Delay Unit 777*a*. The signal on the line HOLD ACC, is of course, driven negative, as described above, whenever any SHIFT LEFT or SHIFT RIGHT signal is given, and ALSO when the holding of the Adder is being gated to the Accumulator Register. The effect of the interruption of this HOLD signal is effectively to erase, whatever is already stored in the Delay Unit, since only a binary zero can exist with this AND circuit 774*a* de-conditioned.

Referring to the AND circuit 773*a* of Fig. 7*f*, this receives input signals via line SHIFT ACC RIGHT connected to terminal 5, and via line ACC (*N*+1) OUTPUT connected to terminal 6, this line comprising the output, from the next higher order of the Accumulator Register. Upon a coincidence of two such positive inputs, the output of the AND circuit 773*a* goes positive, and via the OR circuit 775*a* and the cathode follower 776*a* applies a positive signal to the Delay Unit 777*a*. Thus, whenever a signal of 1 microsecond duration is given, calling for a SHIFT ACC RIGHT operation, the output of the next higher order of the Accumulator Register is gated via this AND circuit 773*a* to the Delay Unit 777*a*. At the time that the line SHIFT ACC RIGHT, goes positive, the line HOLD ACC, is negative, and is thus effective, to erase the former holding of the Delay Unit. At the end of the 1 microsecond period, the line HOLD ACC, again becomes positive, to HOLD the newly stored bit of information, which was received from the next higher order of the Accumulator Register. If the signal on the line SHIFT ACC RIGHT is of a sufficient duration, say several microseconds, a shift from the next higher order of the Accumulator Register occurs, during each microsecond, the line HOLD ACC remaining negative during that period. Thus, for each microsecond that the line SHIFT ACC RIGHT is positive, a bit of information, is successively shifted, one order, for each such microsecond, to succeeding lower orders of the Accumulator Register. It is an inherent characteristic of a Delay Unit such as Delay Unit 777*a*, as described above, which allows an input signal to arrive, at the Delay Unit input, at the same time an output signal is being emitted, by this Delay Unit, indicative of what was formerly stored in that Unit.

The AND circuit 772*a* serves a function, similar to that of AND circuit 773*a*, except that it is for SHIFT LEFT. Here, an input signal on terminal 3 is applied to line SHIFT ACC LEFT to condition this AND circuit 772*a*, while the output of the next LOWER order, of the Accumulator Register, is applied via terminal 4 to line ACC (*N*−1) OUTPUT and this ouput, from the next LOWER order, is passed via this AND circuit 772*a*, the OR circuit 775*a*, and the cathode follower 776*a*, to the Delay Unit 777*a*. Again, a shifting of a bit information, to a successive order of the Accumulator Register (shifting to the left) occurs, for each microsecond that the line SHIFT ACC LEFT, is positive, line HOLD ACC remaining negative during that time.

The AND circuit 771*a* receives inputs from "corresponding" Adder order SUM outputs, via the terminal 2, feeding to the line SUM OUTPUT. If this AND circuit 771*a* is conditioned, by a positive voltage on line ADDER TO ACC connected to terminal 1, which may be either an E/R 4 (D1) or an E/R 8 (D1) signal (see Timing Diagram Fig. 6*ae*) then the SUM OUTPUT is gated through this AND circuit 771*a*.

Thus, upon coincidence of two positive inputs, the output of this AND circuit 771*a*, goes positive, and via the OR circuit 775*a* and the cathode follower 776*a*, feeds a positive signal to the Delay Unit 777*a*. If the SUM OUTPUT of the "corresponding" Adder order is a binary 0, this signal on the line SUM OUTPUT, is negative, and the signal input to the Delay Unit 777*a* is negative, to thereby store a binary 0. The output of the Delay Unit 777*a*, feeds via line ACC (N) which thus is representative of any of the outputs, for orders Q, P and 1 through 35, respectively, each of which feeds to a respective output terminal 8. Thus, it is seen that the output of the Adder may be gated to the Accumulator Register, and that the holding of the Accumulator Register, may be shifted, left or right, a shift occurring at a rate of one order per microsecond.

It should also be noted, as stated above, that the signal MQ (1) TO ACC (35) which feeds to terminal 3 of the Accumulator Register order 35 (Fig. 1*d*) on occasions, as described above, when the Accumulator Register and the MQ are being shifted jointly, to the left, as one register, the signal, on the line ACC (*N*−1) OUTPUT connected to terminal 4 (Fig. 7*f*) is actually coming from the MQ (1) output (Fig. 1*d*), while the signal to terminal 3 of the Accumulator Register 34 order, is actually the signal MQ (1) TO ACC (35) (Figs. 1*g* and 1*d*).

There has also been described above, how signals on lines "(+) TO ACC (S)" and "(−) to ACC (S)" will cause a direct insertion of a positive or negative Sign, respectively, in the Accumulator Register Sign order. Whenever a regular SHIFT ACC LEFT signal is given, for a shift operation that does not include the MQ, as described below, then the line HOLD ACC, connected to terminal 7 of the Accumulator Register 35 order, is driven negative, as usual, and as the information is shifted left, since no binary 1, is shifted into the Accumulator Register order 35 from the MQ, then in effect, a binary 0 is stored in this Accumulator Register 35 order. In other words, if a signal called for a shift of 6 orders, and a binary 1 was present initially, in all Accumulator Register orders, then as the information is shifted left, binary 0's are effectively stored, in the Accumulator Register 35 order, and these binary 0's are shifted left, so that at the end of the 6 step shift operation, the last 6 orders of the Accumulator Register, namely, orders 30 through 35, all contain binary 0's.

The outputs of the Accumulator Register, via terminals 8, of the respective orders (Fig. 7*f*) are positive, to represent storage of binary 1's and negative to represent storage of binary 0's. These signals are fed (except for orders P and Q) mainly to the Memory Buss Switches, as illustrated in Figs. 1*d* and 1*e*.

4. MULTIPLIER QUOTIENT REGISTER

Referring now to Fig. 1*g* it is seen that each order of the MQ is, for the purpose of this application, identical in detail, a representative circuit for these orders being illustrated in Fig. 7*g*. The Sign order, for example, of the MQ, may receive inputs from any one of three sources. One is a signal fed via line "(−) TO MQ (S)" of Fig. 1*g* to terminal 1, for the insertion of a binary 1, to store a negative Sign in the MQ Sign order. A second input is to the terminal 7, via the line MEM REG (S) and the signal on this line is gated by a control signal on the line MR TO MQ (see also Fig. 7*g*) for gating the holding of the Memory Register "S" order to the MQ "S" order. A third input line HOLD MQ (S) feeds to terminal 8 of the S order of the MQ (Fig. 1*g*) and is used during gating of information, from the Memory Register to the MQ, and is also used, to insert a positive Sign indication, by breaking the recirculation loop of the Delay Unit, as described above, to thereby store a binary 0, which is the indication of a positive Sign. This HOLD MQ (S) line also goes negative, when a positive signal occurs on the line CLEAR MQ, as described above, which negative HOLD signal is effective, to erase the holding of the MQ register, that is, to set each order to zero.

The MQ1 order via its input terminal 7 receives inputs from the Memory Register 1 order, via its input terminal 3 from the Accumulator Register 35 order, and via its input terminal 5 from the next lower MQ order 2. The MQ orders 2 through 34, have inputs to their respective terminals 7, from "corresponding" outputs of the Memory Register, inputs from the succeeding HIGHER order, of the MQ, to terminal 3, and inputs from the succeeding LOWER order, of the MQ, to terminal 5. The MQ 35 order receives inputs from the Memory Register 35 order via its terminal 7. MQ order 35 also receives an input from the next HIGHER order of the MQ, in this case, the MQ 34 order, via its terminal 3 and also receives a signal from the line "(1) TO MQ (35)" via its terminal 1, which last line signal is used for the insertion of a binary 1, in the MQ 35 order. Control signals applied to the MQ are as follows:

A signal via the line MR TO MQ, for "dumping" the holding of the Memory Register into the MQ, in corresponding bit orders. A signal via the line SHIFT MQ RIGHT, for shifting the holding of the MQ, to the right, and it should be noted that a signal on this last line is also effective to shift the holding of the Accumulator Register 35 order to the MQ 1 order. A signal via the line SHIFT MQ LEFT shifts the holding of the MQ, to the left, and a signal via the line CLEAR MQ acts, via the circuits described above, to cause the lines HOLD MQ (1–35) to go negative, respectively, and thereby erase the holding of all orders of the MQ.

Referring to Fig. 7*g*, there is illustrated, in detail, a representative MQ order. The circuitry illustrated is somewhat similar to the circuitry of the Accumulator Register orders, in that a Delay Unit, which in Fig. 7*g* is Delay Unit 787*a*, is the storage element per se, of the circuit. This Delay Unit 787*a* may receive an input via one of four AND circuits or via its terminal 1, feeding a line SET TO (1), which means that a binary 1 can thus be set directly, into the particular order of the MQ. As long as the line HOLD MQ, connected to terminal 8, is positive, the AND circuit 781*a* is conditioned, and positive outputs of the Delay Unit 787*a* are allowed to pass via this conditioned AND circuit 781*a*, an OR circuit 785*a* and a cathode follower 786*a* back to the Delay Unit, to thus provide, the recirculation path for a stored binary 1 bit. If a binary 1 is stored, a positive signal appears at the output of the Delay Unit and is thus recirculated. However, if a binary 0 is stored, the output of the Delay Unit, is negative, so that it cannot pass via the AND circuit 781*a*, such binary 0's being reproduced in the Delay Unit, as described above. The line HOLD MQ is driven negative, to thus break the recirculation path and effectively, erase the holding of the Delay Unit, whenever a signal is emitted via a line CLEAR MQ (Fig. 1*g*) which produces a negative signal on the line HOLD MQ (Figs. 1*g* and 7*g*) to thus erase the holding of the MQ storage element.

When a positive signal appears on line MR TO MQ this signal (Fig. 1*g*) in addition to producing a negative signal on the line HOLD MQ, to break the recirculation path (Fig. 7*g*) also is fed via terminal 6 to the line MR TO MQ (Fig. 7*g*) to condition an AND circuit 782*a* so that a positive signal from the "corresponding" Memory Register order, applied to terminal 7 and thus to line MR (N) is fed to the OR circuit 785*a*, and thence via the cathode follower 786*a* to the Delay Unit.

When a positive signal is applied via terminal 4 to the line SHIFT MQ LEFT, the holding of the succeeding LOWER order of the MQ, fed to terminal 5 and applied to line MQ $(N-1)$ passes via an AND circuit 783*a* and via the OR circuit 785*a* and the cathode follower 786*a* to the Delay Unit 787*a*, whereby the holding of the next LOWER order of the MQ is shifted LEFT to the instant order. This shift is effective, as in the case of the Accumulator Register, to shift the bits, one position, for each microsecond that the line SHIFT MQ LEFT is positive, the line HOLD MQ being simultaneously negative, to break the recirculation of the stored bit, in the instant MQ order.

A positive input to terminal 2 is applied to line SHIFT MQ RIGHT to similarly shift bits, to the RIGHT, in orders 2 through 35 of the MQ or, in the case of the MQ 1 order, the input to terminal 3 is applied to line ACC (35), whereby the holding of the Accumulator Register order 35 is transferred to the Delay Unit 787*a* of MQ order 1 on a SHIFT MQ RIGHT.

With regard to the Sign order of the MQ, an input is made via input terminal 1 and line "(−) TO MQ (S)" of Fig. 1*g* instead of SET TO (1) of Fig. 7*g*, thus feeding a binary 0 which is an indication of a negative Sign into the MQ Sign order. At this time, the HOLD MQ voltage, remains positive, and the positive signal is fed, directly to the OR circuit 785*a*, so that a binary 1, representative of a negative Sign, is injected directly into the Delay Unit 787*a*. When it is necessary to store a positive Sign in the MQ Sign order, the line "(+) TO MQ (S)" (Fig. 1*g*), as described above, drives the line HOLD MQ (S) negative (Fig. 1*g* and labeled HOLD MQ in Fig. 7*g*) to erase the holding of the Delay Unit, and thereby effectively store a binary 0, which is representative of a positive Sign.

Likewise, a binary 1 may be stored in the MQ 35 order, by a positive signal applied to the input terminal 1, to render line "(1) TO MQ (35)" positive (Fig. 1*g* and labeled SET TO (1) in Fig. 7*g*), which applies positive directly to the OR circuit 785*a* (Fig. 7*g*) to directly inject a binary 1 into the MQ 35 order, regardless of what was formerly stored in that order, the line HOLD MQ, remaining positive.

Thus, it is seen that the holding of the MQ can be erased, the holding of the Memory Register may be "dumped" into the MQ, the holding of the MQ may be shifted, left or right, jointly with the holding of the Accumulator Register and the MQ Sign order may be set, to represent a positive or a negative Sign, and the MQ 35 order, may be set, to represent a holding of a binary 1. The output of any Delay Unit, is positive, to represent a binary 1, or negative to represent a binary 0. Respective outputs of the various MQ orders feed via the respective output terminals 9 (Figs. 1*g* and 1*e*) to the Memory Buss Switches (Fig. 1*e*) to be described presently.

5. MEMORY BUSS SWITCHES

Referring to the Memory Buss Switches, as represented in Fig. 1*e*, these are mere switching circuits, in that they do NOT contain any storage elements. The inputs to these Switches are from the Accumulator Register, as indicated in Figs. 1*d* and 1*e* and also from the MQ, as indicated by the lines and cable, Figs. 1*g* and 1*e*. If an Instruction STORE is given, with a full word Address, the Accumulator Register orders S, and 1 through 35, are fed via orders S, and 1 through 35 of the Memory Switches, to thereby place information on the Memory Busses S, and 1 through 35. If an even half word is Addressed, during a STORE operation, the same action takes place, that is, the outputs of orders S, and 1 through 35, of the Accumulator Register are gated, via the Memory Buss Switches, to the Memory Busses S, and 1 through 35. However, those cathode ray tubes which store the information received from Busses S, and 1 through 18 only are UNBLANKED, as described in said above identified application of Fox et al., during this even half word Address or in other words, the information, on the Memory Busses 18 through 35, is NOT delivered, to cathode ray tube storage. However, if an odd half Address is given, with a STORE Instruction, information from the Accumulator Register orders S, and 1 through 17 only, are gated by the Memory Buss Switches, to the Memory Busses 18 through 35, this switching being accomplished, as described presently, by the Memory Buss Switch orders 18 through 35. No information is gated to the Memory Busses S, and 1 through 17 with an odd half word Address. The same type of operation takes place on STORE MQ operations, depending upon whether the Address is for a full word or for an even or an odd half word. Thus, the Switch orders S, and 1 through 17, require two inputs only (neglecting control inputs) namely, one input from "corresponding" Accumulator Register orders, and one from "corresponding" MQ orders. However, orders 18 through 35, of the Memory Buss Switches, require 4 inputs (neglecting control inputs), that is, one from "corresponding" Accumulator Register orders, one from "corresponding" MQ orders, one from an Accumulator Register order N–18, where N is the Memory Buss Switch order number, and one from an MQ order N–18. The special case of the Memory Buss 18 order will be described below.

The four control signals which accomplish the switching for full or half words, as the case may be, are present, as needed, on the following lines: Line "ACC (S to 17) TO MEM BUS (18 to 35)" which feeds to terminal 3, respectively, of each Memory Switch Buss order 18 to 35 (only 35 being shown in Fig. 1*e*). This control signal, as described below, controls the transposition of bits, FROM order S, and 1 to 17 inclusive of the Accumulator Register TO the respective Memory Busses 18 to 35 inclusive, when an odd half word Address is selected. Line "ACC (S to 35) TO MEM BUSS (S to 35)" which feeds to terminal 1, of each Memory Buss Switch order S, and 1 through 35 is effective, when a full word Address is selected. Line "MQ (S to 35) TO MEM BUSS (S to 35)" applied to terminal 3, of each Memory Buss Switch order S, and 1 through 17 and to terminal 5 of orders 18 to 35 and is effective, where a full word Address is selected and information is being transferred, from the MQ orders S and 1 through 35 to the Memory Buss orders S and 1 through 35. Line "MQ (S to 17) TO MEM BUSS (18 to 35)" which feeds to terminal 7, of Memory Buss Switch orders 18 to 35 is effective to gate the holding of the MQ orders S and 1 through 17 to the respective Memory Busses, 18 through 35.

Referring to Fig. 7*h*, which illustrates a representative one of the Memory Buss Switches for orders 18 through 35, the four inputs, previously mentioned, are preesnt. The output of the "corresponding" Accumulator Register order, represented by input terminal 2 and line ACC (N) (OUTPUT) comprises one input to the AND circuit **705*b*, whose other input is via terminal 1 and line "ACC (S to 35) TO MEM BUSS (S to 35)" which passes bits from ALL orders of the Accumulator Register to all orders of the Memory Busses. As stated above, and as described in said above identified application of Fox et al., with an even half word, the cathode ray tube orders 18 through 35 are NOT UNBLANKED. Thus, during a full or an even half word Address, a positive signal on the line "ACC (S to 35) TO MEM BUSS (S to 35)" gates information from each order of the Accumulator Register to the coresponding Memory Buss order. The output of the AND circuit 705*b* passes via an OR circuit 709*b* and a power cathode follower 710*b* to the line MEM BUSS (N) representing a "corresponding" Memory Buss connected to the output terminal 9**.

An AND circuit **706*b* is conditioned via terminal 3 and the line "ACC (S to 17) TO MEM BUSS (18 to 35)" whereby the output of the Accumulator Register order N–18 (where N represents the particular Memory Buss Switch order), is fed through this conditioned AND circuit 706*b*, when an odd half word is Addressed, at which time, as described above, the line "ACC (S to 17) TO MEM BUSS (18 to 35)" goes positive The output of this AND circuit 706*b* passes via the OR circuit 709*b* and the power cathode follower 710*b*** to the corresponding Memory Buss. Thus, when an odd half word is called for, the Accumulator Register order outputs S and 1 through 17 are gated to the respective Memory Busses 18 to 35. It is to be noted particularly that the bit, stored in the S order of the Accumulator Register appears on Memory Buss 18.

The AND circuit **707*b* is conditioned via terminal 5 and line "MQ (S to 35) TO MEM BUSS (S to 35)" whereby the output from the "corresponding" MQ order, as represented by the terminal 6 and line MQ (N) OUTPUT, passes via this conditioned AND circuit 707*b* and via the cathode follower 709*b* and the power cathode follower 710*b*, to the corresponding Memory Buss orders whether a full or a half word is Addressed, the operation being identical to that described in connection with the AND circuit 705*b***, when the Instruction is STORE, with either a full or a half word Address. Where an EVEN half word is Addressed, again the cathode ray tubes for orders 18 to 35 are NOT UNBLANKED.

The AND circuit **708*b* is conditioned, via terminal 7 and line "MQ (S to 17) TO MEMORY BUSS (18 to 35)" when an ODD half word is Addressed, to thus permit bits, applied to terminal 8 and line MQ (N–18) output, from these so designated orders of the MQ to pass via the conditioned AND circuit 708*b*, the OR circuit 709*b* and the power cathode follower 710*b*, to a MEM BUSS (N) output and to terminal 9**, whereby data, in the respective MQ orders S, and 1 through 17, with an ODD half word Address is passed, respectively, to Memory Buss orders 18 to 35, inclusive.

Referring to Fig. 7*i*, there is illustrated a representative Memory Buss Switch for orders S, and 1 through 17. The AND circuit **701*b*, via input terminal 2 and line ACC (N) OUTPUT, receives a signal from a "corresponding" order of the Accumulator Register which, when the terminal 1 and line "ACC (S to 35) TO MEM BUSS (S to 35)" is positive, is passed through the AND circuit and via an OR circuit 703*b* and a power cathode follower 704*b* to Memory Buss (N) and to terminal 9**, this terminal being, of course, connected to a "corresponding" Memory Buss order.

The AND circuit **702*b* is conditioned via the terminal 3 and line "MQ (S to 35) TO MEM BUSS (S to 35)" whereby an input to terminal 4 and line MQ (N) OUTPUT is passed to the OR circuit 703*b* and the power cathode follower 704*b*, to Line MEM BUSS (N) and to terminal 9**, which as stated above, is connected to a "corresponding" Memory Buss order.

Thus, it is seen that full or half words may be read from the Accumulator Register orders and via the Memory Buss Switches and Memory Busses, to Memory, during STORE operations, with full or with EVEN or ODD half words, or may be read from the MQ orders, to Memory, via the Memory Buss Switches and the Memory Busses.

TIMING DIAGRAM OF VARIOUS OPERATIONS

The Timing Diagram of Figs. 6*ad* and 6*ae*, with Fig. 6*ad* above Fig. 6*ae*, illustrates the timing of the respective control signals, for gating information from Memory to the Memory Register, from the Memory Register to the Adder, from the Adder to the Accumulator Register, from the Accumulator Register, in True or in Complement form, to the Adder; also from the Memory Register to the MQ and from the Accumulator Register and the MQ, through the Memory Buss Switches, to the Memory Busses and thence to Memory. The various timing signals are also illustrated for causing a SHIFT of the Accumulator Register and the MQ to the right or the left, the holding of the respective Registers, being shifted, one order, for each microsecond that the particular control signals are positive.

Various other signals illustrated in this Timing Diagram of Figs. 6*ad* and 6*ae* have been utilized in circuits described above. For example, the End of Operation signal (Fig. 6*ad* and also Fig. 6*ae*) which is a two microsecond signal occurring during certain Execute or Execute/Regenerate cycles, is effective in the Cycle Timer (see Figs. 3*c* and 3*d*) to signal the End of Operation. At the same time, as an End of Operation occurs, this signal is emitted to the Instruction Counter, described above, for stepping that counter, one count, so that as the Machine enters an Instruction cycle, the next Instruction Read, will be the succeedingly numbered Instruction. An exception occurs on TRANSFER operations, as will be described below. Another signal STEP INST CTR, shown in the Timing Diagram (Fig. 6*ad* and also Fig. 6*ae*) is for the purpose of stepping the Address Counter, this Address Counter being stepped, one count, for each microsecond that the particular signal, calling for the stepping of the Address Counter is positive.

TRANSFER

Referring again to the Timing Diagram (Fig. 6*c*) which is the Timing Diagram for a TRANSFER operation, as stated above the function of this TRANSFER operation is to enable the Machine to deviate from the normal operation of executing Instructions at sequentially numbered Address locations. The TRANSFER Instruction allows the Machine to perform an Instruction, at a certain Address, and then to TRANSFER and perform the Instruction at THE Address designated by the Address part of the TRANSFER Instruction. To do this, it is necessary to set the Instruction Counter, to this Address portion of the TRANSFER Instruction held in the Instruction Register and also to suppress the normal stepping of the Instruction Counter, at the end of execution, that is at the End of Operation. Referring to the signals illustrated in the Timing Diagram of Fig. 6*c*, as the Machine enters an Instruction calling for a TRANSFER operation, this half word Instruction is Read out of Memory to the Memory Busses, and is gated by an I9 (D1) signal as indicated by the labeling in Fig. 6*c*, to the Memory Register. This I9 (D1) signal is labeled "MEM BUSS (S to 17) TO MR (S to 17), MEM BUSS (18 to 35) TO MR (S to 17)" to indicate that an EVEN half or an ODD half word, comprising the Instruction may be Read out of Memory, as described above, to the Memory Register. Next an I10 (D1) signal is emitted to gate this Instruction from the Memory Register, into the Instruction Register, and since the Operation Decoder now determines that the operation is TRANSFER, a GO TO EX/RGN signal is emitted by the control circuits, as described above, at I11 (D1) time to send the Machine into Execute/Regenerate time. At "7" time, of the first Execute/Regenerate cycle (Fig. 6*c* and also Fig. 6*ae*), a 3 microsecond signal is emitted, to RESET the Instruction Counter (see also Fig. 4*d*). After the Instruction Counter has been so RESET, an E/R 10 (D1) pulse (Figs. 6*c* and 6*ae*) SET INST CTR TO INST REG is emitted to set the Instruction Counter to the Instruction Register, as described above. At this point, the Address portion of the TRANSFER Instruction Read out of Memory, is now standing in the Instruction Counter, and an End of Operation is emitted at E/R 10 (D2). It should be noted that no signal is shown, in the Timing Diagram (Fig. 6*c*) for stepping the Instruction Counter, so that, after a sufficient number of Regenerate cycles, have taken place, as described in said above identified application of Fox et al., the next Instruction to be Read from Memory is THE Instruction stored at the Address indicated by the Address portion of the TRANSFER Instruction now standing in the Instruction Counter.

STOP AND TRANSFER

Referring to Fig. 6*d*, it will be seen that the operation STOP AND TRANSFER is like the TRANSFER operation, described just above, except that the Machine STOPS at the end of Instruction time and is sent into Regenerate cycles. Referring to Fig. 6*d*, at I9 (D1) time as indicated by the labeling, an EVEN half word or an odd half word is transferred from the Memory Buss to the Memory Register, as in TRANSFER, and at I10 (D1) time the contents of the MR are transferred to the Instruction Register, as in TRANSFER. However, at I11 (D1) time, both the signals REGENERATE and GO TO EX/RGN are emitted, but REGENERATE always Predominates and, as long as the Machine is STOPPED it stays in Regenerate, although it has an "interval" Execute/Regenerate condition. When the Machine is RESTARTED, by any well known means, it removes the STOP condition, and, as described above, the Machine proceeds to an Execute/Regenerate cycle. As the Machine goes into this Execute/Regenerate cycle, the Instruction Counter is reset, and then SET it to the holding of the Address part of the Instruction Register, as indicated by the labeled pulses of Fig. 6*d*, and the End of Operation is signalled. Thus, it is possible for the Machine to be stopped, and automatically, upon Re-Starting, TRANSFER to another part of the Program of Instruction, as indicated at the Address, now stored in the Instruction Counter.

TRANSFER ON ZERO

Another type of TRANSFER Instruction is TRANSFER ON ZERO, the Timing Diagram of which is illustrated in Fig. 6*e*. During Instruction time, an I9 (D1) signal, as indicated by its labeling in Fig. 6*e*, causes the odd or even half word to be Read from the Memory Busses to the Memory Register, and a signal emitted at I11 (D1) time, as indicated by the labeling, transfers the contents of the Memory Register to the Instruction Register. As the Instruction is thus transferred to the Instruction Register, the Operation Decoder is energized and its output signifies that the operation is TRANSFER ON ZERO and an Execute/Regenerate cycle is called for, at I11 (D1) time, as indicated by the labeling of this signal in Fig. 6*e*. This Instruction TRANSFER ON ZERO, requires a transfer, ONLY when the value ZERO is held in the Accumulator Register. To determine if the Accumulator Register contains a zero, it is necessary to pass the Complement, of the Accumulator Register holding, through the Adder, and, at the same time, emit a Carry to the Adder 35 order. Thus, if all orders of the Accumulator Register contained zeros, as they are Complemented, these zeros become 1's, and THE Carry, added to the Adder 35 order, propagates through all Adder orders, now set at 1's to produce an END CARRY. If no such END CARRY is produced, ZERO did NOT stand in the Accumulator Register. To execute this test; during the Execute/Regenerate cycle an E/R 1 (D4) signal, as indicated by its labeling in Fig. 6*e*, is emitted to gate the holding of the Accumulator Register in Complement form to the Adder, and at the same time, an E/R 1 (D4) signal is emitted to insert a Carry in the Adder order 35. If an END CARRY results, then an E/R 7 (D3) signal is emitted, as labeled in Fig. 6*e*, to RESET the Instruction Counter, and thereafter, an I10 (D1) signal is emitted, as labeled in Fig. 6*e*, to SET the Instruction Counter to the holding of the Address portion of the Instruction Register.

If "NO" End Carry resulted, it is an indication that the Accumulator Register did not contain a ZERO, and these latter two signals are NOT emitted, and the Instruction Counter remains at its original setting. An E/R 10 (D2) signal is generated, to signal an End of Operation, and if no Carry had resulted, which, as explained above, signifies that the Accumulator Register did not contain a binary 0, a signal is emitted, to step the Instruction Counter, one count, so that the next Instruction, to be Read, from Memory, is the Instruction at the next sequentially numbered Address.

Thus, it is seen that when a TRANSFER ON ZERO operation occurs, IF the Accumulator Register CONTAINS a ZERO, the TRANSFER is effected and the next Instruction is Read from that Address in Memory, indicated by the Address portion of this TRANSFER ON ZERO Instruction. However, if the Accumulator Register does not contain a ZERO, the next Instruction Read is taken from the next sequentially numbered Address position in Memory.

TRANSFER ON OVERFLOW

Refer now to Fig. 6*f* which is the Timing Diagram for a TRANSFER ON OVERFLOW operation. This operation is similar to a regular TRANSFER operation, except that the transfer is conditioned, upon the Overflow trigger being ON. As described above, the Overflow trigger may be turned ON, by a variety of conditions, one, for example, being when the Accumulator Register 1 order, contains a binary 1, and a SHIFT LEFT Instruction occurs. This operation of TRANSFER ON OVERFLOW is performed, as follows: During Instruction time and specifically at I9 (D1) time, as indidicated by the labeling in Fig. 6*f*, a half word Instruction is Read from the Memory Busses to the Memory Register and at I10 (D1) time, as indicated by the labeling, the Instruction in the Memory Register is "dumped" into the Instruction Register, and, since the Operation Decoder is energized, a GO TO EX/RGN signal is emitted, at I11 (D1) time. During this Execute/Regenerate cycle, an E/R 7 (D3) signal, as indicated by the labeling in Fig. 6*f*, is emitted for Resetting the Instruction Counter and an E/R 10 (D1) signal, as indicated by the labeling is emitted to SET the Instruction Counter to the holding of the Address portion of the Instruction Register. If, and only if, the Overflow trigger is ON, these latter two signals, as stated above, are produced to execute the TRANSFER. Thus, provided this Overflow trigger is ON, the TRANSFER is effected, as just described, and an End of Operation signal is given at E/R 10 (D2) time, as indicated in Fig. 6*f*.

However, if the Overflow trigger had been OFF, a TRANSFER would not be effected, and a signal is emitted at E/R 10 (D2) time, as indicated by the labeling in Fig. 6*f*, to step the Instruction Counter, so that the next Instruction, would be Read from the next sequentially numbered Address in Memory. At E/R 11 (D1) time, as indicated by the labeling in Fig. 6*f*, a signal is emitted for Resetting the Overflow trigger, so that, at the end of this TRANSFER ON OVERFLOW operation, the Overflow trigger will be OFF, whether it was ON before, or not.

Thus, during a TRANSFER ON OVERFLOW operation, a transfer is effected, PROVIDED that the Overflow trigger is ON, signifying that an Overflow had occurred, and the Overflow trigger is thereafter Reset OFF. However, if the Overflow trigger had been OFF, a TRANSFER is NOT effected, but instead, the Instruction Counter is stepped one count so that the next Instruction will be taken from the next sequentially numbered Address.

TRANSFER ON PLUS

The Timing Diagram for a TRANSFER ON PLUS operation is illustrated in Fig. 6*g* and the operation, during this Instruction, is similar to that described for the TRANSFER ON OVERFLOW operation, EXCEPT that the TRANSFER is conditional, upon the Accumulator Register Sign being POSITIVE. If the Accumulator Register Sign IS positive, a TRANSFER IS effected, but if the Accumulator Register Sign is negative, the Instruction Counter is stepped one count, as in its normal operation. The TRANSFER ON PLUS operation ALSO DIFFERS from the TRANSFER ON OVERFLOW operation, in that the Overflow trigger is NOT Reset OFF.

LOAD MQ

The Timing Diagram for a LOAD MQ operation is illustrated in Fig. 6*h*. During an Instruction cycle, at I9 (D1) time, as indicated by the labeling, a half word is gated from the Memory Busses to orders S, and 1 through 17, of the Memory Register and at I10 (D1) time, as indicated by the labeling, this half word Instruction is "dumped" from the Memory Register into the Instruction Register, the Operation Decoder receiving an indication of the kind of Instruction at that time and emitting a signal, indicating that the Instruction is LOAD MQ. The Control Circuits then control the Cycle Timer to emit a GO TO EXECUTE signal at I11 (D1) time. This Execute cycle is required, since Memory will be READ-OUT, during this Execute cycle. At E9 (D1) time, as indicated by the labeling in Fig. 6*h*, either a FULL word, an EVEN half word or an ODD half word at the specific Address, indicated by the Address part of the Instruction Register holding, which directly controls the deflection circuits during EXECUTE is Read, out of Memory, via the Memory Busses, to the Memory Register. As described in detail above, either the FULL, the EVEN half word or the ODD half word, at the Address indicated, is gated to the Memory Register from the Memory Busses, by a combination of proper signals on lines MEM BUSS (S to 17) TO MR (S to 17), MEM BUSS (18 to 35) TO MR (S to 17), MEM BUSS (18 to 35) TO MR (18 to 35) and CLEAR MR (18 to 35). Thus, a FULL, or an EVEN half word or an ODD half word, depending upon the Address of the Load MQ Instruction is Read, out of Memory, via the Memory Buss to the Memory Register. Thereafter, at E11 (D1) time, a signal is emitted, as indicated by the loading in Fig. 6*h* for gating the Memory Register to the MQ, to thereby transfer the FULL, the EVEN half word or the ODD half word, from the Memory Register to the MQ. Of course, if a half word, is Read, it is Read into the MQ orders S, and 1 through 17, while its orders 18 through 35, receive zeros, since as described above in detail, whenever a half word is Read, out of Memory, it is invariably Read into orders S, and 1 through 17, of the Memory Register while its orders, 18 to 35, are Reset to zero. The usual End of Operation signal and the STEP INSTRUCTION COUNTER signals are emitted, at E10 (D2) time, as indicated by the labeling in Fig. 6*h*, to cause the Cycle Timer to proceed, either to the next sequentially numbered Instruction or into Regenerate time, the Instruction Counter, being stepped, so that the next Instruction will be Read, from the next sequentially numbered Address location, in Memory.

NO OPERATION

The Timing Diagram for a NO OPERATION instruction is illustrated in Fig. 6*i*. During Instruction time, at I9 (D1) time, as indicated by the labeling in Fig. 6*i*, a half word is Read, from Memory, via the Memory Busses to the Memory Register, and at I10 (D1) time, this Instruction is "dumped" from the Memory Register to the Instruction Register. The Operation Decoder is conditioned and causes the Control Circuits to operate the Cycle Timer, so that a GO TO EX/RGN signal is emitted at I11 (D1) time, the Machine goes to an Execute/Regenerate cycle. During this Execute/Regenerate cycle, NO operation control signals are emitted, so that NO operation takes place, with the exception that the End of Operation signal is produced, which signals, of course, that the operation is over, and a signal, for STEPPING THE INSTRUCTION COUNTER, is produced, so that the next Instruction will be Read, from the next sequentially numbered Address location, in Memory.

ROUND

The Timing Diagram of a ROUND operation is illustrated in Fig. 6*j*. During Instruction time, at I9 (D1) time, as indicated by the labeling, the ROUND Instruction is Read, out of Memory, via the Memory Buss to the Memory Register, and at I10 (D1) time, this Instruction is "dumped" from the Memory Register into the Instruction Register, and at I11 (D1) time, a GO TO EX/RGN signal is given. During the Execute/Regenerate cycle, at E/R 1 (D4) time, as indicated by the labeling, the holding of the Accumulator Register, in True form, is gated to the Adder, and, if the MQ 1 order contains a binary 1, a Carry increment is added to the Adder 35 order, at the same time. However, if the MQ 1 order contains a binary 0, no Carry increment is added, to the Adder order 35. At the same time, an E/R 1 (D4) signal, as indicated by the labeling, is effective to gate any Carry output from the Adder 1 order, to the Overflow trigger, so that, if during a ROUND operation, a Carry IS propagated from the Adder 35 order through the entire length of the Accumulator Register, that is orders 35 through 1, the Overflow trigger will be turned ON, to indicate that an Overflow has occurred. At E/R 4 (D1) time, as indicated by the labeling, a signal is emitted, to gate the holding of the Adder into the Accumulator Register and, thereafter, an End of Operation is signalled and the Instruction Counter is stepped, one count.

Thus, it is seen that in this ROUND operation, the binary 1 or binary 0 bit storage, of the most significant bit order of the MQ, determines whether or not a Carry shall be added, to the Adder order 35, that is, to the lowest significant order of the number, stored in the Accumulator Register.

RULES GOVERNING ADDITION

Before proceeding to a discussion of the ADD Timing Diagram, illustrated on Fig. 6*k*, a few of the rules for binary addition, as performed by this Machine, will now be stated. During an ADD operation, the factors are added ALGEBRAICALLY, so that if the Signs are UNLIKE, the value, stored in the Accumulator Register is Complemented to a 1's Complement, and is added, in the Adder, to the True value of the number stored in the Memory Register. By such an addition of a Complement number to a True number, SUBTRACTION is actually performed.

If, in this ADD operation, the Signs are UNLIKE, and the 1's Complement of the value stored in the Accumulator Register is added, in the Adder, to the True value of the number stored in the Memory Register, and an END CARRY is produced, an "elusive 1" must be added in order that a correct result be obtained.

Thus the following rules for ADD may be stated:

*Rule 1*

If the Accumulator Register and the Memory Register Signs are ALIKE, add the Accumulator Register value, in True form, to the Memory Register True value.

*Rule 2*

If the Accumulator Register and Memory Register Signs are UNLIKE, add the 1's Complement of the Accumulator Register value, to the Memory Register True value.

*Rule 3*

If the Accumulator Register and the Memory Register Signs are ALIKE, the Accumulator Register Sign is left unchanged.

*Rule 4*

If the Accumulator Register and the Memory Register Signs are UNLIKE and

*a.* If NO End Carry results, it is an indication, that the value in the Accumulator Register was the larger, and the SUM, now in the Accumulator Register, is in Complement form. Therefore, it is necessary to Recomplement the present Accumulator Register factor and leave the Sign of the Accumulator Register, UNCHANGED.

*b.* If there IS an End Carry, it is an indication, that the value in the Memory Register was the larger, so that the SUM, now in the Accumulator Register, is in True form, but an "elusive 1" must be added to the result and the Sign, of the Accumulator Register, must be CHANGED.

ADD

Referring now to Timing Diagram for ADD, illustrated in Fig. 6*k*, it is seen, from the labeling, that during Instruction time, an I9 (D1) signal, gates a HALF word ADD Instruction, from Memory, via the Memory Buss to the Memory Register and, at I10 (D1) time, this ADD Instruction is "dumped" from the Memory Register into the Instruction Register. The Operation Decoder, determining that the operation is ADD, causes the Control Circuits to emit a GO TO EXECUTE signal, at I11 (D1) time, sending the Machine into an Execute cycle.

During this Execute cycle, specifically, at E9 (D1) time, as indicated by ALL the labeling in Fig. 6*k* for this signal, a FULL, an EVEN half word, or an ODD half word is Read, out of Memory, via the Memory Busses to the Memory Register, and at E11 (D1) time, a GO TO EX/RGN signal is emitted, sending the Machine into an Execute/Regenerate cycle. The purpose of the Execute cycle, is to Read the FULL or HALF word, in Memory, into the Memory Register, preparatory to dumping this FULL or HALF word, into the Accumulator Register. The word Read, out of Memory, is Read from THE Address, specified by the Address portion of the ADD Instruction. The Execute/Regenerate cycle is required so that the actual addition can take place. During this Execute/Regenerate cycle, an E/R 1 (D4) signal is emitted, as indicated by its labeling, for gating the holding of the Memory Register to the Adder. The factor, in the Accumulator Register, is also gated to the Adder at E/R 1 (D4) time, in True or in Complement form, depending upon the Signs of the two factors, as indicated by the labeling in Fig. 6*k*. If the Signs are ALIKE, the value in the Accumulator Register is gated, in True form, to the Adder, but if the Signs are UNLIKE, the value, in the Accumulator Register, is gated, in Complement form, to the Adder, either operation taking place, under control of an E/R 1 (D4) signal. Thus, by passing the value from the Memory Register to the Adder, and the value from the Accumulator Register, in True or in Complement form, to the Adder, an actual addition takes place. Because of the inherent nature of the Delay Units of the Adder, Carries, throughout the Adder, are propagated at a rapid rate, and, therefore, if an END CARRY ensues, it occurs almost immediately.

If the Signs are ALIKE, and the Adder 1 order emits a Carry signal, it is an indication of an Overflow, and the Carry output, of the Adder 1 order, is gated to the Overflow trigger by an E/R 1 (D4) signal, to turn ON the Overflow trigger.

However, if the Signs are UNLIKE, a Complement of the value from the Accumulator Register, is gated to the Adder, and if an End Carry occurs from the Q order, under this latter condition, it is an End Carry and under Rule 4*b*, set out above, it is necessary to add an elusive 1 in the Adder 35 order, at approximately E/R 1 (D4) time. After allowing 3 microseconds, for propagation of carries, which 3 microseconds provides a large safety factor, an E/R 4 (D1) signal is emitted, as indicated in Fig. 6*k*, to gate the Sum, from the Adder, to the Accumulator Register.

As described above, this Sum, may be in True or in Complement form. If the Signs are UNLIKE, and NO End Carry resulted, then under RULE 4*a* above, it is known that the data in the Accumulator Register is in Complement form. Therefore, it is necessary to Recomplement the number, so that the final value, stored in the Accumulator Register, at the end of the ADD operation, is in True form. To produce this Re-Complement operation, an E/R 7 (D2) signal is emitted as indicated in Fig. 6*k* for passing the holding of the Accumulator Register, in Complement form, to the adder. At this time, there is no other input to the Adder, so the effect is to merely pass information, through the Adder, in order to Complement the value. At E/R 8 (D1) time, a signal is emitted, to gate the Re-Complemented output of the Adder, to the Accumulator Register, so that the Recomplementing operation is complete.

binary 1 indicating a Minus Sign. If the Accumulator Register Sign is negative, under the same conditions, the signal emitted at E/R 10 (D1) time, is labeled "(+) TO ACC (S)" as illustrated in Fig. 6*k*, which, as described above, renders the line HOLD ACC (S) of Fig. 7*e*, minus to thereby insert a binary 0, in the Sign order of the Accumulator Register, which binary 0 is indicative of a positive Sign.

Thus, it is seen that if the Signs are UNLIKE, and if an End Carry did result, the Accumulator Register Sign is changed. At E/R 10 (D2) time, the End of Operation signal is given, and the Instruction Counter is stepped, one count.

In the following examples of Add operations, the Memory Register is illustrated as though its capacity was 4 bits only, to the right of the binary point, instead of the actual 35, and the same is true of the Accumulator Register. Both Overflow positions, respectively, are also indicated.

Example 1.—Accumulator Register and Memory Register SIGNS ALIKE

| | | |
|---|---|---|
| A. Accumulator Register | +00.0101 | |
| Memory Register | + .1101 | |
| Result in Accumulator Register | +01.0010 | |

NOTE—An Overflow occurred, beyond the binary point, and this is noted, by turning ON the Overflow trigger, as described above.

| | | |
|---|---|---|
| B. Accumulator Register | −00.0101 | |
| Memory Register | − .0011 | |
| Result in Accumulator Register | −00.1000 | |

Example 2.—Accumulator Register and Memory Register SIGNS UNLIKE

| | | |
|---|---|---|
| A. Accumulator Register | +00.0101 | |
| Complemented Accumulator Register | 11.1010 | |
| Memory Register | − .0111 | |
| | C00.0001 | Since End Carry |
| | 1 | add "elusive 1" and |
| Result in Accumulator Register | −00.0010 | change Sign (RULE 4b) |
| B. Accumulator Register | +00.0101 | |
| Complemented Accumulator Register | 11.1010 | |
| Memory Register | − .0011 | |
| | NC11.1101 | Since NO End Carry |
| Result in Accumulator Register | +00.0010 | Recomplement Accumulator and leave Sign unchanged (RULE 4a). |
| C. Accumulator Register | +00.0101 | |
| Complemented Accumulator Register | 11.1010 | |
| Memory Register | − .0101 | |
| | NC11.1111 | Since NO End Carry |
| Result in Accumulator Register | +00.0000 | Recomplement Accumulator and leave Sign unchanged (RULE 4a). |
| D. Accumulator Register | −00.0101 | |
| Complemented Accumulator Register | 11.1010 | |
| Memory Register | + .0101 | |
| | NC11.1111 | Since NO End Carry |
| Result in Accumulator Register | −00.0000 | Recomplement Accumulator and leave Sign unchanged (RULE 4a). |
| E. Accumulator Register | −00.0000 | |
| Complemented Accumulator Register | 11.1111 | |
| Memory Register | + .0000 | |
| | NC11.1111 | Since NO End Carry |
| Result in Accumulator Register | −00.0000 | Recomplement Accumulator and leave Sign unchanged (RULE 4a). |

If the "original" Sum gated from the Adder to the Accumulator Register was in True form, then there was a carry from the Q order and this Recomplementing operation is NOT required.

At E/R 10 (D1) time, the Accumulator Register Sign order is SET positive or negative, as required by the algebraic rules of addition. Thus, if the Signs of the Accumulator Register and the Memory Register, are UNLIKE, and an End Carry resulted, the Sign of the Accumulator Register is changed, as indicated by Rule 4*b*, above. Therefore, if the Sign of the Accumulator Register is positive, a negative Sign must be stored in the Accumulator Register Sign order, by a 1 microsecond signal, occurring at E/R 10 time, labeled, as shown in Fig. 6*k* "(−) TO ACC (S)" whereby the Sign is changed, as described in connection with Fig. 7*e*, above by injecting a binary 1 directly into the Sign order, a In the examples, given above, Example 1A illustrates a situation in which the Accumulator Register and the Memory Register SIGNS are BOTH POSITIVE, so that when the values are added, an Overflow occurs. Example 1B illustrates a situation in which the Accumulator Register and Memory Register SIGNS are BOTH NEGATIVE, and when the values are added, to obtain a Sum, NO Overflow occurs.

Example 2A illustrates a situation in which the Accumulator Register SIGN is POSITIVE, the Memory Register SIGN is NEGATIVE and its value is GREATER THAN that of the Accumulator Register. In this instance, an End Carry DOES occur, so an "elusive 1" is added to the Sum obtained from adding the Complement of the value in the Accumulator Register to the value in the Memory Register, to thus obtain the final Sum, and the Sign of the Accumulator Register is CHANGED. Example 2B illustrates a situation in which the Accumulator Register SIGN is POSITIVE, the Memory Register SIGN is NEGATIVE and the value in the Memory Register is GREATER THAN the value in the Accumulator Register. Upon addition of the Complement of the number in the Accumulator Register, to the number in the Memory Register, NO End Carry results, so the Sum, in the Accumulator Register is a Complement number, and Recomplementing is necessary to obtain a True value in the Accumulator Register, and its SIGN is left UNCHANGED. Example 2C illustrates a situation in which the SIGN of the Accumulator Register is POSITIVE, the SIGN of the Memory Register is NEGATIVE, and the numeric VALUES ARE EQUAL. Upon addition of the Complement of the value in the Accumulator Register to the value in the Memory Register, NO End Carry results. Since NO End Carry results, the Sum, reaching the Accumulator Register is Recomplemented, to contain a True value and the SIGN of the Accumulator Register is left UNCHANGED, that is, it is left, as a positive Sign. This operation gives a result of a POSITIVE ZERO. The example shown under 2D above, illustrates a problem wherein the SIGN of the Accumulator Register, is NEGATIVE, the SIGN of the Memory Register is POSITIVE and the numeric VALUES are EQUAL. Again, adding the Complement of the value in the Accumulator Register, to the value in the Memory Register, provides a Sum, for which No End Carry occurs. Since there is NO End Carry, the value is Recomplemented, and the SIGN of the Accumulator Register, is left UNCHANGED. This leaves a NEGATIVE ZERO. Example 2E illustrates a problem in which a NEGATIVE ZERO in the Accumulator Register is ADDED TO a POSITIVE ZERO, in the Memory Register. During the addition of the Complement of value in the Accumulator Register, to the value in the Memory Register, NO End Carry occurs, and it is necessary to Recomplement the SUM reaching the Accumulator Register, and to leave the SIGN, UNCHANGED, the RESULT BEING A NEGATIVE ZERO. The problem illustrated under 2C, 2D, and 2E, respectively, indicate how the machine operates, on either a POSITIVE or a NEGATIVE ZERO quantity.

ADD ABSOLUTE

The ADD ABSOLUTE operation whose Timing Diagram is illustrated in Fig. 6*m* is the same as the ADD operation just described, except that the number in the Memory Register is treated as POSITIVE, regardless of its actual Sign. During Instruction time, an I9 (D1) signal, as indicated by its labeling, gates the half word Instruction from the Memory Buss to the Memory Register orders S and 1 through 17, and at I10 (D1) time, as indicated by the labeling, the Memory Register is "dumped" into the Instruction Register. At I11 (D1) time, a GO TO EXECUTE signal is emitted by the Control Circuits in accordance with the output of the Operation Decoder, which sends the Machine into an Execute cycle. At E9 (D1) time, a FULL word, an EVEN half word, or an ODD half word, depending on the Address of the ADD ABSOLUTE Instruction, is Read, out of Memory, to the Memory Buss and to the Memory Register. At E11 (D1) time, as indicated by the labeling, a GO TO EX/RGN signal is emitted, sending the Machine into an Execute/Regenerate cycle, during which an E/R 1 (D4) signal is emitted, as indicated by the labeling to "dump" the holding of the Memory Register into the Adder. A signal, emitted at the same time, PROVIDED that the Accumulator Register value is positive, "dumps" the holding of the Accumulator Register, in True form, into the Adder, BUT, if the Accumulator Register Sign is negative, a signal at this time, "dumps" the holding of the Accumulator Register, in Complement form, into the Adder. Whether the holding of the Accumulator Register is gated to the Adder in True or in Complement form is dependent ONLY upon the holding of the Accumulator Register Sign order, since, as stated above, during an ADD ABSOLUTE operation, the Memory Register Sign is TREATED as POSITIVE. If the Accumulator Register Sign is positive, and a Carry occurs from the Adder 1 order, then at E/R 1 (D4) time, as indicated by the labeling, this Carry is gated to the Overflow trigger to turn it ON. This is a real Overflow carry since the Sign of the Accumulator Register being positive, BOTH values therefore, are treated as POSITIVE, so that any carry, from the Adder 1 order, is an overflow. However, if the Accumulator Register Sign is negative and a Carry occurs, from the Adder Q order, it is an indication of an End Carry, since, with the Accumulator Register Sign negative, the complement of the holding of the Accumulator Register is being added, in the Adder. Under these conditions, an "elusive 1" must be added, to the Adder order 35, so that an E/R 1 (D4) signal is emitted as indicated by the labeling in Fig. 6*m*, to the line CARRY ADDER (35) to thereby add a one. to the Adder 35 order. This four microsecond signal will allow sufficient time for carries to propagate, INCLUDING Carries, caused by a first End Carry, which adds a one to the adder 35 order, and may therefore cause propagation of additional carries. At E/R 4 (D1) time, as indicated by the labeling, a signal is emitted for "dumping" the output of the Adder into the Accumulator Register, which stores the Sum resulting from the ADD ABSOLUTE process, replacing what was formerly contained in the Accumulator Register. If the holding of the Accumulator Register was positive or, if the holding of the Accumulator Register was negative and a Carry occurred, the value thus stored in the Accumulator Register is in True form. However, if the Accumulator Register were negative, and NO carry resulted, the Sum thus stored in the Accumulator Register is in Complement form, and an E/R 7 (D2) signal, as indicated by its labeling, is emitted for passing the holding of the Accumulator Register, in Complement form, to the Adder, and an E/R 8 (D1) signal is emitted, for gating the holding of the Adder to the Accumulator Register, to thereby effect a Recomplementing operation to thus store a True value, in the Accumulator Register.

The Sign of the Accumulator Register is left undisturbed, unless the Accumulator Register Sign, is negative, and a Carry occurred. In such an event, an E/R 10 (D1) signal is emitted, to store a POSITIVE Sign in the Accumulator Register Sign order. At E/R 10 (D2) time, a two microsecond End of Operation signal is emitted and also an E/R 10 (D2) signal which is effective, as indicated by the labeling in Fig. 6*m*, to step the Instruction Counter.

Thus it is seen, that during an ADD ABSOLUTE operation, the ABSOLUTE value of the number, stored in the Memory Register, is TREATED as having a POSITIVE Sign, regardless of its actual Sign, and its true value is added to the True or Complement value stored in the Accumulator Register, according to the conditions described, just above.

SUBTRACT

A SUBTRACT operation is quite similar to the ADD operation, described above, except that certain rules, for handling the information, depending upon the Signs of the factors being subtracted, govern the operation. The SUBTRACT Instruction directs the Machine to subtract the number Read, out of Memory to the Memory Register, from the value stored in the Accumulator Register. This SUBTRACT operation proceeds according to the following rules:

*Rule 1*

If the Accumulator Register and the Memory Register Signs are ALIKE, the value, in the Memory Register, is added to the 1's Complement of the value, in the Accumulator Register.

*Rule 2*

If the Accumulator Register and Memory Register Signs are UNLIKE, the True value of the value, in the Accumulator Register, is added to the value stored in the Memory Register.

*Rule 3*

If the Signs of the Memory Register and the Accumulator Register are UNLIKE, the Accumulator Sign is NOT changed.

*Rule 4*

If the Memory Register and the Accumulator Register Signs are ALIKE, and

*a.* If NO End Carry results, the result, stored in the Accumulator Register, is in Complement form, and therefore, must be Recomplemented, and the Sign of the Accumulator Register is left UNCHANGED.

*b.* If there IS an End Carry, an "elusive 1" must be added to the Adder 35 order, and the Sign of the Accumulator Register is CHANGED.

Refer now to the Fig. 6*n*, which illustrates the Timing Diagram for a SUBTRACT operation. During I9 (D1) of Instruction time, as indicated by the labeling, a half word Instruction, is gated from the Memory Buss to the Memory Register, and at I10 (D1) time, this half word Instruction is gated, from the Memory Register to the Instruction Register. The Operation Decoder, then being energized, and indicating that a SUBTRACT operation is to take place, causes the Control Circuits to emit a GO TO EXECUTE signal at I11 (D1) time. During this Execute cycle, an E9 (D1) signal, as indicated by the labeling, is emitted, for gating a FULL word, an EVEN half word, or an ODD half word, from the Memory Buss to the Memory Register. Thereafter, a GO TO EX/RGN signal is emitted at E11 (D1) time, to send the Machine into Execute/Regenerate time. During the Execute/Regenerate cycle, an E/R 1 (D4) signal, as indicated by the labeling, is emitted, for gating the holding of the Memory Register to the Adder, and, if the Signs are UNLIKE, an E/R 1 (D4) signal, as indicated by the labeling, gates the holding of the Accumulator Register, in True form, to the Adder. However, if the Signs are ALIKE, an E/R 1 (D4) signal gates the holding of the Accumulator Register, in Complement form, to the Adder.

During addition with the Signs UNLIKE, if a Carry is emitted, by the Adder 1 order, as the information is passed through the Adder, since two True numbers are being passed, through the Adder, this is an indication that a true Overflow has occurred, and this Carry signal is effective to turn ON, the Overflow trigger. However, if the Signs are ALIKE, which means that the True number, from the Memory Register, is being added, to the Complement of the number, in the Accumulator Register and if the Adder Q order carries as the information is passed through the Adder, then it is necessary to add an "elusive 1" to the Adder order 35. This occurs, practically simultaneously, with the passage of information through the Adder and is represented, in Fig. 6*n*, by an E/R 1 (D4) signal labeled CARRY ADDER (35). The output from the Adder, in either event, whether the Signs, are alike, or unlike, is gated to the Accumulator Register, by an E/R 4 (D1) signal, as indicated by the labeling in Fig. 6*n*, this output, from the Adder, replacing the former holding of the Accumulator Register.

If the Signs are UNLIKE, NO End Carry occurs, so that the value stored in the Accumulator Register is in True form.

If, however, the Signs are ALIKE, and NO Carry occurs, then the Sum, stored in the Accumulators Register, is in Complement form, and in order to Recomplement this Sum, an E/R 7 (D2) signal, as indicated by the labeling, is emitted, to pass the Complement, of the holding of the Accumulator Register, to the Adder, and thereafter, an E/R 8 (D1) signal, is emitted, for gating the holding of the Adder to the Accumulator Register. At this time, manipulation of the NUMERIC values is complete, and only the Accumulator Register Sign must be fixed. The Sign of the Accumulator Register, remains the same, unless the original Signs were ALIKE and an End Carry occurred. Under these conditions, if the Accumulator Register Sign is negative, the Accumulator Register Sign is changed, by an E/R 10 (D1) signal, as indicated by its labeling, which injects a positive Sign, in the Accumulator Register Sign order. However, if under the same conditions, the Accumulator Register Sign is positive, a negative Sign indication is stored, in the Accumulator Register Signs order, by an E/R 10 (D1) signal, as indicated by its labeling. The End of Operation signal and the signal, for stepping the Instruction Counter, are, as usual, emitted at E/R 10 (D2) time.

Thus, it is seen that the Instruction calling for a SUBTRACT operation, will cause the number, Addressed and Read, out of Memory, to the Memory Register, to be subtracted from the number, in the Accumulator Register, according to the algebraic rules of SUBTRACT. During SUBTRACT operations, the Calculator handles POSITIVE AND NEGATIVE ZERO values, with equal facility, as will be apparent in certain ones of the following examples.

Example 1.—Accumulator Register and Memory Register SIGNS ALIKE

| | | | |
|---|---|---|---|
| A. | Accumulator Register | +00.0101 | |
| | Complemented Accumulator Register | 11.1010 | |
| | Memory Register | + .0011 | |
| | | NC11.1101 | Since NO End Carry |
| | Result in Accumulator Register | +00.0010 | Recomplement Accumulator, leave Sign UNCHANGED (RULE 4a). |
| B. | Accumulator Register | −00.0101 | |
| | Complemented Accumulator Register | 11.1010 | |
| | Memory Register | − .0101 | |
| | | NC11.1111 | Since NO End Carry |
| | Result in Accumulator Register | −00.0000 | Recomplement Accumulator, and leave Sign UNCHANGED (RULE 4a). |
| C. | Accumulator Register | −00.0101 | |
| | Complemented Accumulator Register | 11.1010 | |
| | Memory Register | − .0111 | |
| | | C00.0001 | Since an End Carry 1 Add "elusive 1" and |
| | Result in Accumulator Register | +00.0010 | CHANGE Sign (RULE 4b). |

Example 2.—Accumulator Register and Memory Register SIGNS UNLIKE

| | | |
|---|---|---|
| A. | Accumulator Register | +00.0101 |
| | Memory Register | − .0011 |
| | Result in Accumulator Register | +00.1000 |
| B. | Accumulator Register | −00.0101 |
| | Memory Register | + .1101 |
| | Result in Accumulator Register | −01.0010 |

NOTE—Overflow, beyond binary point, is noted, by turning ON the Overflow trigger.

In the above examples, Example 1A illustrates a situation in which a positive value, in the Memory Register, is subtracted from a positive value, in the Accumulator Register, with a resultant Sum and NO Carry. Since there is NO End Carry, the value in the Accumulator Register is Recomplemented, and the Sign is left unchanged according to RULE 4*a*, for SUBTRACT described above. Example 1B illustrates a problem, in which a negative value, in the Memory Register, is subtracted from a negative value, in the Accumulator Register, the numeric values being equal. Since NO End Carry results, from the Sum, the Accumulator Register, is Recomplemented, and the Sign is left unchanged, so that the result, left in the Accumulator Register, is a NEGATIVE ZERO. In Example 1C, a negative quantity, in the Memory Register, is subtracted, from a negative value, in the Accumulator Register. Since, as a result of this subtraction, an End Carry results, the "elusive 1" is added, to the least significant order of the Adder, and the Sign of the Accumulator Register, is CHANGED, in accordance with the conditions set out, in RULE 4*b* above. Examples 2A and 2B illustrate operations, involving subtraction of a quantity in the Memory Register from a quantity in the Accumulator Register, when the Signs are UNLIKE. In Example 2B, an Overflow occurs and this Overflow is noted, as stated above, by the Overflow trigger being turned ON.

SUBTRACT ABSOLUTE

Refer now to Fig. 6*p* which illustrates the Timing Diagram for a SUBTRACT ABSOLUTE operation. This operation is the same as an ADD operation, described above, EXCEPT that the number in the Memory Register, which has been Read, from Memory, is TREATED as a NEGATIVE quantity, regardless of its actual Sign. At I9 (D1) time, of Instruction time, preceding the SUBTRACT ABSOLUTE operation, as indicated by the labeling, a half word Instruction is gated, from the Memory Buss to the Memory Register orders, S, and 1 through 17, and thereafter, an I10 (D1) signal gates this half word Instruction, from the Memory Register to the Instruction Register. The operation Decoder, then being energized to indicate a SUBTRACT ABSOLUTE operation, causes the Control Circuits to emit, a GO TO EXECUTIVE signal at I11 (D1) time. During this Execute cycle, an E9 (D1) time is effective, as indicated by the labeling, to gate a FULL word, an EVEN half word or an ODD half word, from the Memory Busses to the Memory Register, depending upon the Address, called for by this SUBTRACT ABSOLUTE Instruction. Thereafter, a GO TO EX/RGN signal is emitted at E11 (D1) time, sending the Machine into an Execute/Regenerate cycle. During the Execute/Regenerate cycle, an E/R 1 (D4) signal is emitted, as indicated by the labeling, for gating the holding of the Memory Register, to the Adder, and if the Accumulator Register Sign is negative, which is an indication that the Signs are ALIKE, since the Memory Register Sign is treated as being negative, an E/R 1 (D4) signal, as indicated by the labeling, gates the holding of the Accumulator Register, in True form, to the Adder. However, if the Accumulator Register Sign was positive, which is equivalent to having UNLIKE Signs, the holding of the Accumulator Register, in Complement form, is gated to the Adder. While this information is being gated to the Adder, if the Accumulator Register Sign is negative, and a Carry is emitted, from the Adder 1 order, it is an indication that a true Overflow has occurred, since only True values are being passed, through the Adder. This Adder 1 order Carry is employed, to turn ON the Overflow trigger. IF, however, the Accumulator Register Sign is positive, and if the Adder Q order, carries, it is an End Carry, and an "elusive 1" is added, to the Adder 35 order, by the insertion of a Carry in the Adder 35 order, by an E/R 1 (D4) signal, as indicated by the labeling. Three microseconds are allowed, for all Carries to propagate and an E/R 4 (D1) signal, is emitted, as indicated by the labeling. For gating the output of the Adder to the Accumulator Register, thereby replacing what was formerly held in the Accumulator Register.

If the Accumulator Register Sign is positive, and there is NO END Carry, the Sum, thus stored in the Accumulator Register is in Complement form, and an E/R 7 (D2) signal, as indicated by the labeling, transmits the Complement of the Accumulator Register to the Adder to thus Recomplement the Accumulator Register, and at E/R 8 (D1) time, the Adder output is transferred to the Accumulator Register.

If the Accumulator Register Sign is positive, and a Carry ensues, then at E/R 10 (D1) time, as indicated by the labeling, a negative Sign is stored in the Accumulator Register Sign order, regardless of the former holding of the Accumulator Register Sign order. Otherwise, the Accumulator Register Sign order is left undisturbed. The usual End of Operation signal and the signal for stepping the Instruction Counter, one count, are emitted at E/R 10 (D2) time.

Thus, it is seen that during a SUBTRACT ABSOLUTE operation, the number in the Memory Register is added to the number in the Accumulator Register, according to the algebraic rules of addition, with the number in the Memory Register being treated as negative, regardless of its actual Sign.

RESET ADD

Referring to Fig. 6*q*, which illustrates the Timing Diagram for a RESET ADD operation, at I9 (D1) time, of Instruction time, as indicated by the labeling, a half word Instruction, is gated, from the Memory Busses to the Memory Register, and thereafter, at I10 (D1) time, this half word Instruction is gated, from the Memory Register to the Instruction Register. The Operation Decoder, then being energized to indicate a RESET ADD operation causes the Control Circuits to emit a GO TO EXECUTE signal, at I11 (D1) time, so that the Machine proceeds to an Execute cycle. During the Execute cycle, an E9 (D1) signal is emitted, as indicated by the labeling, to gate a FULL word, an EVEN half word, or an ODD half word, from the Memory Buss, to the Memory Register, depending upon the Address, of this half word RESET ADD Instruction. Thereafter, a GO TO EX/RGN signal is emitted at E/R 11 (D1) time, to send the Machine into an Execute/Regenerate cycle. During the Execute/Regenerate cycle, an E/R 1 (D4) signal, as indicated by its labeling, is emitted, for gating the holding of the Memory Register, to the Adder. However, it should be noted, that the holding of the Accumulator Register is NOT gated to the Adder. This, in effect is as though the Accumulator Register, had been Reset to zero, since an E/R 4 (D1) signal, as indicated by the labeling, is emitted, for gating the holding of the Adder, which is merely the word originally held in the Memory Register, to the Accumulator Register, which replaces the value formerly stored, in the Accumulator Register. At E/R 10 (D1) time, the Accumulator Register Sign order is set to "correspond" to the Memory Register Sign order, which completes the operation. In other words, if the Memory Register Sign is negative, a Minus Sign is stored in the Accumulator Register Sign order but if the Memory Register Sign is positive, a positive Sign is stored in the Accumulator Register Sign order.

Thus, on a RESET ADD operation, the full word or the half word Read, out of Memory, into the Memory Register, is stored in the Accumulator Register, replacing the value, formerly stored, in the Accumulator Register. The usual End of Operation signal and the signal for stepping the Instruction Counter, are emitted, at E/R 10 (D2) time.

RESET SUBTRACT

The operation, during a RESET SUBTRACT Instruction, is similar to that described above, for RESET ADD except that the Accumulator Register Sign order is set differently. During a RESET SUBTRACT operation, the Accumulator Register Sign order is SET to the OPPOSITE of the Memory Register Sign order. Thus, it may be stated that during a RESET SUBTRACT operation, this Instruction is Read, out of Memory, to the Memory Buss, and into the Memory Register, at I9 (D1) of Instruction time, as illustrated in Fig. 6*r*, and the Memory Register is "dumped" into the Instruction Register, at I10 (D1) time, the Machine produces a GO TO EXECUTE signal, at I11 (D1) time, to send the Machine into an Execute cycle whereupon, at E9 (D1) time, as indicated by the labeling, a FULL word, an EVEN half word, or an ODD half word is Read, out of Memory, depending upon the Address portion of this RESET SUBTRACT Instruction, whereupon the Control Circuits produce a GO TO EX/RGN signal at E11 (D1) time, to send the Machine into an Execute/Regenerate cycle. The Memory Register is gated to the Adder, at E/R1 (D4) time and from the Adder to the Accumulator Register at E/R4 (D1) time, to thus replace, the value formerly stored in the Accumulator Register. If the Memory Register Sign in negative, a POSITIVE Sign is stored in the Accumulator Register Sign order, by an E/R 10 (D1) signal but, if the Memory Register Sign is positive, a NEGATIVE Sign is stored, in the Accumulator Register Sign order, by an E/R 10 (D1) signal. The End of Operation signal and the signal, for stepping the Instruction Counter are emitted at E/R 10 (D2) time.

STORE

The function of the STORE Instruction is to store the contents of the Accumulator Register, in Memory. A full word, in the Accumulator Register, may be stored in a full word Address, in Memory, or the more significant half word, in the Accumulator Register, including the Sign bit, may be stored, in either an EVEN or an ODD half word Address, in Memory. As stated above, it is the Sign bit of the STORE Instruction which indicates whether a full or half word is to be stored. The contents of the Accumulator Register will remain therein, unaltered, after the execution of a STORE Instruction. During I9 (D1) of Instruction time, as indicated by the labeling in Fig. 6*s*, the usual half word Instruction, is gated, from the Memory Busses, to orders S and 1 through 17, of the Memory Register, and thereafter, an I10 (D1) signal, as indicated, gates this half word Instruction, from the Memory Register into the Instruction Register. The Operation Decoder is energized, at approximately I10 time of the Instruction cycle so that the line STORE (Fig. 5*am*) as described above, goes positive, and via the circuits described above, causes the line PREPARE FOR MEM RI (which is to prepare Memory for Read-IN), to go positive at this time (Figs. 5*am* and 6*s*), this latter line remaining positive, until another Instruction is Read, into the Operation Decoder. Thereafter, as is seen in Fig. 6*s*, an I11 (D1) signal is emitted, to send the Machine into an Execute cycle, during which, information will be stored, in Memory. As described in detail, in said above identified application of Fox et al., the signal PREPARE FOR MEM RI, prepares the Memory, so it can be Read into. During the Execute cycle, an E8 (D2) signal, as indicated by its labeling in Fig. 6*s*, is emitted, and gates the holding of the Accumulator Register orders S, and 1 through 35, into the Memory Buss orders S, and 1 through 35, if a FULL or an EVEN half word is called for. As described above, if an EVEN half word is selected, only Memory orders S, and 1 through 17, will be UNBLANKED, so that, only the left half word is stored in the cathode ray tube memory. However, if a FULL word is called for, the cathode ray tubes for the Memory orders S, and 1 through 35 are all UNBLANKED, so that the FULL word is stored. As described above, if an ODD half word is selected, the holding of the Accumulator Register orders S, and 1 through 17 only, that is, the Sign order and the most significant half of the holding, are gated, by the Memory Switches, to Memory Busses, 18 through 35, and, with an ODD half word called for, the cathode ray tubes for Memory orders, 18 through 35, are UNBLANKED, to effectively store the right half word. After this storage has taken place, the usual End of Operation signal, and the signal for stepping the Instruction Counter, are emitted at E10 (D2) time.

Thus, it is seen that a FULL word or an EVEN half word, or an ODD half word may be Read, under control of a STORE Instruction controlling the Operation Decoder from the Accumulator Register, and stored, at a SELECTED Memory Address. Storing of information in the cathode ray tubes comprising Memory, as it appears on the Memory Busses, is fully described in said application of Fox et al.

STORE MULTIPLIER QUOTIENT REGISTER

Referring to Fig. 6*t*, which is the Timing Diagram for a STORE MQ operation, this operation is similar to that just described, for a STORE operation, EXCEPT that corresponding orders of the MQ are gated to the Memory Busses, for storage in Memory, rather than the corresponding Accumulator Register orders. As in the case of the STORE operation, a STORE MQ operation may call for a FULL, an EVEN half or an ODD half word Address, the operation otherwise being the same, as in STORE. As is seen from Fig. 6*t*, an E8 (D2) signal, gates information from the MQ orders to the Memory Busses, either the MQ orders S, and 1 through 35, being gated to the Memory Busses S, and 1 through 35, for a FULL or an EVEN half word Address, but if an ODD half word Address is desired, the MQ orders S, and 1 through 17, which are the Sign, and the more significant half word, of the holding of the MQ, are gated, to the Memory Busses 18 through 35, and are thus stored, in an ODD half word Address in Memory.

STORE ADDRESS

The STORE ADDRESS operation is illustrated in Fig. 6*u* and is similar to the STORE operation, described above, EXCEPT that ONLY half words, are Addressed, and only orders in Memory holding half word Instructions, are Addressed, the Address portions ONLY, being UNBLANKED, as is fully described, in said above identified application of Fox et al., whereby the Address portion only, of an Instruction stored in Memory, is replaced, by a new Address portion.

LONG SHIFT LEFT

Referring to Fig. 6*v*, which illustrates the Timing Diagram for a LONG SHIFT LEFT operation, the function of this operation is to shift the contents of the Accumulator Register AND the MQ, jointly, as one Register, any desired number of places, to the LEFT, from 0 to 255. Neither the Sign bit of the Accumulator Register nor the Sign bit of the MQ is shifted. As is seen, from an inspection of Fig. 6*v*, the half word Instruction is gated, at I9 (D1) time, from the Memory Busses to the Memory Register, and at I10 (D1) time, the half word is gated, to the Instruction Register. The Address portion, of this Instruction, indicates the number of places, which the Accumulator Register and the MQ are to be jointly shifted during the execution of this Instruction. As stated above, this number is between 0 and 255, and is stored in the Address Counter portion of the Instruction Register. For each order that the Accumulator Register and the MQ are jointly shifted, the Address Counter is stepped, one count. As stated above, since the Address Counter, is a count down counter, it will count down to zero, when the required number of shifts has taken place. Hence, during this operation, the shifts continue until the Address Counter counts down to zero, which is an indication that the required number of shifts has taken place.

At I11 (D1) time, a GO TO EX/RGN signal is emitted, to send the Machine into Execute/Regenerate cycles. During these Execute/Regenerate cycles, as long as the Address Counter does NOT reach zero, positive signals are emitted, at E/R 1 (D8) time, to lines SHIFT ACC LEFT, SHIFT MQ LEFT, MQ (1) TO ACC (35) and STEP ADR CTR. The signals on the first three lines are effective for each microsecond that the respective lines are positive, to cause the Accumulator Register and the MQ, acting as one Register, to shift, one step, to the LEFT. At the same time, a positive signal, on the line STEP ADR CTR, steps the Address Counter, one count, per each microsecond. Thus it is seen, that during the Execute/Regenerate cycles, the Accumulator Register and MQ may be jointly shifted, 8 orders, to the LEFT, for each such cycle. This process continues until such time as the Address Counter goes to zero, at which time the signal, on all lines, goes negative. This may take various numbers of Execute/Regenerate cycles. For example, if a shift of 28 places, was required, it would require 3 full Execute/Regenerate cycles, and during the fourth such Execute/Regenerate cycle, the signals on the respective lines will go negative at E/R 5 time, as indicated by the dotted portion, in Fig. 6*n*, of the signals on these lines, which represents any LAST Execute/Regenerate cycle. While the shift operation is taking place, as long as the Address Counter does NOT reach zero, and whenever the Accumulator Register 1 order contains a binary 1, the output of the Accumulator Register 1 order is connected to the Overflow trigger, to turn it ON, as the binary 1 is shifted, to the LEFT, into the Overflow positions. Therefore, whenever a binary 1, is shifted past the Accumulator Register 1 order, to the Overflow orders, the Overflow trigger is turned ON, to indicate that an Overflow has occurred. During the LONG SHIFT LEFT operation, the holding of the MQ is effectively shifted, into and perhaps out of, the Accumulator Register, but in any event, the Accumulator Register Sign is SET, to the holding of the MQ Sign, therefore, if the MQ Sign is positive, a positive SIGN is stored in the Accumulator Resistor Sign order, by an E/R 10 (D1) signal, as indicated by the labeling in Fig. 6*v*, but if the Accumulator Register Sign is negative, a negative Sign is stored in the Accumulator Register Sign order. Signals for storing a positive or a negative Sign, as the case may be, into the Accumulator Register Sign order, occur during an Execute/Regenerate cycle, but of course, only the first such signal is effective to store the Sign indication. The End of Operation signal and the signal, for stepping the Instruction Counter, one count, occur at E/R 10 (D2) time, during THAT Execute/Regenerate cycle, during which the Address Counter reaches zero. As the Address Counter reaches zero, the number of shifts required, has taken place, and therefore the Ends of Operation signal may be properly given.

LONG SHIFT RIGHT

Refer now to Fig. 6*w*, which illustrates the Timing Diagram for a LONG SHIFT RIGHT operation. This operation is somewhat similar to the LONG SHIFT LEFT operation, EXCEPT, that the shifting of the Accumulator Register and the MQ is jointly, to the RIGHT, rather than to the left, and no signals are required, to be gated, to the Overflow trigger, since the binary 1's will be shifting in a direction, away from the Overflow position, and also, during a LONG SHIFT RIGHT operation, the Accumulator Register Sign is transferred, to the MQ Sign order.

At 19(D1) time of the Instruction time, a half word is gated, as indicated by the labeling in Fig. 6*w*, from the Memory Busses to the Memory Register. This half word Instruction is then gated, from the Memory Register to the Instruction Register, at I10(D1) time. The number of places or orders, which are to be shifted, for the execution of this Instruction, is stored in the Address Counter, because, in this operation, as stated above, the Addres Counter portion, of the Instruction Register is utilized, to COUNT the number of shifts, rather than to select a Memory Address.

At I11(D1) time, a GO TO EX/RGN signal, is emitted, to send the Machine into Execute/Regenerate cycles. During each such Execute/Regenerate cycle, as long as the Address Counter does NOT contain zero, E/R 1 (D8) signals are emitted, to lines SHIFT ACC RIGHT and SHIFT MQ RIGHT, to cause a shifting of the Accumulator Register and the MQ, acting as one register, to the RIGHT (exclusive of the Sign orders) and a signal is also emitted to the line, STEP ADR CTR to cause the Address Counter to be stepped, one step, for each microsecond that the respective lines are positive. As stated above, in the description of the LONG SHIFT LEFT operation, the process continues until the Address Counter, counts down, to zero, at which time the shifting is terminated. If the Accumulator Register Sign is positive, a positive Sign, is stored in the MQ Sign order, by an E/R 10 (D1) signal, but if the Accumulator Register Sign is negative, a negative Sign is stored in the MQ Sign order. During THE Execute/Regenerate cycle, in which Address Counter goes to zero, the End of Operation signal and the signal for stepping the Instruction Counter are emitted, at E/R 10 (D2) time. It should be noted, at this time, that no separate signal is necessary, for connecting the Accumulator Register 35 order to the MQ 1 order during this LONG SHIFT RIGHT operation, since this function is performed by the positive signal on the line SHIFT MQ RIGHT, as described above.

Thus, it is seen, that the holding of the Accumulator Register and the MQ, acting as one Register, may be shifted, to the RIGHT, a selected number of orders.

SHIFT ACCUMULATOR LEFT

The Timing Diagram for SHIFT ACCUMULATOR LEFT is illustrated in Fig. 6*x*. During this operation, the holding of the Accumulator Register ONLY, is shifted, to the LEFT, any desired number of places, from 0 to 255. The Sign bit, of the Accumulator Register is NOT shifted in the execution of this Instruction. At I9 (D1) time of the Instruction cycle, as indicated by the labeling of Fig. 6*x*, a half word Instruction is gated, from the Memory Busses to the Memory Register orders S, and 1 through 17, and this half word Instruction is thereafter gated, by an I10 (D1) signal, as indicated by the labeling, from the Memory Register to the Instruction Register, and at I11 (D1) a GO TO EX/RGN signal is emitted, sending the Machine into Execute/Regenerate cycles. The Instruction now in the Instruction Register is comprised of an Operation portion, and an Address portion. The Address portion indicates, the required number of shifts, and its setting is entered into the Address Counter of the Instruction Register, as described above, to set the counter, to count the desired number of shift LEFT steps. During the Execute/Regenerate cycles, at E/R 1 (D8) time, as long as the Address Counter does NOT count down, to zero, positive signals are emitted, to lines SHIFT ACC LEFT and STEP ADR CTR, to cause the Accumulator Register ONLY, to be shifted, one order, to the LEFT, for each microsecond that the line is positive, and for stepping the Instruction Counter, one count, per microsecond. The signals are of a duration of 8 microseconds, as noted by E/R 1 (D8), so that the holding of the Accumulator Register is shifted, 8 orders to the LEFT, during EACH Execute/Regenerate cycle, until such time as the Address Counter goes to zero. As long as the Address Counter does NOT go to zero, and the Accumulator Register 1 order contains a binary 1, this Accumulator Register 1 order output is connected to the Overflow trigger, and is effective, during each shift, to turn it ON, thus indicating that a binary 1 has shifted, from the Accumulator Register 1 order, to the Overflow orders P and Q. The Sign, of the Accumulator Register, remains unchanged, whether it is positive or negative. At the same time that the Address Counter counts down to zero, the desired number of shifts has taken place, and the signals on the lines SHIFT ACC LEFT STEP ADR CTR and ACC (1) TO OV TRIG, go negative. During the last Execute/Regenerate cycle, which is THE cycle during which, the Address Counter counts down, to zero, an End of Operation signal is emitted, and a signal, for stepping the Instruction Counter is also emitted, at E/R 10 (D2) time.

Thus it is seen, that the Accumulator Register only, may be shifted, to the LEFT by an Instruction SHIFT ACCUMULATOR LEFT, this Instruction thus differing from LONG SHIFT LEFT, in that the MQ, is NOT shifted.

SHIFT ACCUMULATOR RIGHT

The Timing Diagram, for SHIFT ACCUMULATOR RIGHT, is illustrated in Fig. 6y. AT I9 (D1) time, of the Instruction cycle, as indicated by the labeling, a half word SHIFT ACCUMULATOR RIGHT Instruction, is gated, from the Memory Busses to the Memory Register orders S, and 1 through 17, and at I10 (D1) time, this Instruction is gated, from the Memory Register to the Instruction Register, the Address Counter portion of the Instruction Register, thereby being set to the number, indicative of the required number of steps of shift, to take place.

At I11 (D1) time, a GO TO EX/RGN signal is emitted, sending the Machine into Execute/Regenerate cycles. During these Execute/Regenerate cycles, the holding of the Accumulator Register is shifted, 8 orders, to the RIGHT, for each such cycle, until such time as the Address Counter counts down, to zero. At "1" time, of each Execute/Regenerate cycle, an E/R 1 (D8) signal is emitted, and applies positive potential to lines, SHIFT ACC RIGHT and STEP ADR CTR, to cause a shifting of the Accumulator Register ONLY, 1 order, for each microsecond that the line is positive, while the E/R 1 (D8) signal, fed to the line STEP ADR CTR, causes the Address Counter to be stepped down, one count, each microsecond. Therefore when the required number of steps of shift has taken place, the Address Counter is at zero, and the signals, on both said lines, go negative. During the LAST Execute/Regenerate cycle, which is THE Cycle, during which the Address Counter counts down, to zero, an End of Operation signal is emitted, at E/R 10 (D2) time and a signal is also emitted, to step the Instruction Counter.

Thus it is seen that the holding of the Accumulator Register ONLY may be shifted to the RIGHT a number of orders, from 0 to 255. The Sign of the Accumulator Register is NOT shifted during this operation. This Instruction differs from the LONG SHIFT RIGHT operation in that the MQ is NOT shifted.

MULTIPLY AND MULTIPLY AND ROUND

The Instruction MULTIPLY means multiply the number ( the multiplicand) stored at the Address of the MULTIPLY Instruction, by the number (the multiplier) stored in the MQ.

The Instruction MULTIPLY AND ROUND functions the same as the MULTIPLY Instruction, with the additional requirement, that if the 1 order of the MQ register contains a binary 1 upon the completion of the MULTIPLY operation, then a carry of 1 is added to the contents of the Accumulator Register at the least significant order, that is order 35.

The procedure for MULTIPLY is to inspect the least significant order of the MQ, that is, the 35th order during E/R cycles, and, if a binary 1 is contained therein, the multiplicand, entered in the Memory Register, as described presently, is added to the contents of the Accumulator Register, and thereafter, the Accumulator Register and the MQ are jointly shifted, one order to the RIGHT. If, however, the MQ order 35 contains a binary 0, the multiplicand is NOT added to the contents of the Accumulator Register, but the Accumulator Register and the MQ ARE jointly shifted, one order to the RIGHT. This procedure is repeated 35 times, that is, once for each order of the MQ and, as the partial product is formed in the Accumulator Register, it is continually shifted into the MQ, thus taking over those orders in which the multiplier was previously stored, while the successive bits of the multiplier, are shifted to and through the MQ order 35, in connection with which circuits are provided to determine whether the holding of the MQ 35 order is a binary 1 or a binary 0. The execution of the MULTIPLY and the MULTIPLY AND ROUND Instructions each requires 36 Execute/Regenerate cycles. The functions performed during the Execute/Regenerate #1 cycle and the Execute/Regenerate #36 cycle are identical to those performed during the Execute/Regenerate #2 through Execute/Regenerate #35 cycles. For this reason, the Multiply Divide Tally Counter (Fig. 5b) is employed to distinguish between the different ones of Execute/Regenerate cycles. Thus, the trigger TE of the Multiply Divide Tally Counter is ON during an Execute cycle, the trigger T1 is ON during Execute/Regenerate #1 cycle, trigger T2 is ON during Execute/Regenerate #2 through Execute/Regenerate #35 cycles, and trigger T36 is ON during Execute/Regenerate #36 cycle. The counting of the 34 Execute/Regenerate cycles which take place during the time trigger T2 is ON is accomplished by the Address Counter. A count of 34 is entered in the Address Counter during the Execute cycle, and during EACH Execute/Regenerate cycle, the Address Counter is stepped down, one count, and since, as stated above, it is a "count down" counter, the Address Counter will reach zero, after 34 Execute/Regenerate cycles have been completed.

Refer now to the composite of Figs. 6z and 6aa, with Fig. 6aa to the right of Fig. 6z, these illustrate the Timing Diagram for a MULTIPLY and for a MULTIPLY AND ROUND operation. At I9 (D1) time of the Instruction cycle, as indicated by the labeling in Fig. 6z, a signal is emitted to Reset trigger T36 (Fig. 5b) of the Multiply Divide Tally Counter, described above, and at the same time an I9 (D1) signal, as indicated by the labeling in Fig. 6z, is effective to gate a half word Instruction via the Memory Buss to the Memory Register. The half word Instruction is subsequently gated from the Memory Register to the Instruction Register at I10 (D1) time, so that the Operation Decoder is energized to signal a MULTIPLY or a MULTIPLY AND ROUND operation, the multiplicand being located at the Address THEN held by the Instruction Register.

At this time, the MQ contains the Multiplier in accordance with the requirement that the Multiplier must be Read into the MQ PRIOR to the processing of a MULTIPLY or a MULTIPLY AND ROUND operation. This may, for example, be done by a LOAD MQ Instruction in the Program, as described above, which Instruction occurs in the Program prior to the MULTIPLY Instruction. At I11 (D1) time a GO TO EXECUTE signal is emitted to send the Machine into Execute cycles. At "4" time, of the Execute cycle, an E/R 4 (D1) signal, as indicated by the labeling of Fig. 6z, is emitted to turn ON the trigger TE (Fig. 5b) of the Multiply Divide Tally Counter and an E/R 4 (D1) signal is also emitted to Reset the Address Counter. This operation of Resetting the Address Counter is preparatory to setting the Address Counter to the count of 34, which, as described presently, occurs at E9 (D1) time.

At E9 (D1) time of the Execute cycle, as indicated by the labeling, this signal is effective to gate a FULL, and ODD half word or an EVEN half word COMPRISING THE MULTIPLICAND, from the Memory Buss to the Memory Register, depending upon whether a full or a half word is Addressed by the MULTIPLY Instruction. At the same time, it is an E9 (D1) signal which SETS a COUNT of 34 INTO the ADDRESS COUNTER, as described above. At E11 (D1) time, a GO TO EX/RGN signal is emitted to send the Machine into an Execute/Regenerate cycle. As the Machine enters the FIRST Execute/Regenerate cycle, an E/R 0 (D1) signal, as indicated by the labeling of Fig. 6z, turns OFF the trigger TE (Fig. 5b) of the Multiply Divide Tally Counter and turns ON the trigger T1. Trigger T1 thus is ON during the FIRST Execute/Regenerate cycle. Subsequently, in this same cycle an E/R 1 (D4) signal is emitted, as indicated by the labeling, PROVIDED the MQ 35 ORDER CONTAINS a BINARY 1, which E/R 1 (D4) signal THEREUPON transfers the multiplicand stored in the Memory Register into the Adder. It should be particularly noted that the holding of the Accumulator Register is NOT, at this time, gated to the Adder, so that the output of the Adder will be the multiplicand ONLY. At E/R 4 (D1), as indicated by the labeling, a pulse is emitted to gate the holding of the Adder to the Accumulator Register, so that IF the MQ (35) ORDER CONTAINED a BINARY 1, which, in this instance, would have been the least significant digit of the multiplier, the MULTIPLICAND WOULD HAVE BEEN ADDED ONCE TO THE ACCUMULATOR REGISTER.

If, however, the MQ (35) order contained a binary 0, the Memory Register would NOT have been connected to the Adder, the output of the Adder would have been all zeros and nothing would have been gated to the Accumulator Register.

An E10 (D1) signal, as indicated by the labeling in Fig. 6z, is then emitted for shifting the Accumulator Register and the MQ, jointly, one order to the RIGHT, and the Machine enters a SECOND Execute/Regenerate cycle.

At "0" time of this SECOND Execute/Regenerate cycle, an E0 (D1) signal as indicated by the labeling in Fig. 6z is emitted to turn OFF the trigger T1 (Fig. 5b) of the Multiply Divide Tally Counter and to turn ON the trigger T2. Trigger T2 will remain ON for 34 Execute/Regenerate cycles, or until the Address Counter has counted down to zero. At "1" time of this SECOND Execute/Regenerate cycle, an E/R 1 (D4) signal, as indicated by the labeling in Fig. 6z, is emitted to gate the holding of the Memory Register TO THE ADDER. Thus, the MULTIPLICAND IS NOW GATED TO THE ADDER, REGARDLESS of the BINARY 1 or BINARY 0 STATUS of the MQ (35) ORDER. At the same time, an E/R 1 (D4) signal, as indicated by the labeling in Fig. 6z, is emitted to gate the holding of the Accumulator Register in True form TO THE ADDER to thus ADD the multiplicand to the first partial product, WHICH, HOWEVER, HAS, as described above, BEEN SHIFTED, ONE ORDER, TO THE RIGHT. At this time, IF the MQ (35) ORDER CONTAINS A BINARY 1, an E/R 4 (D1) signal, as indicated by the labeling in Fig. 6z, is emitted FOR CONNECTING the "newly formed" SUM output of the ADDER TO THE ACCUMULATOR REGISTER. Thus, a NEW PARTIAL PRODUCT replaces the FIRST PARTIAL PRODUCT in the ACCUMULATOR REGISTER.

However, if the MQ (35) ORDER CONTAINED a BINARY 0, the "newly formed" SUM is NOT gated to the Accumulator Register so that its contents (THE FIRST PARTIAL PRODUCT, WHICH IS THE MULTIPLICAND, PER SE) remains in the Accumulator Register.

An E/R 10 (D1) signal, as indicated by the labeling in Fig. 6z, is emitted to shift the Accumulator Register and MQ jointly to the RIGHT. At the same time an E/R 10 (D1) signal, as indicated by the labeling, is emitted to step the Address Counter down, one count, during this 1 microsecond period.

The Machine then enters the THIRD Execute/Regenerate cycle and the subsequent Execute/Regenerate cycles, up to Execute/Regenerate cycle 35, the operation during these cycles being identical to that during the SECOND Execute/Regenerate cycle. During the Execute/Regenerate cycle #35 as the Address Counter is stepped down, one count, it steps down to zero, now having been stepped down 34 counts. As the Address Counter reaches zero and the Machine enters Execute/Regenerate cycle #36, as labeled at the top right of Fig. 6aa, a signal, as indicated by the labeling in Fig. 6z, is emitted at E/R 0 (D1) to turn OFF trigger T2 (Fig. 5b) of the Multiply Divide Tally Counter and the trigger T36 ON. Trigger T36 (Fig. 5b) of the Multiply Divide Tally Counter remains ON until Execute/Regenerate cycle #36 is terminated.

At "1" time of the Execute/Regenerate #36 cycle, an E/R 1 (D4) signal, as indicated by the labeling in Fig. 6z, is emitted to emit a Carry into the Adder (35) order and an E/R 1 (D4) signal also gates the holding of the Accumulator Register in True form to the Adder.

If, as indicated by the labeling in Fig. 6z, during a MULTIPLY AND ROUND operation, and PROVIDED the MQ (1) ORDER CONTAINS A BINARY 1, the Adder SUM output is GATED at E/R 4 (D1) time INTO THE ACCUMULATOR REGISTER.

However, if the operation is MULTIPLY or if the operation is MULTIPLY AND ROUND and the MQ (1) ORDER CONTAINS a BINARY 0, the Adder SUM output is NOT gated to the Accumulator Register, so that the Accumulator Register RETAINS its last partial product, which is the FULL PRODUCT.

According to the algebraic rules so governing during MULTIPLY, if the Signs of the Multiplicand and the Multiplier are UNLIKE, the PRODUCT is NEGATIVE. Hence, if the Signs ARE UNLIKE, then NEGATIVE Signs are stored in BOTH the MQ Sign order and in the Accumulator Register Sign order by E/R 10 (D1) signals, as indicated by the labeling in Fig. 6z.

However, if the multiplicand and multiplier Signs are ALIKE, then POSITIVE Signs must be stored in the MQ Sign order and in the Accumulator Register Sign order, and such POSITIVE Signs are so stored by an E/R 10 (D1) signal, as indicated by the labeling in Fig. 6z.

During the Execute-Regenerate #36 cycle, which is the LAST cycle of the MULTIPLY or MULTIPLY AND ROUND operation, an End of Operation signal is emitted and a signal is also emitted for stepping the Instruction Counter.

The following example will illustrate the method employed in the Calculator for performing MULTIPLY, it being assumed, for the purposes of this example, that a Machine is used having a capacity of 5 orders instead of 35, so that the Accumulator register has only 5 orders instead of 35, and the MQ will also have 5 orders instead of 35, and the Overflow orders P and Q of the Accumulator Register ALSO exist, these 5 orders thus representing the 35 order Machine. In this example it will be assumed that the MQ contains a 5 bit multiplier 01101, while the 5 bit multiplicand, stored at the Addressee selected by the MULTIPLY Instruction is 10110.

Referring to Fig. 8a, this sample MULTIPLY problem is illustrated, the multiplicand, stored in the Memory Register, being 10110, as stated above, and the multiplier, stored in the MQ, being 01101. This multiplier, as stated above, was stored in the MQ prior to the MULTIPLY Instruction, while the multiplicand was Read out of Memory to the Memory Register during the Execute cycle of MULTIPLY, as described above. During the E/R 1 cycle, as indicated by the labeling, the multiplicand is passed from the Memory Register to the Adder to effectively ADD the multiplicand to the holding of the Accumulator Register, which, at this time, are all zeros, which are also applied simultaneously to the Adder. Since, in the problem assumed, the least significant bit of the multiplier is a binary 1, the Sum (really the multiplicand only) from the Adder is connected to the Accumulator Register, and the Sum is thereby stored in the Accumulator Register replacing the zeros stored therein. Next, the Accumulator Register and the MQ are jointly shifted, one order, to the RIGHT.

The Machine then enters the E/R 2 cycle during which, as indicated, in Fig. 8*a*, the holdings of the Memory Register and of the Accumulator Register are gated simultaneously to the Adder to effectively ADD the multiplicand in the Memory Register to the FIRST PARTIAL PRODUCT (the multiplicand value, now shifted one order to the right) in the Accumulator Register. However, as is seen by inspection of Fig. 8*a*, the least significant bit of the MQ contains a binary 0 at this time, so the Sum from the Adder is NOT connected to the Accumulator Register, and the Accumulator Register thereby retains the same value (the multiplicand) that it had at the start of this SECOND Execute/Regenerate cycle.

Thereafter, the Accumulator Register and the MQ are jointly shifted, one order to the RIGHT, as illustrated in Fig. 8*a*, and the Machine then enters the E/R 3 cycle. During this THIRD cycle, the multiplicand stored in the Memory Register and the contents of the Accumulator Register (multiplicand shifted two orders to the right) are added together, and, since as is seen by inspection of Fig. 8*a*, a binary 1 is contained in the least significant order of the MQ, the SUM from the Adder is gated to the Accumulator Register, whereby the multiplicand has been added to the partial product.

Next, the Accumulator Register and the MQ are jointly shifted, one order, to the RIGHT, and the Machine enters the E/R 4 cycle. During the E/R 4 cycle, the multiplicand, stored in the Memory Register and the shifted partial product stored in the Accumulator Register are passed to the Adder to effectively ADD the multiplicand to the shifted partial product, and since, as is seen from an inspection of Fig. 8*a*, the least significant order of the MQ contains a binary 1, the SUM from the Adder is gated to the Accumulator Register to thereby produce a new partial product.

Next, the Accumulator Register and the MQ are jointly shifted, one order, to the RIGHT, and the Machine enters the E/R 5 cycle. During this E/R 5 cycle, the multiplicand, in the Memory Registerm, and the new shifted partial product in the Accumulator Register are effectively added in the Adder. However, as is seen from an inspection of Fig. 8*a*, at this time the least significant order of the MQ contains a binary 0 so that the SUM from the Adder is NOT gated to the Accumulator Register so that it RETAINS the same partial product which it held at the start of the E/R 4 cycle.

Next, the Accumulator Register and the MQ are jointly shifted, one order, to the RIGHT and the PRODUCT is now contained in the Accumulator Register and the MQ. The most significant orders of the PRODUCT are contained in the Accumulator Register orders and the least significant orders are contained in the MQ orders. It should be noted that each order of the multiplier was interrogated, and the multiplicand was either added or not, depending upon the binary 1 or binary 0 holding, respectively, of the respective bits of the MQ, lowest order, and, with appropriate column shifting a partial product was built up until finally the PRODUCT was produced. In this example, only a five order Machine was assumed instead of an actual Machine of 35 orders for the Accumulator Register and the MQ.

Thus, it is seen that the system for MULTIPLY in this Machine comprises successive interrogations of the least signficant order of the MQ for a binary 1 or a binary 0, and consequent adding or not adding, respectively, the multiplicand to the partial product being built up in the Accumulator Register and the MQ. In any event, the partial product is shifted, one order to the RIGHT, to provide an appropriate column shifting during the interrogation of the lower order of the multiplier. It should be noted that the multiplier is lost during this operation except that provision can be made for storing the multiplier in Memory at the Address from which it was originally taken. The numeric portion of this MULTIPLY operation will proceed, as described, whether the multiplier or multiplicand Signs are ALIKE or UNLIKE. However, if the multiplicand and the multiplier Signs are UNLIKE, the Sign orders of the Accumulator Register and of the MQ, not illustrated in the chosen example, would be set to indicate a negative Sign, while if the Signs are ALIKE, the Accumulator Register and the MQ sign orders would be set to indicate a positive Sign.

DIVIDE

The Instruction DIVIDE means to divide the contents (the dividend) of the combined Accumulator Register and MQ by the number which is stored in Memory (the divisor) at the Address specified by the DIVIDE Instruction. The divisor is Read, out of Memory, to the Memory Register and, upon completion of the DIVIDE operation, the quotient is stored in the MQ, and the remainder is stored in the Accumulator Register. After an initial test to ascertain if the divisor is greater than the dividend, each SUBSEQUENT step of the DIVIDE operation consists of a "conditional subtraction" and a shift of the dividend relative to the divisor. The subtraction is "allowed to be completed" ONLY IF the partial remainder is larger than the divisor, that is, subtraction is allowed to be completed only if the divisor will "go" into that portion of the partial remainder which is being interrogated. Upon completion of the subtraction, or if the subtraction is not allowed to be completed, the shift of the partial remainder relative to the divisor takes place. The quotient, as each bit of the quotient is determined is stored in the 35 bit order of the MQ and, as the dividend (partial remainder) is shifted, one order to the LEFT, this bit of the quotient is also shifted, one order to the LEFT, and, as the quotient is built up, bit by bit, upon completion of the operation, the full quotient is stored, as stated above, in the MQ.

Refer now to the composite of Figs. 6*ab* and 6*ac*, with Fig. 6*ac* to the right of Fig. 6*ab*, which illustrate the Timing Diagram for a DIVIDE operation. At I9 (D1) time of an Instruction cycle, as indicated by the labeling in Fig. 6*ab*, a signal is emitted for resetting the trigger T36 (Fig. 5*b*) of the Multiply Divide Tally Counter to an OFF condition, and a signal is emitted at the same time for gating a half word Instruction from the Memory Busses to the orders S, and 1 through 17, of the Memory Register. At I10 (D1) time, as indicated by the labeling in Fig. 6*ab*, a signal is emitted for gating this half word Instruction from the Memory Register to the Instruction Register, this half word Instruction indicating, by its Address portion, the Address of the divisor, stored in Memory. As the Operation Decoder ascertains that the operation is DIVIDE, Control Circuits are energized to emit a GO TO EXECUTE signal at I11 (D1) time, for sending the Machine into an Execute cycle. At "4" time of this Execute cycle, as indicated by the labeling in Fig. 6*ab*, the trigger TE (Fig. 5b) of the Multiply Divide Tally Counter is turned ON, and the Address Counter is Reset at the same time. At E9 (D1) time, as indicated by the labeling in Fig. 6*ab*, a FULL word, an EVEN half word or an ODD half word comprising the DIVISOR, is Read from the Memory Busses to the Memory Register, and a count of 34 is SET into the Address Counter. Next, a GO TO EX/RGN signal is emitted at E11 (D1) time, as indicated by the labeling in Fig. 6*ab*, for sending the Machine into Execute/Regenerate cycles.

As the Machine enters the FIRST Execute/Regenerate cycle, an E/R 0 (D1) signal, as indicated by the labeling in Fig. 6*ab*, is emitted to turn OFF the trigger TE (Fig. 5*b*) of the Multiply Divide Tally Counter and to turn ON the trigger T1. Since the divisor was Read out of Memory to the Memory Register at E9 (D1) time, it is now stored in the Memory Register, and, as stated above, the dividend should be held by the combined Accumulator Register and the MQ Register PRIOR to the start of the DIVIDE operation.

During this FIRST Execute/Regenerate cycle, a CHECK is made to insure that the divisor IS GREATER THAN the dividend. This is due to the fact that the Machine is operating with fractional values. If the divisor IS greater than the dividend, the execution of the DIVIDE Instruction IS continued, but, if NOT, the Machine is stopped. Thus, it is seen that if a quotient greater than 1 is being obtained, it would exceed the capacity of the Machine, and it STOPS. Therefore, only DIVIDE resulting in a quotient less than 1 is permitted.

This CHECK is made, during the FIRST Execute/Regenerate cycle as the E/R 1 (D4) signal is emitted to gate the holding of the Memory Register (the divisor) to the Adder and at the same time that the holding of the Accumulator Register (a part of the dividend) in Complement form is gated to the Adder to thereby effectively subtract the divisor from the dividend portion. If NO End Carry results from this subtraction, the Machine is STOPPED by an E/R 5 (D1) signal. If an End Carry DOES occur, it is an indication that the divisor is larger than the dividend, and the operation DIVIDE is allowed to proceed as E/R 10 (D1) signals, as indicated by the labeling in Fig. 6*ab*, are emitted for connecting the MQ 1 order to the ACC order 35 and shifting the joint MQ and Accumulator Register to the LEFT, one order.

The Machine then enters a SECOND Execute/Regenerate cycle, and at 0 time of this cycle, as indicated by the labeling in Fig. 6*ab*, and E/R 0 (D1) signal is emitted to turn OFF the trigger T1 (Fig. 5*b*) of the Multiply Divide Tally Counter and to turn ON the trigger T2. Next, at E/R 1 (D4) time, as indicated by the labeling in Fig. 6*ab*, this signal gates the divisor, stored in the Memory Register, into the Adder, and at the same time the Complement of the Accumulator Register (the dividend portion) is gated to the Adder to thereby effectively subtract the divisor from the dividend. If an End Carry results from this subtraction, it is an indication that the divisor did NOT "go" into that portion of the dividend and the output of the Adder is NOT connected to the Accumulator Register. However, if NO carry occurred, it signifies that the divisor DID "go" into the dividend in the particular orders being interrogated, and an E/R 4 (D1) signal is emitted, as indicated by the labeling in Fig. 6*ab*, for connecting the Adder output to the Accumulator Register, thereby completing this subtract portion of the operation. Next, an E/R 5 (D1) signal, as indicated by the labeling, is emitted for storing a binary 1 in the MQ 35 order, this being the first bit of the QUOTIENT.

If the divisor did NOT "go," i.e., if a carry DID result, the binary 1 would NOT be stored in the MQ 35 order, so that this 35 order would contain a binary 0.

When there is NO Carry, then, by mathematical analysis, it is known that the number now contained in the Accumulator Register is in Complement form. It is, therefore, necessary to Recomplement the present holding of the Accumulator Register. This is accomplished as an E/R 7 (D2) signal, as indicated by the labeling, is emitted to gate the holding of the Accumulator Register in Complement form to the Adder and thereafter an E/R 8 (D1) signal is emitted to gate the output of the Adder to the Accumulator Register, thereby completing the Recomplementing operation.

At E/R 10 (D1) time of the SECOND E/R cycle, whether or not the divisor "goes" into the dividend, the Accumulator Register and the MQ are jointly shifted, one order to the LEFT, as positive signals are present, as indicated by the pulses in Fig. 6*ac*, on the lines SHIFT ACC LEFT, SHIFT MQ LEFT and MQ (1) TO ACC (35). The signal MQ (1) TO ACC (35) is necessary on a shift LEFT operation, so that the output of the MQ (1) order can feed to the Accumulator Register (35) order. At the same time an E/R 10 (D1) signal on line STEP ADR CTR steps the Address Counter down, one count. The operation during the E/R 3 through E/R 35 cycles is the same as during the E/R 2 cycle, in that the holding of the Memory Register and the holding of the Accumulator Register in Complement form are gated to the Adder to check a subtraction, but this subtraction is not allowed to go to completion unless NO carry occurs. Then, if this subtraction did go to completion, a binary 1 is stored in MQ (35) order each time to sequentially build up the QUOTIENT, and the holding of the Accumulator Register is Recomplemented, or, in any event, the Accumulator Register and the MQ are jointly shifted, one order to the LEFT, and the Address Counter is stepped down, one count. This "conditional subtraction" which takes place, but is not allowed to go to completion until it is determined that the divisor will "go" into that portion of the dividend being subtracted is extremely useful. In prior Machines, the subtraction WAS carried to completion, determining that the subtraction was NOT a valid one (an OVERDRAFT) and it was necessary to ADD BACK the divisor to the dividend BEFORE shifting to the next digital position. The novel circuits employed in the invention of instant application and particularly the Delay Units, as described above, and the fast acting Adder, in which carries are propagated, almost immediately, allows such a feature to be properly exploited for maximum speed of operation. During the E/R 35 cycle, as the Address Counter is stepped down, one count, it is stepped down to a count of zero, having now been stepped down 34 counts. Thus, as the Address Counter reaches zero, the Machine, in the next Execute/Regenerate cycle, which is the E/R 36 cycle, and at zero time of this cycle, namely E/R 0 (D1) time, as indicated by the labeling, a signal is emitted to turn OFF the trigger T2 (Fig. 5*b*) of the Multiply Divide Tally Counter and to turn ON the trigger T36. Then, at "1" time of this cycle, E/R 1 (D4) signals, as indicated by the labeling in Fig. 6*ab*, are emitted for gating the holding of the Memory Register (the divisor) to the Adder, and for gating the holding of the Accumulator Register (the dividend) in Complement form to the Adder to thereby subtract the divisor from that portion of the dividend now contained in the Accumulator Register. As usual, if a Carry results from a subtraction, the output of the Adder is NOT allowed to be gated to the Accumulator Register so that, in effect, the subtraction does NOT take place. However, if the divisor does "go" into that portion of the dividend, NO Carry results, and an E/R 4 (D1) signal, as indicated by the labeling in Fig. 6*ab*, is emitted for gating the holding of the Adder to the Accumulator Register to thereby "complete" the subtraction. Next, an E/R 5 (D1) signal, as indicated by the labeling in Fig. 6*ab*, is emitted to store a 1 in the MQ (35) order. Since there was NO carry, as stated above, it is an indication that the holding of the Accumulator Register is now in Complement form and, therefore, an E/R 7 (D2) signal is emitted for connecting the holding of the Accumulator Register, in Complement form to the Adder and an E/R 8 (D1) signal is emitted, for connecting the holding of the Adder to the Accumulator Register, to thereby Recomplement the holding of the ACC Register. The operation of handling the numeric portion of this DIVIDE operation is completed with the "conditional subtraction" occurring during the E/R 36 cycle.

According to the rules of algebraic DIVIDE, if the

Signs of the dividend and the divisor are ALIKE, a positive Sign is stored in the MQ Sign order by an E/R 10 (D1) signal, but if the Signs are UNLIKE, a negative Sign is stored in the MQ Sign order by an E/R 10 (D1) signal.

During this E/R 36 cycle, which is the LAST cycle of the DIVIDE operation, an End of Operation signal is emitted at E/R 10 (D2) time, and another signal is emitted for stepping the Instruction Counter.

Thus, it is seen that AFTER a DIVIDE operation HAS BEEN STARTED, a "conditional subtraction" is made to determine whether the value standing in the Accumulator Register is greater than the value in the Memory Register, and if it IS, the divisor in the Memory Register IS subtracted from the partial remainder (dividend) in the Accumulator Register, and a binary 1 is placed in the MQ (35) order to provide one bit of the QUOTIENT. The dividend and the quotient are then shifted, one order to the LEFT.

IF, HOWEVER, the value in the Accumulator Register, which is a part of the dividend is less than the divisor, the subtract operation is NOT allowed to be "completed," which, of course, will SAVE ENTIRELY the extra operation of putting the divisor back in additively to "RESTORE" the dividend when a "NO GO" situation is reached, and, further, no OTHER extra steps or change in the DIVIDE routine is required. During this latter operation, a binary 1 is NOT stored in the MQ (35) order, but the MQ and the Accumulator Register are jointly shifted to the LEFT. This effectively stores a binary 0 in the MQ (35) order to provide this bit of the QUOTIENT. There are 35 such "conditional subtraction" and shifting operations, and again, the Multiply Divide Tally Counter and the Address Counter are used to keep track of which Execute/Regenerate cycle the Machine is in.

An example of a DIVIDE operation, as performed by the Machine is illustrated in Fig. 8*b*, wherein the divisor Read out of Memory into the Memory Register has a value of 10110, and the dividend contained in the Accumulator Register and the MQ has a value of 0100011111. In this chosen example, a 5 bit Machine, rather than a 35 bit Machine, is assumed for simplicity of explanation. Thus the Memory Register, the Accumulator Register and the MQ are represented, as containing only 5 bits (except for the fact that the Overflow positions P and Q of the Accumulator Register are also shown). The Sign positions are not illustrated in this purely numeric example. Assuming, as stated above, that a dividend of 0100011111 exists in the Accumulator Register and MQ combined reading, from just right of the binary point to the right, and that an Instruction DIVIDE is given calling for an Address at which a divisor of 10110 is stored, again reading from just right of the binary point to the right, the divisor of 10110 is Read out of Memory into the Memory Register during the Execute cycle, as described above, and the Machine proceeds to Execute/Regenerate cycles for the purpose of carrying out DIVIDE. During the E/R 1 cycle, as illustrated in Fig. 8*b*, the Complement of the value (the dividend) in the Accumulator Register is added to the value (the divisor) in the Memory Register, and the Adder output, at this time, under the problem assumed, has a Carry, which is an indication that the divisor is greater than the dividend, which is a required condition for the Machine to continue operation since the QUOTIENT must NOT be equal to or greater than 1. Hence, the Machine proceeds to shift both the MQ and the Accumulator Register jointly to the LEFT.

It should be particularly noted that the Adder output is NOT gated to the Accumulator Register. This FIRST cycle is MERELY a CHECK cycle to see that the requested division is legitimate.

The Machine then enters an E/R 2 cycle during which, as illustrated in Fig. 8*b*, the Complement of the THEN value in the Accumulator Register is added to the value in the Memory Register and again a Carry occurs. Since a Carry has occurred, the Adder output is NOT connected to the Accumulator Register but the value in the Accumulator Register remains as it was before entering into the E/R 2 cycle. Both the Accumulator Register and the MQ are jointly shifted, one order, to the LEFT.

The Machine then enters an E/R 3 cycle, and again, as is seen from Fig. 8*b*, the Complement of the THEN value in the Accumulator Register is added to the value, in the Memory Register. This time, however, NO End Carry ensues, so that the value in the Adder is gated to the Accumulator Register AND a binary 1 is stored in the least significant order of the MQ. It should be noted that this differs from the operation in the E/R 2 cycle, for when a Carry DOES occur, as under E/R 2, the least significant order of the MQ was left in its original state, which was, of course, storing a binary 0. Returning again to this E/R 3 cycle, the value in the Accumulator Register, at this point, is in Complement form, and therefore, it must be Recomplemented, and thereafter BOTH the Accumulator Register and the MQ are jointly shifted, one order to the LEFT.

The Machine then enters an E/R 4 cycle during which, as is seen from Fig. 8*b*, the Complement of the Accumulator Register is added to the value in the Memory Register and as is seen, there is NO End Carry, and thus, a binary 1 is stored in the least significant order of the MQ, and the Adder output is gated to the Accumulator Register. The value in the Accumulator Register is now in Complement form, and, therefore, it is necessary to Recomplement, and next, the Accumulator Register and the MQ are jointly shifted, one order, to the LEFT.

The Machine then enters an E/R 5 cycle, and, as is seen from Fig. 8*b*, the Complement of the value in the Accumulator Register is again added to the value in the Memory Register. During this cycle, however, an End Carry DOES occur, which indicates that for this cycle the divisor did NOT "go" into the dividend. Due to the fact that there IS a Carry, the least significant order of the MQ is undisturbed and thus, in effect, stores a binary 0, and the Adder output is NOT gated to the Accumulator Register. The Accumulator Register is thus holding the same value as it did at the start of this E/R 5 cycle. Thereafter, the Accumulator Register and the Memory Register are jointly shifted, one order to the LEFT.

The Machine then enters an E/R 6 cycle. This E/R 6 cycle corresponds in function, of course, to the normal Machine E/R 36 cycle. During this LAST E/R cycle, the Complement of the value in the Accumulator Register is added to the value in the Memory Register and, since NO End Carry occurs, a binary 1 IS stored in the least significant order of the MQ, and the value in the Adder is gated to the Accumulator Register, as illustrated in Fig. 8*b*. This value in the Accumulator Register is now in Complement form, and it is necessary to Recomplement this value. Also during this last E/R cycle, the Sign of the MQ is SET in accordance with the rules for algebraic DIVIDE, and an End of Operation is signalled. As the operation ends, the QUOTIENT, which, in our assumed example, is equal to 01101 is stored in the MQ, while the remainder, 00001, is stored in the Accumulator Register, and the operation is thus completed.

Thus, it is seen that binary DIVIDE is accomplished by subtracting the divisor from the dividend in the Accumulator Register, which may be a remainder, and, if we find a "go" condition, the subtraction is allowed to be "completed" and a binary 1 is stored in the least significant order of the MQ to build up a QUOTIENT. Then the dividend and the QUOTIENT are jointly shifted, one order to the LEFT, during successive cycles, the QUOTIENT replacing the least significant orders of the dividend, as it is formed.

If the divisor does NOT "go" into the remainder, then

NO binary 1 is stored in the least significant order of the MQ, which is equivalent to storing a binary 0 for that bit of the QUOTIENT and the remaining dividend and the partial QUOTIENT are jointly shifted, one order to the LEFT. After a sufficient number of such steps, the QUOTIENT is stored in the MQ, and the remainder in the Accumulator Register, while the Memory Register still holds the divisor. The dividend is destroyed during this operation unless it has been stored, prior to the operation in some other Address in Memory.

In Fig. 8*c*, there is illustrated a card punched to represent twenty-four 36 bit numbers. If this card is placed in a Card Reader, the Electronic Data Processing Machine may be programmed to read this card when an Instruction selects this Card Reader for a READ Instruction. As the Card Reader is energized under control of the Operation Decoder and the Control Circuits, the card is fed, bottom first, through the Card Reader. This operation, is, of course, slow in comparison with the speed of operation of the Calculator, so that the Calculator may proceed to carry out additional Instructions, but before the bottom row, namely, the 9's row of the card reaches the reading station of the Card Reader, the Calculator must, by means of a COPY Instruction call for the first word of 36 bits from the card, this COPY Instruction including an Address, which is THE Address, at which the first word of 36 bits read from the card is to be stored in Memory. When the 9's row reaches the reading station of the Card Reader, the information of the punched holes is sensed by brushes in a well-known manner, and the 36 bit word, for instance the word represented in the left hand 36 columns of the card (Fig. 8*c*) is read into a buffer storage of thirty-six trigger circuits and then is "dumped" into the MQ Register in the same manner as described above. This information is next transferred from the MQ Register and is stored, in Memory, at THE Address specified by said COPY Instruction.

A second COPY Instruction must be given before the 9's row LEAVES the reading station of the Card Reader, so that the Calculator reads a second word, for instance that represented by columns 37 to 72 of the card (in the right half of the 9's row in Fig. 8*c*) into the buffer storage and thence via the MQ Register to Memory, at the Address specified by this second COPY Instruction. The selection of the actual columns read from the card is determined by the wiring on a pluggable control panel in a well-known manner. The Calculator may then proceed to carry out additional Instructions involving calculations which do not require use of the MQ Register, up to that time when the 8's row reaches the reading station. As the 8's row reaches the reading station, two successive COPY Instructions must be given for reading the information punched in the 8's row, that is, one COPY to read columns 1 through 36, and a second COPY to read columns 37 through 72. This process continues until all rows are Read. Cards punched in the binary notation are, of course, convenient for the Machine, since it operates inherently in binary, upon binary numbers having a Sign bit and 35 binary bits.

The Machine may also be programmed to read a card punched conventionally in the decimal notation (for numbers) as illustrated in Fig. 8*d*, in which each digit occupies one column or it may be programmed to read a card punched in conventional alphabetic characters, using two punches, per column, examples of which are also illustrated in Fig. 8*d*. For example, a digit 2 is indicated by a hole punched in the "2" row, while a digit 6 is represented by a hole punched in the "6" row. Alphabetic characters, as stated, use a combination comprising two punched holes, per column. Special characters, such as punctuation marks, may use up to three punched holes. The Machine may be programmed to read cards punched with alphabetic and special characters in such conventional manner and the Program controls the Machine so that it stores a Card Image until alphabetic printing is needed.

When decimal values are punched in the conventional manner, the Machine is so programmed that the Calculator, through the use of various Instructions which it can perform easily and quickly translates such a decimal number to a binary number without any other apparatus being required. In this manner of operation, the 9's row is read first, and it is regarded as a plural digit number consisting of only 9's and 0's, the 9's, of course, being stored as binary 1's, since the Calculator represents bits in a yes-no or ON-OFF manner. Each group of 9's and 0's comprising a multi-digit number having the accuracy of 36 binary bits of the left half of Fig. 8*d*, for example, IS TRANSLATED, AS READ, that is, the 9's row, upon being read, is translated into its binary equivalent and the 8's row considered as 8's and 0's is thereafter translated and added to the respective translations of the 9's row and the process continues until all rows, and thus the entire card content, is translated. With the card as illustrated in Fig. 8*d*, the numeric values can be handled in groups by means of normal plugboard wiring and the groups can then be controlled by the programming to translate during Read-In to Memory. The alphabetic and special characters can be plugwired and handled by the Instructions so that they are stored in Memory as a card image for later use. Also, the entire card can be stored in Memory as a Card Image, and thereafter the decimal values can be translated by means of the Program.

In the Calculator, True numbers ONLY are stored in Memory. Thus, whenever an arithmetic operation takes place, the result is stored finally in the Accumulator Register or in the MQ Register, in True form. This system was adopted since parallel binary machines operating upon both True and Complement numbers, encounter difficulties with Complement numbers during NON-ARITHMETIC operations. Because each number is represented in True form, with a Sign representation, there is a possibility that the value of zero may exist having a POSITIVE or a NEGATIVE Sign. The Machine has been designed to permit either a POSITIVE or NEGATIVE ZERO to exist. "Mathematically," a quantity of zero means nothing so that mathematically only, there is no meaning to the Sign of a zero quantity. In the Calculator, however, a zero multi-digit value must be represented by a certain configuration of bits, including the Sign bit, which must have a positive or negative representation, since there is no provision for a third stable state to represent "NO SIGN." Because of this fact, the rule is applied that when the result of a calculation, stored in the Accumulator Register, is zero, the Sign, PREVIOUSLY STORED, in the Accumulator Register, REMAINS UNCHANGED, during ADD or SUBTRACT. For MULTIPLY and DIVIDE, the rule followed is that if the Signs of the multiplier and the multiplicand are UNLIKE, the product is NEGATIVE. Therefore, if quantities of +0 and −X are multiplied, where X represents any number, the result or product is a NEGATIVE zero. Actually, in the machine, a plus zero multidigit value and a minus zero multi-digit value have different configurations of bits, but if a negative 0 was arbitrarily suppressed, by special control circuits, the Machine would be blind to one of the $2^{36}$ configurations, that may be obtained from the 36 bits. This, of course, would present a serious drawback in attempting to perform LOGICAL operations on NON-NUMERIC information, since, if the machine were unable to recognize each of the $2^{36}$ configurations, many of the configurations would become useless. If negative zero were not allowed, the Machine would be unable to recognize, for example, the existence of a hole, punched only in that column of a decimally punched card, which corresponds to the Sign position of the word in Memory, if that were the only hole in that row of the card. A punched hole is, of course, read in as a binary 1, which in the language of the Machine represents a negative Sign in the Sign position. Thus, referring to Fig. 8*d*, as columns 37 through 72 of the 9's row, is read wherein the only punched hole is in the 37th column, the word is —000, etc. If this were not an allowed operation, the word, of course, could not be properly read into the Machine. The 9 hole, as punched, may be the first digit in a decimal number, say a quantity of 936 as illustrated in Fig. 8*d*, being punched in columns 37, 38 and 39. Thus, as described above, a parallel binary Calculator of the type shown and described herein, which may handle EITHER POSITIVE or NEGATIVE ZERO quantities, is highly useful in operations not strictly mathematical and also in certain mathematical operations such as reading a decimal punched card and converting the values to pure binary representation.

There has thus been provided novel means for producing parallel binary add and subtract operations of different kinds involving the use of the respective sign indications of the factors, novel methods of producing parallel binary multiplication and division, also taking into account the signs of the factors, novel means for producing various operations under control of stored Instructions and a novel system wherein either POSITIVE or NEGATIVE ZERO indications are properly handled.

While there has been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In an electronic data processing machine, including means to produce a transfer on zero operation comprising, in combination, an addressable memory including read-in means for storing a program of instructions at selectable addresses therein and read-out means for reading out instructions therefrom, an instruction register, an instruction counter, means for normally stepping said counter, means controlled by said counter for normally selecting sequentially numbered addresses in said memory, an accumulator register, an adder, means for transferring the manifestation of said transfer on zero instruction including an address portion from said memory to said instruction register, means effective upon ascertainment that said instruction is transfer on zero for initiating a test of said accumulator register for a zero standing therein comprising means complementing the holding of said accumulator register and feeding it to said adder and inserting a unit value, in the lowest order of said adder, and means effective upon carry from the highest order of said adder, indicative of a previous 0, standing in said accumulator register to transfer the address part of said instruction stored in said instruction register to said instruction counter, whereby the normal sequence of instruction selection, is altered accordingly.

2. In combination, a multiorder accumulator register, a multiorder multiplier quotient register containing the less significant bits of a result and means including a multiorder adder connected order by order to said accumulator register, for producing a round operation in said accumulator register including means testing the highest order of said multiplier quotient register for a binary 1, and effective to produce a round operation in said adder upon ascertainment of a binary 1 and transferring the result, in said adder, to said accumulator register.

3. In combination, a multiorder accumulator register, a multiorder adder and a multiorder multiplier quotient register containing the less significant bits of a result and means for producing a round operation including means for transferring the true value of the manifestation stored in said accumulator register to said adder, means checking the highest order of said multiplier quotient register for the presence of a binary 1 or a binary 0, and means, effective upon ascertainment of a binary 1, for adding a unit increment to the lowest order of said adder, and means thereafter effective to transmit the new adder sum to said accumulator.

4. A combination as in claim 3, and including an overflow indicator connected to the highest order of said adder and effective upon addition of said unit increment of value to said lowest order of said adder and a consequent rippling of a carry through said adder and through its highest order, to operate said overflow indicator.

5. In a device for performing an add absolute operation and including an accumulator register with a first factor stored therein, means for indicating the sign of the factor stored therein, an adder having a plurality of regular orders and a plurality of overflow orders and adapted to emit representations of a result upon the reception of representations of two factors, means for feeding said first factor to said adder, selectively, in true or in complement form, means feeding a second factor to said adder, in true form only, said second factor being treated, as a positive value, regardless of its sign, and said first factor, being transferred to said adder, in true form, if said accumulator sign is plus, and in complement form, if said accumulator sign is minus, an overflow indicator, means for operating said overflow indicator provided a carry occurs from said highest regular adder order and said accumulator register factor is plus, means receiving an indication of the sign of the accumulator register factor and an indication of a carry from the highest overflow order inserting an increment of value in the lowest order of said adder if said accumulator register factor is minus and a carry occurs from the highest overflow order, means transmitting signals representing a result from said adder to said accumulator register, means recomplementing said result, by passing it in complement form, to said adder upon receiving indications that said accumulator sign is minus and no carry occurred and means setting said sign indication to plus upon receiving indications that said accumulator register sign was minus and a carry did occur.

6. In a device for performing a subtraction operation between a first factor and a second factor, said factors comprising values of either sign, respectively, an adder, having a plurality of regular orders and a plurality of overflow orders and adapted to emit representations of a result upon the reception of representations of factors, an accumulator register, means indicating the sign of a first factor stored in said accumulator register, means operative, upon ascertaining that the signs of said first factor and said second factor are unlike, to transfer the true value of the factor in said accumulator register to said adder and the true value of said second factor to said adder, but operative if the signs are alike, to transfer the complement value of said first factor to said adder, an overflow indicating device, means operative to set said device to indicate an overflow upon ascertaining that said signs are unlike and there is a carry from the highest regular order of said adder, means effective upon ascertaining that said signs are alike and a carry occurs from the highest overflow order, to inject an elusive 1 into the lowest regular order of said adder, means transferring the representations of a result in said adder to said accumulator register, means operative upon ascertaining that the signs are alike and there is no carry to transfer the complement of said result in said accumulator register to said adder and back to said accumulator register to thereby recomplement said value, and means effective upon ascertaining that said signs are alike, that there is a carry and that said accumultaor sign is minus, to set said sign to plus, but effective upon ascertaining that said signs are alike, there is a carry and the accumulator sign is plus, to set said sign to minus.

7. In a device for producing a subtract absolute operation on two factors having respectively, either one of two signs, and including an adder having a multiplicity of regular orders and a multiplicity of overflow orders and adapted to emit representations of a result upon the reception of representations of factors, an accumulator register, means for indicating the sign of a factor in said accumulator register, means operative, upon ascertaining said accumulator sign is minus, to transfer the true value of the factor in said accumulator register to said adder and the true value of said second factor to said adder, but operative upon ascertaining that said accumulator sign is plus, to transfer the complement of said accumulator factor to said adder, an overflow indicating means, means operative upon ascertaining that said accumulator sign is minus and a carry occurs from the highest regular order of said adder, to set said overflow indicating means, means operative upon ascertaining that said accumulator sign is plus and a carry occurs from the highest overflow order, to enter an elusive 1 in the lowest adder order, means to transfer the resultant representation from said adder to said accumulator register, means rendered operative upon ascertaining that said accumulator sign is plus and there is no carry, to transfer the complement of said value in said accumulator to said adder and back to said accumulator register to thus recomplement said value, and means operative, upon ascertaining that said accumulator sign is plus and there is a carry, to change the accumulator register sign to minus.

8. In an electronic data processing machine for producing a multiplication operation including addressable storage means comprising memory, means storing a program of instruction in said memory, a count down counter, a memory register, an instruction register, an adder, an accumulator register, and a multiplier quotient register, means for storing a sign indication for said multiplier quotient register, means for storing a sign indication for said accumulator register, means controlled by said program to transfer a multiplier from said memory to said multiplier quotient register, means controlled by said program to transfer a multiply instruction, from said memory to said memory register and from said memory register to said instruction register, means for setting said count down counter, to a fixed setting, means controlled by the data manifestations in said instruction register to select a multiplicand, at the address in memory indicated by the address portion of the instruction stored in said instruction register and to transfer said multiplicand to said memory register, means checking the lowest order of said multiplier quotient register, for a binary 1 or a binary 0 therein, and effective, upon ascertaining the presence of a binary 1, to transfer said multiplicand from said memory register to said adder, and from said adder to said accumulator, to thus store a first partial product, means shifting said accumulator register and said multiplier quotient register, jointly, in one direction as controlled by a multiply indication, means transferring the true value of said shifted partial product in said accumulator register to said adder, and said multiplicand to said adder, said checking means checking the binary 1 or binary 0 status of the new lowest order value in said multiplier quotient register, and effective, if a binary 1 is ascertained, to transfer said adder sum to said accumulator register, to replace the first shifted partial product, by a second partial product, said shifting means again shifting said multiplier quotient register and said accumulator register, one step to the right, and stepping said count down counter, one step, said transferring means transferring said multiplicand to said adder, and the true value of said second shifted partial product to said adder, means testing the new value at the lowest multiplier quotient register order and transferring said adder sum to said accumulator register, if a binary 1 exists, and means repeating said operation until all digits of the multiplier have been tested and all transfers and shifts have been made, whereby the full product is produced, in said multiplier quotient register and in said accumulator register, at the time that said step down counter, counts down to zero.

9. In a machine as in claim 8, and including, means for checking the signs of the multiplier and the multiplicand and means effective, if said signs are unlike, to store a negative sign in both the multiplier quotient sign order and the accumulator register sign order but if said signs are alike, the signs so stored are positive.

10. In an electronic data processing machine for producing a divide operation and including addressable electrostatic storage means comprising memory, means storing a program of instruction in memory, a memory register, an instruction register, a count down counter, an adder, an accumulator register, a multiplier quotient register, means for storing a sign indication for said multiplier quotient register, means controlled by said program for transferring a dividend to said accumulator register and to said multiplier quotient register jointly, means controlled by said program, for transferring a divide instruction from said memory to said memory register and from said memory register to said instruction register, means controlled by the manifestation of a divide instruction in said instruction register, to transfer a divisor from the address in memory indicated by the address part of the instruction in said instruction register, to said memory register, means resetting said count down counter to zero, means adding a stipulated value, indicative of the number of steps of shift, to said count down counter, means transferring the memory register contents to said adder, and the complement of the value in said accumulator register to said adder, to test whether said divisor is greater than said dividend, means for stopping said machine if said divisor is less than said dividend, as indicated by no carry from said adder, means operative, if said divisor is greater than said dividend to continue said divide operation, means connecting the highest order of the multiplier quotient register to the lowest order of the accumulator register, means operable to shift both said multiplier quotient register and said accumulator register, one step, to the left, including shifting the contents of said multiplier quotient highest order to the lowest accumulator register order, means transferring said divisor in memory resister to said adder and the complement of said accumulator register to said adder, to thus tentatively subtract the divisor from the dividend, means effective, if no end carry ensues, to transfer said result in said adder to said accumulator register, and also effective to store a binary 1, in the lowest order of the multiplier quotient register, to thus provide a quotient bit, but effective if a carry did ensure, to block transfer of said result to said accumulator register, and to insert a binary 0, in the lowest order of the multiplier quotient register, means effective, when no carry ensues, to transfer the complement of the value in said accumulator register to said adder and from said adder back to said accumulator register to thereby recomplement said value, means shifting said multiplier quotient register and said accumulator register jointly, one step in one direction as determined by a divide indication, including shifting the multiplier quotient highest order content to the accumulator register lowest order, means stepping said count down counter, one step, means repeating said tentative subtractions of said divisor from said dividend and inserting a binary 1, for each "go" and a binary 0 for each "no go" in the lowest order of said multiplier quotient register to thereby build up said quotient, means effective to provide one additional such tentative subtraction, with subsequent transfer or no transfer of the result to said accumulator register, upon said step down counter reaching zero, to thus complete the divide operation, means checking the signs of the divisor and dividend, and means effective, if said signs are alike, to store a positive sign in said multiplier quotient sign order, but if said signs are unlike to store a negative sign.

11. An electronic data processing machine for producing binary division in parallel comprising an adder having a plurality of regular orders, each comprising a full binary adder and a plurality of overflow orders, each comprising a half binary adder, an accumulator register comprising a delay unit, for each order, and having a respective order connected to each of said adder orders, a multiplier quotient register, means connecting said multiplier quotient register to said accumulator register for shifting as a unit therewith in one direction, a dividend entered in said multiplier quotient register and said accumulator register jointly, means storing a divisor, means initiating a test of the relative value of said divisor and said dividend and stopping said division process, if said divisor is less than said dividend, means operative to continue said division operation, if said divisor is greater than said dividend, means shifting said multiplier quotient register and said accumulator register, after said test, means transferring the contents of said accumulator register to said adder, in complement form, and the divisor to said adder, in true form, to thus tentatively subtract said divisor from said dividend, checking means, effective upon no carry from the highest overflow order of said adder, indicative of a "go" condition, to transfer said result from said adder to said accumulator register and to add binary 1 in said multiplier quotient register lowest order, to thus provide an increment of quotient and effective to transfer the complement of the value in the accumulator register into said adder and from said adder to said accumulator register to thus recomplement said value, said checking means, however, blocking the transfer of said result from said adder to said accumulator register and the subsequent recomplement operation, if a carry does occur, indicative of a "no go" and operative to insert a binary 0 into said lowest multiplier quotient order, said shifting means again shifting said multiplier quotient register and said accumulator register jointly and said transferring means repeating said tentative subtractions, and selectively inserting a binary 1 or binary 0, in said multiplier quotient register lowest order, to thus build up said quotient, until a set number of shifts have occurred, whereupon said quotient appears in said multiplier quotient register.

12. A machine, as in claim 11 and including, means testing the signs of said divisor and said dividend, and means controlled by said testing means to set said multiplier quotient register sign, to plus, if said signs are alike, but to minus, if said signs are unlike.

References Cited in the file of this patent

UNITED STATES PATENTS

| | | |
|---|---|---|
| Re. 23,699 | Havens | Aug. 18, 1953 |
| 2,503,765 | Rajchman et al. | Apr. 11, 1950 |
| 2,528,100 | Williams | Oct. 31, 1950 |
| 2,568,932 | Rajchman et al. | Sept. 25, 1951 |
| 2,601,089 | Burkhart | June 17, 1952 |
| 2,604,262 | Phelps | July 22, 1952 |
| 2,617,930 | Cutler | Nov. 11, 1952 |
| 2,636,672 | Hamilton et al. | Apr. 28, 1953 |
| 2,638,542 | Fleming | May 12, 1953 |
| 2,749,037 | Stibitz | June 5, 1956 |
| 2,776,794 | Williams et al. | Jan. 8, 1957 |
| 2,786,628 | Kilburn | Mar. 26, 1957 |
| 2,799,449 | Turing et al. | July 16, 1957 |
| 2,800,278 | Thomas | July 23, 1957 |
| 2,810,516 | Tootill et al. | Oct. 22, 1957 |
| 2,815,168 | Zukin | Dec. 3, 1957 |

FOREIGN PATENTS

| | | |
|---|---|---|
| 167,102 | Australia | Feb. 27, 1956 |
| 749,836 | Great Britain | June 6, 1956 |

OTHER REFERENCES

E.R.A., 24 Digit Parallel Computer With Magnetic Drum Memory (PX29136), Engineering Research Asso. Inc., St. Paul, Minn., Figs. 3.5–3 to 6, and Fig. 3.8–1, pages 17, 27, 28, 39, Figs. 3.4–6 to 8, 16 to 19, 1949.

Ordvac Manual Univ. of Illinois, Oct. 31, 1951, pages 27 to 30, 34, 35, 95 to 104, 115 to 118, and 141 to 152, and Figs. 189, 195, 271, 289, 301, 317, 343, 348, 352.

Estrin: A description of the Electronic Computer at the Institute of Advanced Studies, Proceedings Ass. for Computing Machinery, September 1952, pp. 95–109.

Chu: The Oak Ridge Automatic Computer, Proceedings Ass. for Computing Machinery, September 1952, pp. 142–147.

N.B.S. Circular 551, Computer Development (Seac and Dyseac) at the National Bureau of Standards.

UNITED STATES PATENT OFFICE

CERTIFICATION OF CORRECTION

Patent No. 2,974,866 March 14, 1961

Jerrier A. Haddad et al.

It is hereby certified that error appears in the above numbered patent requiring correction and that the said Letters Patent should read as corrected below.

Column 37, line 13, for "followed" read -- follower --; line 47, for "eneven" read -- even --; column 40, line 32, after "passes" insert -- via --; column 41, line 8, for "383b" read -- 393b --; column 47, line 49, for "CTR 17," read -- CTR 17. --; column 55, line 17, for "522a" read -- 552a --; column 56, line 18, for "Deflective" read -- Deflection --; column 59, line 66, for "483d" read -- 583d --; column 69, line 5, for "ASCU" read -- ASUC --; column 70, line 16, for "412d" read -- 512d --; column 72, line 28, for "Fig. 2ac, and line 581c" read -- Fig. 5ad, and line 502d --; line 66, strike out "The second input to the AND circuit 507e."; column 73, line 5, for "T/R" read -- E/R --; column 74, line 7, for "519d" read -- 579d --; column 79, line 63, for "of" read -- if --; column 87, line 42, for "mission" read -- emission --; line 56, for "an" read -- on --; column 94, line 29, for "750d" read -- 570d --; line 68, for "Divids" read -- Divide --; line 72, for "contacts" read -- contains --; column 95, line 66, for "Roland" read -- Round --; column 96, line 39, for "Liewise" read -- Likewise --; column 100, line 4, strike out "and", second occurrence; line 5, strike out "D 4549"; column 105, line 44, for "amplified" read -- amplifier --; line 71, for "substraction" read -- subtraction --; column 106, line 67, for "it" read -- if --; column 121, line 72, for "coresponding" read -- corresponding --; column 134, line 38, for "Signs" read -- Sign --; column 135, line 45, for "EXECUTIVE" read -- EXECUTE --; column 137, line 24, for "in" read -- is --; column 139, line 41, for "Resistor" read -- Register --; column 140, line 3, for "Addres" read -- Address --; column 144, line 64, for "Addressee" read -- Address --; column 145, line 50, for "Registerm" read -- Register --; column 147, line 39, for "and" read -- an --; column 156, line 55, for "ensure," read -- ensue,--.

Signed and sealed this 5th day of December 1961.

(SEAL)
Attest:

ERNEST W. SWIDER
Attesting Officer

DAVID L. LADD
Commissioner of Patents